US009933924B2

(12) United States Patent
Taylor

(10) Patent No.: US 9,933,924 B2
(45) Date of Patent: *Apr. 3, 2018

(54) METHOD, SYSTEM AND USER INTERFACE FOR CREATING AND DISPLAYING OF PRESENTATIONS

(71) Applicant: Robert Taylor, Atlanta, GA (US)

(72) Inventor: Robert Taylor, Atlanta, GA (US)

( * ) Notice: Subject to any disclaimer, the term of this patent is extended or adjusted under 35 U.S.C. 154(b) by 627 days.

This patent is subject to a terminal disclaimer.

(21) Appl. No.: 14/485,320

(22) Filed: Sep. 12, 2014

(65) Prior Publication Data

US 2015/0007035 A1    Jan. 1, 2015

Related U.S. Application Data

(63) Continuation of application No. 13/159,766, filed on Jun. 14, 2011, now Pat. No. 8,850,320.

(60) Provisional application No. 61/354,984, filed on Jun. 15, 2010.

(51) Int. Cl.
  *G06F 3/048* (2013.01)
  *G06F 3/0484* (2013.01)
  *G06F 9/44* (2018.01)
  *G06F 17/21* (2006.01)

(52) U.S. Cl.
  CPC ........ *G06F 3/04842* (2013.01); *G06F 9/4443* (2013.01); *G06F 17/212* (2013.01)

(58) Field of Classification Search
  None
  See application file for complete search history.

(56) References Cited

U.S. PATENT DOCUMENTS

| | | | |
|---|---|---|---|
| 7,379,848 B2 * | 5/2008 | Yu | G06Q 10/10 702/186 |
| 7,458,030 B2 | 11/2008 | Kirn et al. | |
| 7,725,812 B1 | 5/2010 | Balkus et al. | |
| 2003/0206182 A1 | 11/2003 | Kelly et al. | |
| 2004/0153504 A1 * | 8/2004 | Hutchinson | G06F 17/30017 709/204 |
| 2004/0268224 A1 | 12/2004 | Balkus et al. | |
| 2005/0044480 A1 | 2/2005 | Templier | |
| 2005/0132288 A1 | 6/2005 | Kirn et al. | |
| 2005/0160368 A1 * | 7/2005 | Liu | G06F 3/0481 715/762 |
| 2006/0031749 A1 * | 2/2006 | Schramm | G06F 17/30056 715/201 |
| 2006/0171515 A1 * | 8/2006 | Hintermeister | G06Q 10/10 379/110.01 |

(Continued)

OTHER PUBLICATIONS

International Search Report dated Feb. 17, 2012 in International Application No. PCT/US2011/04315.

(Continued)

*Primary Examiner* — Hua Lu
(74) *Attorney, Agent, or Firm* — Morris Manning & Martin, LLP; Bryan D. Stewart; John R. Harris

(57) ABSTRACT

A method and system for creating at least one presentation, comprising: at least one computer, at least one application operable on the at least one computer, the at least one application configured for: receiving a plurality of assets; and allowing at least one user to define the at least one presentation over the time that the at least one presentation is to be displayed, using at least two assets to be simultaneously presented for at least one selected point in time.

15 Claims, 98 Drawing Sheets

(56) References Cited

U.S. PATENT DOCUMENTS

| | | | |
|---|---|---|---|
| 2006/0209090 A1 | 9/2006 | Kelly et al. | |
| 2007/0124669 A1* | 5/2007 | Makela | G06F 17/30905 715/201 |
| 2007/0160972 A1* | 7/2007 | Clark | G09B 5/14 434/362 |
| 2008/0082581 A1* | 4/2008 | Templier | G06F 17/30044 |
| 2008/0209330 A1* | 8/2008 | Cruver | G06F 15/16 715/733 |
| 2008/0276174 A1* | 11/2008 | Hintermeister | G06Q 10/10 715/720 |
| 2009/0249222 A1* | 10/2009 | Schmidt | H04N 21/2368 715/751 |
| 2009/0327934 A1* | 12/2009 | Serpico | G06F 17/248 715/764 |
| 2010/0146496 A1* | 6/2010 | Stoddart | H04N 21/4126 717/168 |
| 2011/0016427 A1* | 1/2011 | Douen | G06F 19/324 715/828 |

OTHER PUBLICATIONS

Written Opinion dated Feb. 17, 2012 in International Application No. PCT/US2011/04315.
www.webex.com, retrieved on Jan. 30, 2012, from www.web.archive.com archived Jun. 7, 2011 (15 pages).
www.abode.com/products/adobeconnect.html, retrieved on Jan. 30, 2012 from www.web.archive.com archived Jun. 9, 2011(73 pages).
www.articulate.com, retrieved on Jan. 30, 2012 from www.web.archive.com archived Jun. 10, 2011(26 pages).

\* cited by examiner

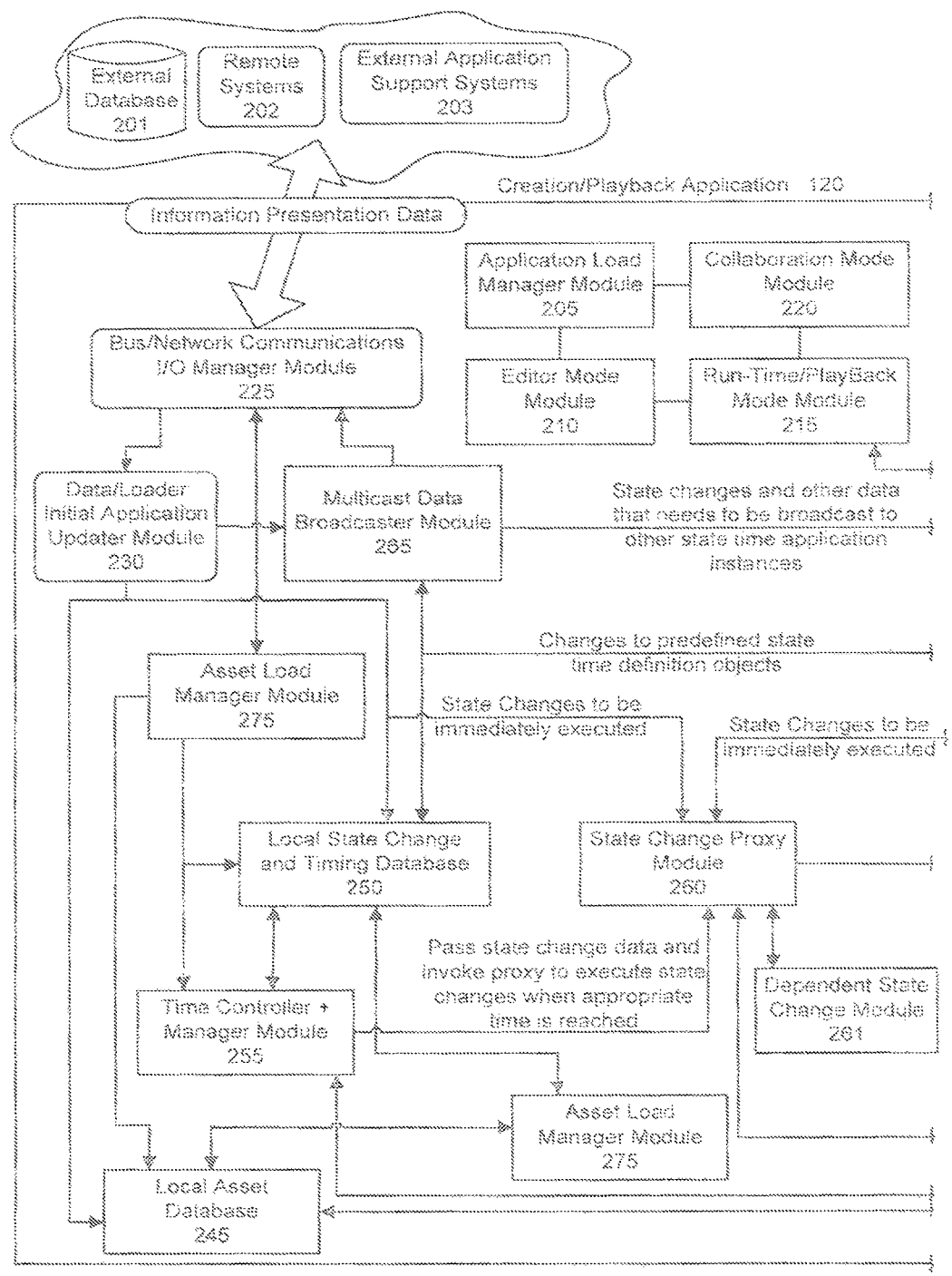

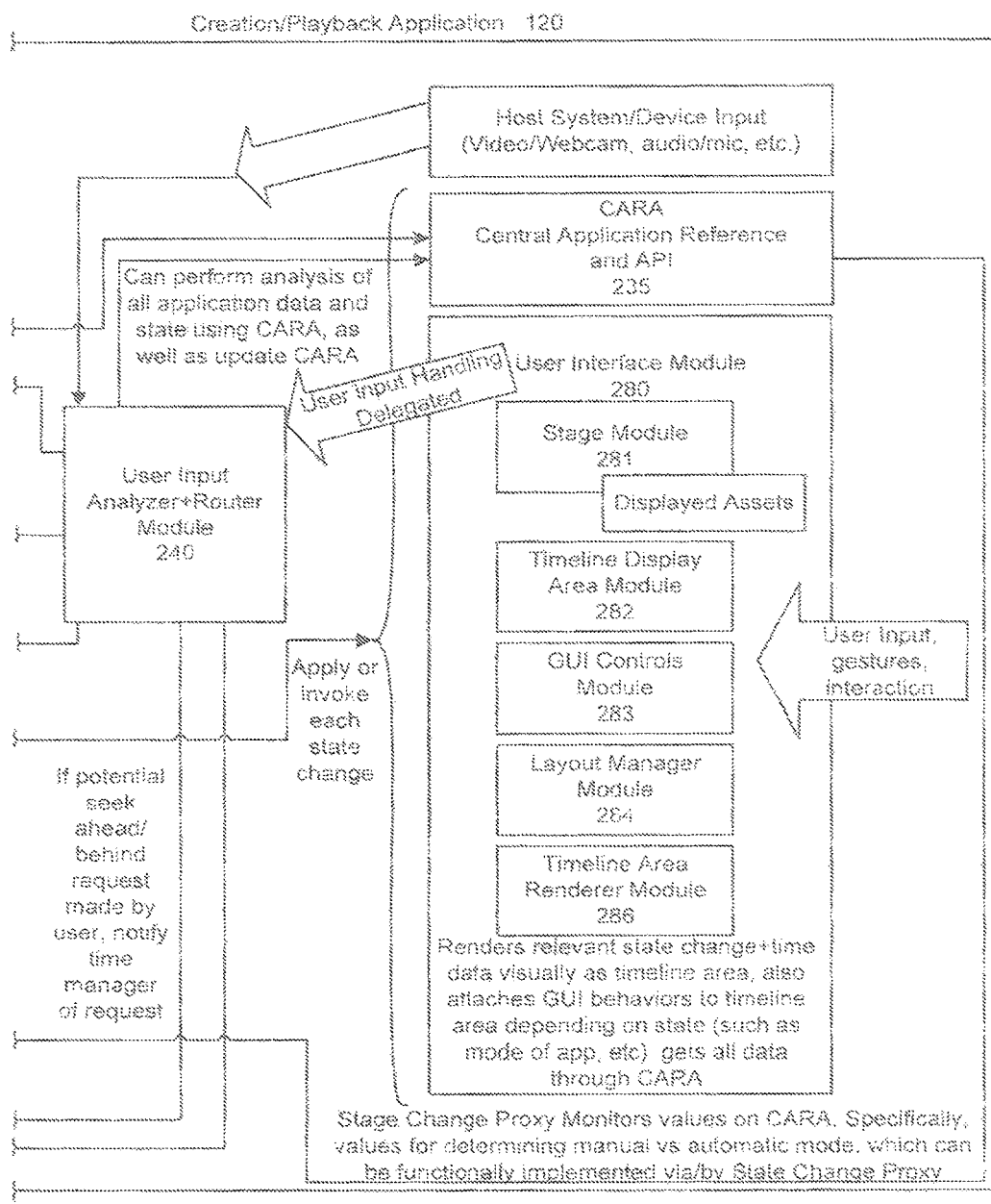

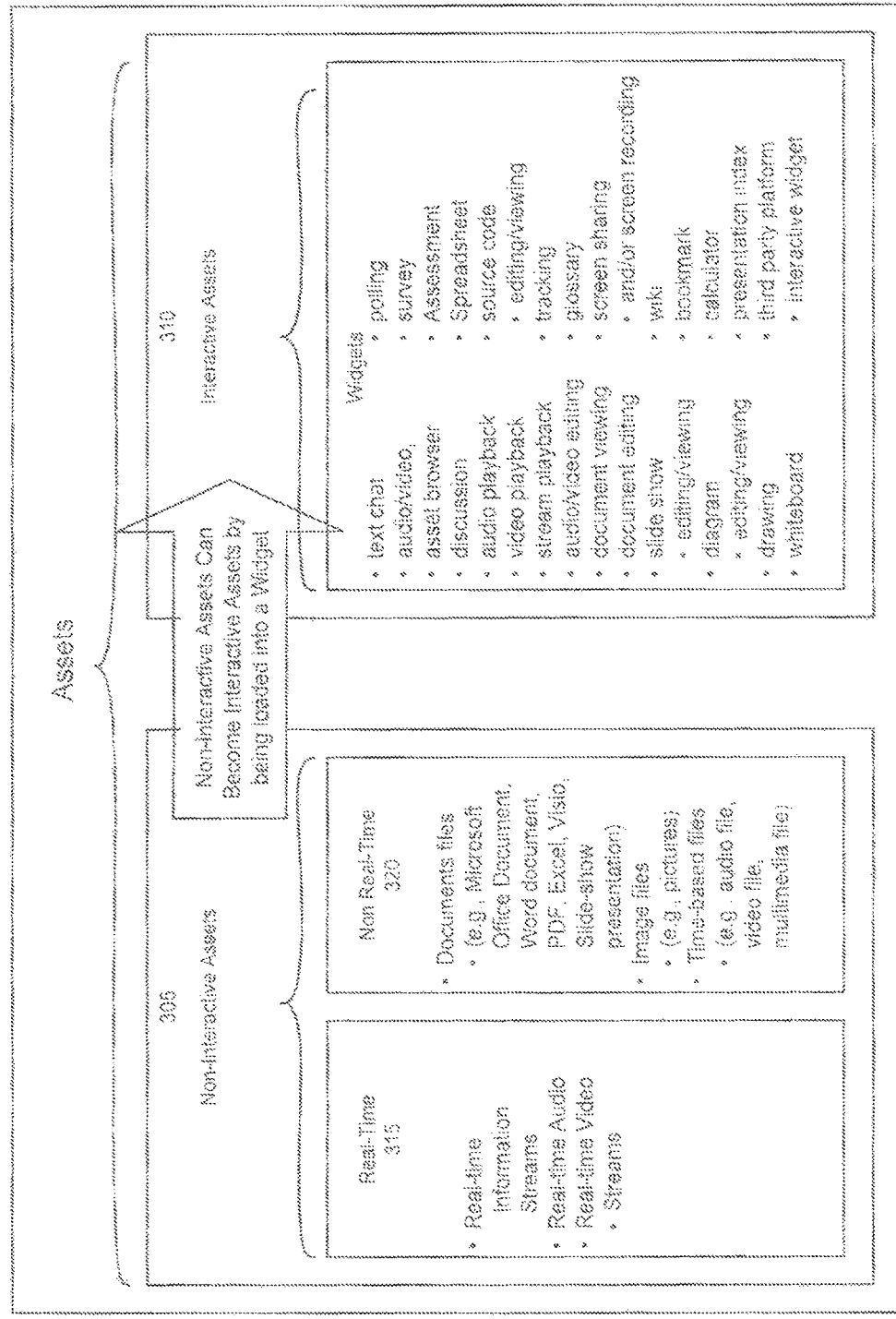

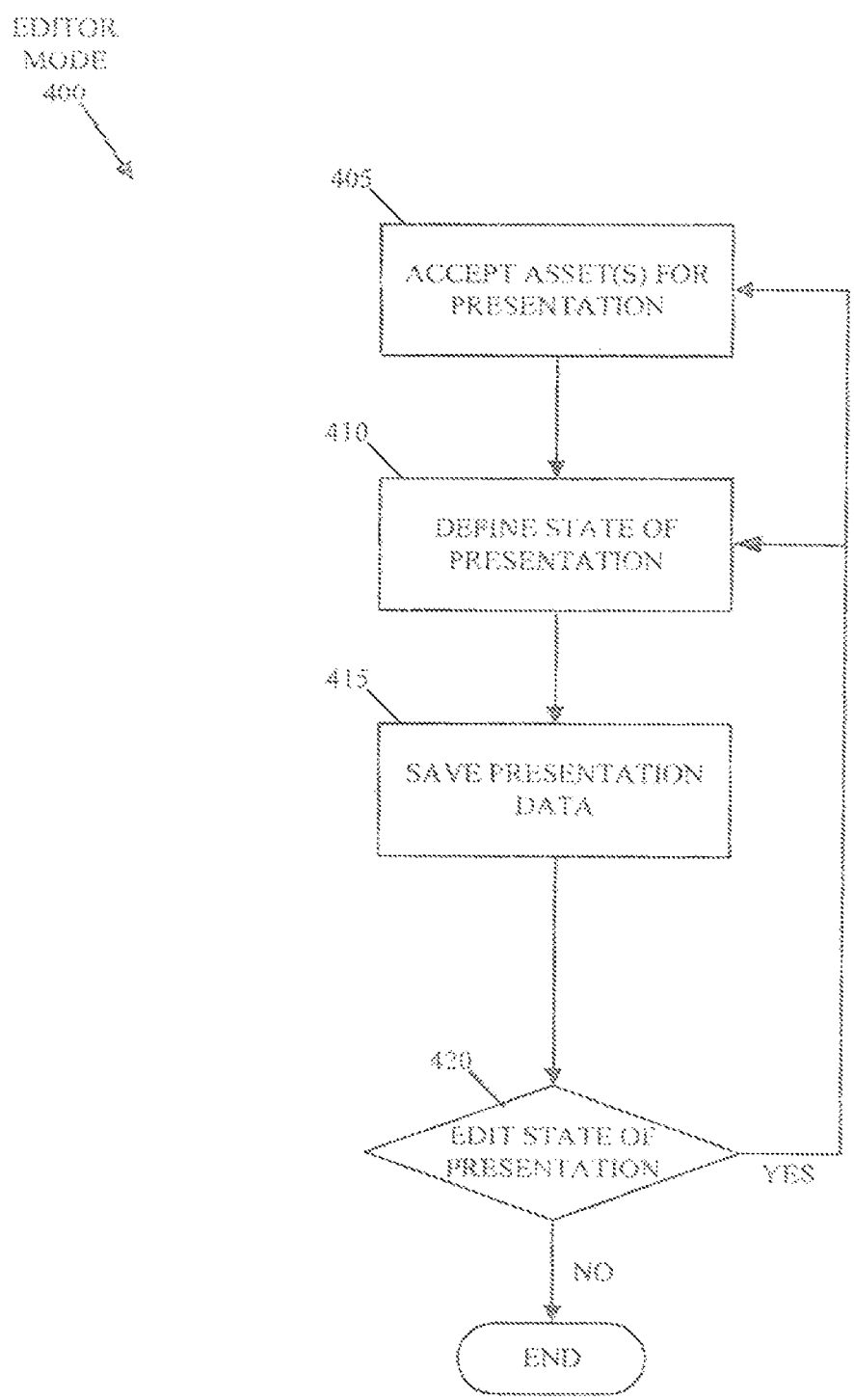

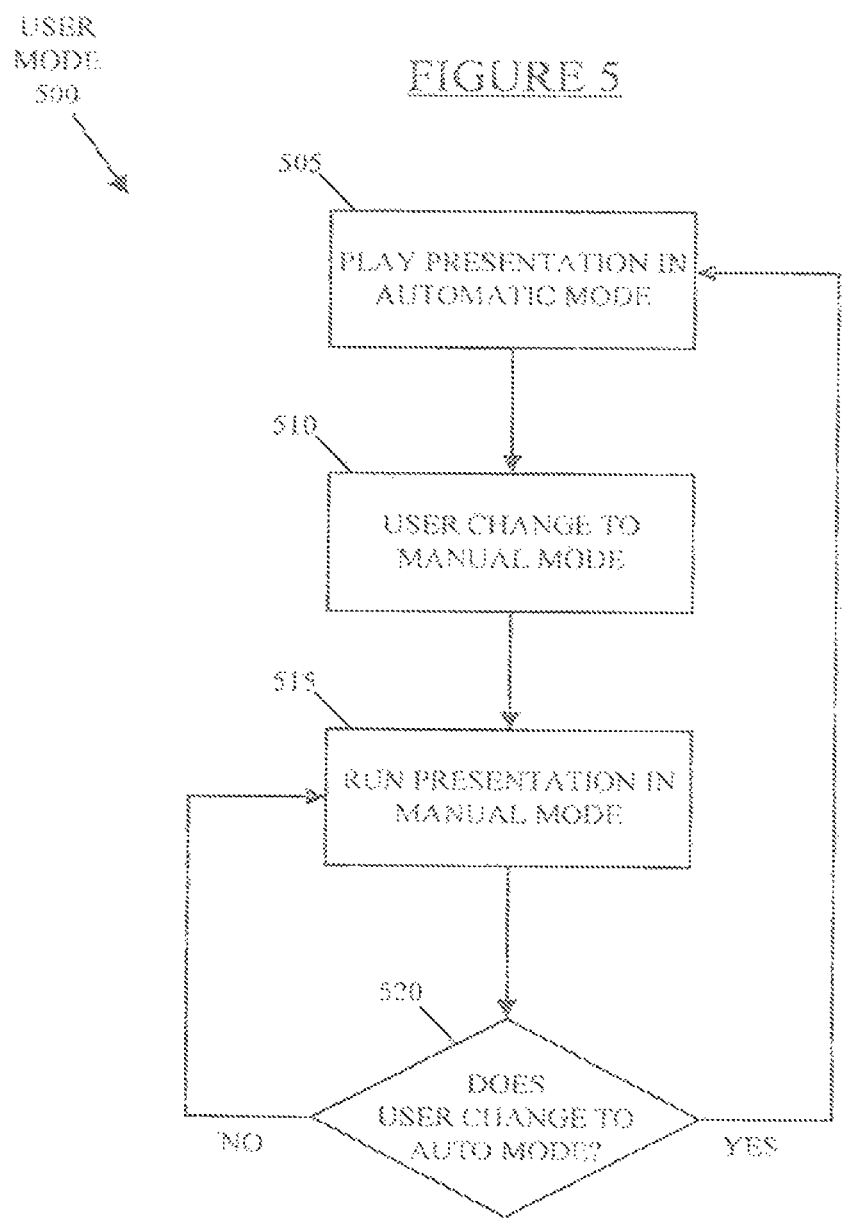

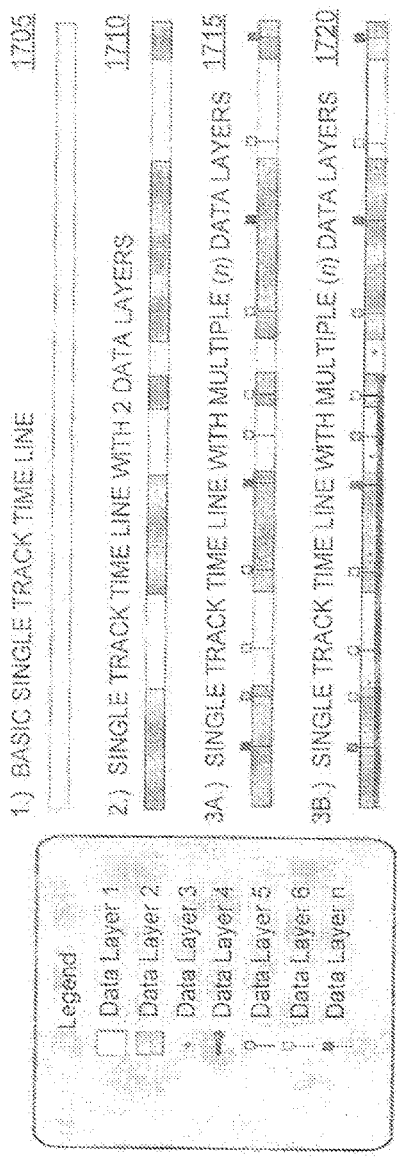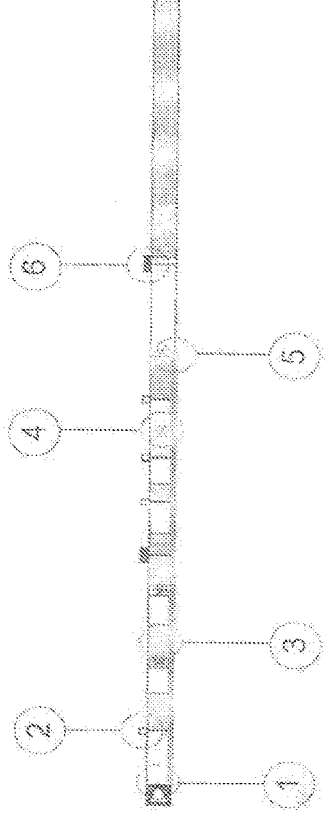
FIGURE 17

FIGURE 18
BASIC SINGLE TRACK EMBODIMENT EXAMPLES
A) Basic Single Track Time line with 1 Data Point
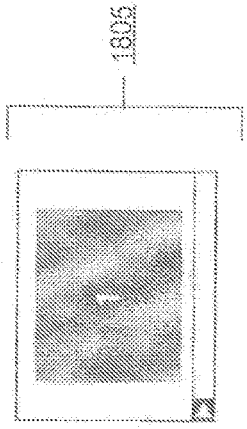
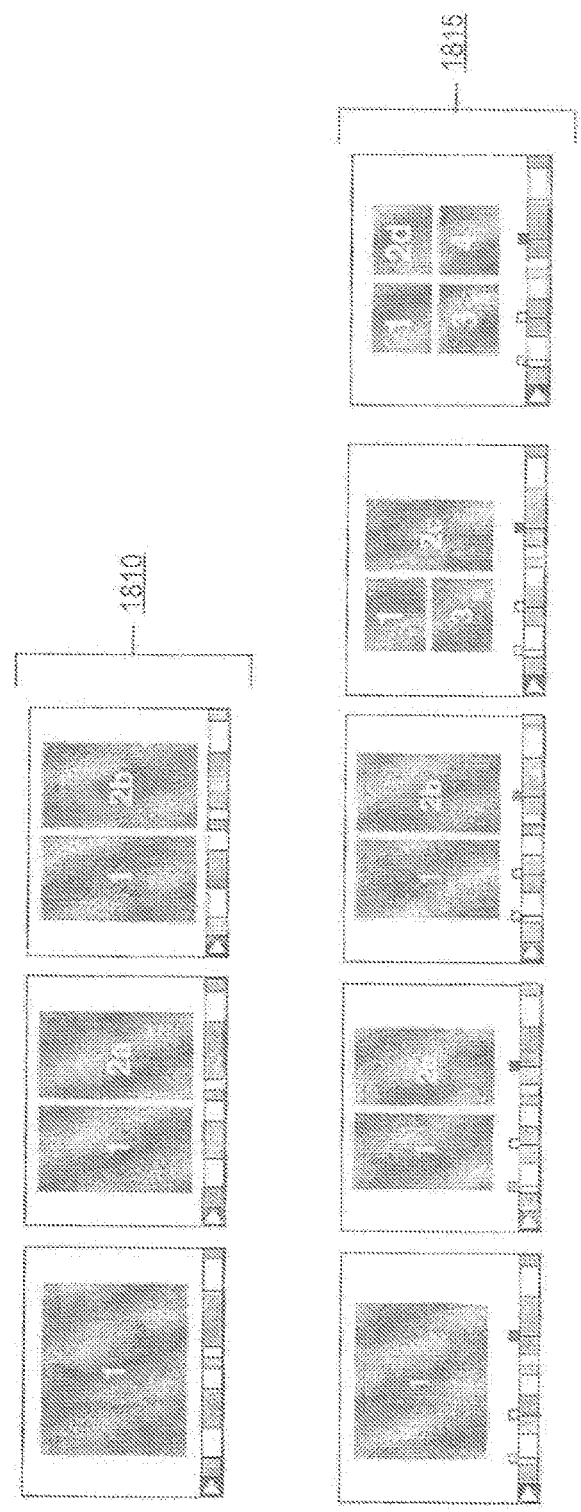

FIGURE 19

ICON LEGEND

VIDEO — Film icon can represent a video document asset, video playback widget or audio/video editing widget AUDIO — Music note icon can represent an audio document asset, audio playback widget or audio/video editing widget (Used interchangeably with speaker icon.)

AUDIO — Speaker icon can represent an audio document asset, audio playback widget or audio/video editing widget (Used interchangeably with music note icon.)

REFERENCE LINK — Asterisk icon can represent a reference link to additional information that may include any external web site, article, document, and/or other digital artifact.

TIMER / STOPWATCH — Time icon can used to represent a timer and/or stopwatch, related to time within an information presentation or within an asset or widget CHAT AND/OR DISCUSSION — Dialogue icon can represent a text chat, video chat or discussion asset CALCULATOR — Calculator icon can represent a calculator widget QUIZ/EXAM/ASSESSMENT — Question mark icon can represent an assessment widget SPREADSHEET — The spreadsheet icon represents a spreadsheet widget DOCUMENT — Document icon can represents a Document (MS Word, PDF, etc.), Document File, Document viewing widget, document editing widget.

SLIDE SHOW — Slide icon can represents slide show presentation document asset or slide show presentation viewing/editing widget PICTURE / IMAGE — Camera icon can represents a picture or image file/widget.

NOTE PAD — Note pad icon can represent a diagram editing/viewing widget, a drawing suite widget

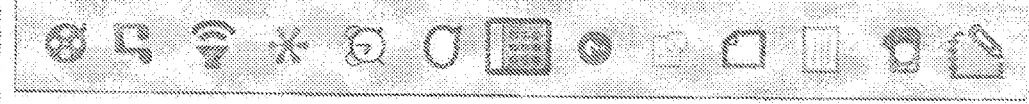

MULTI TRACK TIME LINE EXPANDED VS SINGLE TRACK TIME LINE COLLAPSED
SAMPLE PRESENTATION WITH 7 DATA LAYERS

MULTI-TRACK TIME LINE CONTEXTUAL AND PREDICTIVE USER INTERFACE HEAT MAP

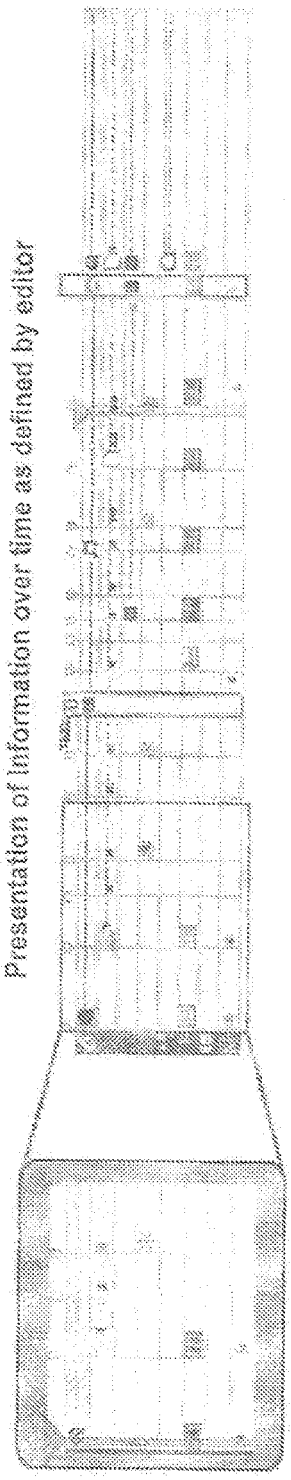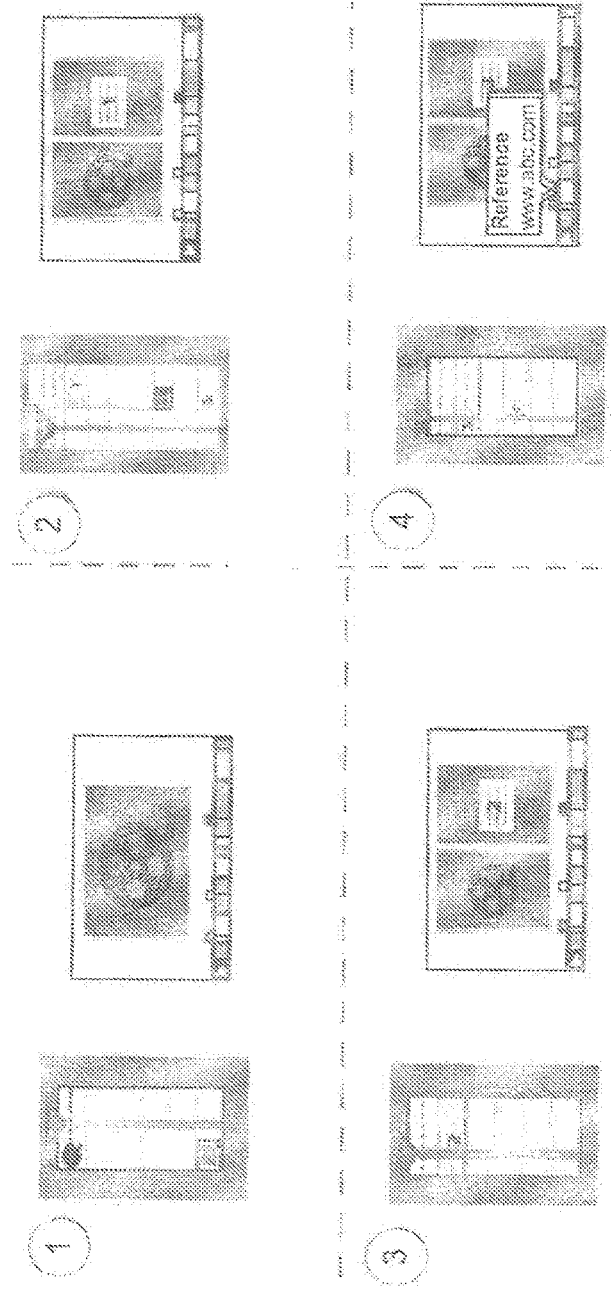
FIGURE 23

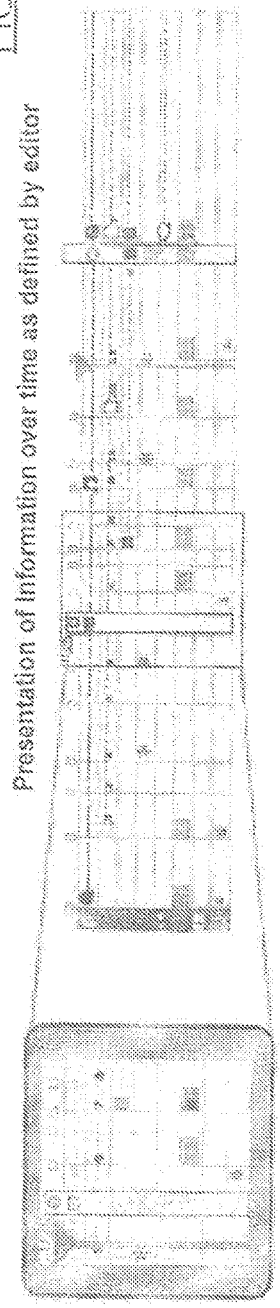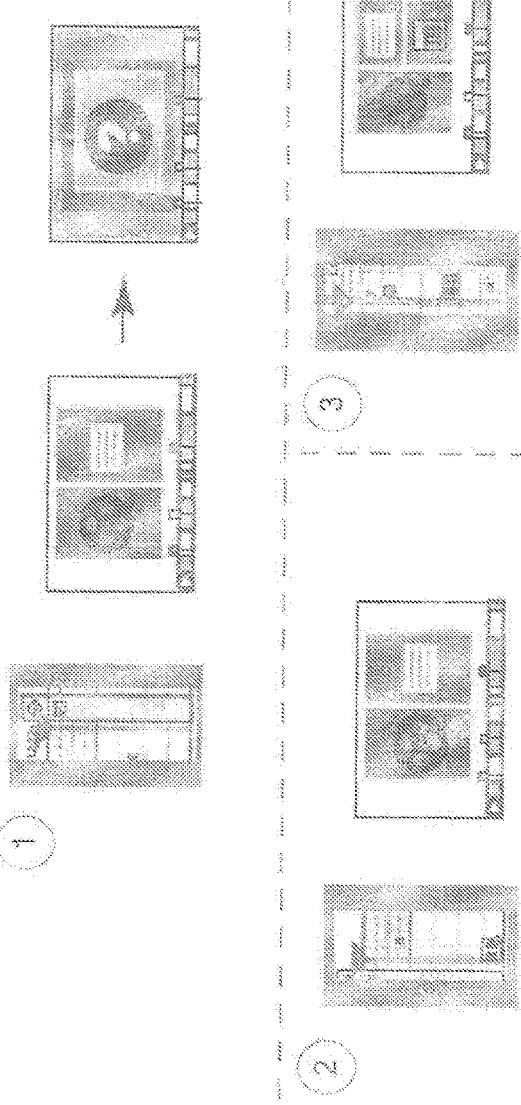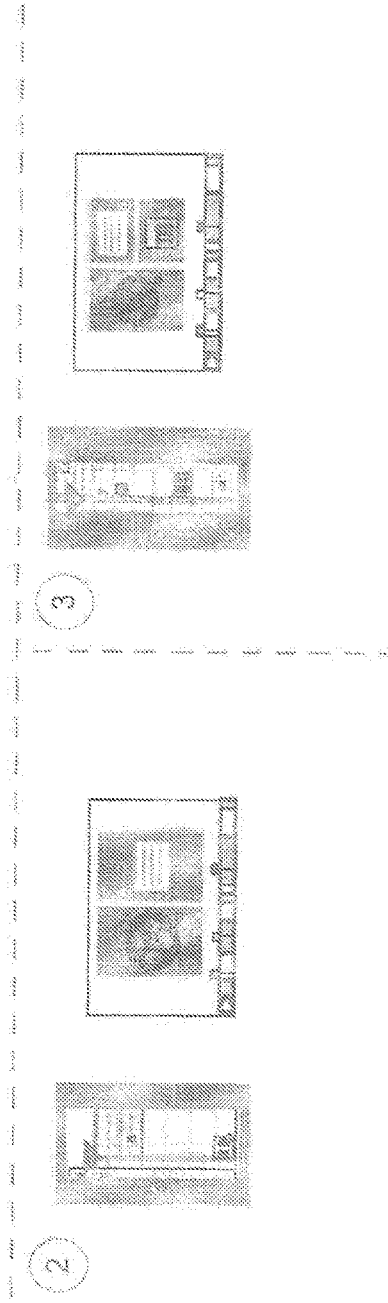
FIGURE 24

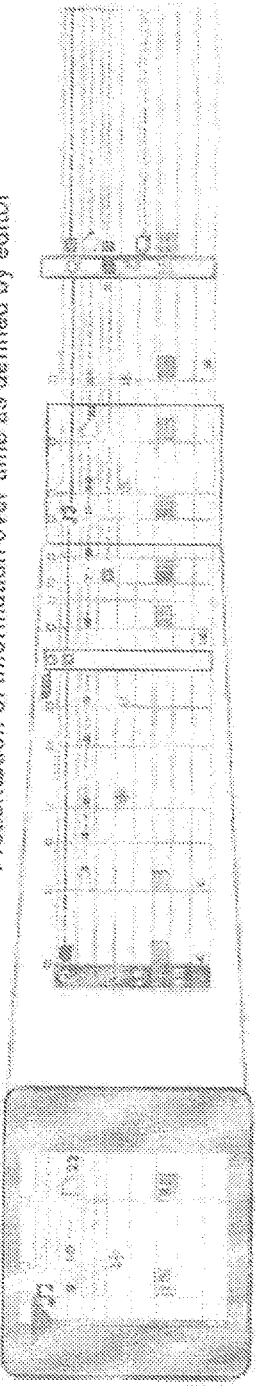
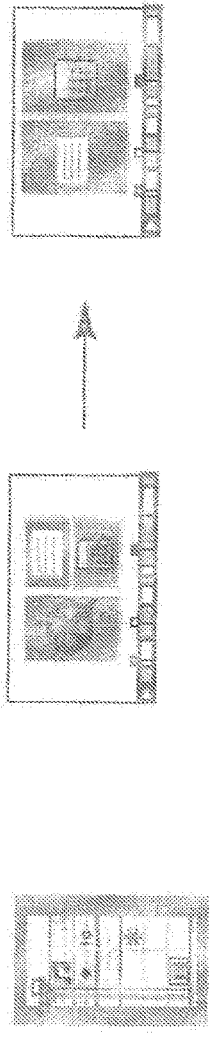
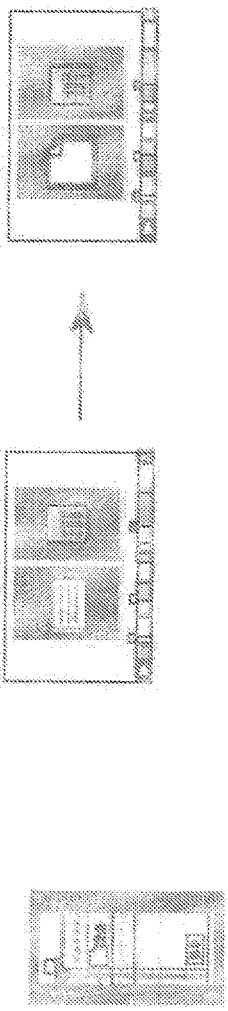
FIGURE 25

AUTOMATIC PLAY MODE

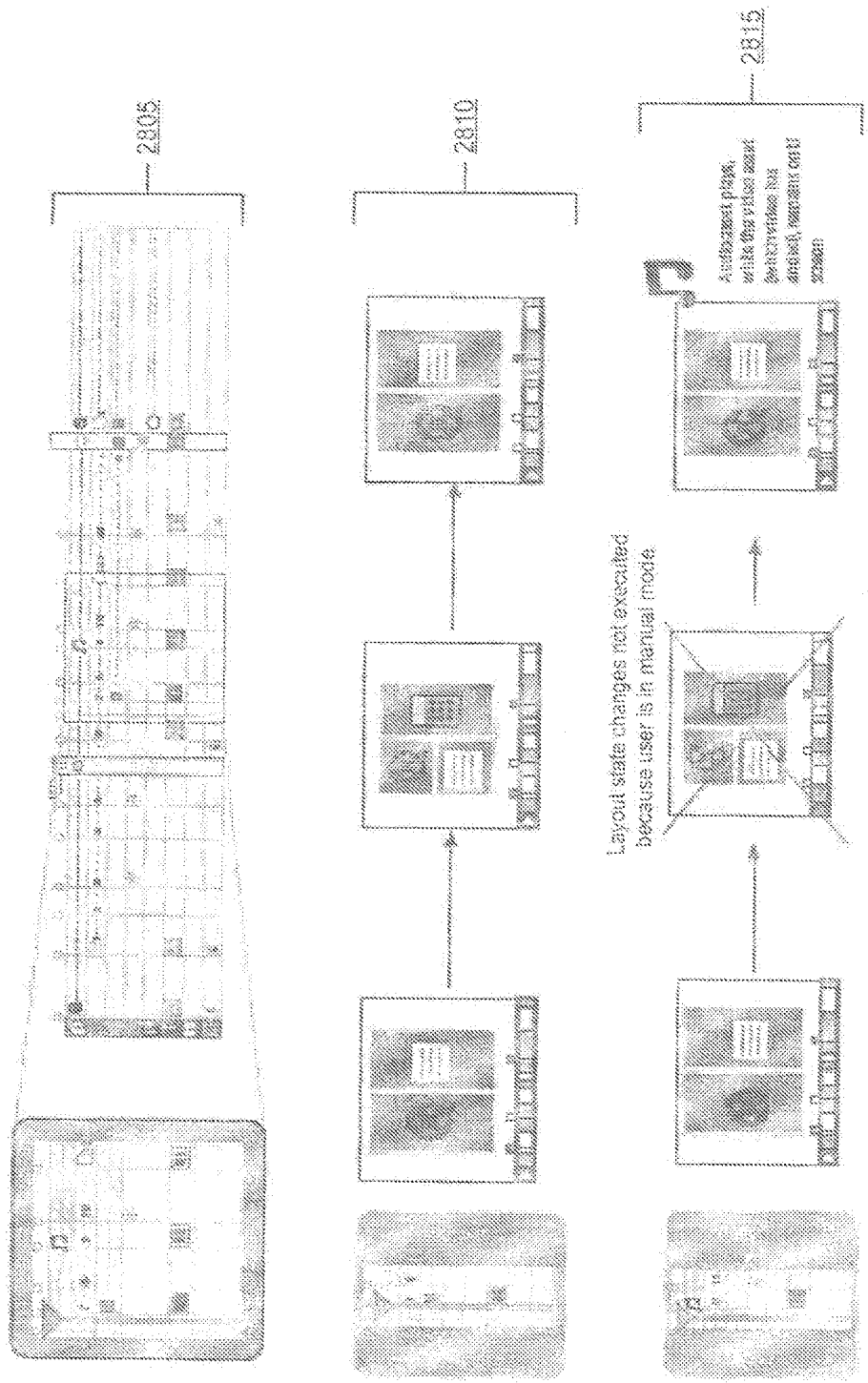

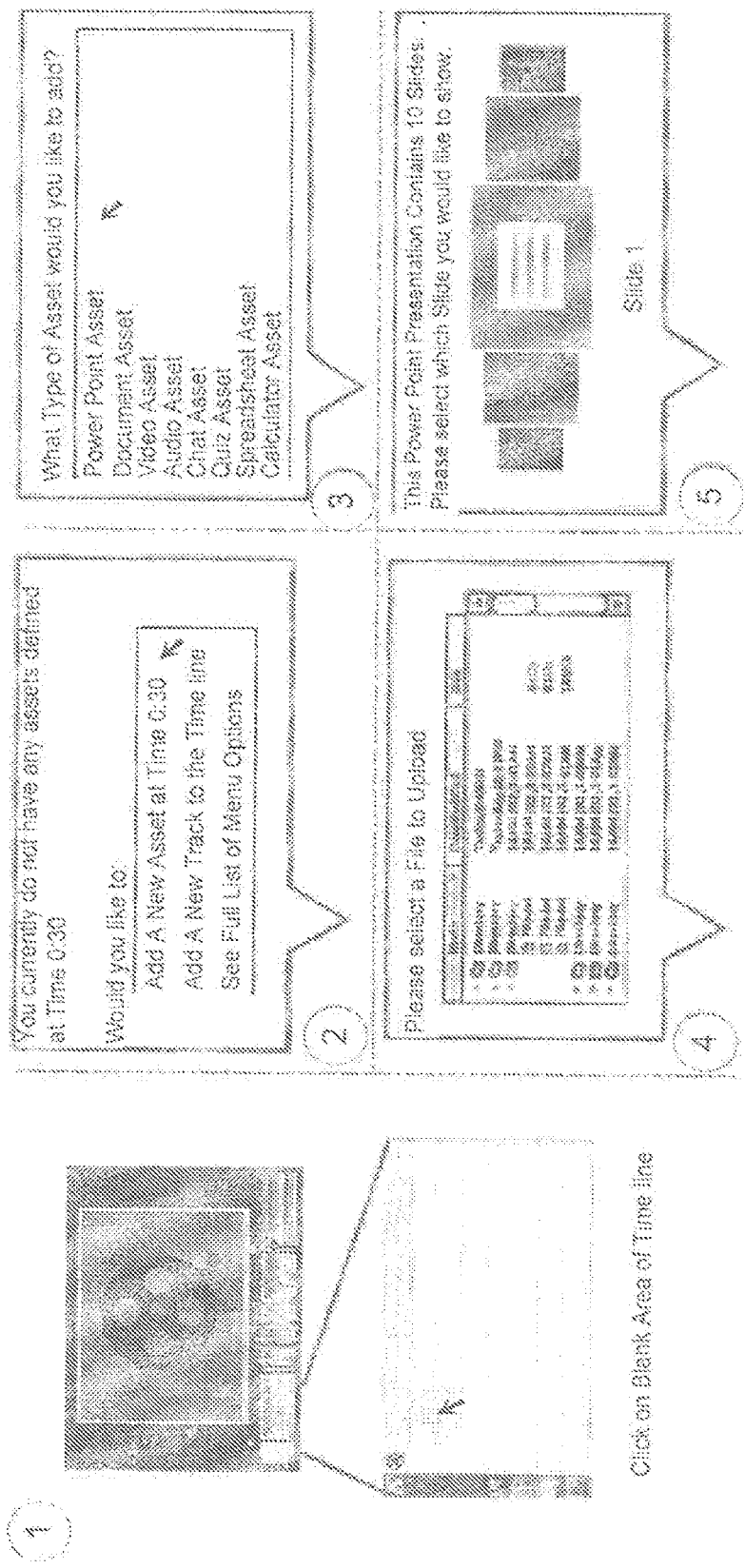

*FIGURE 30A*
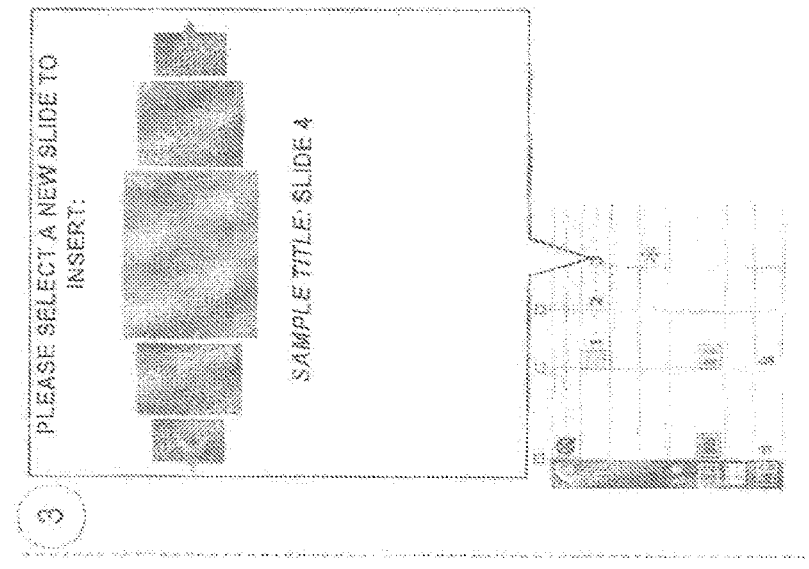
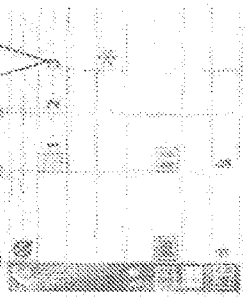
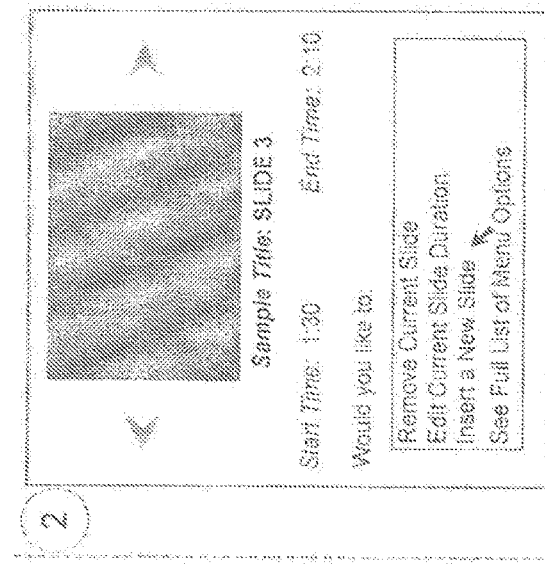
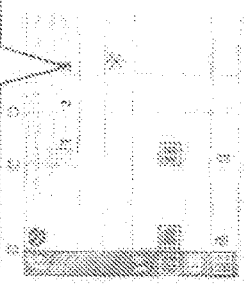
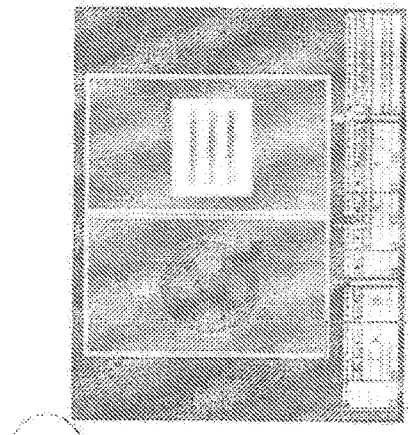
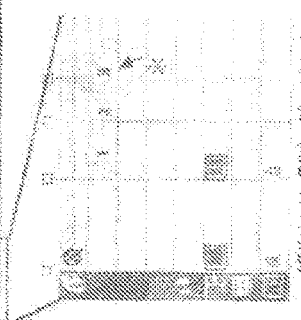

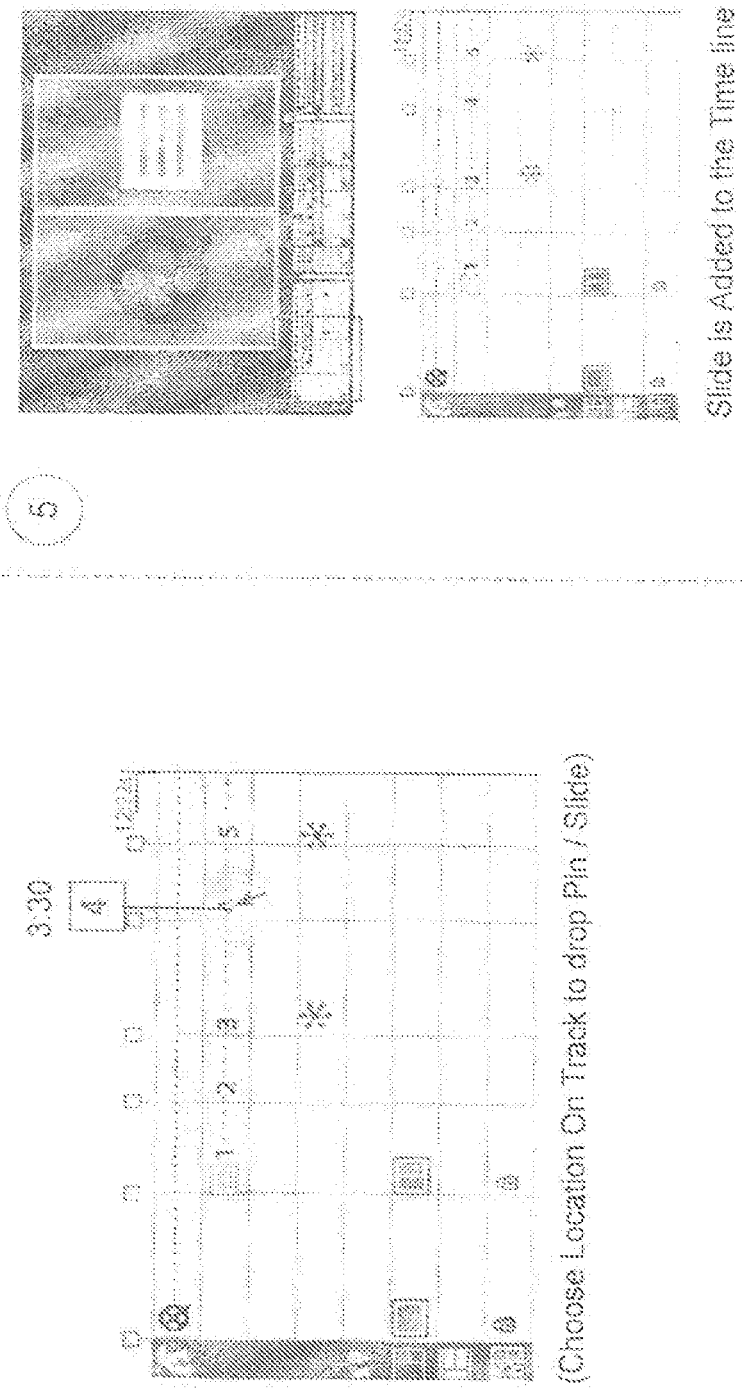

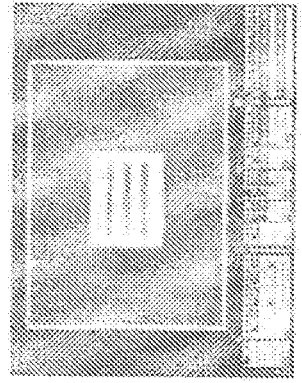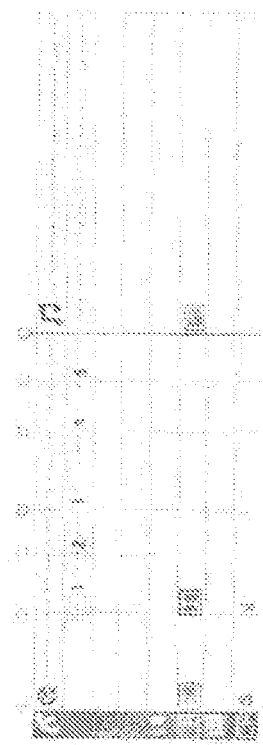
FIGURE 31B
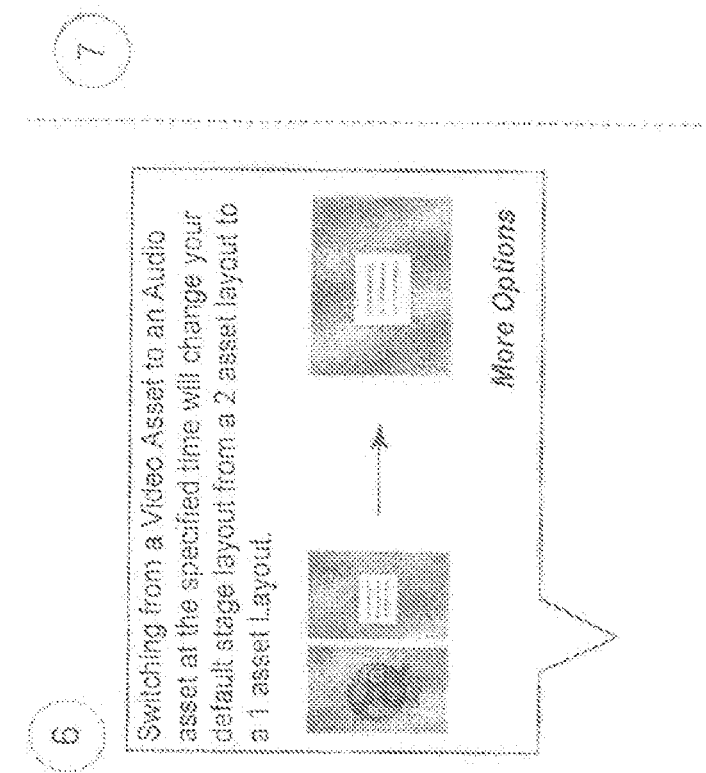

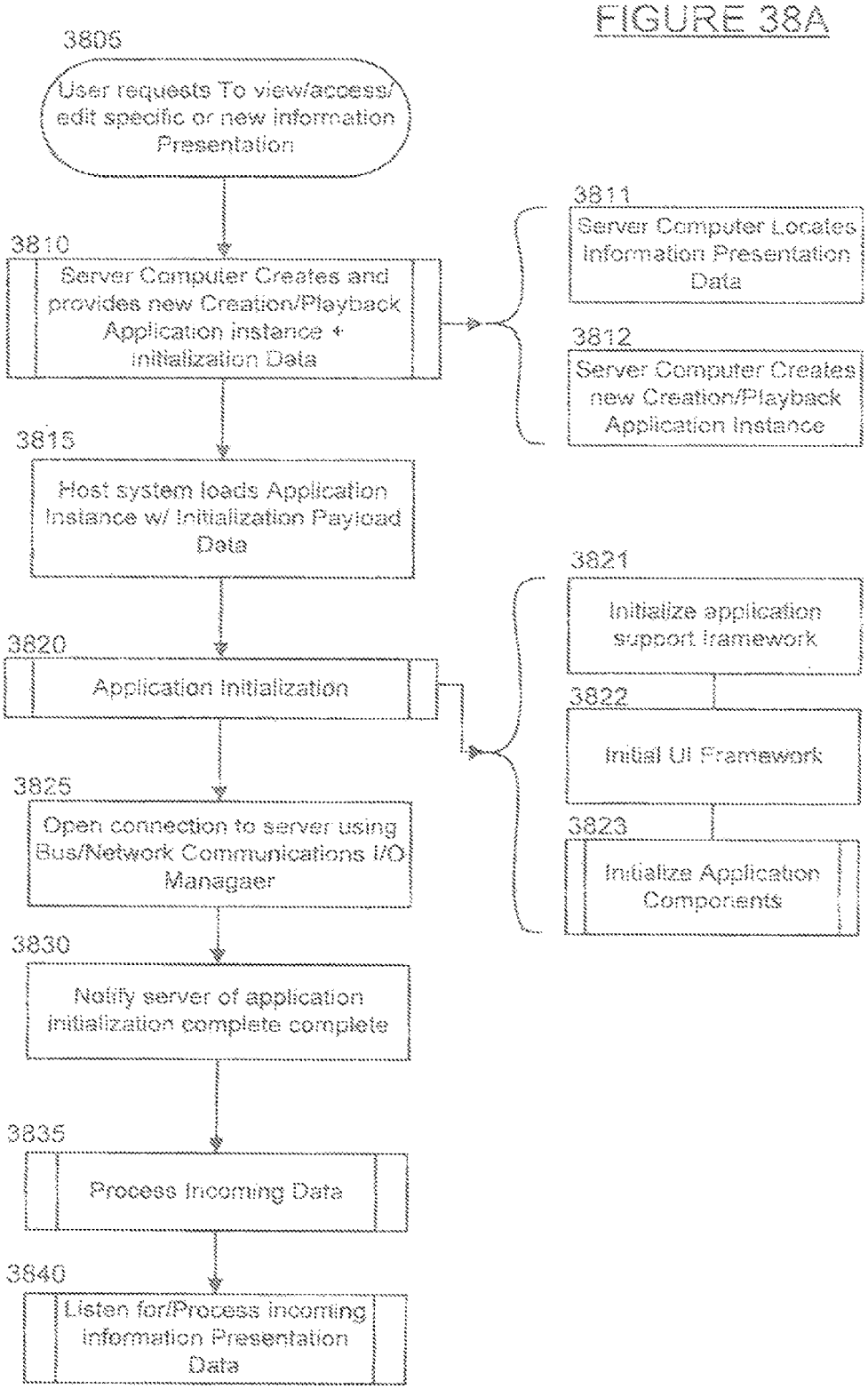

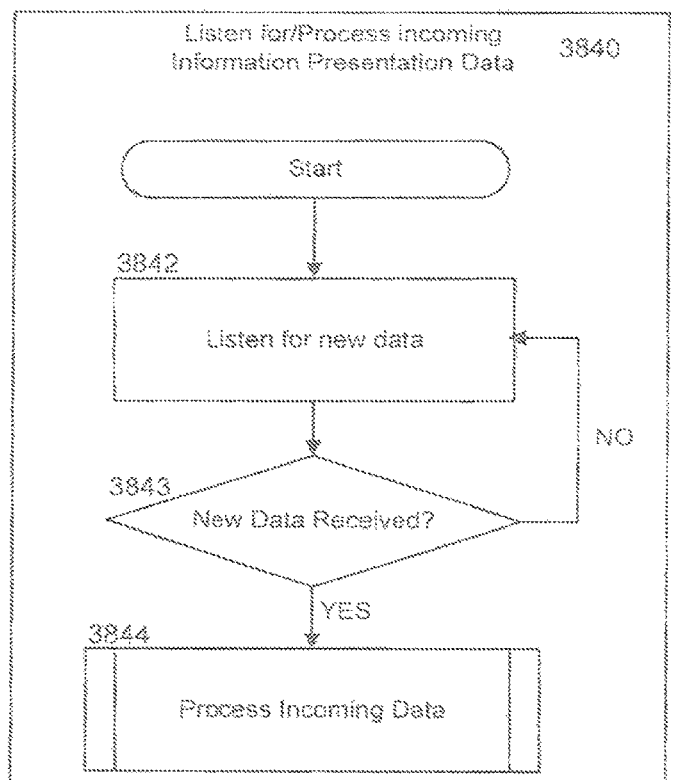
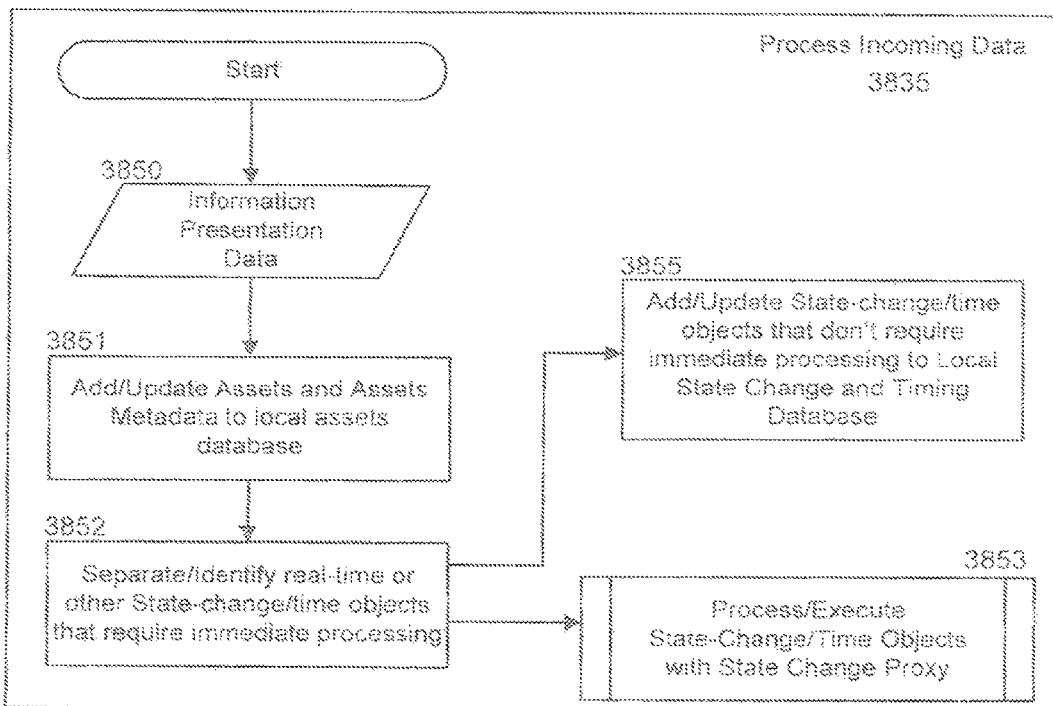
FIGURE 38B

EDITING A RECORDED OR EXISTING INFOMRATION PRESENTATION

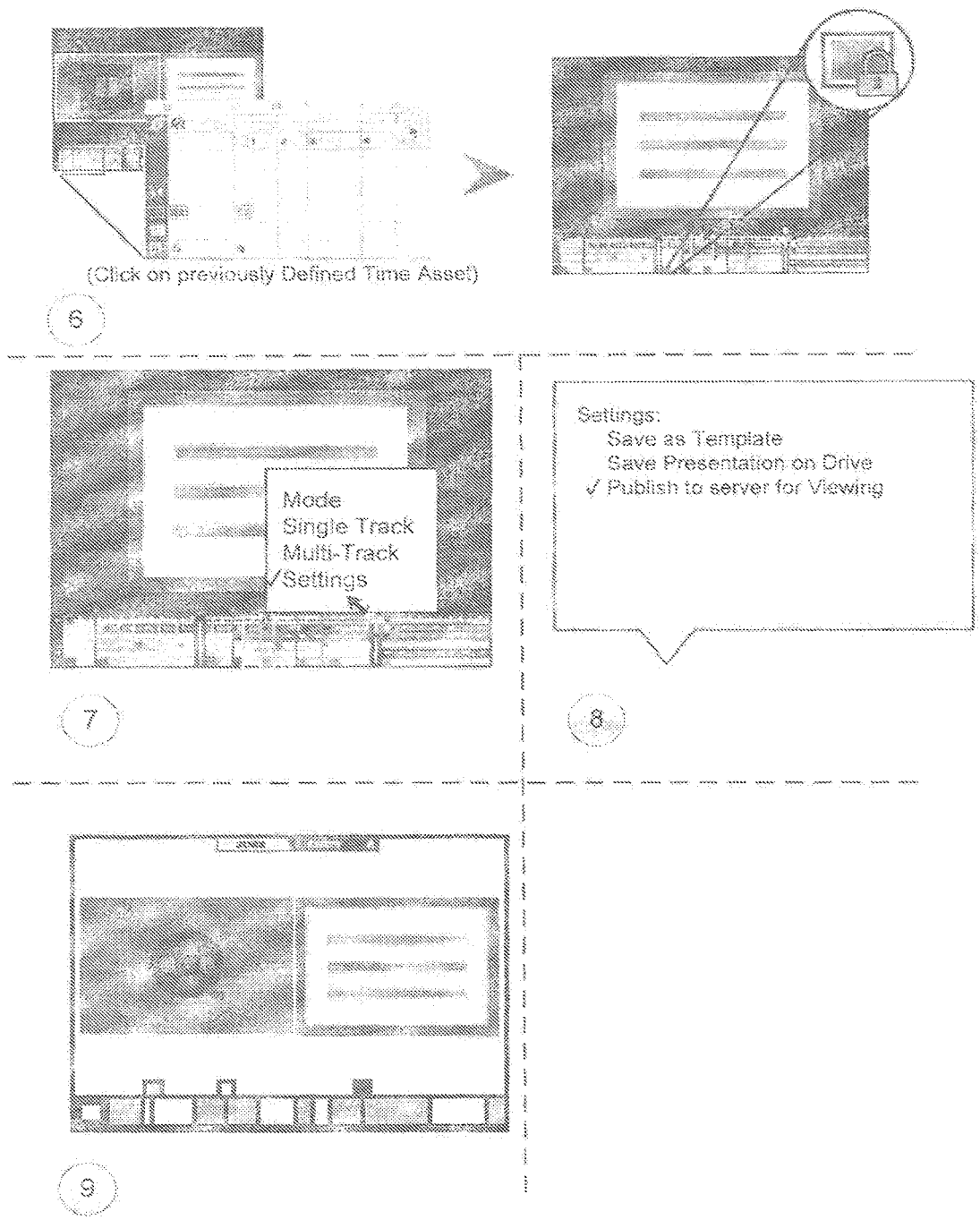

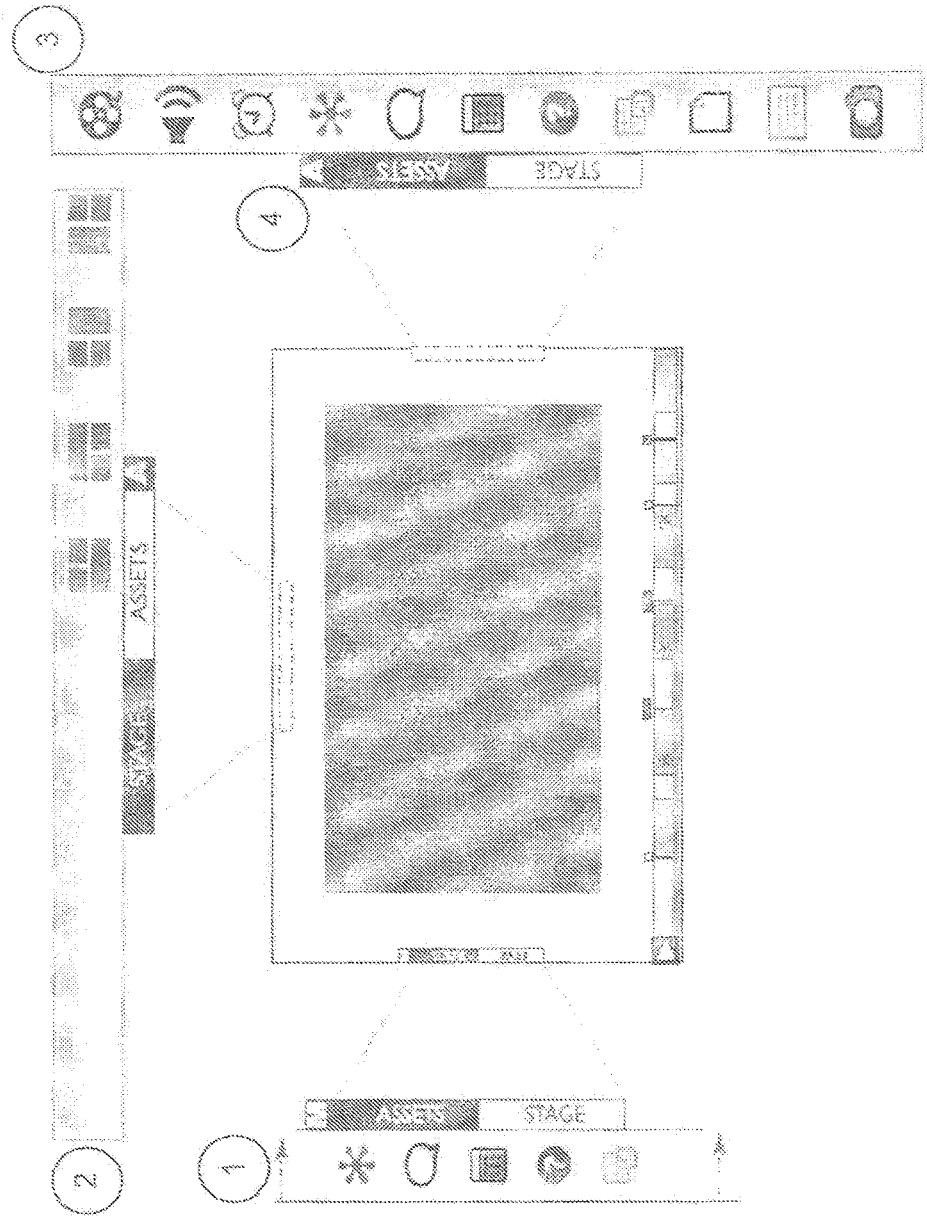

Multiple Usage Scenarios: Predefined Presentation, Configuration or Real Time Widgets. Run time Playback

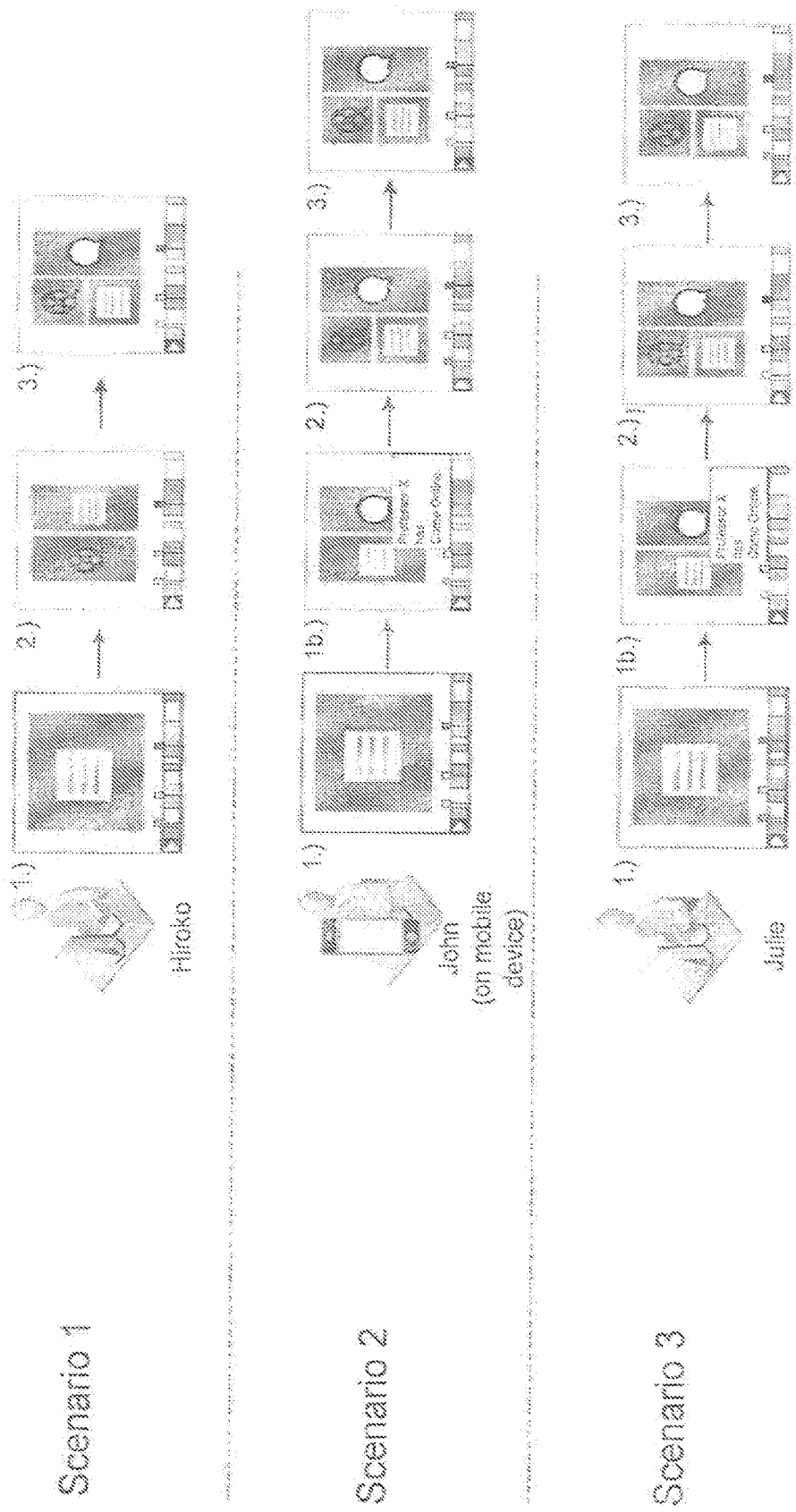

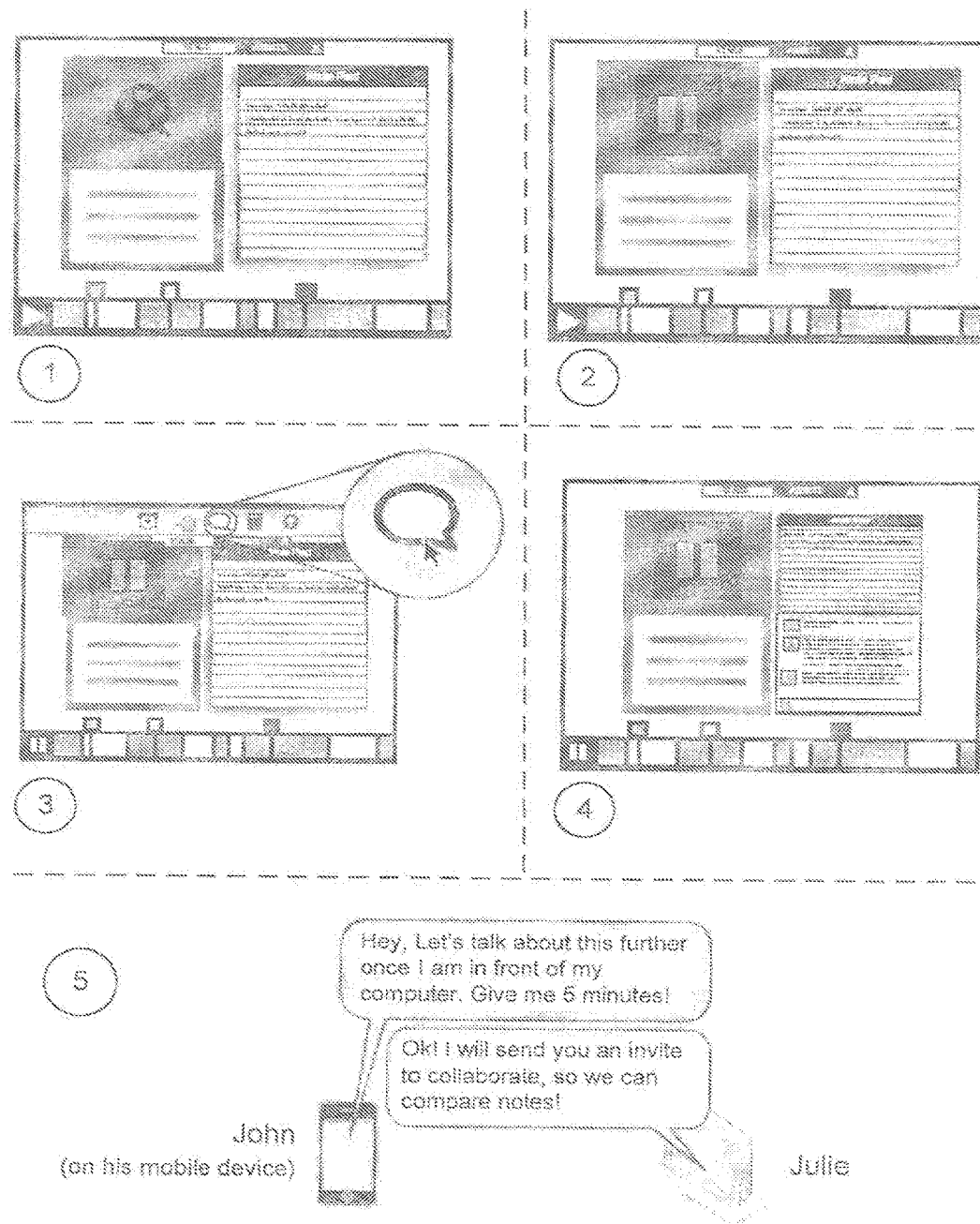

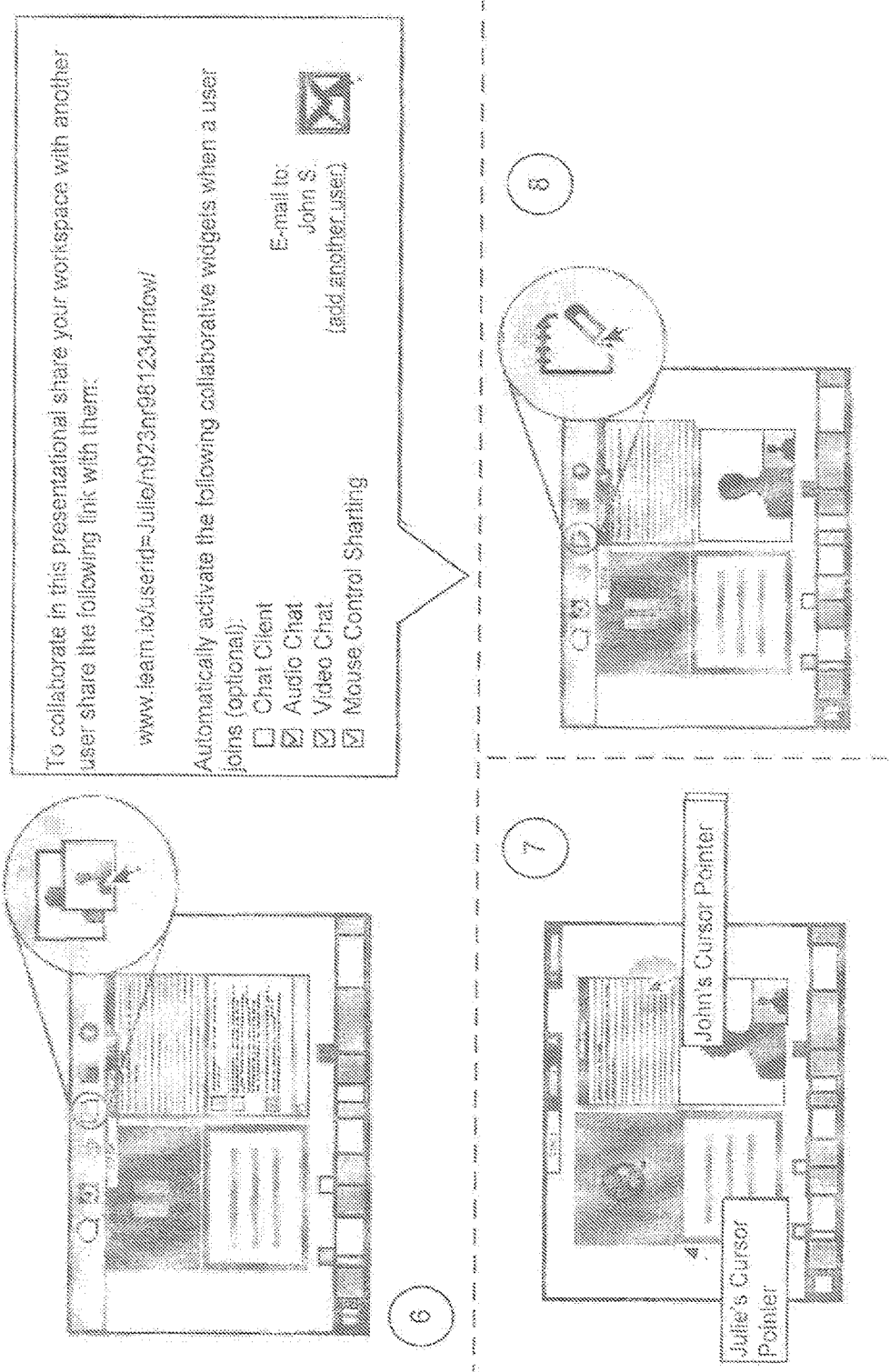

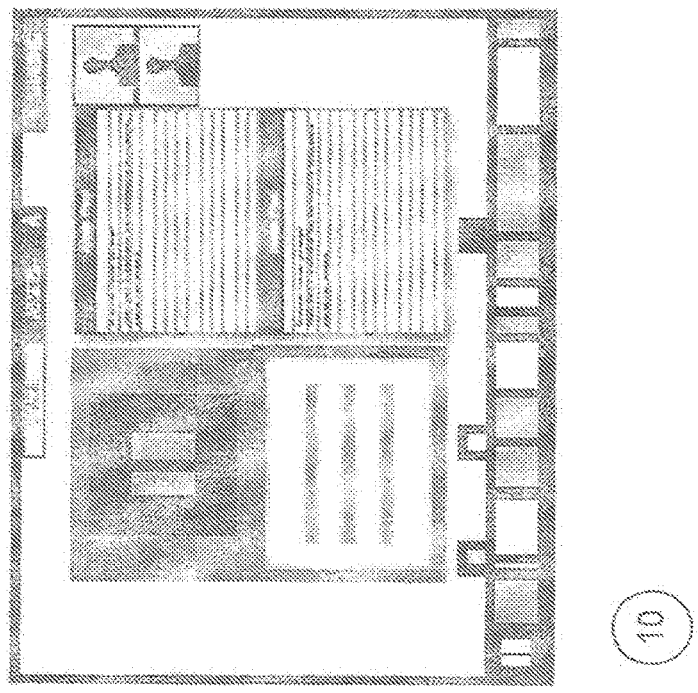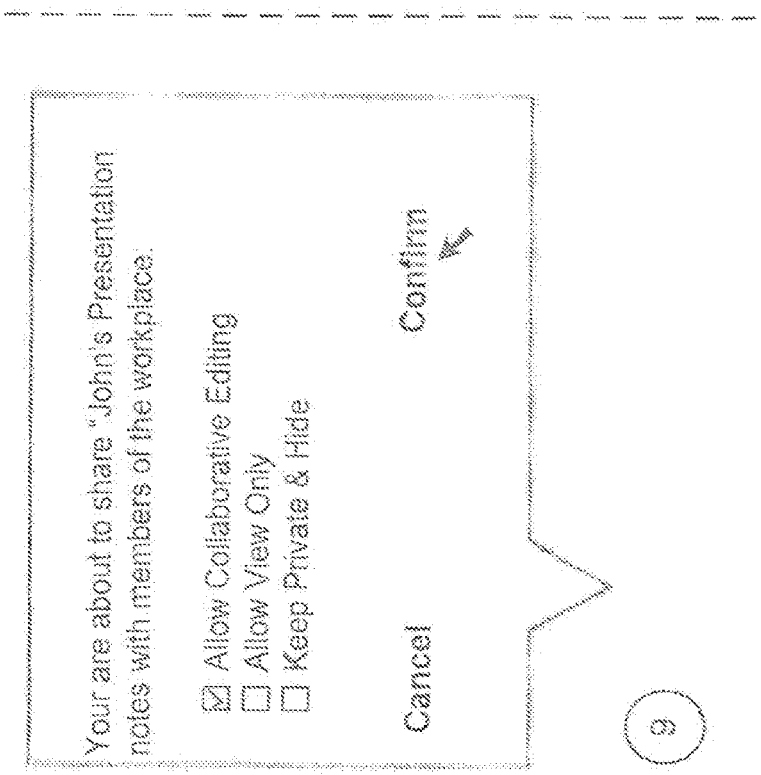
FIGURE A2C

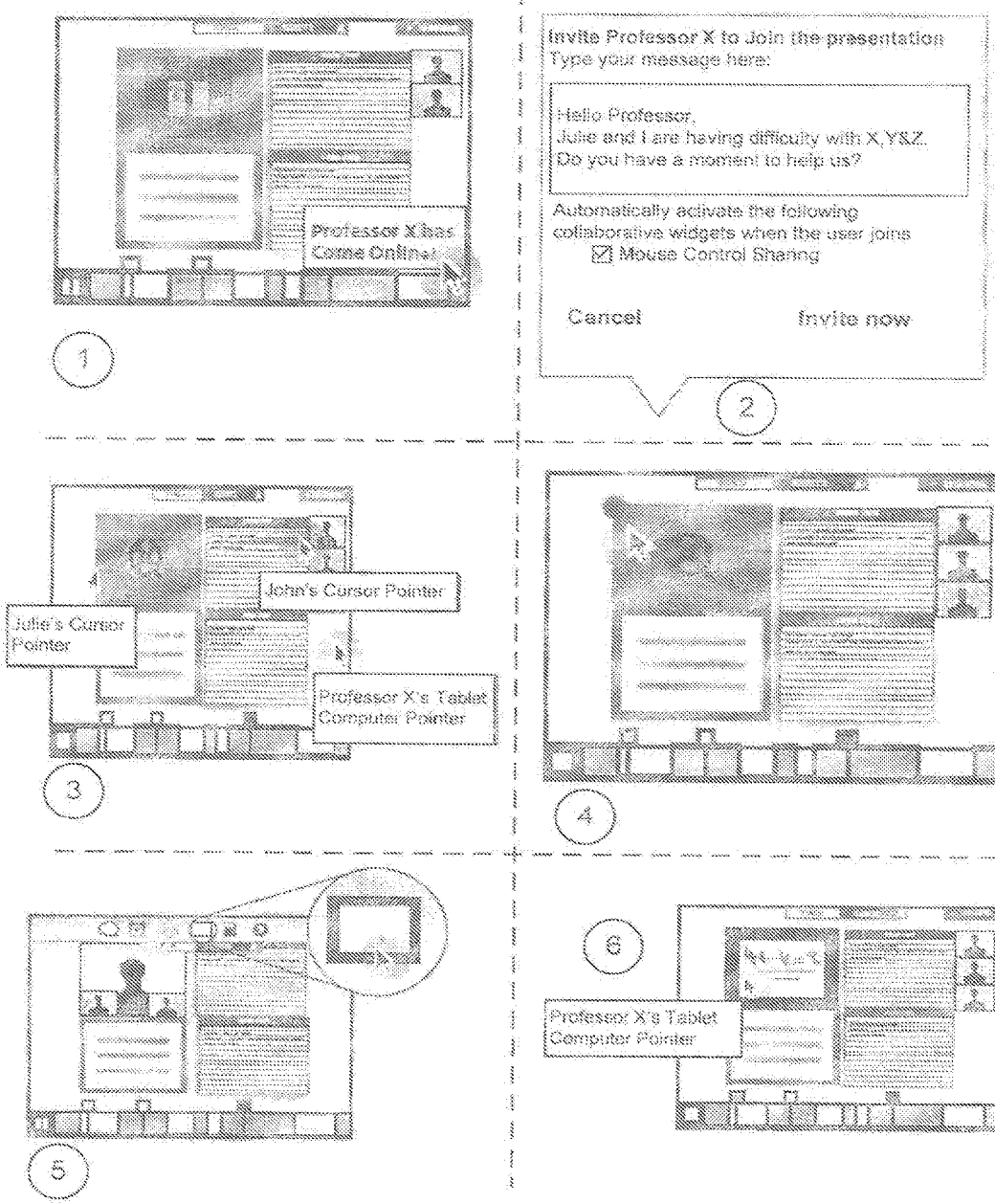

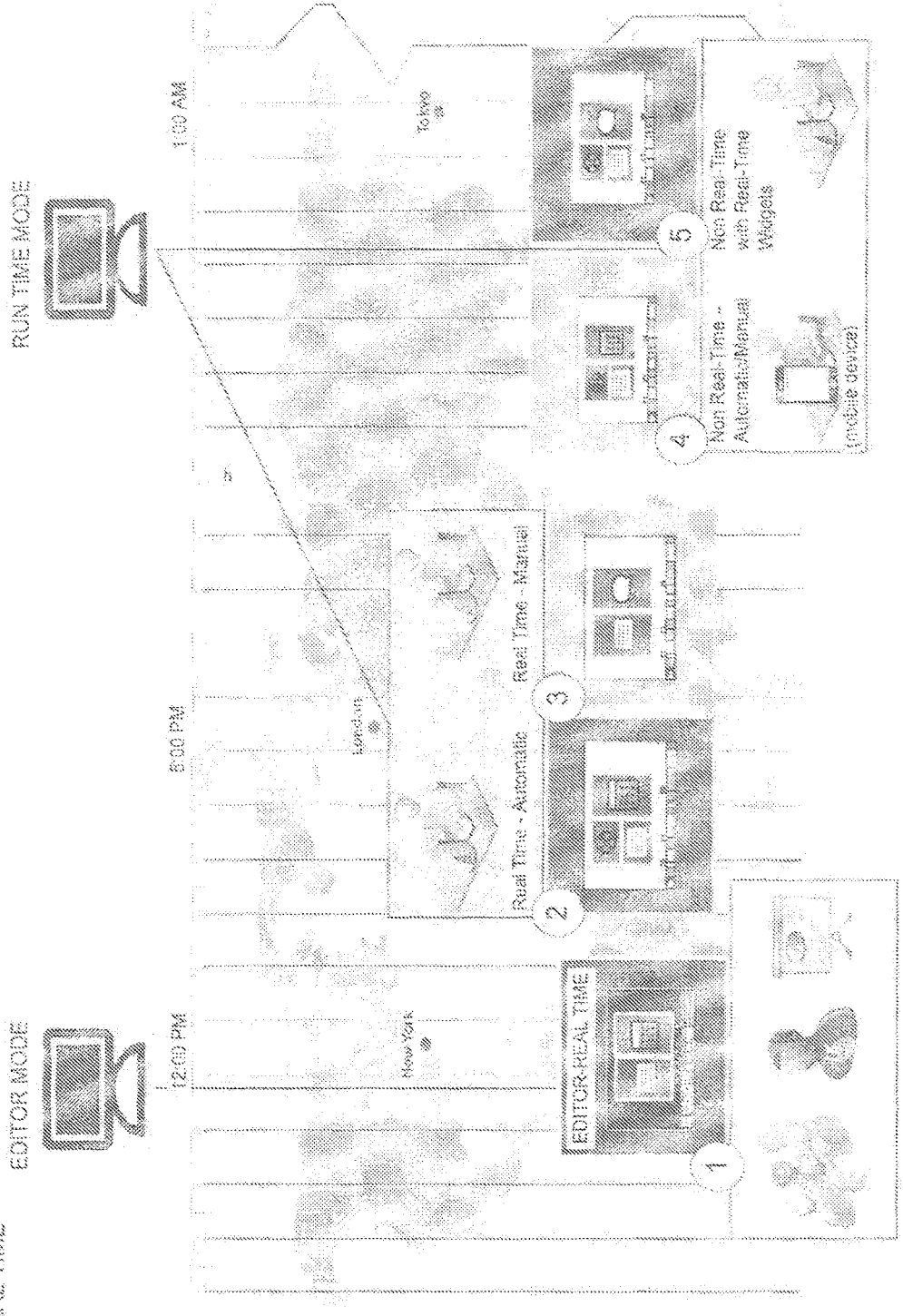

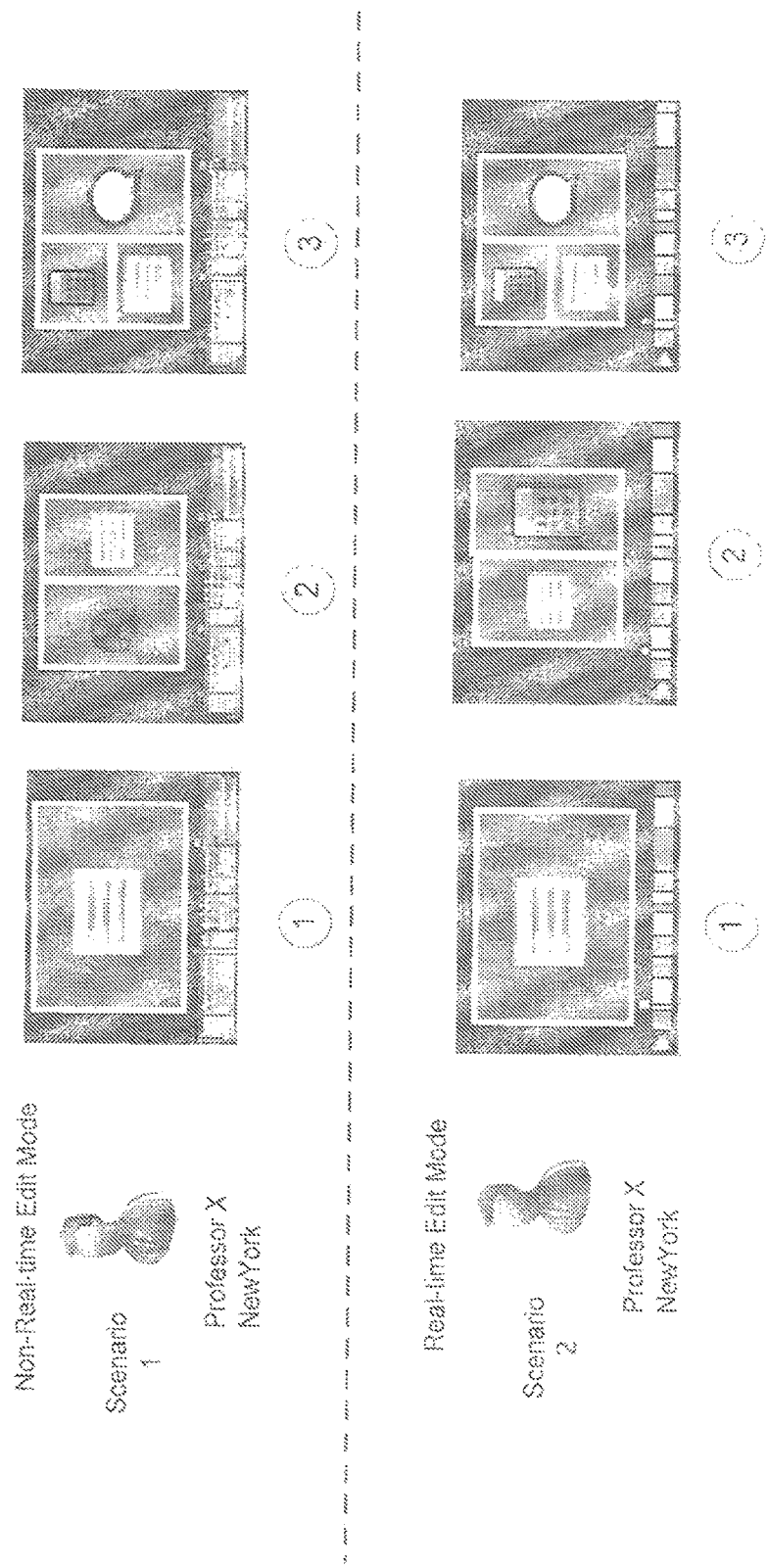

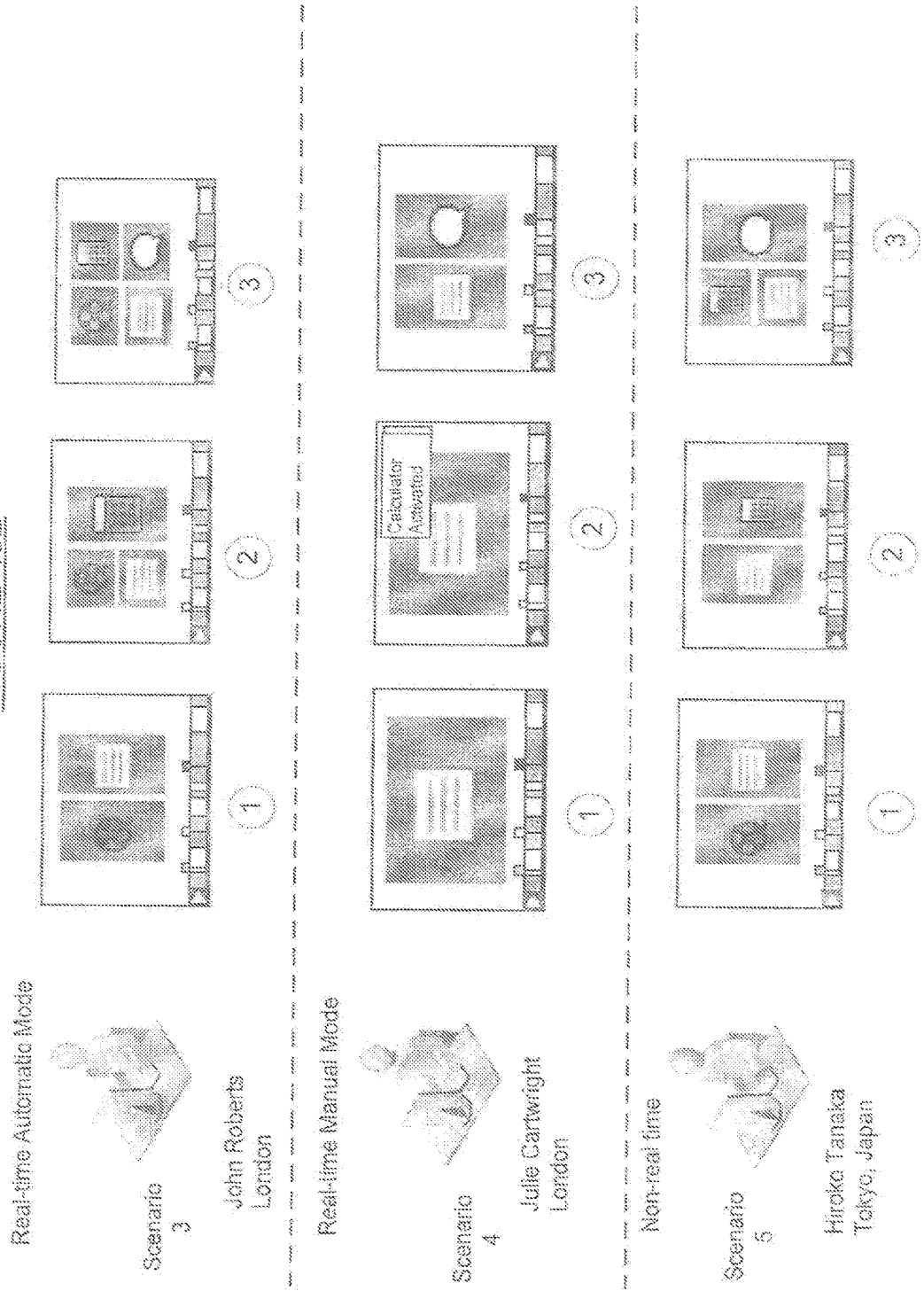

COLLABORATIVE CREATION AND EDITING OF AN INFORMATION PRESENTATION

FIGURE 46B
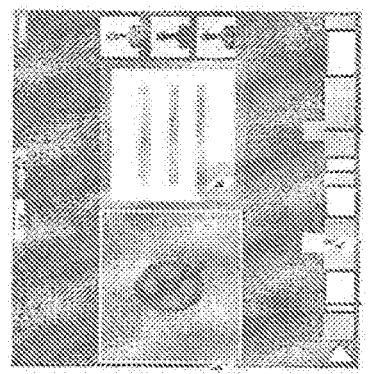
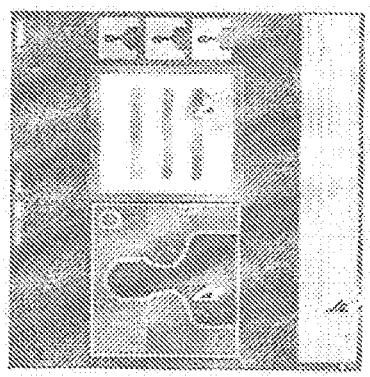
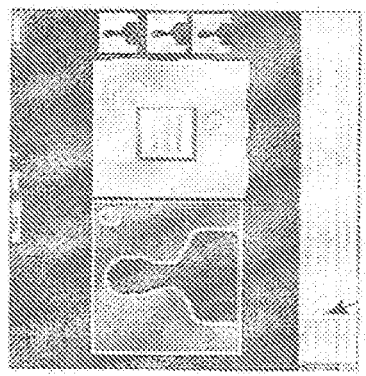

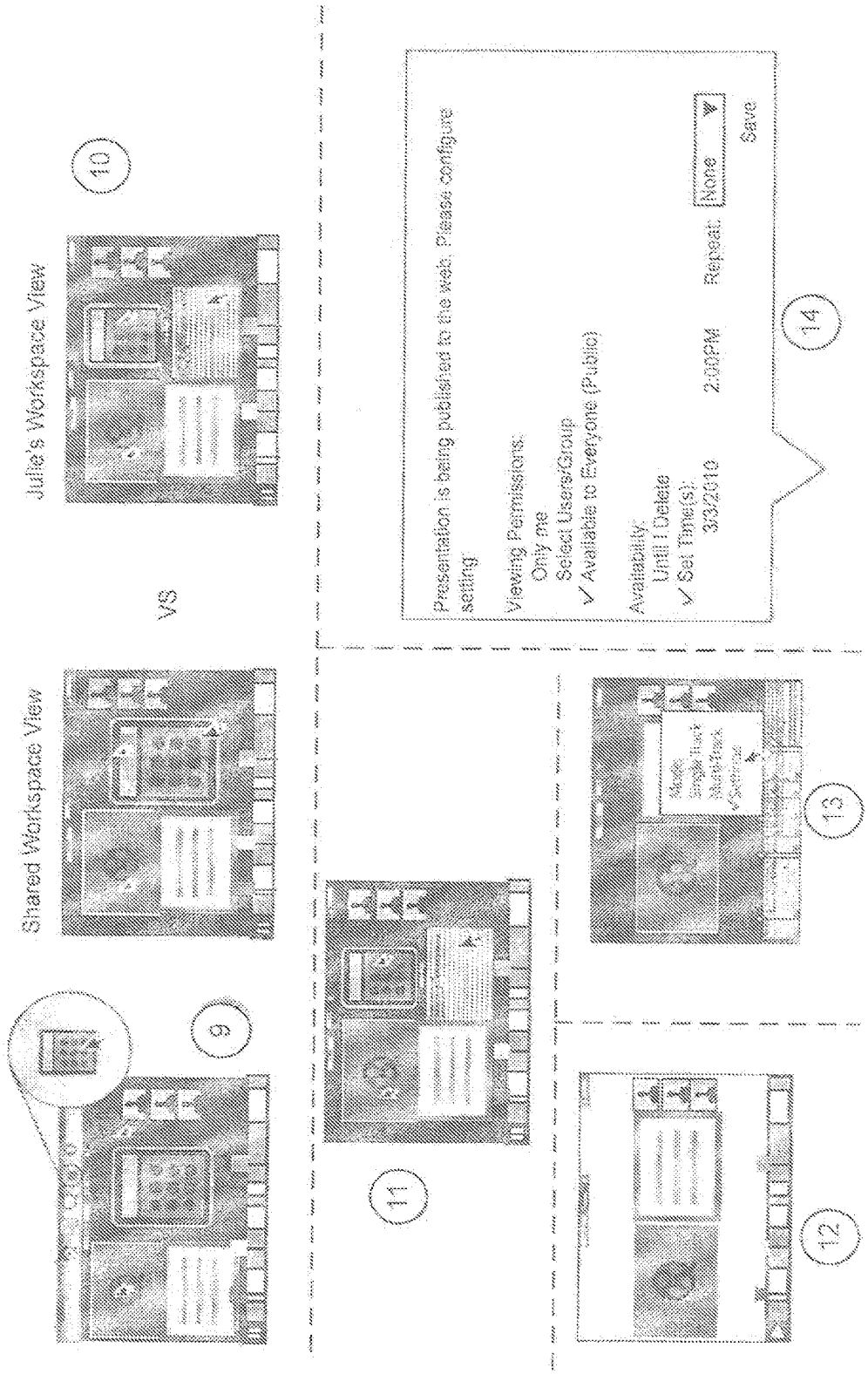

DISCUSSION WIDGET EXAMPLE USING QUESTION AND ANSWER STYLE CONFIGURATION

FIGURE 48B
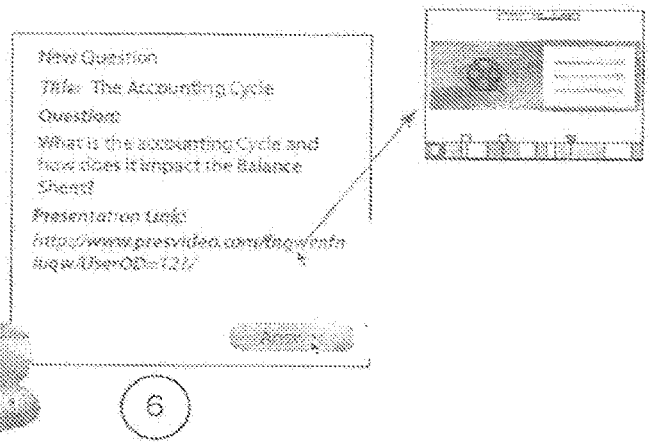
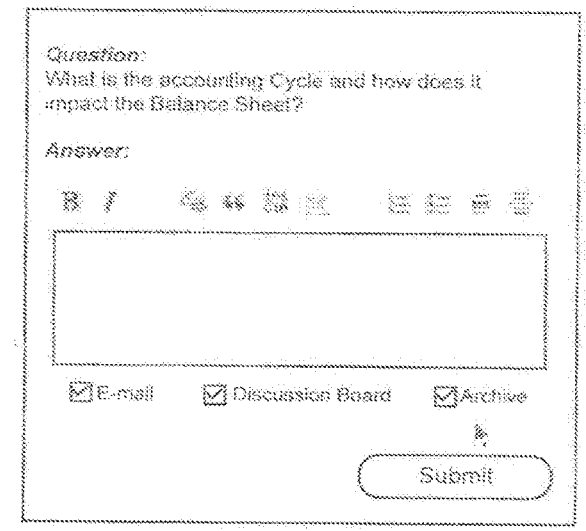
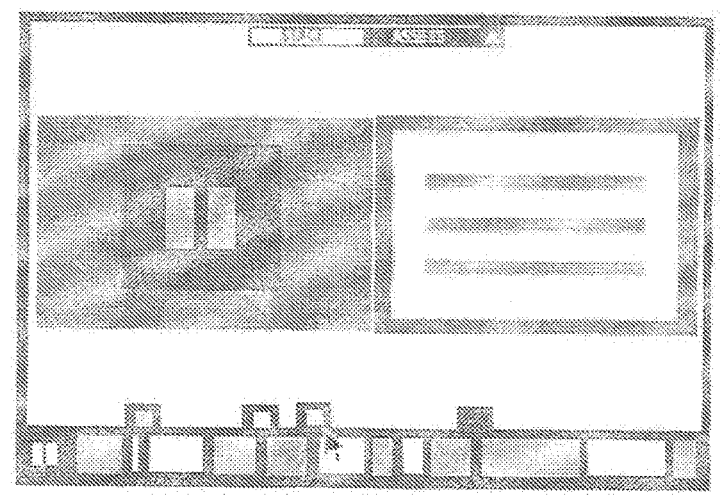

FIGURE 50

Presentation Building Workshop
Sample Powerpoint Presentation

RESOURCES
- Objectives of Financial Reporting Presentation
  File Name: Module3OFR.ppt
- Lecture Notes
  File Name: 09 07 23 Lecture Notes.ppt
- Home Work Assignment
  File Name: 09 07 023 Homework.ppt

CLASS DISCUSSION
David: Why is financial Reporting important?
Professor: One of the reasons, is to provide information useful to present and potential users in making investment, credit, or similar decisions.
Susan: Do we have a quiz on Tuesday?
Beth: I think it is on Thursday...
Professor: We will have a quiz on Thursday. It will cover modules 3 through 5.

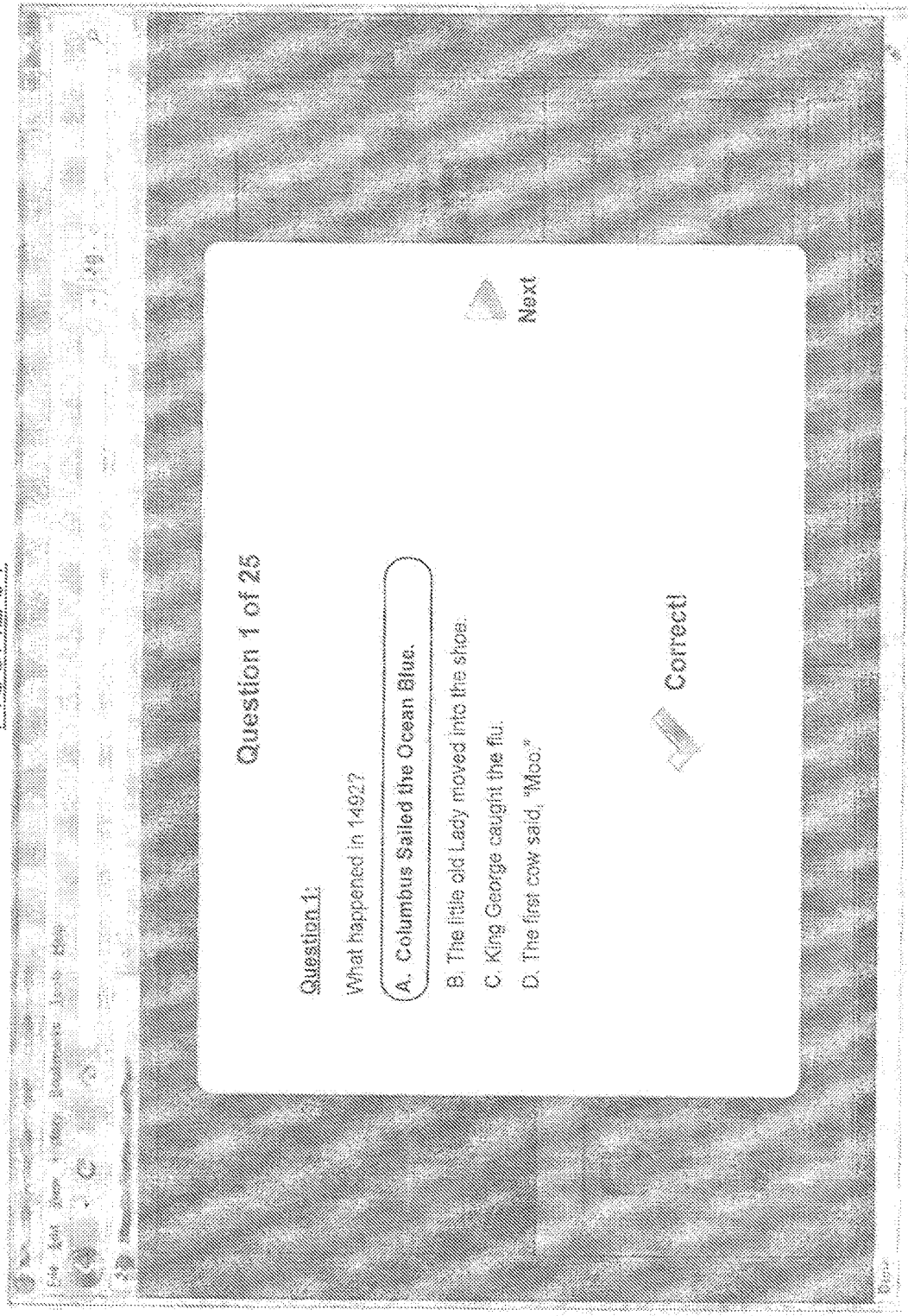

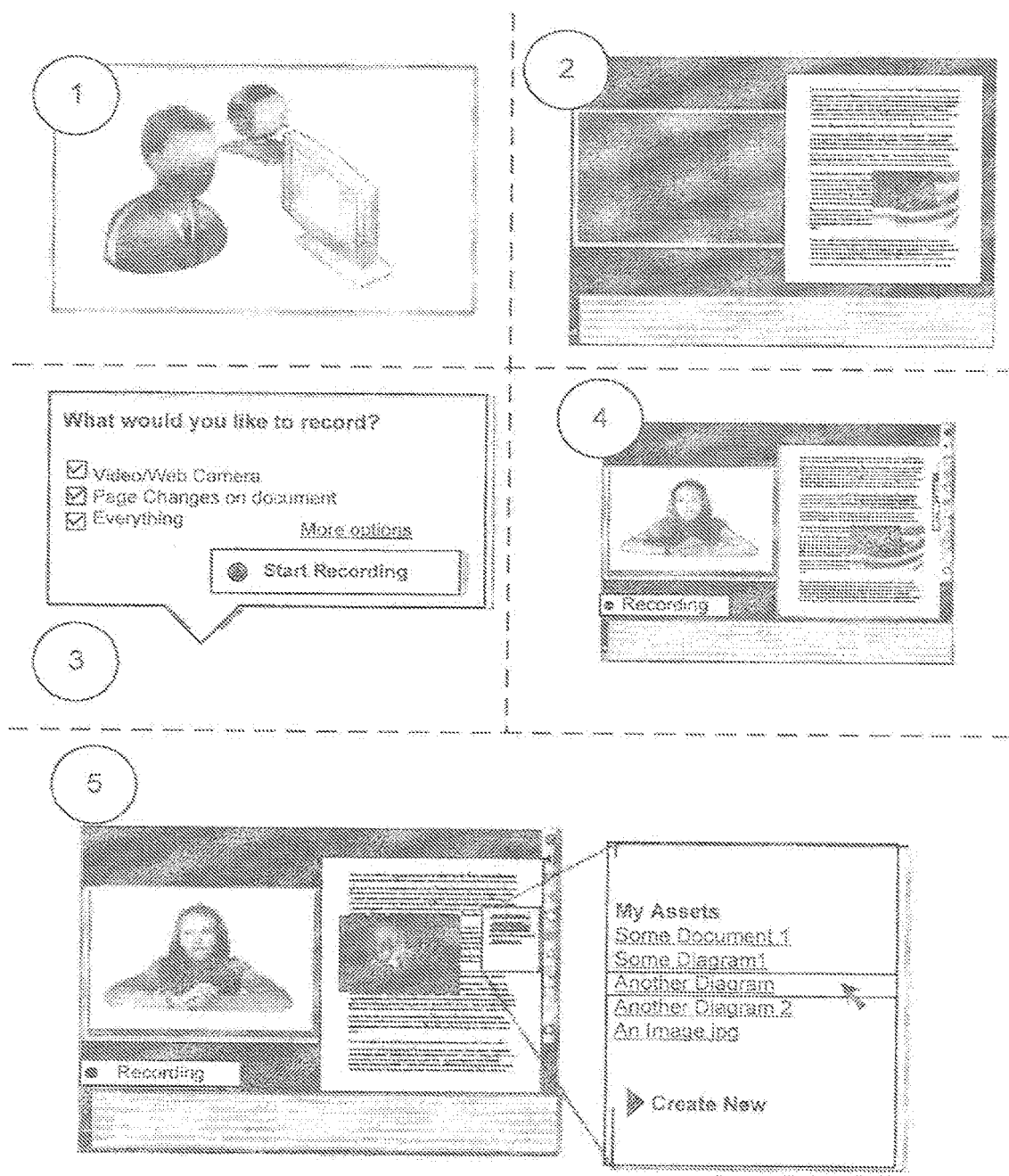

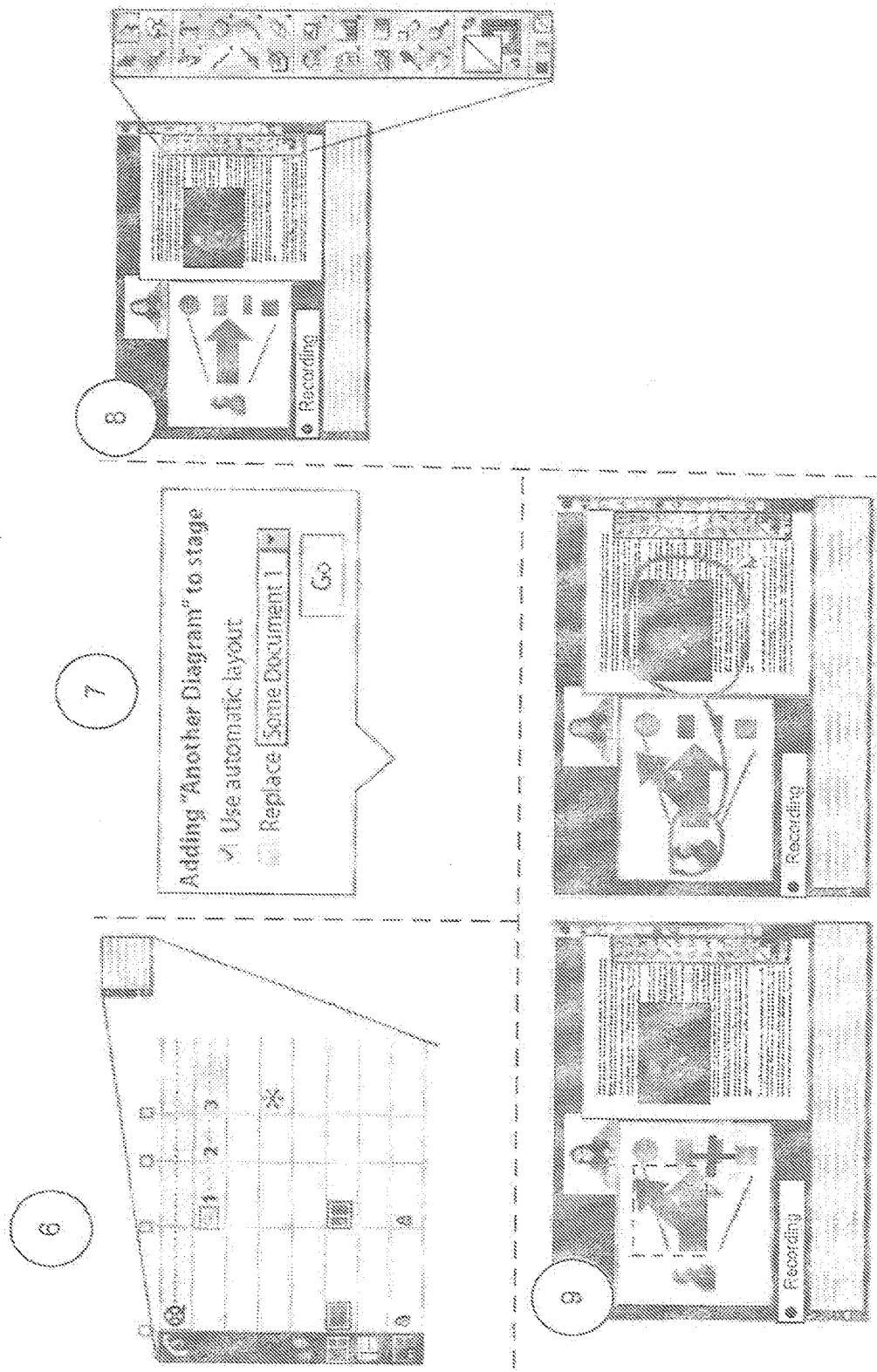

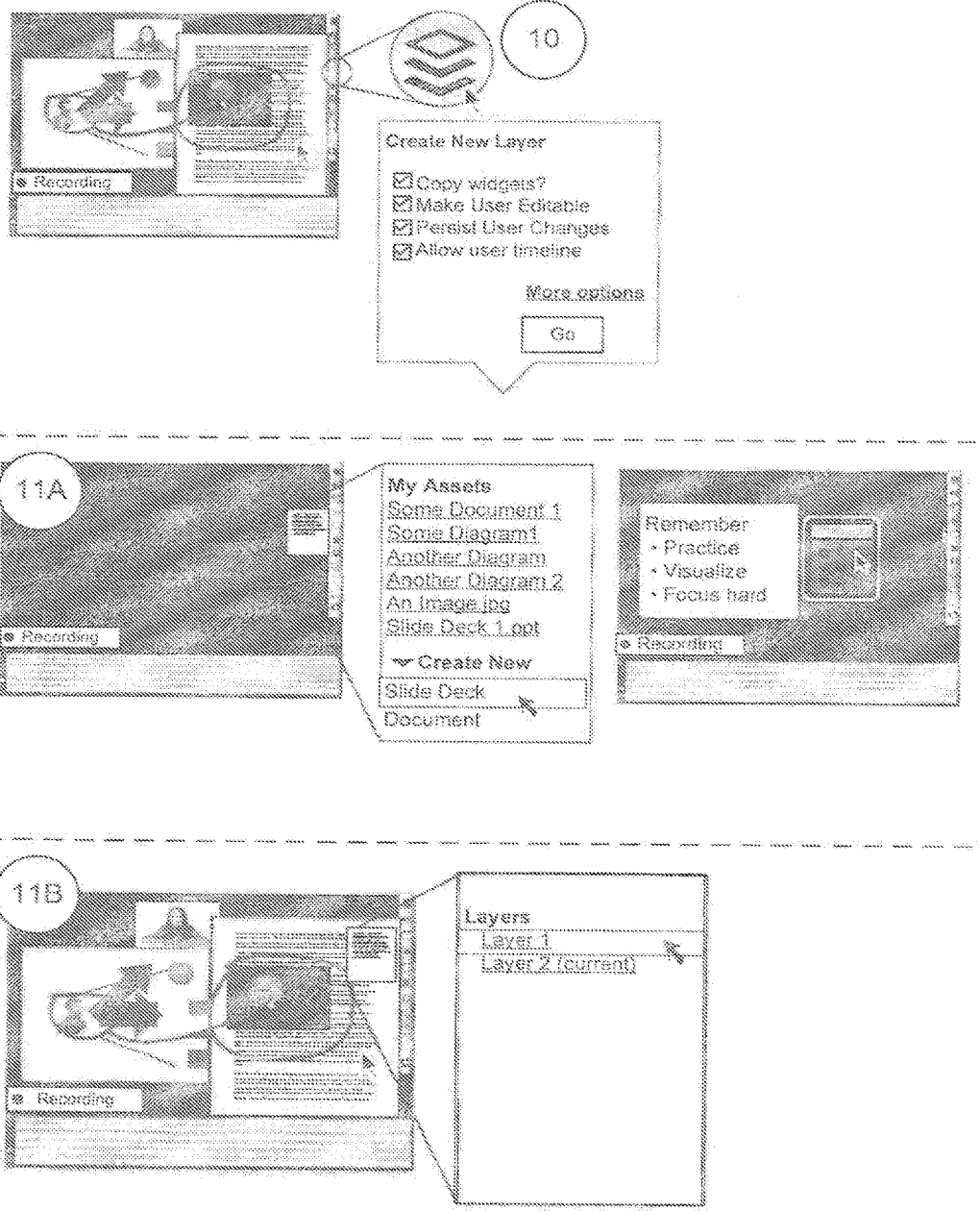

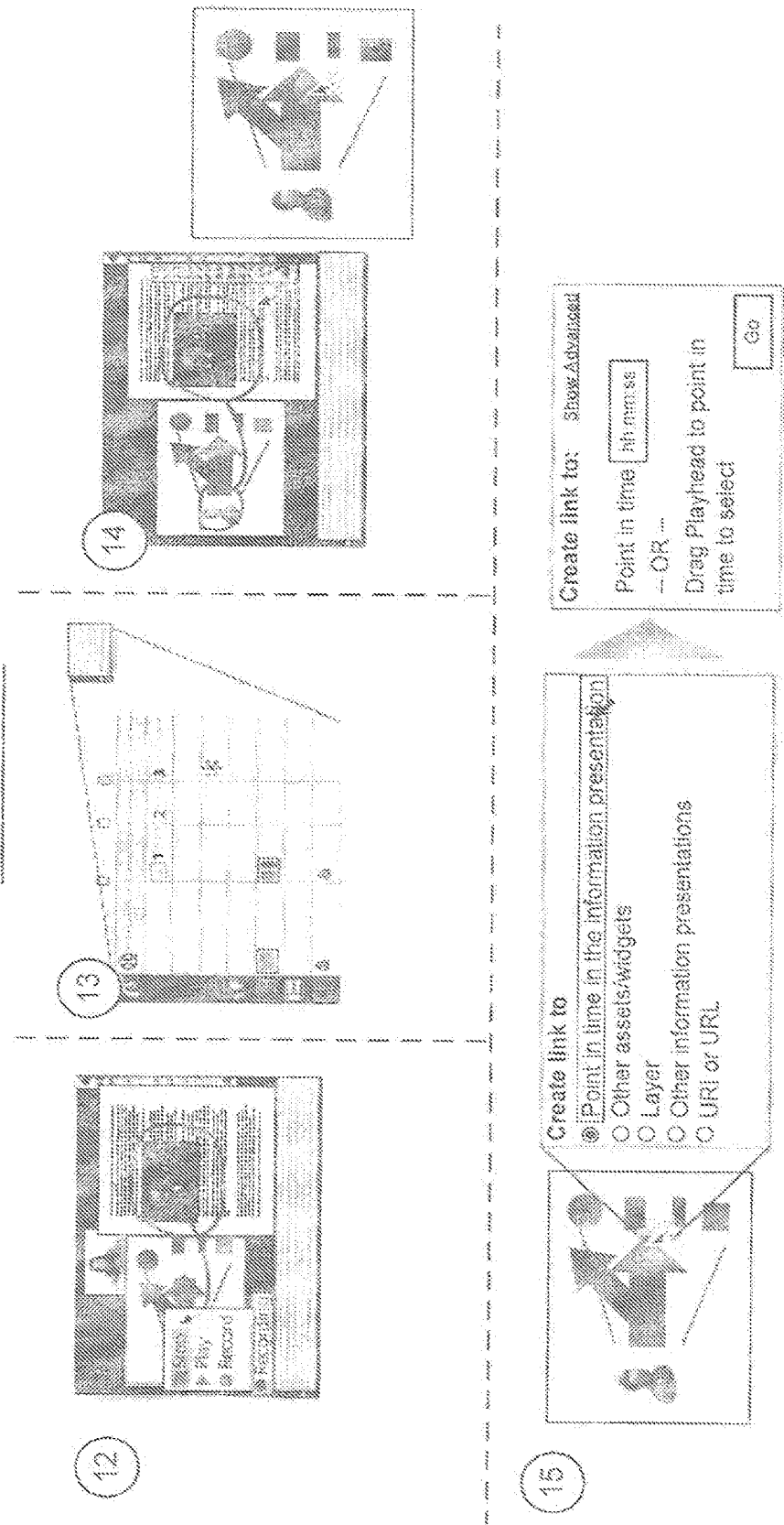

FIGURE 75E
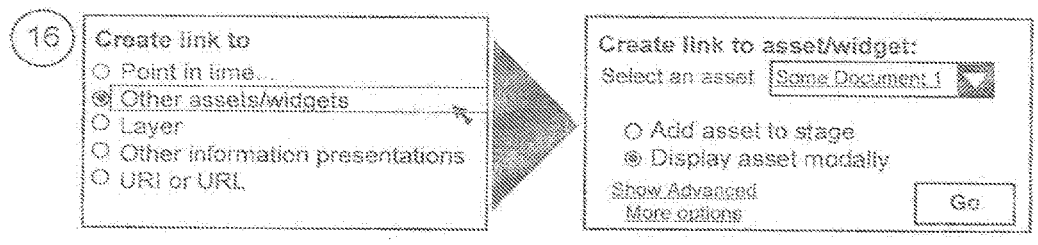
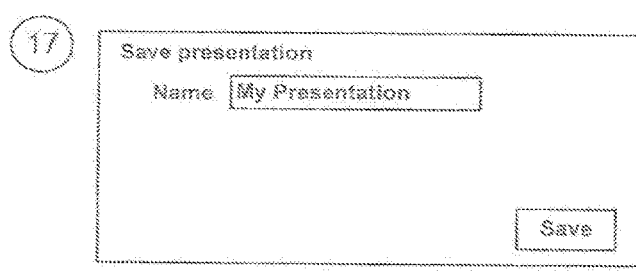

FIGURE 76A
ADVANCED DELIVERY OF AN INFORMATION PRESENTATION PART 1
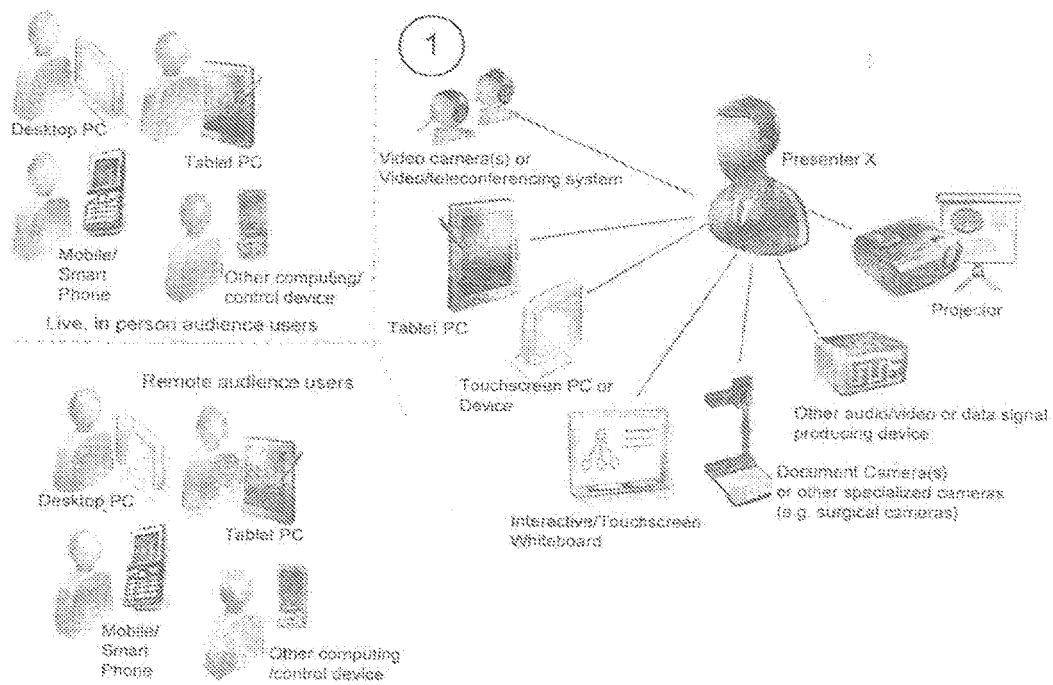
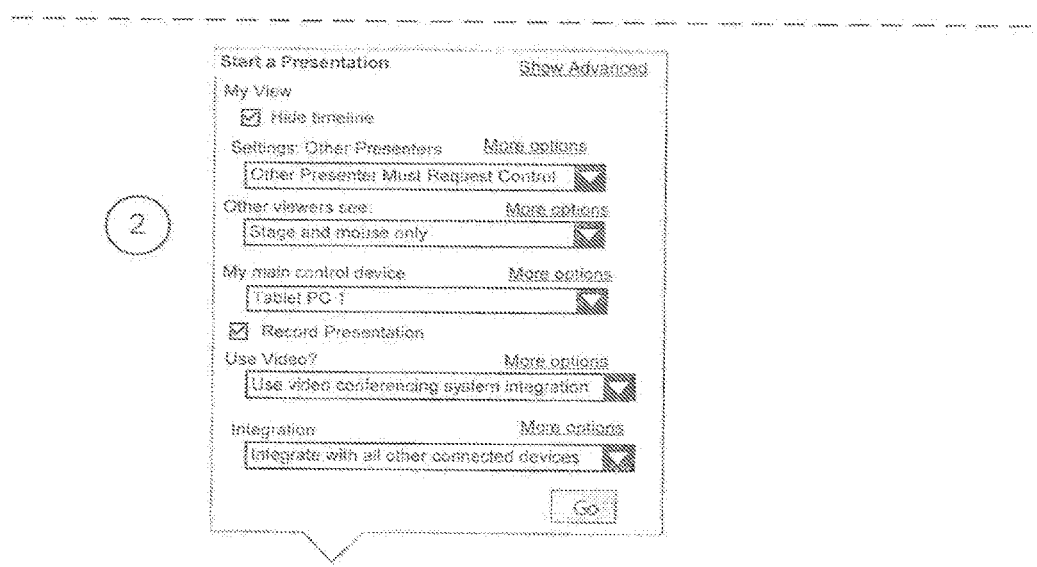

FIGURE 76C
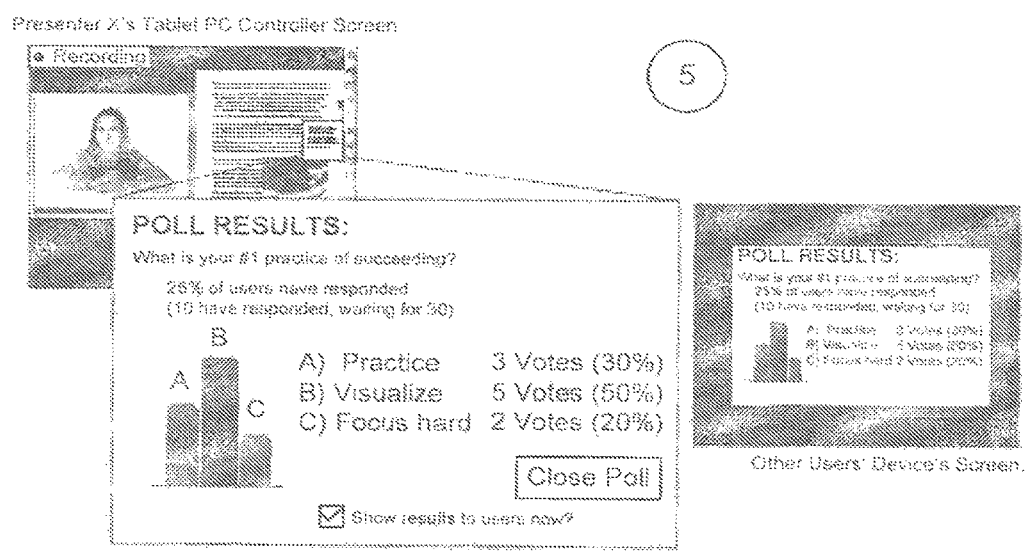
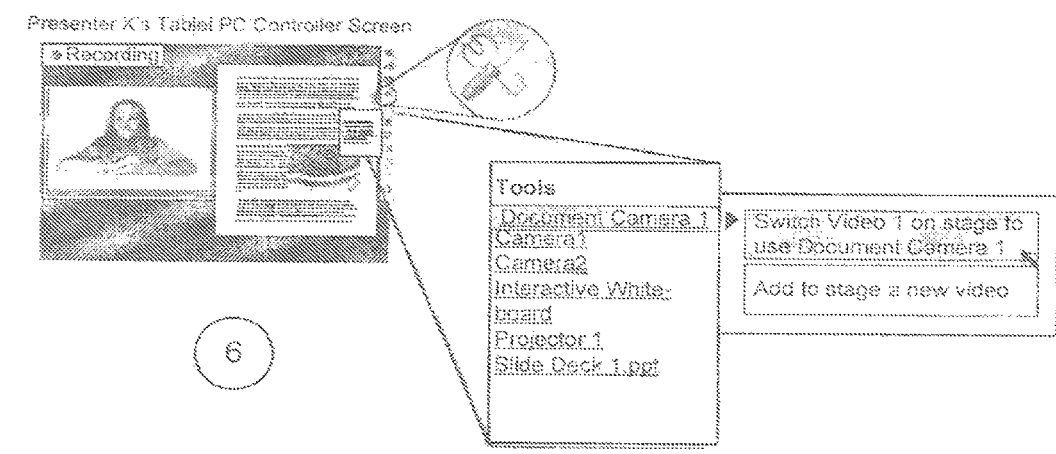

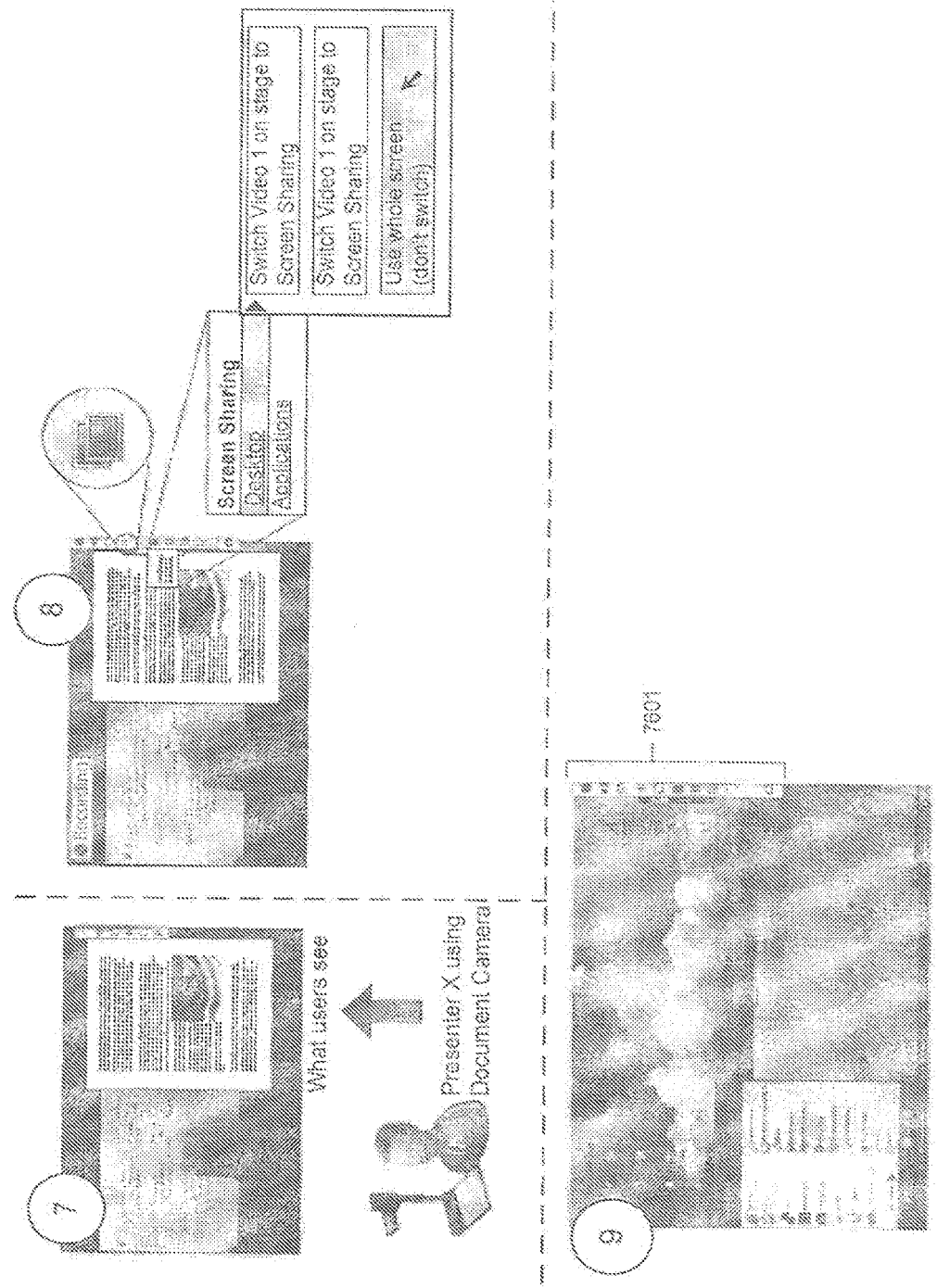

METHOD, SYSTEM AND USER INTERFACE FOR CREATING AND DISPLAYING OF PRESENTATIONS

CROSS-REFERENCE TO RELATED APPLICATIONS

This application claims the benefit of U.S. Provisional Application No. 61/354,984, filed Jun. 15, 2010, which is incorporated by reference in its entirety.

BRIEF DESCRIPTION OF THE FIGURES

FIGS. 1-5 and 15-16 are figures describing various systems and methods of multiple embodiments of the invention.

FIGS. 6-14 and 17-77 illustrate various screen shots and examples related to multiple embodiments of the invention.

DESCRIPTION OF SEVERAL EMBODIMENTS

Figure 1:
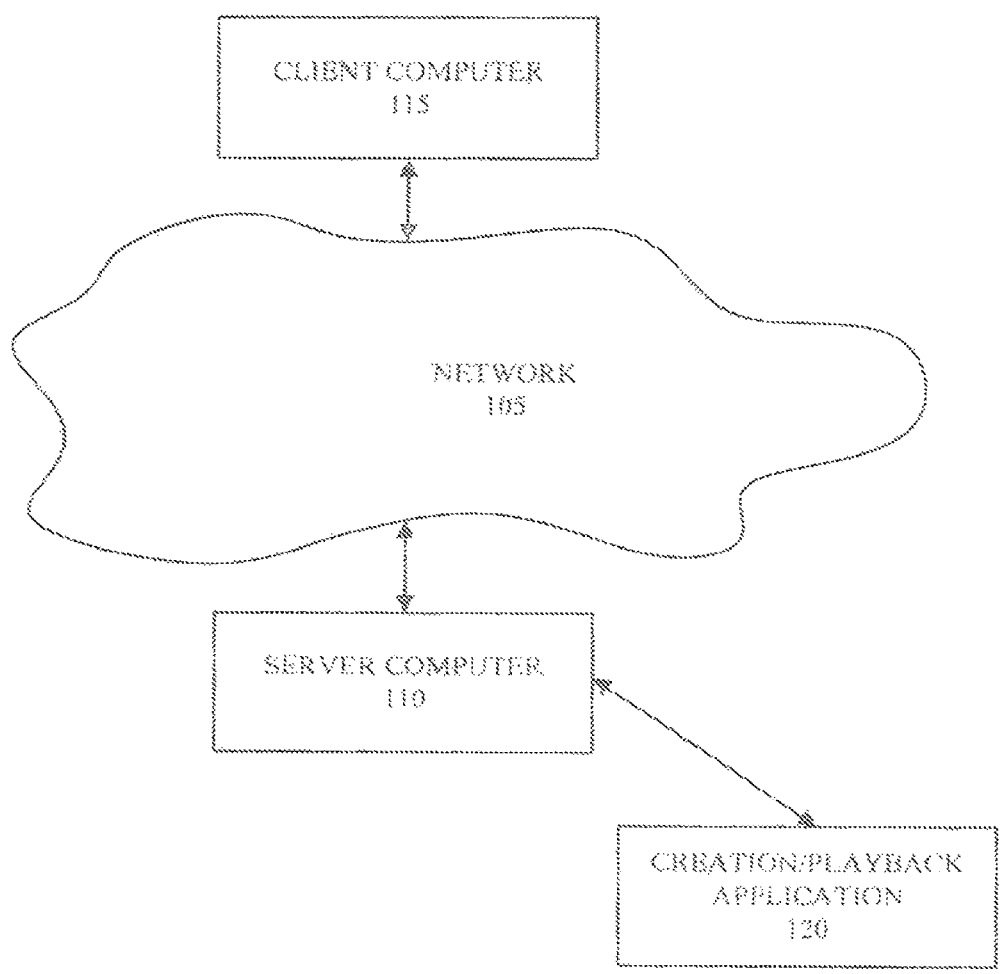

FIG. 1 illustrates a system 100 for creating (e.g., defining), playing back and otherwise interacting with information presentations comprising interactive and non-interactive information, according to one embodiment. The system 100 allows at least one person to: define and/or edit and/or interact with at least one information presentation (e.g., either before a user views the information presentation (sometimes referred to as "predefined" or "on-demand") and/or at the same lime a user views the information presentation (sometimes referred to as "real-time")); view the defined information presentation; update and/or control the information presentation (e.g., either before the user views the information presentation and/or at the same time a user views the information presentation); interact with the information presentation; edit the information presentation; interact in real time (e.g., synchronously, live) with other users of the system and users of the information presentation; or interact in non-real time (e.g., asynchronously) with other users of the system and users of the information presentation; or any combination thereof, hereinto referred to as the "capabilities of the system". An information presentation can be defined in system 100 by utilizing a plurality of assets. The plurality of assets can comprise non-interactive assets or interactive assets. The non-interactive assets 305 (see FIG. 3) (which can be assets that are not interactive with either another person, system 100, or another system) can comprise real time assets 315 and/or non real-time assets 320. The real-time assets 315 can comprise: real time information streams, real-time audio streams, or real-time video streams, or any combination thereof. The non real-time assets 320 can comprise: at least one time-based file (e.g., audio file, video file, multimedia file), or at least one document file (e.g., Microsoft Office Document, Word document, PDF. Excel. Visio. Flash, slideshow presentation), at least one image file (e.g., picture), or any combination thereof. The interactive assets 310 (which are assets that can be interactive with another person (e.g., user), system 100, or another system) can comprise widgets.

The widgets can comprise at least one text chat widget, at least one audio/video chat widget, at least one asset browser widget, at least rne discussion widget, at least one audio recording/playback widget, at least one video recording/playback widget, at least one stream recording/playback widget, at least one audio/video editing widget, at least one document viewing widget, at least one document editing widget, at least one linking widget, at least one activity widget, at least one slide show editing/viewing widget, at least one diagram editing/viewing widget, at least one drawing suite widget, at least one whiteboard widget, at least one polling widget, at least one survey widget, at least one assessment widget, at least one spreadsheet widget, at least one user list widget, at least one source code viewing and editing widget, at least one tracking widget, at least one glossary widget, at least one screen sharing and/or screen recording widget, at least one wiki widget, at least one bookmark widget, at least one calculator widget, at least one presentation index widget, at least one layers widget, at least one integrations widget, or at least one third party platform interactive widget, or any combination thereof. It should be noted that any widget can be provided using third-party software. In addition, those of ordinary skill will see that any widget function(s) can be combined with any other widget function(s) to form other widgets.

Referring to FIG. 1, in one embodiment, server (e.g., host) computer 110 can communicate over a network 105 (e.g., Intranet. Internet) with client computer 115. A creation/playback application 120 can be accessed by a user utilizing the client computer 115 and/or the server computer 110. The creation/playback application 120 can support a number of modes which include, but are not limited to: editor mode, run-time/playback mode, record mode, or collaborate mode, or any combination thereof. Those of ordinary skill in the art will see that many other modes can be created and implemented by the system 100 in the creation/playback application 120. The system 100 can be set to be run in multiple modes simultaneously and/or use capabilities of the multiple modes simultaneously. The creation/playback application 120 can also: use editor mode and editor mode capabilities to create and/or edit an information presentation; use run-time mode (e.g., playback mode) and run-time mode capabilities to playback an information presentation; use collaborate mode and collaborate mode capabilities to support collaboration within the application and system (above and beyond the inherent real-time capability of any individual asset or widget, such as chat or video chat); or use record mode to record any and all state changes to an information presentation wherein such state changes may be played back or further edited; or any combination thereof. The capabilities of the modes are further described below, as well as illustrated together with the embodiments of the creation/playback application 120 executing some of the capabilities of the system 100.

In one embodiment, the creation/playback application 120, can run on the server computer 110 (as shown in FIG. 1). In alternate embodiments, the creation/playback application 120 can run on the client computer 115 or a combination of the server computer 110 and client computer 115. Thus, any of the modules in the creation/playback application 120 can reside on the server computer 110 or the client computer 115. For example, in one embodiment, some of the modules could reside on the server computer 110 and some on the client computer 115. In other embodiments, all of the modules could reside on the server computer 110 or the client computer 115.

Creation/Playback Application

FIGS. 2A and 2B set forth details of the creation/playback application 120, according to one embodiment. In one embodiment, the creation/playback application 120 can receive information presentation data. Information presentation data can include a plurality of assets, assets meta-data, other meta-data, or state change/time definition data, or any combination thereof.

At this point, it should be noted that state change/time definition data can describe and/or define a change to the state of the information presentation (including describing changes in state for the creation playback application itself and describing changes to other state change/time definition objects/data) for a given point in time. The state change/time definition data can specify a state change to be: immediately executed, executed at some point in the future, or executed at some point in the past; or any combination thereof. In this way, state change/time definition data can collectively and together define an information presentation and an information presentation over time, and together with the creation/playback application 120, flexibly accommodate a number of capabilities of the system 100.

In one example of capabilities, a collection of-state change/time definition data for various points in the past and future can represent an information presentation over time and can be received by the creation/playback application. As previously mentioned, state change/time definition objects, in addition to defining state changes to both the application and to other state change/time definition objects, can define state changes to the information presentation, and specifically, state changes as they pertain to the use or state of assets, wherein assets, as well as assets meta-data is also received/to be received by the state-time application. Using such information presentation data as described, the creation/playback application 120 can: render the information presentation over time, visually on a timeline area and/or playback the information presentation by executing the state change/time definition data at the appropriate times, thereby "playing back" the information presentation (e.g., by actuating, activating, and displaying the assets).

As previously detailed, state change/time definition data can be of an immediate run nature; i.e., defined to be executed immediately. In the previous example, one use of immediate run state change/time definition data could be for initializing the application and information presentation. The capability of implementing immediate run state change/time definition data can support a number of other capabilities of the system. For example, immediate run state changes can be used to initialize the application and the information presentation into a known state, and can allow for a user, at any point in time, including at the application's initialization, to access the information presentation at any point of the information presentation's potential duration, as well as to sync the state of the application that may be defined for that point in time. Another example using this capability could be where a second user can enter into the application and immediately be synced to the state of the application and information presentation of a first user, thereby immediately replicating exactly what the first user sees at that point in time.

The creation/playback application 120 can continually listen for, receive, process, store and execute all information presentation data, including immediate-run state change/time definition data. In this way, the state of the creation/playback application 120 and the information presentation (and all of both of their constituent parts) can be continually updated and modified in real-time. By providing for essentially any real time change and any real time update, any real-time capability can be achieved, including that of various real-time collaborative capabilities, including, but not limited to: real-time capabilities within widgets (for instance real-time updates to the text chat widget), real-time viewing of information presentations, real-time viewing of many user's devices' cursor pointers and locations, and collaborative editing of information presentations.

Additional details related to the state change/time definition data is further described below with respect to FIG. 37.

Referring back to FIGS. 2A and 2B, the creation/playback application 120 can comprise: an application load manager module 205, an editor mode module 210, a run-time (e.g., playback) mode module 215, a collaboration mode module 220, a bus/network communications I/O manager module 225, a data loader/initial application updater module 230, a central application reference and application programming interface (API) (hereinafter referred to as CARA) 235, a user input analyzer and router module 240, a local asset database module 245, a local state change and timing database 250, a time controller and manager module 255, state change proxy module 260, multicast data broadcaster module 265, asset load manager 275, or user interface module 280; or any combination thereof. Examples of capabilities of the system provided for by the creation/playback application 120 are further documented in a number of usage scenarios presented throughout this document.

It should be noted that the various components of FIGS. 2A and 2B can together enable the various modes of the creation/playback application 120, wherein the modes of the application together with the assets can enable the capabilities of the system 100. Those of ordinary skill in the art will see that any of the modules/databases discussed in this application can be combined with any other modules/databases. In addition, those of ordinary skill in the art will see that certain functions can be separated from the modules and incorporated into other existing modules or new modules. Furthermore, any of the modules can be configured to be run on a variety of devices and/or in a variety of different modes.

The application load manager module 205 can be an initialization module containing all the logic for instantiating and integrating all other modules within the creation/playback application 120. The application load manager module 205 can also be responsible for helping to coordinate the creation/playback application's simultaneous capabilities using the various modes (e.g., editor mode, run-time mode, collaboration mode, etc.). In this way, the application load manager module 205 can execute multiple algorithms for such multi-mode capability when needed.

The editor mode module 210, run-time mode module 215, and collaboration mode module 220 can be three or more independent modules (herein referred to collectively as per-mode modules) that can enable the creation/playback application instances to encapsulate, expose and/or contain per-mode focused initialization algorithms and per-mode focused execution algorithms. Each per mode module can enable the creation/playback application 120 to be run in its respective mode. In some embodiments, a per-mode module can be run separately and independently of any dependency on other per-mode modules, while other modules (such as the application load manager module 205) can also use various combinations of the per mode modules to combine the per-mode capabilities together within the application and by users of the application.

The per-mode modules can receive the CARA 235 and the full creation/playback application context, and can populate and/or inject custom per-mode instructions/functionality and capability into any and all dependent module instances in the application. For example, custom handling capability and routines can be provided and/or injected into: the timeline area renderer module 286 to support timeline area rendering capability; or the user input analyzer and router module 240 to support per mode user input handling functionality; or any combination thereof.

The bus/network communications I/O manager 225 can be responsible for all communications between the creation/playback application 120 and; external support components;

external data stores; other remote applications (e.g., other creation/playback applications instances in use by other users); any other network connected resource, or other remote systems; or any combination thereof. For example, some creation/playback application instances can be dependent on receiving live data from other creation/playback application instances or from the system 100. In addition, the bus/network communications I/O manager 225 can be responsible for communications between the creation/playback application 120 and; external application support systems 203; external database(s) 201; or other remote systems 202; or any combination thereof. In some embodiments, the bus/network communications I/O manager 225 can communicate using numerous protocols (e.g., TCP/IP, IP protocols).

The data loader/initial application updater module 230 can be responsible for receiving information presentation data from the bus/network communications I/O manager module 225. The data loader/initial application updater module 230 can then add the received data or references to the data to various data store modules within the creation/playback application 120. The data loader/initial application updater module 230 can also identify any state change objects that need to be executed and pass the state change objects off for execution. The data loader/initial application updater module 230 can also: add assets and assets meta data to the local asset database 245; add non-immediate (future or past state change data) to the local state change and timing database 250; identify state change objects which should be immediately executed upon receipt and pass these state change objects to the state change proxy module 260 for immediate execution.

The CARA (Central Application Reference and API) 235 can provide and/or implement structured APIs and make the creation/playback application 120 addressable from any other module or component within the creation/playback application 120. In some embodiments, any module and any state change can be invoked through access via CARA 235. In some embodiments, CARA 235 can: provide access to all application state data; organize access to some or all other modules/data/objects/instructions within the creation/playback application 120; or expose/implement encapsulated state change routines; or any combination thereof.

The user input analyzer and router module 240 can handle user input for all of the user interface module's submodules. The user input analyzer and router module 240 can also, independently, or in conjunction with injected dependencies (see description of per-mode modules 210, 215, 220), analyze: the state of the information presentation and the information presentation state or data for any given point in time, the state of the creation/playback application 120; or the source graphical user interface (GUI) of the input; or any combination thereof. In addition, the user input analyzer and router module 240 can respond or perform actions based on such analysis. The actions it can take can include: updating/adding/deleting state changes and/or state change/time definition data and/or state change/time definition objects; prompting for additional user input: identifying updated/added/deleted state changes and/or state change objects which necessitate notification of the update/add/change to other components of the creation/playback application 120; or notifying and providing dependent modules with changes to state changes and/or state change objects (note that dependent modules can include state change proxy module 260, local state change and timing database 250, multi data broadcaster module 265); or any combination thereof. The user input analyzer and router module 240 can be responsible for implementing the contextual and predictive user interface capabilities further described with respect to FIG. 22.

The local asset database 245 can store assets and/or asset instances along with metadata. The local state change and timing database 250 can store local data for any state change objects.

The time controller and manager module 255 can be responsible for implementing/executing all time related aspects of the creation/playback application 120 within information presentations. A lime controller (e.g., contained within the time controller and manager module 255) can be invoked on an as-needed basis by state change commands/objects through the state change proxy module 260, such as to initialize, start or stop the time controller and/or the playback of the information presentation. In addition, in some embodiments the user can start or stop or activate or inactivate the time controller, and/or the playback of the information presentation, or the time controller can be started automatically by the creation/playback application 120. The time controller can implement an internal clock management functionality based on the system 100's hardware or software clock capabilities and data received from subsequent state change invocations. For example, suppose an information presentation starts with a set of predefined state change/time changes, contained and included in the initialization payload processed after the application initializes. The predefined state change/time data can include immediate run state changes (e.g., intended to initialize the information presentation and/or initialize or configure the creation/playback application 120). These immediate run state changes can invoke the time controller with relevant data describing the structure of the information presentation, whereby the information presentation is a time oriented presentation by virtue of the data provided. Using this data, the time oriented information presentation can then be implemented and managed over time, wherein the time controller executes the relevant state changes described in the state change/time definition data and state change/time data objects by invoking a state change proxy module (and passing the state change/time data/objects) when the appropriate time in the duration of information presentation is reached. The time controller and manager module 255 can be started as a routine on CARA 235 and/or invoked through and immediate state change command/object, or started by the user or automatically by the creation/playback application as previously described.

The state change proxy module 260 can execute all state changes contained/described in the collection of 1-n state change/time data/objects it is invoked with. Additionally, the state change proxy module 260 can interact/query on an as-needed basis with the dependent state change module 261. The state change proxy module 260 can also be used to implement the automatic/manual mode configurations of the system 100. For example, the state change proxy module 260 can monitor values on CARA 235, and if it is determined that the user has entered manual mode, can prevent certain classes of state changes from being invoked/executed (e.g., layout change state changes).

The dependent state change module 261 can analyze a collection/list of state changes to be executed, and can augment the collection/list with additional implied or dependent, state change directives, if needed.

The multicast data broadcaster module 265 can be responsible for: generating messages and/or state change/time definition data/objects for all dependent creation/playback application instances and then passing messages/objects to the bus/network communications I/O manager module 225 to be sent outside the creation/playback application 120, for example, such as for sending real time updates to other user's creation/playback application instances, either directly to such instances, or to instances external application support systems 203 for the recipient system to determine all dependent creation/playback application instances and send to all dependent instances; or any combination thereof.

The asset load manager 275 can be responsible for all asset loading needs in the creation/playback application 120. As such, the asset load manager can monitor or listen to the local state change and timing database 250 for updated/added/removed state change/time objects. Upon notification and receipt of the updated/added/removed object, the object can be analyzed for references to any dependent assets referenced by the state change object. In addition, the asset load manager 275 can provide for speed and efficiency within the system 100 and across any computer networks used, as the asset load manager 275 can contain logic to load assets or portions of assets for the information presentation as the assets are needed.

The user interface module 280 can comprise modules that enable an editor and/or a user to define and/or control a presentation by allowing the editor and/or user to enter commands or provide user input through a user interface, as well as to visually represent the state of the system and the information presentation. The user interface module 280 can accommodate multiple approaches for defining, playing back and interacting with an information presentation. The user interface module 280 can be comprised of a stage module 281, a timeline display area module 282, a GUI controls module 283, a layout manager module 284 and a timeline area renderer module 285.

The stage module 281 can be the graphical area in which all elements of the creation/playback application 120 and information presentation are visually displayed. The elements that can be visually displayed can include, but are not limited to, all graphical user interface controls for the creation/playback application 120 and all assets.

The timeline display area module 292 can be the graphical area in which all elements relating to the information presentation's and creation/playback application's state over time can be visually displayed, including a timeline(s) and tracks as described below. In addition, the timeline display area can visually display other elements of the creation/playback application 120 and information presentation.

The GUI controls module 283 can encapsulate and/or provide any and all necessary graphical user interface elements and components used anywhere in the user interface by other user interface modules. Pan of the GUI controls module 283 can be provided/fulfilled by the native support of the system 100 on which the creation/playback application 120 is running.

The layout manager module 284 can comprise many components/instruction sets for providing various layouts for the assets within the creation/playback application 120 or on the information presentation screen(s). The layout manager module 284 can provide flexible, input driven algorithms for laying out 1-n assets in various positions. It can also encapsulate and provide for automatic or convenience layout capabilities with additional encapsulated algorithms with predefined default values or which can evaluate the context of the assets which it is laying out and automatically determine the best layout. With respect to evaluation of context and subsequent automatic layout, the layout manager module 284 can analyze various aspects of the system 100, including, but not limited to: number of assets to be laid out, type of assets, dimensions and/or aspect ratio of assets to be laid out (e.g., 8.5 inch by 11 inch document, 800 pixel by 600 pixel presentation document, 4:3 video document, 16:9 video document, etc), font size(s) of text within the assets, or available space on the user interface within creation/playback application 120 or information presentation on the particular device that is being used for display; or any combination thereof. For example, depending on the configuration of the application, the layout manager module 284 can determine that two assets are to be displayed (e.g., a 4:3 video, and an 800 by 600 presentation), and then determine that there is enough available space to layout the assets side by side on the screen. Likewise, the layout manager module 284 could determine that there is not enough space to optimally display both assets, and provide a side by side layout which only can show one asset at a time but can allow the user to "slide" back and forth between the two assets. In this scenario, it could also determine to show the two assets as one on top of the other.

The timeline area renderer module 286 can be responsible for rendering relevant state change and time definition data visually in the timeline area(s) and attaching GUI behavior/interaction handling code/instructions to the timeline area(s). The timeline area renderer module 286 can: contain core and generic subroutines used in various modes as well as routines intended for a per mode basis and/or be injected with additional per-mode subroutine codes in order to render the timeline area.

Various Modes

Figure 15:
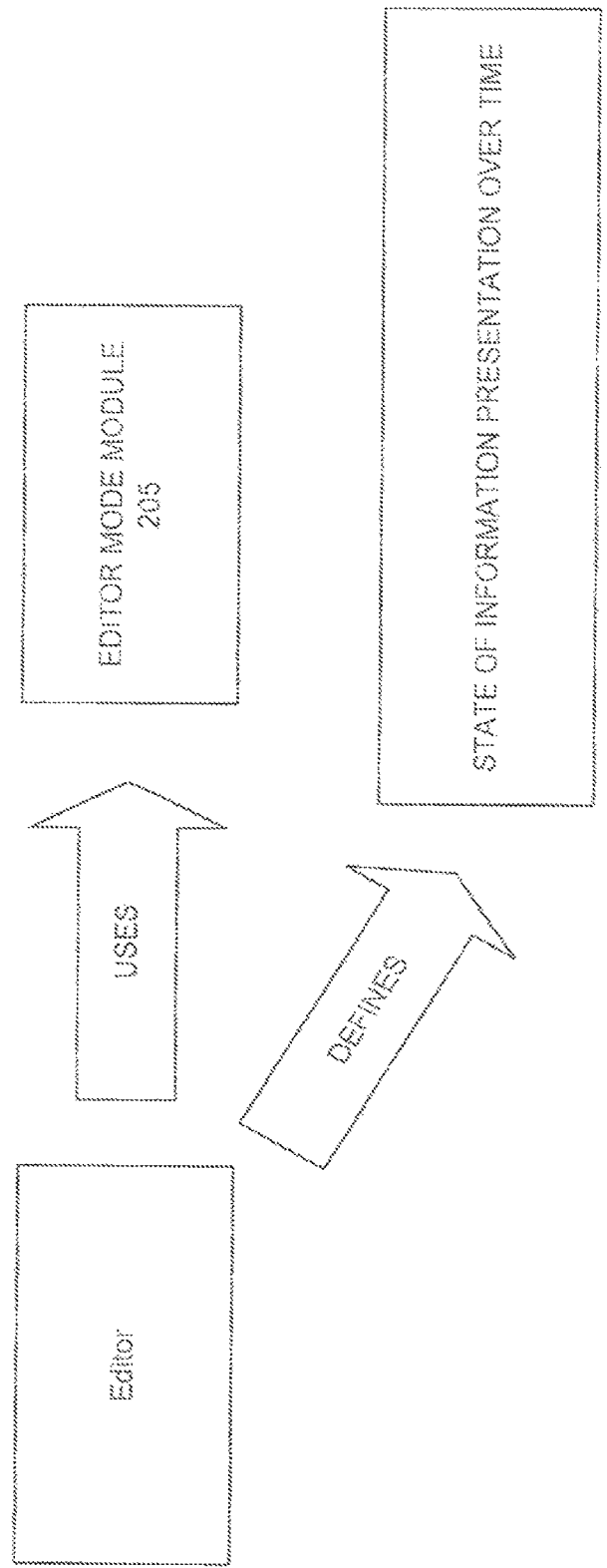
Figure 16:
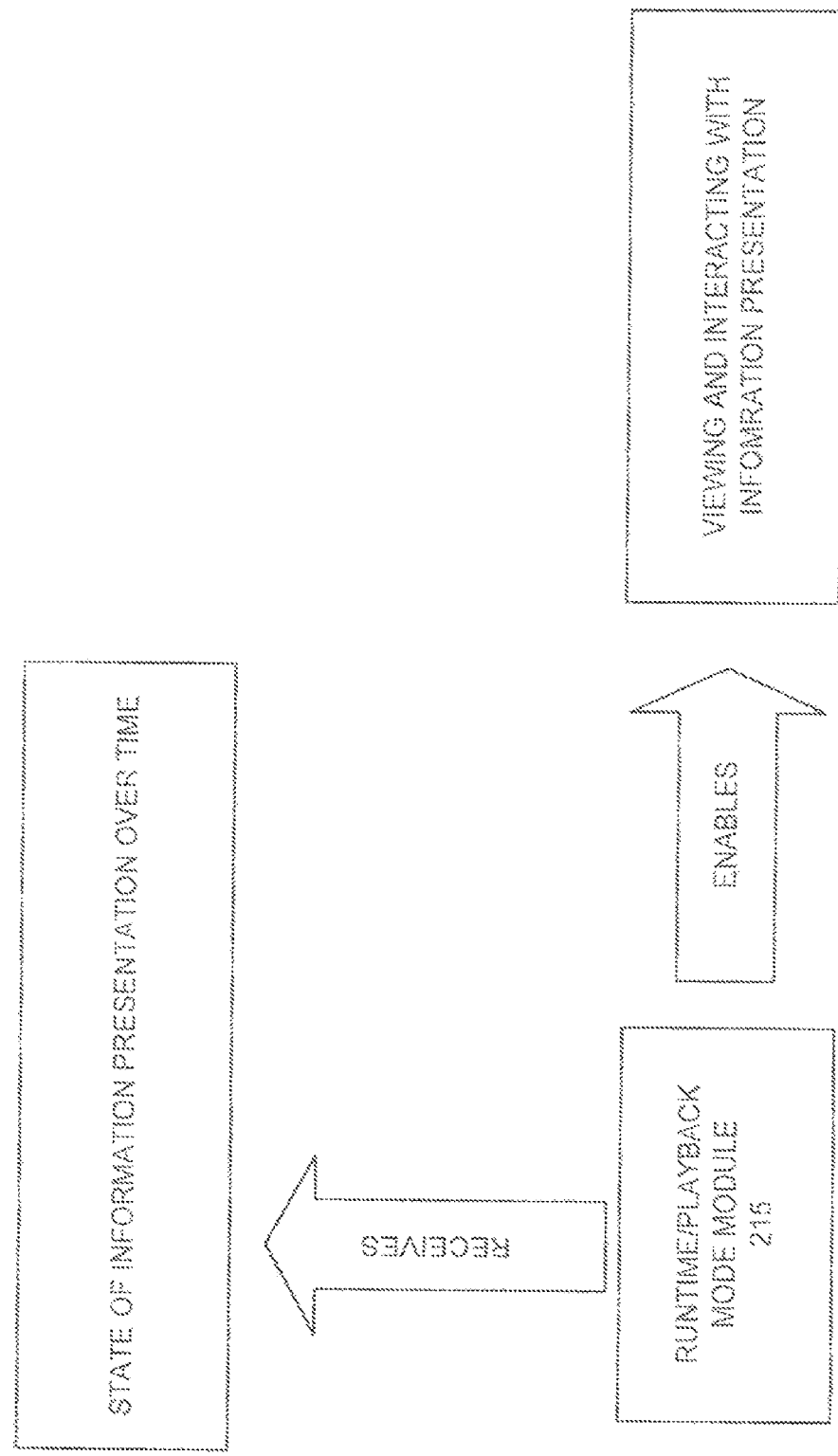

FIGS. 15-16 outline some of the various modes enabled within and supported by the creation/playback application 120. As indicated in FIG. 15, the editor mode capabilities, enabled in one embodiment by the editor mode module 205 can enable a user (e.g., editor) to define an information presentation over time. (It should be noted that a user (e.g., editor) can include any person or computer capability that uses any device for defining the information presentation.) The defining of the information presentation can include, but is not limited to, defining: the assets that are presented and the times at which the assets are presented; the way the information presentation and/or asset(s) is presented over time; the interactive and functional capabilities of the information presentation and/or assets as displayed over time; the interactive and functional capabilities over time of the creation/playback application 120 for other users using or viewing the information presentation; any other aspect of the state of the information presentation or assets for any given point in time; or any other aspect of the state over time of the creation/playback application 120 for other users using or viewing the information presentation; or any combination thereof. This capability will be referred to hereinafter as "defining the state of the information presentation over time." in one embodiment, the information presentation state can be defined for at least one selected point in time (e.g., on at least one timeline).

In one embodiment, the user can interact with the at least one timeline, the timeline being rendered visually by the user interface module(s), to define the information presentation, wherein the creation/playback application can create state change/time definition data for the defined state changes that comprise the defined information presentation. An additional editor mode capability can include the ability for the creation/playback application 120 to enter a record mode. While the record mode is activated, a user can make state changes to an information presentation and assets in real-time and the creation/playback application 120 can monitor and record all input made by the user as it relates to state changes of the information presentation, assets, creation/playback application 120, etc. Some specific examples of recordable state changes include, but are not limited to: actuating, activating, moving, showing, hiding assets; using the whiteboard widget; editing a document using the document editing widget; editing a spreadsheet using the spreadsheet editing widget; drawing using the drawing suite widget; gesturing with a device's cursor pointer; or manipulating or interacting with any assets or widgets; or any combination thereof. After a record mode session is ended, the recorded state changes can be rendered in the timeline area. The user can repeatedly engage the record mode to either overwrite recorded state change/time definition data or to supplement it with additional recorded state change/time definition data. Recorded state change/time definition data can be immediately edited using the other editor mode capabilities, such as interacting with the timeline area. Additionally, the creation/playback application 120 can persist the information presentation data and it's constituent parts (i.e., to an external database 201, a remote system 202, an external application support system or sub system 203), and recall them again for editing as well as playback at any time. It should be noted that an editor user can include any person or computer capability that uses any device for defining the information. It should be noted that the record mode capability of the system is recording actual changes to the underlying data and state of the creation playback application and the information presentation such that that information presentation and full sequence of events may be "played back" at a later, rather than recording the screen or a video.

As indicated in FIG. 16, the runtime/playback mode capabilities, enabled in one embodiment by the runtime/playback mode module 215, can enable a user to: access and view information presentations and assets; interact directly and indirectly with the information presentation and assets; customize and edit the information presentation and the assets and the way they are presented; interact with other users of the system; or collaborate with other users of the system together with the information presentation or the assets; or any combination thereof. This capability will be referred to hereinafter as "the user viewing and interacting with the information presentation".

The collaboration mode capabilities, enabled in one embodiment of a collaboration mode module 220, can enable users to collaborate in real-time and non real-time in ways that may not be directly supported through any disclosed assets. For example, users of the system could use a collaboration mode capability whereby all users are able to view any other user's interactions or user invoked changes to the state of the information presentation, assets or application. Another example could be where each user can view the cursor indicator or mouse pointer of all other users viewing an information presentation collaboratively (hereinafter called a multi-cursor view). In this example, a multi-cursor view is not necessarily provided for by any other module, and thusly could be provided for by the collaboration mode module 220. When the multi-cursor view is activated, the collaboration mode module 220 can send state change/time definition data through the multicast data broadcaster module 265 to notify the other users' applications to also activate this feature immediately. After all users' applications have the feature activated, each of the respective collaboration mode modules 220 can then be responsible for (e.g., while the feature is activated) engaging the multicast data broadcaster module 220 to send the coordinate details of the respective users' cursors as state change/time definition data.

Those of ordinary skill in the art will see that any of the capabilities/functions of any of the modes can be combined with the capabilities of other modes.

Figure 40B:
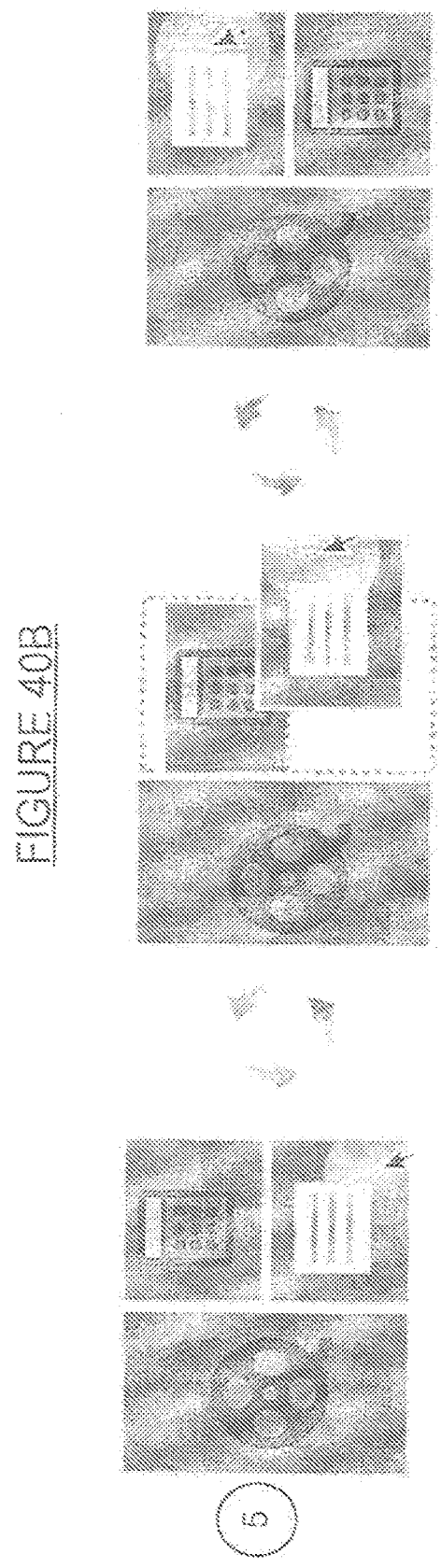

FIGS. 40A and 40B describe some of the graphical user elements and operations that can be available to a user within the various modes of the system, such as for interacting with the information presentation or defining the information presentation state over time. (It should be noted that in some embodiments the user interface features can also be used outside system 100.) 1) displays an embodiment through which a user can change/edit the information presentation, specifically, add/remove assets to be displayed, change the information presentation or stage layout, and switch between automatic mode and manual mode. 2) specifically details an embodiment for selecting a layout. 3) specifically details a method in which a user can locate available assets. 4) specifically details a user interface control for switching or toggling to automatic mode from manual mode (detailed below). 5) details other ways in which the user can manipulate the layout or the assets within the information presentation; interact with the information presentation or assets; or define the information presentation state or state of the assets over time.

By manipulating the information presentation during playback, such as selecting/configuring/changing the layout or adding/removing assets from the screen, or inviting other users to collaborate, the creation/playback application 120 can change from playing the information presentation in its predefined format (automatic play mode) into manual play mode, wherein the creation/playback application 120 can no longer implement some or all of the predefined information presentation's state changes, such as the display/activation of assets and layout changes. The user/editor can immediately switch back to automatic mode with a single user gesture, such as clicking on a button. This capability is also detailed in FIGS. 5 and 27-28, and their accompanying descriptions below.

Tracks

The user interface module 280, together with other modules, can accommodate multiple approaches for defining, playing back, visualizing and interacting with an information presentation. In one embodiment, one of the multiple approaches that can be implemented using the user interface module 280 can be the implementation by the creation/playback application 120 of a visual timeline with zero or more tracks within a timeline display area, wherein the visual timeline and tracks are a specific graphical user interface that can be used interactively by the user with the system to: a) define states of the information presentation, states of the assets, and states of the creation/playback application 120 and/or the changes of the state of the information presentation, the state of the assets, and the state of the creation/playback application over time; b) interact with the information presentation, the assets, and the creation/playback application's states and state changes over time; or c) generally interact with the information presentation, the assets, and the creation/playback application; or any combination thereof). The graphical user interface can also be used to visually represent for the user the information presentation, the assets and the creation playback application (e.g., changes of the state over time).

Tracks can flexibly accommodate the user in various capacities in visualizing, interacting with and configuring/defining an information presentation, its assets and the creation/playback application's state over time. The timeline area can have multiple tracks with certain tracks devoted to visualizing or configuring certain aspects of the state over time. For example, a multi-track embodiment in any mode may contain a track for each of the 1-n assets to be displayed or activated/actuated and certain aspects of state related to that specific type of asset. Tracks of this nature can be referred to as asset tracks. In addition there can be tracks that can be specifically implemented for defining and controlling other aspects of the information presentation over time, such as the layout of the information presentation, the abilities or constraints of the user to modify the layout of the information presentation, the functional capabilities of the assets and the information presentation, or the logic and rules regarding if real-time interactive widgets should be displayed and provided; or any combination thereof. Tracks of this nature can be referred to as control tracks. Examples of control tracks include: asset layout control tracks purposed around controlling/defining the layout of the assets; application layout control tracks purposed around controlling/defining the layout of the creation/playback application; user constraint tracks purposed around defining certain actions that can or cannot be taken by the user; or any combination thereof. Additional detailed information with regards to tracks can be found in FIG. 21 and its accompanying description.

Assets and Structure

FIG. 3 sets forth the assets, which, as indicated above, can comprise non-interactive assets 305 and/or interactive assets 310. The non-interactive assets 305 (which can be assets that are not interactive with either another person, system 100, or another system) can comprise real time assets 315 and/or non real-time assets 320. The assets can be human and/or machine readable. The real-time assets 315 can comprise: real time information streams, real-time audio streams, or real-time video streams, or any combination thereof. The non real-time assets 320 can comprise: at least one time-based file (e.g., audio file, video file, multimedia file), or at least one document file, at least one image file (e.g., picture), or any combination thereof. The interactive assets 310 (which are assets that can be interactive with another person, system 100, or another system) can comprise widgets (e.g., components) that can: gather user input, provide dialogue with the user, provide interactivity between the user and the information presentation and/or assets, provide interactivity between the user and the system 100 and/or another system, or provide interactivity and collaboration between multiple users of the system 100 and/or another system, or any combination thereof. All of these capabilities will be referred to hereinafter as "widget interactivity." It should be noted that, in one embodiment, non-interactive assets can become interactive assets by being loaded into widgets. Various examples include: a text document becoming editable by being loaded into a document editing widget, an audio or video document becoming editable by being loaded into an audio/video editing widget, or a live video stream becoming configurable within a video playback or audio/video chat widget, or any combination thereof.

The widgets can comprise at least one text chat widget, at least one audio/video chat widget, at least one asset browser widget, at least one discussion widget, at least one audio recording/playback widget, at least one video recording/playback widget, at least one stream playback widget, at least one audio/video editing widget, at least one document viewing widget, at least one document editing widget, at least one linking widget, at least one activity widget, at least one slide show editing/viewing widget, at least one diagram editing/viewing widget, at least one drawing suite widget, at least one whiteboard widget, at least one polling widget, at least one survey widget, at least one assessment widget, at least one spreadsheet widget, at least one user list widget, at least one source code viewing and editing widget, at least one tracking widget, at least one glossary widget, at least one screen sharing and/or screen recording widget, at least one wiki widget, at least one bookmark widget, at least one calculator widget, at least one presentation index widget, at least one layers widget, at least one integrations widget, or at least one third party platform interactive widget; or any combination thereof. It should be noted that any widget can be provided using third-party software. In addition, those of ordinary skill will see that any widget function(s) can be combined with any other widget function(s) to form other widgets.

The text chat widget can enable real-time text-based interactive discussion between multiple users of the system or the information presentation.

The audio/video chat widget can enable real-time audio and video chat between users of the system through their respective devices, whereby each user can simultaneously view real-time video and audio feeds/streams being broadcast from many users of the system. In some embodiments, it may use the stream playback widget. Various video camera and audio input sources can be supported through standard technologies and interfaces on various devices. Examples include web cam technology built into many notebook computers and video camera support built into mobile devices. In addition, the audio/video chat widget can support a record mode and can be used to record a user's audio and/or video input for use in a variety of ways in non real-time scenarios. For example, the audio and/or video recorded could be used as an asset within an information presentation or within any other widget, such as being used in an audio and/or video mode embodiment of the discussion widget.

The document editing widget can enable a user to create, edit, save and/or recall and view documents and/or can provide rich text editing similar to a document editor (e.g., Microsoft Word, etc.).

The slide show editing/viewing widget can enable a user to design, create, edit, save, recall or view (or any combination thereof) slide oriented documents (e.g., slide show presentations) and slide shows similar to other slide show presentation creation tools (e.g., Microsoft PowerPoint, Apple Keynote, etc).

The linking widget can be used independently and stand-alone or in conjunction or as part of any other asset or widget. The linking widget allows any other assets or object within an asset or widget, or within rich text element (e.g., image, video, drawing/diagrams element such as a shape, highlight, bitmapped image, etc; discussions within the discussion widget) or any text within any asset to be linked to or contain links including, but not limited to: 1) one or more points in time in the information presentation; 2) other assets; 3) other states of other assets; 4) other layers in the layers widget; 5) other information presentations; or 6) any other URI or URL; or any combination thereof, any of which can be displayed within the linked from/original information presentation or outside of the information presentation.

The activity widget can be used in conjunction with other widgets in order to assemble or connect a sequence of other widgets or a sequence of layers or screens containing widgets together into a multistep interactive user activity, wherein such activity can be added to and become a part of an information presentation. Further, the activities can be timed or time limited and can be required or not required to be completed by the user.

The diagram editing/viewing widget can enable a user to design, create, edit, save and/or recall and view various types of diagram oriented documents similar to other diagram creation and viewing tools (e.g., Microsoft Visio, etc).

The drawing suite widget can enable a user to design, create, edit, save, recall, insert or view (or any combination thereof) various types of image files and assets of various types including raster/bitmap formats (e.g., GIF. PNG. JPEG) vector file formats (e.g., SVG, EPS, Adobe Illustrator), various image or vector objects or drawing shapes (i.e., circles, squares, highlights, text). The drawing suite widget can support both vector drawing and image manipulation capabilities and raster/bitmap image manipulation and capabilities, and can combine capabilities of various other standard drawing and image manipulation tools (e.g., Adobe Illustrator, Adobe Photoshop, Adobe Fireworks). As may be the case with any widget, the drawing widget may be placed/moved/positioned over top of any other asset or over all assets displayed within the creation/playback application. It is important to note that any widget can be placed on top of any other widget within the user interface and stage of the creation/playback application or within a layer (i.e., within the layer widget) or any combination thereof.

The asset browser widget can enable a user to browse, preview, view, or interact with (or any combination thereof) any asset that may or may not be related to a given information presentation. The asset browser widget may use other widgets if necessary in order to provide its capabilities related to browsing the assets, in addition, the asset browser widget can be one way in which a user may select and add assets to an information presentation or to the stage.

The discussion widget can provide various ways for a user to engage in discussions with other users of the system, according to several embodiments. The discussion widget can be used for various functions for message oriented communication, such as posting, replying, viewing, or archiving messages (or any combination thereof). The discussion widget can be configured to support discussions in several ways, including: ongoing and/or thread oriented discussions similar in structure to other widely used online discussion/message boards (also known as forums); ongoing lists of comments similar in structure to other widely used comment systems; or in other ways (including question and answer, etc.). The discussions and posts/messages can be text or rich text based (i.e., text with various font sizes, colors, embedded drawings, embedded video and/or multimedia, embedded images, etc. examples of which could be Microsoft Word documents or HTML documents), as well as audio and/or video based. For example, discussions, messages, discussion posts and comments can be posted by users in an audio and/or video format, or audio and/or video in rich text format, wherein such audio and/or video may have been recorded using the audio/video chat widget's record mode capability Discussions and messages can be associated with a given point or several points in time within an information presentation, and as such, can be rendered visually on the timeline in various ways. The discussion widget can be configured to notify a number of devices when an interaction with the discussion widget has happened (e.g., notifications to mobile phones, SMS messages, email, notification popups in the creation playback application, when messages are posted or replied to). In addition, the discussion widget and its constituent posts/messages and the posts/messages content can provide for access (such as through links, etc.) directly into the information presentation, at the exact point in time for which the discussion or posts/messages can be associated or other points in time in the information presentation. In addition, the discussion widget and its constituent posts/messages can both be linked as well as contain links in any way provided for by the linking widget, and both can also easily reference and be linked to other discussions and posts/messages.

Figure 48A:
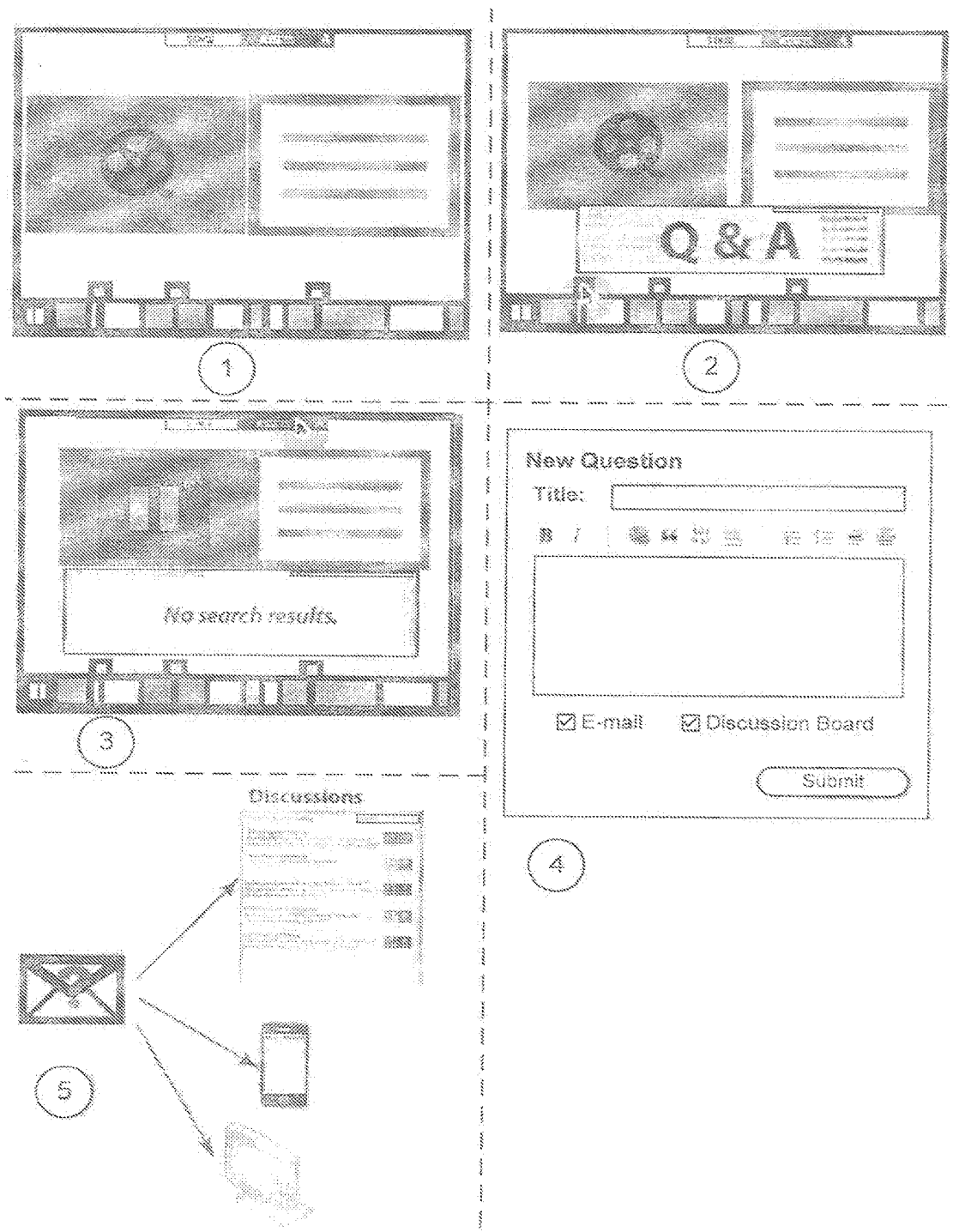

FIGS. 48A and 48B illustrate an example of a specific configuration of the discussion widget, according to one embodiment. In this example, the discussion widget is configured in a question and answer style. In 1, a user (referred to as Julie) is watching an information presentation, created by another user (referred to as Professor X). Julie has opted to activate the question/answer display on the information timeline. In the example, various questions and answers related to the information presentation are represented on the timeline by yellow pins, placed at specific points in time on the timeline that the questions/answers are related to. In 2, while Julie watches the presentation, she finds there is a topic that she does not understand and has a question regarding it. She points her mouse over the 1 or more pins that may appear on the timeline near the portion of the information presentation she is watching. On pointing her mouse over each pin, questions/answers related to the specific point in time the pin is representing can appear in a window using the preview portion of the question and answer configured discussion widget. In 3, Julie cannot find any questions and answers related to her own question, and she decides to activate the search widget to search other course content such as discussion boards regarding her topic. In 4, Julie's search produces no results, so Julie activates the "ask a question" portion of the question and answer configured discussion widget, upon which a dialog box appears, where Julie enters and submits her question. In 5, Julie's question gets sent to multiple locations, including the discussion board, and as an email to Professor X's email and mobile phone. Embedded in the email is a link to the exact moment and time of the information presentation that Julie has a question about, so users can click on it and review the content in the context of Julie's question. In 6, Professor X arrives at his of ice the next day, he notices that he has received an email question from Julie. He opens up the email, reads Julie's question and clicks on the embedded link. Professor X reviews the portion of the presentation that Julie has a question about and responds through the question and answer configured discussion widget by pressing on the "Answer" button. In 7, Professor X feels that Julie's question is a very good one, and wants to archive the question and his answer into the information presentation, so that it can be previewed using the preview portion of the question and answer configured discussion widget related to the timeline of the information presentation. In 8, the archived question and answer now appears represented in the information presentation on the timeline at the point in time that the original question was asked. This "archives" the question and answer for future viewers of the information presentation to reference at that point in time of the information presentation.

The audio recording/playback widget can allow for recording of at least one audio document and/or the selection of at least one audio document, or controlling, viewing or hearing the playback of the audio document, or any combination thereof. The video recording/playback widget can allow for recording of at least one video document and/or enable a user to select at least one video document, or control, view or hear the playback of the video document, or any combination thereof.

The stream playback widget can allow a user to select and/or to connect to at least one real-time (e.g., live) audio, real-time video, or real-time data stream, or to view and/or hear the streams, or any combination thereof.

The audio/video editing widget can enable a user to flexibly edit audio or video documents and assets or any combination thereof in a non-linear fashion similar to other non-linear editing systems. Similar to other non-linear editing systems, a user can create, define and output/save video and audio files and/or assets that are composited or mixed from multiple video and audio files/assets in a non-destructive manner (e.g., without destructing, degrading or modifying the original video and audio assets). The user can use many standard user interface elements and approaches similar to the user interface of other non-linear video and editing systems, such as layers, visual in/out points, etc.

The document viewing widget can enable a user to load and view text based documents in various formats (e.g., Microsoft Office, PDF).

The whiteboard widget can enable a user to draw and diagram independently, above, and/or in conjunction with (e.g., on) any other asset, individually (e.g., visible to only one user) or collaboratively (e.g., with other users in real-time (e.g., live) and non real-time (e.g., non-live)). In addition to its own native drawing capabilities, the whiteboard widget can make use of other widgets, such as, but not limited to, the drawing widget and diagram editing and viewing widget.

The polling widget can enable a user to define and/or participate in question based polls, both in real-time and non-real time. The survey widget can enable a user to define and participate in surveys, both in real-time and non-real time.

The assessment widget can allow users to define or view/access/participate in assessments (such as quizzes and exams) using numerous question types (e.g., multiple choice, true/false, branching, matching, drag and drop, short answer, essay, etc.) and at least one question. The assessment widget can be configured to present to the user one or more quest ions or assessment activities at any point during an information presentation. The assessment widget can be configured in various ways including presenting any or all questions/assessment activities modally (e.g., where the user must provide an answer or a correct answer before proceeding within the information presentation). The assessment widget can also allow determining, storing and/or displaying scores, both within an information presentation and across multiple information presentations. Assessments created/defined using the widget can be limed or time limited and individual questions in the assessment can be timed or time limited. The assessment widget can also be configured in various ways to ensure to ensure security of the assessment data, authenticity of the user and the integrity of the assessment. For example the assessment widget can secure a users device such that only the creation playback application (and no other applications or limited access to other applications) can be used during an assessment or track usage of any other applications on the device (e.g., both capabilities can be used to prevent cheating, etc.). Additionally, the assessment widget can use or be used in combination with various real-time assets and widgets to ensure integrity or the assessment and authenticity of the user and to prevent cheating. For example, the audio/video chat widget can be used to verify the authenticity of the user and to proctor and/or monitor users as they use the application and participate in an assessment.

The spreadsheet widget can create/define/edit and/or allow viewing of spreadsheets (e.g., Excel) and/or spreadsheet oriented activities similar to other spreadsheet applications (e.g., Microsoft Excel, etc.).

The user list widget can allow for users of the system or information presentation to see information about other users of the system or information presentation, and/or interact with other users or solicit interactions with other users of the system or of the information presentation. For example, a user could activate the user list widget and see a list of all users (e.g., editors, viewers, contributors) of an information presentation as well as additional information, such as their name, online status (or last time online), availability. A user could also interact with other users, such as "knocking" on their door or requesting various forms of collaboration, such as chat, collaboration mode, shared white board, etc.

The source code viewing and editing widget can enable a user with software development tool capabilities, ranging from enabling a user to view formatted and color coded computer programming source code (e.g., source code formatting) to enabling a user to participate in a fully integrated development environment. In the integrated development environment embodiment, the source code viewing and editing widget can provide for capabilities such as, but not limited to: source formatting, code highlighting, editing of source code, code completion and hinting, step oriented debugging capabilities, linking to object code, or compiling and execution of code, or any combination thereof. In addition, the source code viewing and editing widget can be one way of implementing and providing for programming to CARA 235. This ability to program against and for CARA 235 could be used to define an information presentation and the state of the information presentation and assets over time programmatically. For example, a user could choose to write code for or "script" to define an information presentation and the state of an information presentation over time or a portion of an information presentation or any asset at any point in time in an information presentation, as an alternative to or in conjunction with using the applications various other capabilities (e.g., user interface) available for defining an information presentation.

The tracking widget can enable a user to track and/or view his progress within an information presentation and across information presentations. Further, it can track and log every single action or interaction a user takes and the time at which it happened, providing for an analysis and reporting data set. The glossary widget can enable a user to view and/or access a glossary for a specific information presentation, or across information presentations. The screen sharing and screen recording widget can enable a user to replicate and/or broadcast in real-time and/or record or playback (e.g., in real-time or non-real time) at least one portion of a user's device's screen, and/or to view another user's recording and/or broadcast on other user's screen. The screen sharing and screen recording widget also allows users of the system to take control of other user's systems (i.e., operating systems) such that a user or multiple users can control another user's computer. In addition, the recorded video of the screen capture can be used as an asset in an information presentation or within other assets.

The layers widget can provide a user and/or editor with the ability to create and edit multiple layers upon the stage within the creation/playback application. Each layer operates similarly to the stage and can be used to display one or more assets. From the user interlace of the creation/playback application 120 users can choose to view the one or more layers containing the assets together or separately, depending on their capabilities, as allowed/disallowed by an editor. (Details regarding constraint controls discussed later in this disclosure).

The wiki widget can provide a user with wiki oriented collaborative knowledge building functions similar to other wikis using rich text, such as Wikipedia. The bookmark widget can enable a user to bookmark and/or recall any point in time in an information presentation or an asset at any point in time, and/or to share and or send these bookmarks with/to other users and other systems. The calculator widget can enable a user to display a graphical calculator (including various types of calculators, such as standard, accounting, scientific, binary, graphing, etc.) and/or to define calculator-based exercises or activities to be used in an information presentation. Those of ordinary skill in the art will see that various calculators (e.g., scientific calculator, accounting calculator, etc.) can be used. The presentation index widget can enable a user to define and/or access an index of various points in time in an information presentation.

The third party platform widget can enable a user to integrate/use widgets built or compiled for/from a variety of platforms. The third party platform widget can include, but is not limited to, a widget built for the Adobe Flash platform ((SWF files etc). Microsoft SilverLight, or other technologies or web technologies (e.g., HTML, JavaScript, CSS, etc.), used separately or in combination.

Figure 37:
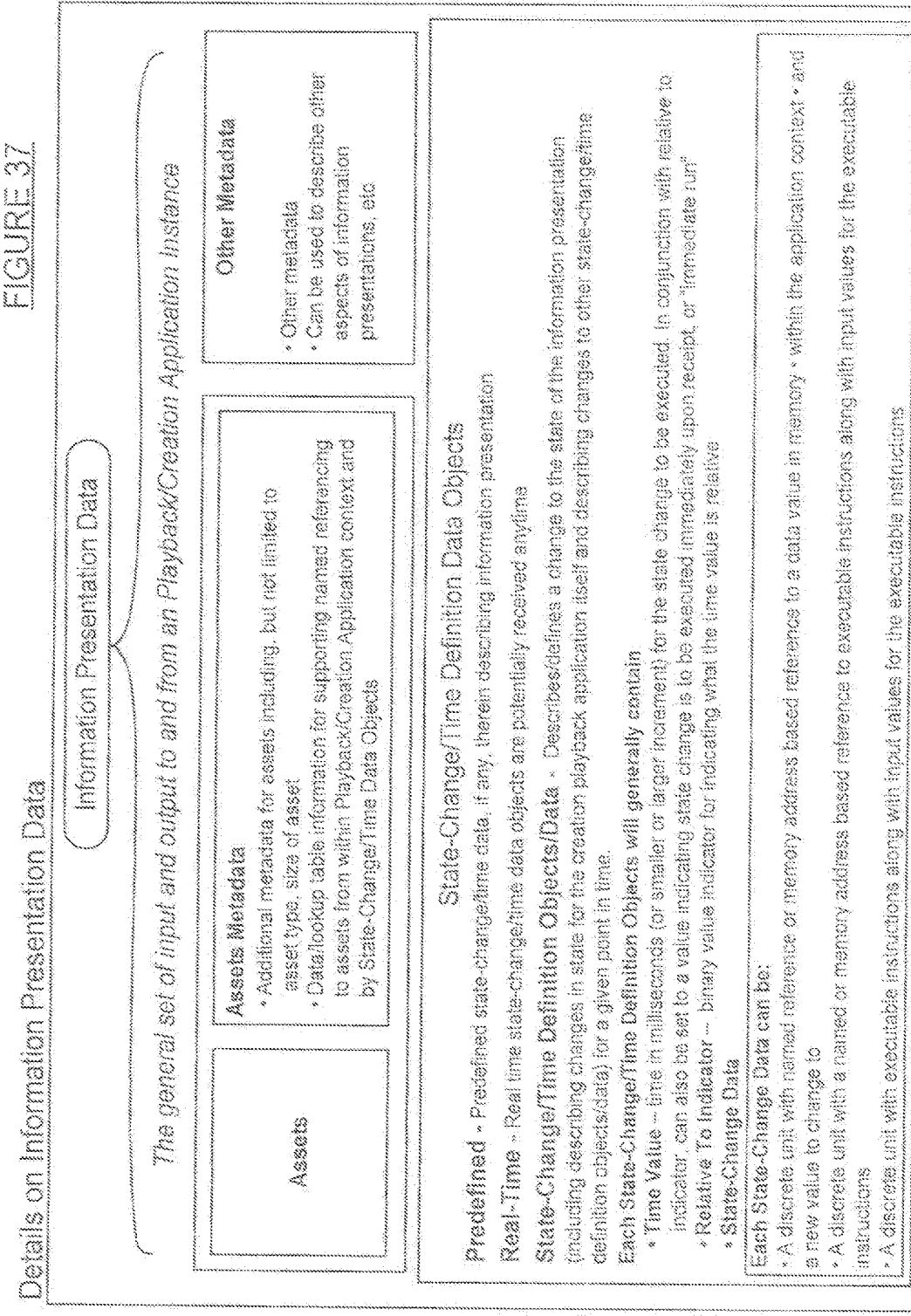

FIG. 37 illustrates the nature and structure of the information presentation data that comprises the general input/output for the creation/playback application 120, according to one embodiment. As noted in FIG. 37, information presentation data can be comprised of the plurality of assets, the assets metadata, other metadata, and state change/time definition objects and data. The state change/time definition objects and data can contain information about change in the state change of the information presentation and the time at which the state change should be executed, including, but not limited to: the way the information presentation and/or assets are presented; the date/time that the state change occurred; the user or user id or the user who invoked/created implemented the state change; any of the data values or data associated with an asset; or the interactive and functional capabilities of the information presentation or assets, over time or at a given time, or any combination thereof. The state change/time definition objects and data can be of two natures; pr-defined or real-time. The predefined state change/time definitions can be created by an editor using an editor-mode embodiment of the system and then saved to be recalled and used by either an editor or user at a later time using the system. Together, a collection or predefined state change/time definition objects can form and define a pre-defined information presentation over time. Real-time state change/time definition objects can be potentially received throughout the use of the application. State change/lime definition objects of both natures (e.g., predefined, real-time) can define state changes of the information presentation or the system and can be: (1) executed at a previous point in time in the information presentation (e.g., should the user(s) of the system be able to/allowed to and choose to backtrack in time over the defined information presentation); (2) immediately executed; or (3) executed at some point in the future or ahead of the current time within the information presentation; or any combination thereof.

Each state change/time definition object can generally contain a time value, which can be the time in milliseconds for the state change to be executed. The time can be either absolute time or time relative to another time or relative to the start time of the presentation. In addition, the state change/time definition object can comprise an indicator set to a value indicating a state change is to be executed immediately upon receipt. Furthermore, the state change/time definition object can comprise a relative-to indicator, which can indicate what the time value is relative to.

The state change data within each state change/time definition object can define an actual change in state to the information presentation, a change in state to the creation playback application 120, or a change in state to other state change/time definition objects. In one embodiment, each state change/time definition data can be: a discrete unit with a named reference or memory address based reference to a data values in memory within the application context and a new value to change to; a discrete unit with a named or memory address based reference to executable instructions along with input values for the executable instructions; or a discrete unit with executable instructions along with input values for the executable instructions; or any combination thereof.

Methods of Using the Creation/Playback Application

FIGS. 38A and 38B illustrate a method by which one embodiment of the system or application can initialize, listen for and process incoming state time data. In 3805, a user of the system can request to view, access, and/or edit an information presentation. In 3810, a server computer 110 can allow access to the creation/playback application 120. This can be done as noted in 3811 and 3812. In 3811, the server computer 110 can locate and provide to the user the information presentation data to be loaded. In 3812, the server computer 110 can create an instance of the creation/playback application 120. In 3815, the user's client computer 115 (e.g., host system such as device, etc) can load the creation/playback application instance and initial information presentation data payload. In 3820, the user's instance initializes itself and its graphical user interface within the host system. This can be done as noted in 3821, 3822 and 3823. In 3821, the support framework is initialized. In 3822, the user interface framework is initialized. In 3823, the creation/playback application 120 components are initialized.

In 3825, the creation/playback application 120 can open a network communication connection to the server computer 110 using a bus/network communications I/O manager 225. Remote server access can be connected via any IP/Socket Protocol. In 3830, the creation/playback application instance can notify the server computer 110 that the initialization is complete. In 3835, the creation/playback application instance can process incoming data related to the initially received information presentation data. This can be done by invoking the data loader/initial application updater module 230 with the initialization payload data, as set forth in 3850-3855.

In 3850, the information presentation data can be received. In 3851, the assets and assets metadata can be added/updated to the local assets database 245. In 3852, the real-time or other state change/time definition objects that require immediate processing and execution can be separated and identified. In 3853, these real-time or other state change/time definition objects that require immediate processing and execution can be handed to the state change proxy module 260 to be immediately executed. In 3855, the state change/time definition objects can be added and/or updated in the local state change and timing database 250 with other state-change/time definition objects which will potentially need to be executed later.

In 3840, the creation/playback application instance can begin the process of continually listening for incoming information presentation data, as set forth in 3842-3844. In 3842, the creation/playback application 120 listens for newly received data. In 3842, it is determined whether new data is received. If yes, new data is received, in 3843, the data is sent to be processed (as described and illustrated in 3835). If no, new data is not received, in 3844, the process returns to 3842, where the creation/playback application 120 continually listens for new incoming data.

FIG. 4 illustrates a method 400 for defining information in an information presentation, according to an editor mode embodiment. In 405, an editor can accept assets to use for the information presentation. In 410, the editor can define the state of the information presentation. In 415, the editor can save the state of the information presentation. In 420, an editor can decide to edit the state of the information presentation. If the editor decides to edit the information presentation, the process can return to 405 or 410 and repeat. If not, the process can end.

FIG. 5 illustrates a method 500 for presenting information, according to a run-time mode embodiment. In 505, an information presentation can play in automatic mode. In 510, it can be determined whether a user wants to change to manual mode. This can be done, for example, by recognizing that the user has clicked on a certain button, clicked on the corner of an asset, or by another method. In one embodiment, the ability to change the information presentation (e.g., go from automatic to manual mode) can be allowed or disallowed by an editor. If yes, in 515, the information presentation plays in manual mode. If no, the information presentation returns to 505 and is played in automatic mode. In 520, it is determined whether the user wants to change to automatic mode. If no, the information presentation is run in manual mode, as indicated in 515. If yes, the information presentation is played in automatic mode, as indicated in 505.

Non-Track and Single Track Embodiments

FIGS. 6-14 and 17-18 illustrate a single timeline track embodiment. FIG. 17 illustrates a single track timeline containing a single display track and representing, using various indicators, various aspects about the information presentation over time, according to one embodiment. In 1705, a basic timeline indicates the duration of an information presentation. In 1710, a timeline with two data layers (which can be color coded) is illustrated. The white and gray area's can represent one aspect of the information presentation's state changes over time. In 1715, third and/or fourth additional aspects of the information presentation's state changes over time are illustrated by pins. In 1720, two additional aspects of the information presentation's state changes are represented: one aspect is represented by the asterisk symbol, and another aspect is represented by the dark line on the bottom of the timeline. In 1725, a sample single track timeline is shown with examples of aspects of an information presentation's state changes as they could be displayed. In 1, a timeline indicating the duration of the information presentation is shown. In 2, a pin (which can be color-coded) can indicate the addition of an asset. In 3, alternating colors on the timeline can indicate asset transitions (e.g., such as page changes in a slide show document or pages in a text based document). In 4, the asterisk symbol can indicate an asset being removed from the stage. In 5, a progress tracking bar can indicate progress and location through the information presentation. In 6, a different shaped pin (which can also have a different color) can indicate a quiz or exercise for the user to complete in the information presentation.

FIG. 18 illustrates several basic single track layout examples. In 1805, a basic single track timeline with one asset is shown. In 1810, a single track timeline is shown. In the first screen, one asset is shown. In the second and third screens, two assets are shown at the same time. In 1815, another single track timeline is shown. In the first screen, one asset is shown. In the second and third screens, two assets are shown. In the fourth screen, three assets are shown. In the fifth screen, four assets are shown.

Figure 6:
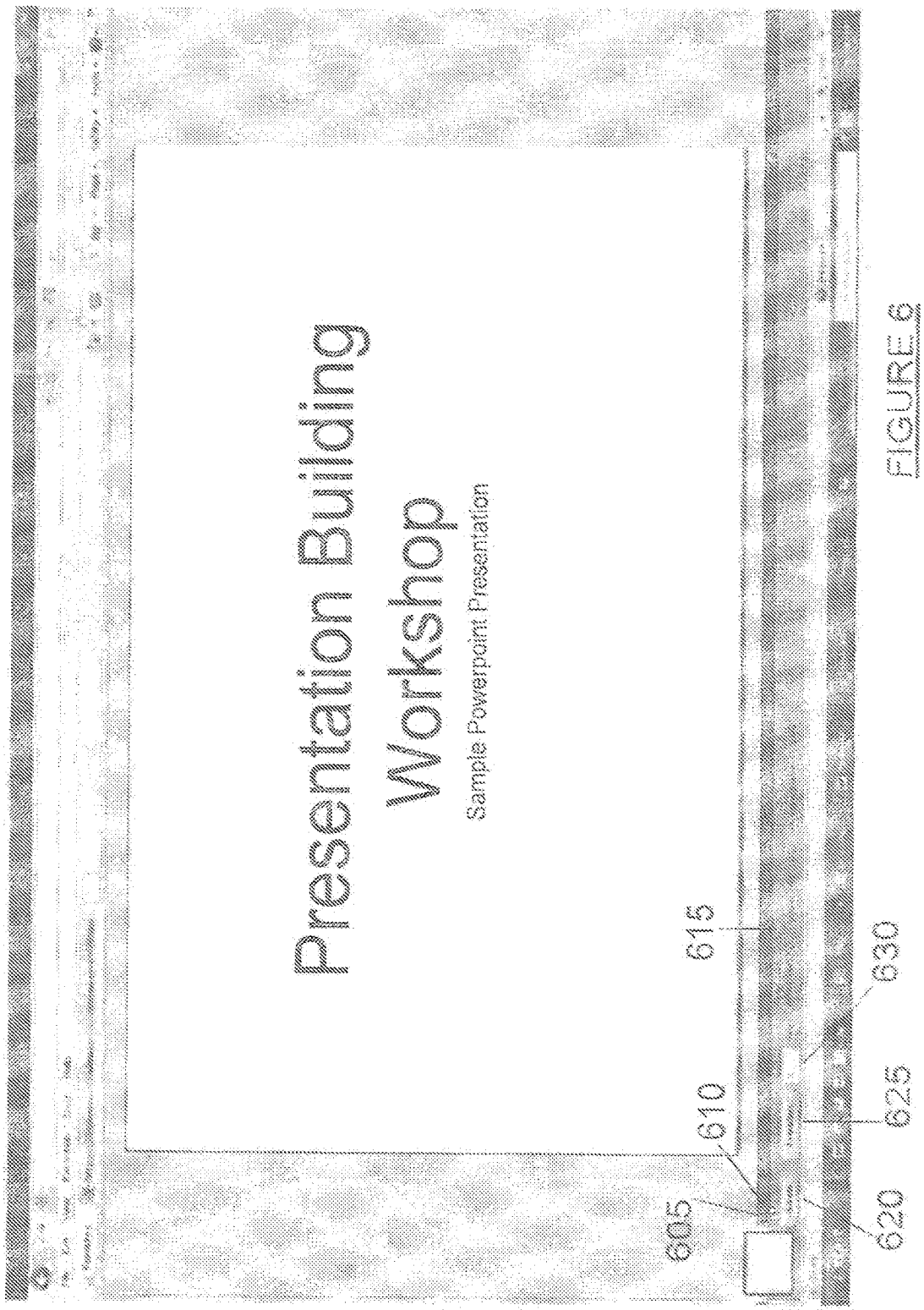
Figure 7:
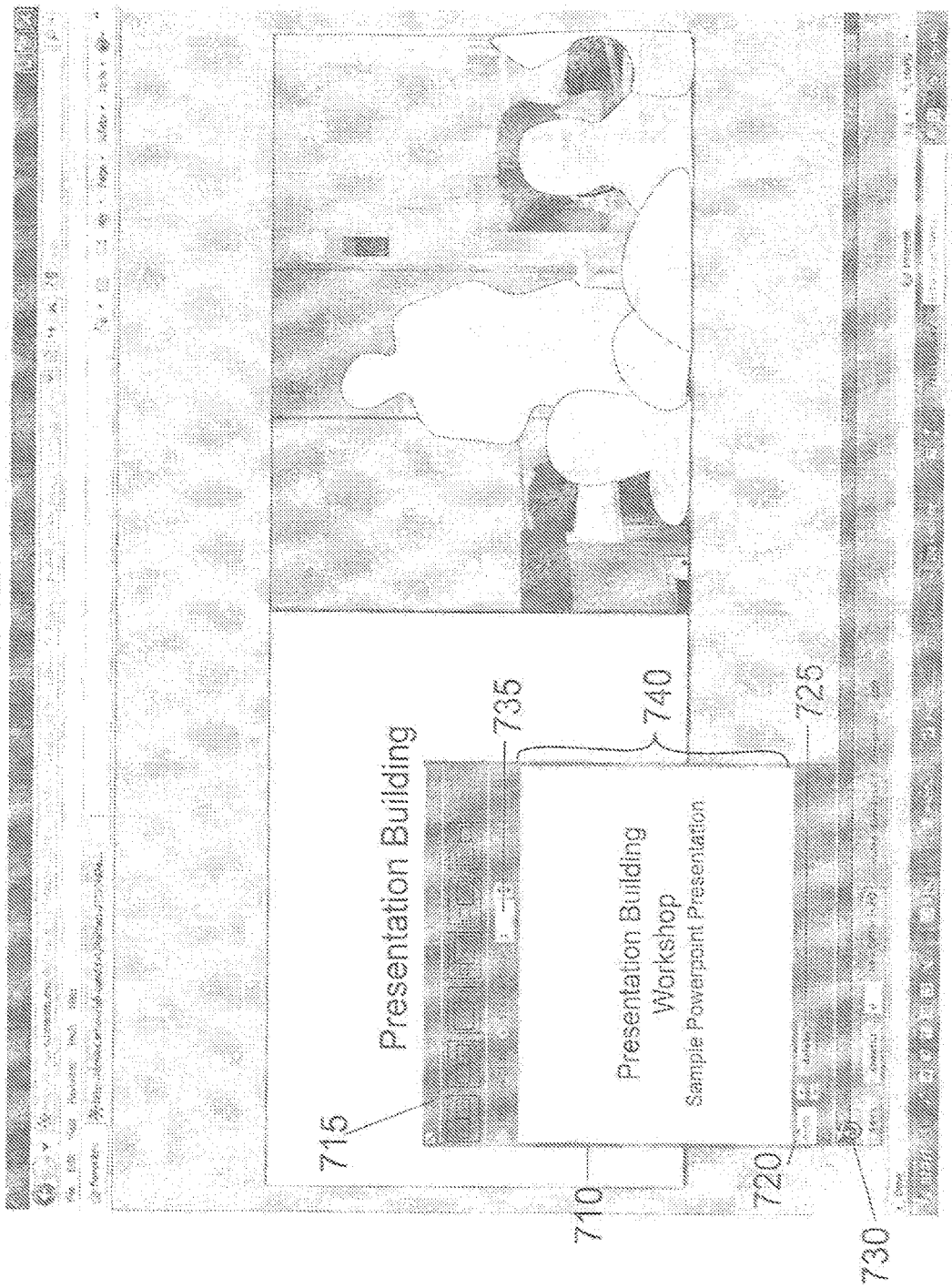
Figure 8:
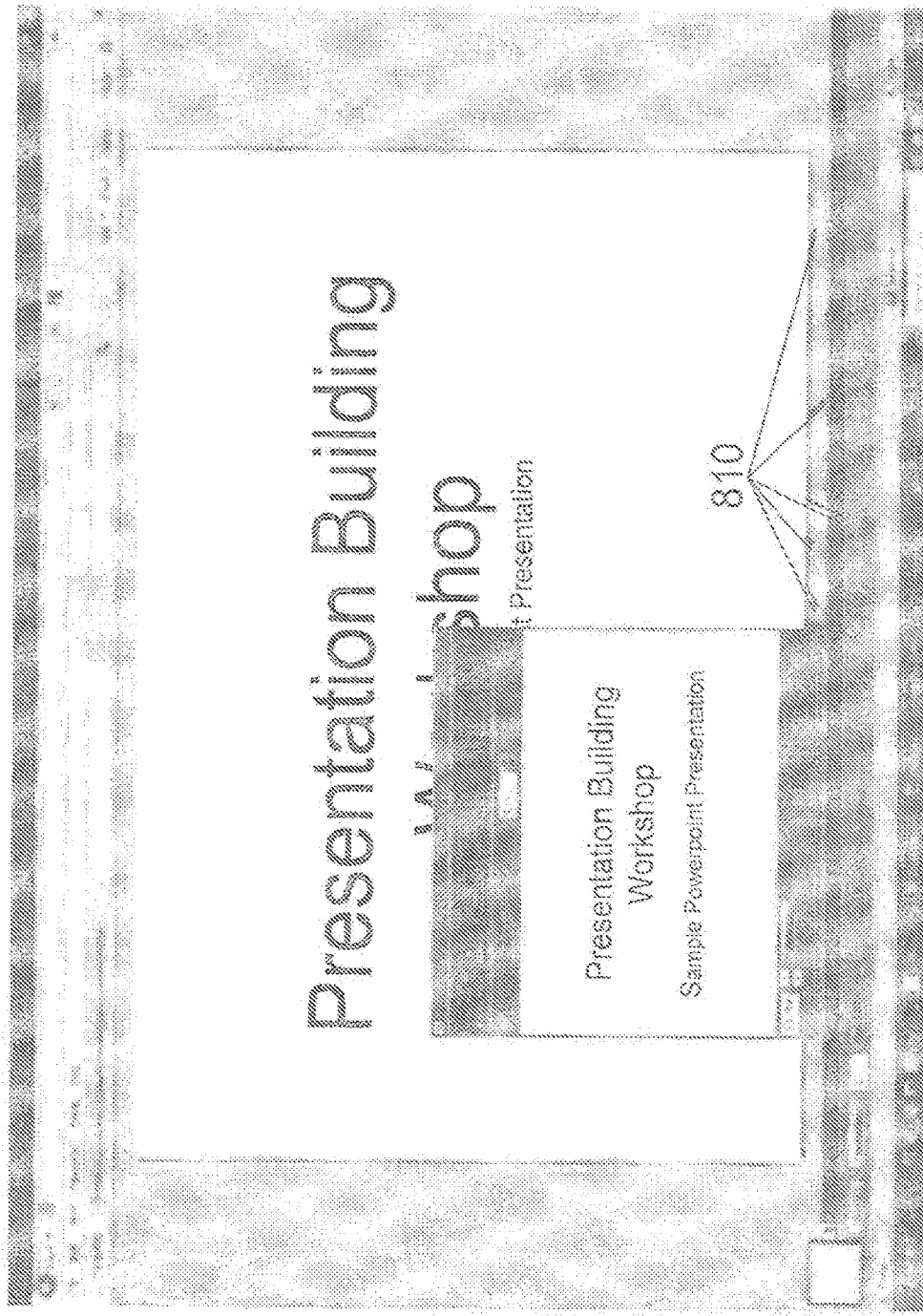

FIGS. 6-8 illustrate screen shots where an information presentation can be defined according to an editor mode embodiment. In these illustrations, a user has entered the creation/playback application 120 in editor mode and has (already) indicated to the system that the information presentation will be comprised using 1 video asset and 1 slide presentation document asset and has chosen the 1 of the each specific assets, slide presentation document and video.

FIG. 6 illustrates the following: a play/pause button 605 which can cause an information presentation to start playing or be paused; a time indicator 610, which can indicate the time in a information presentation; timeline area 615, which can indicate and allow for defining the various elements of an information presentation or the change of an information presentation over time; create button 625, which can be used by a user to create a new state change in the information presentation; save button 620, which can be used to save the edited information presentation; and a number area 630, which can allow an editor user to enter a number of new state changes to create in conjunction with the create button 625.

FIG. 7 illustrates a screen shot where an editor has chosen to define the state of the information presentation at time 0:00. This illustration shows a newly created information presentation with a single state change defined and displayed by a state change indicator 730, which appears here on the timeline. In this illustration, the user has clicked/selected the state change indicator, and the state change editor panel 710 has appeared, allowing the editor user to define various states pertaining to the type of information presentation being created, as defined by the use of the particular assets (in this scenario, 1 video asset and 1 slide presentation). Using the layout state selector 715, the editor user can select from a predefined selection of layout states for the video and slide document at the given particular point in time that the editor panel is being displayed for, in this case, 0:00. In this embodiment, the editor user can adjust the time of the state change in several ways. By clicking on or in another way selecting the state change indicator on the timeline with a pointing device and then dragging the state time change indicator to the right or left in the timeline, the editor user can adjust the time within the information presentation that the state change is executed. As an alternative to the select/click drag method, the editor user can choose to manually enter the time 720 that the state change is executed. In 735, the user can set the state of the information presentation for the given time in the way of which slide of the slide document is presented and displayed by clicking the up or down arrows or manually entering the number of the slide to be displayed into the text box. While interacting with 735, the slide to be displayed can be previewed using the slide previewer 740. There is also a delete button 725 that can be used to delete the state change from the information presentation and the timeline area.

FIG. 8 illustrates another screen shot example illustrating many state change indicators which an editor user has created and which can interact with and signify a number of state changes at various times throughout the information presentation as indicated by 810.

Figure 9:
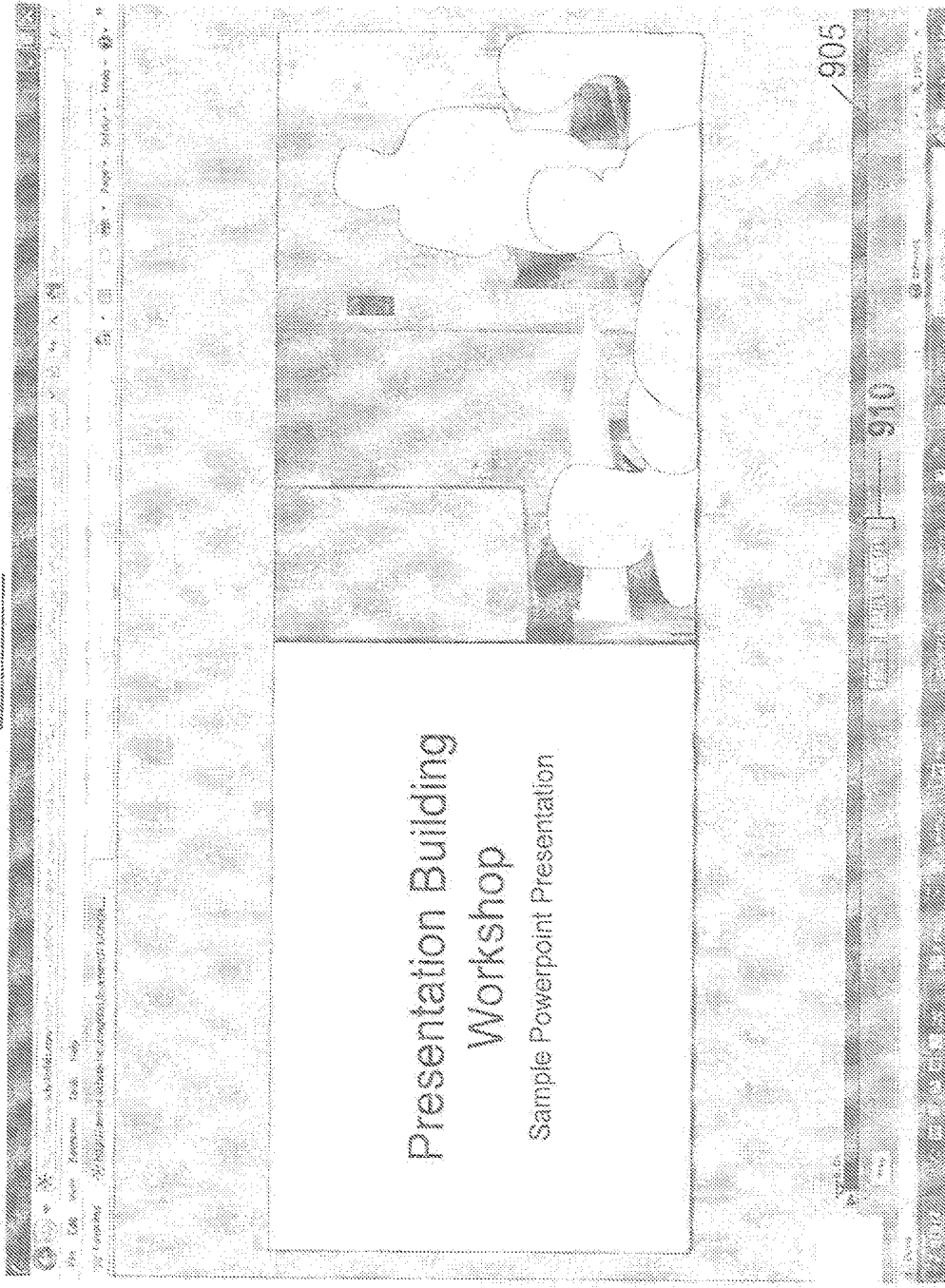

FIG. 9 illustrates a screen shot according to a single track runtime mode embodiment, showing how a user can view/playback an information presentation. In this example, the information presentation uses one video asset and one slide document asset throughout the entire duration. The timeline 905 can have alternating colors to indicate certain aspects pertaining to the change of state of the information presentation over time. In this example, the alternating colors represent when a new slide from the slide document asset will be displayed. Options 910 can allow the user to control or customize the state of the information presentation at any time. In 910, the user can select from different predefined layouts for the two assets that are to be displayed throughout the entire duration of the information presentation.

Figure 10:
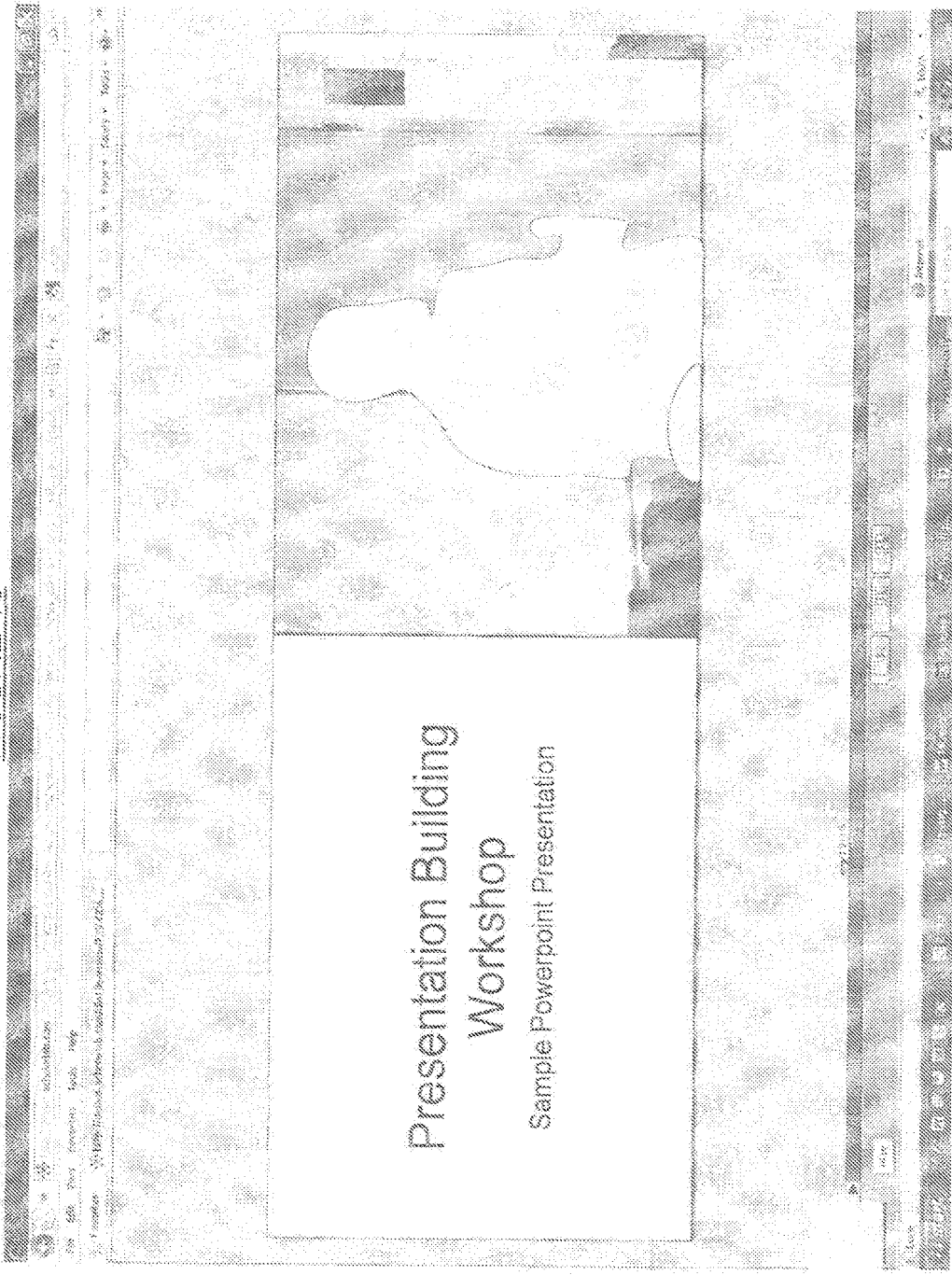
Figure 11:
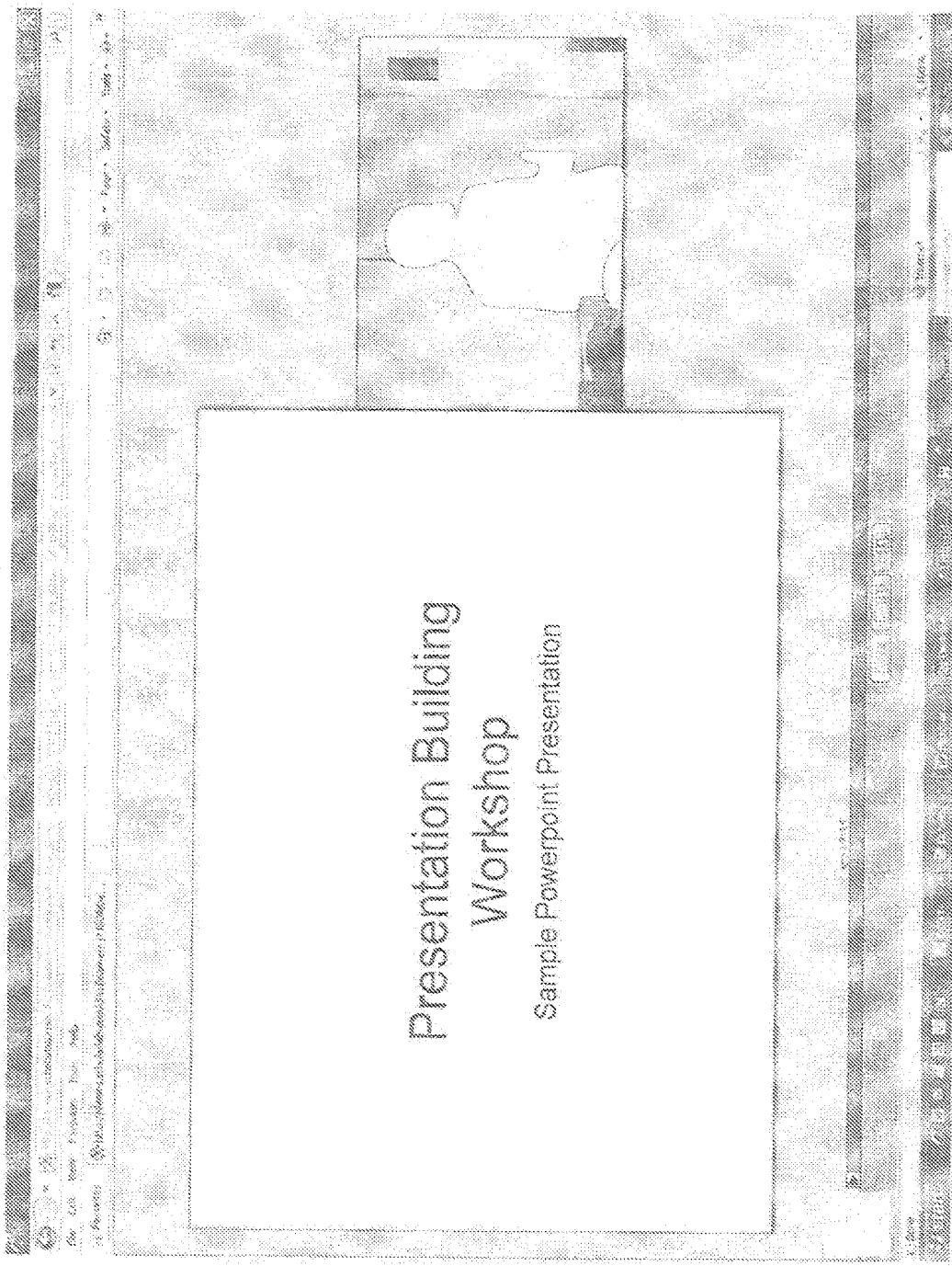
Figure 12:
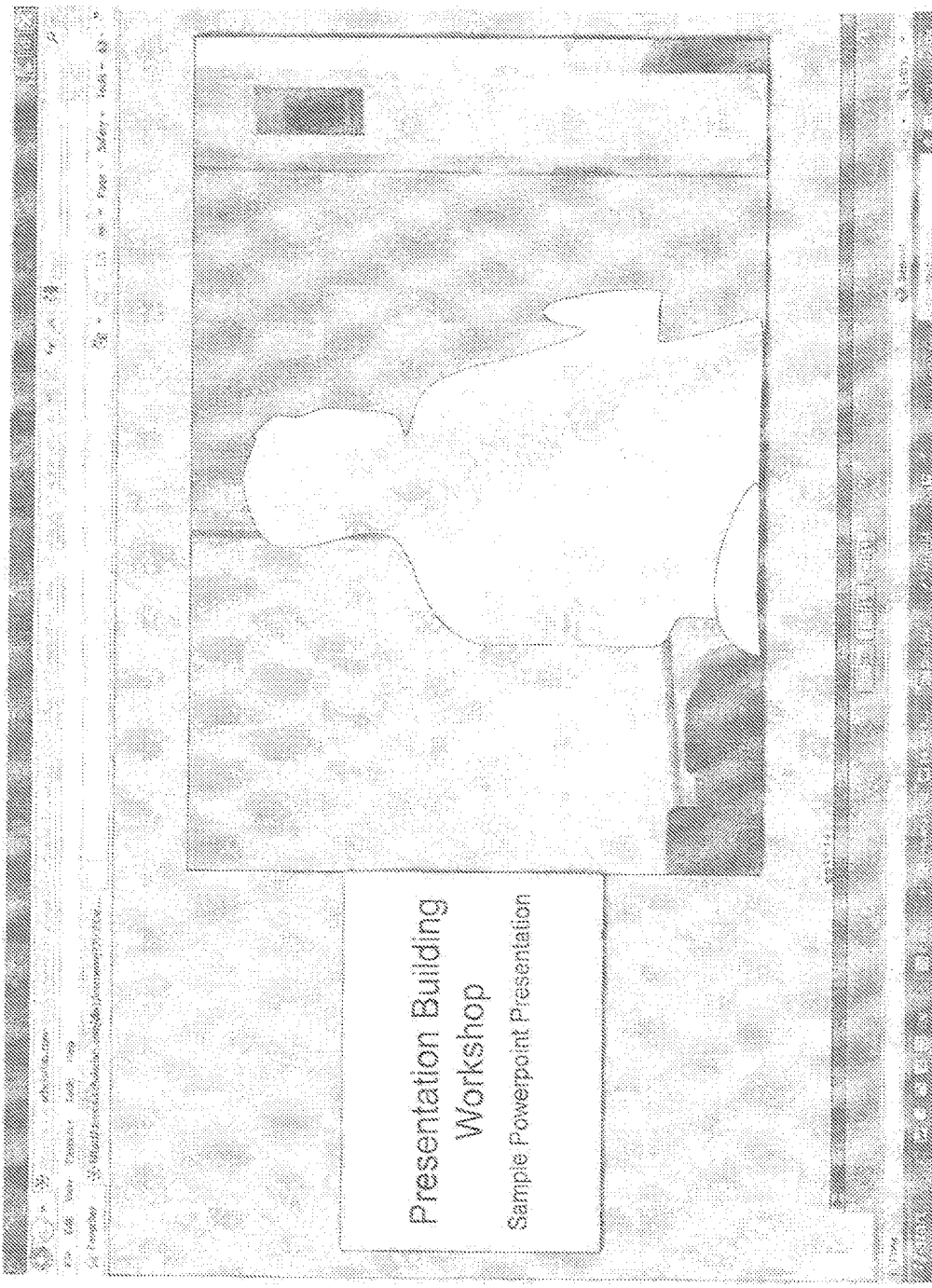

FIGS. 10-12 illustrate the information presentation in FIG. 9 in the various layout states, which may be customized by the user using options 910. FIGS. 10-12 are screen shots illustrating the information presentation at a later point in time. The time within the information presentation is 19:16, as is indicated by the time indicator on the timeline, and the slide from the slide document asset that is programmed to show during this time is illustrated.

Figure 13:
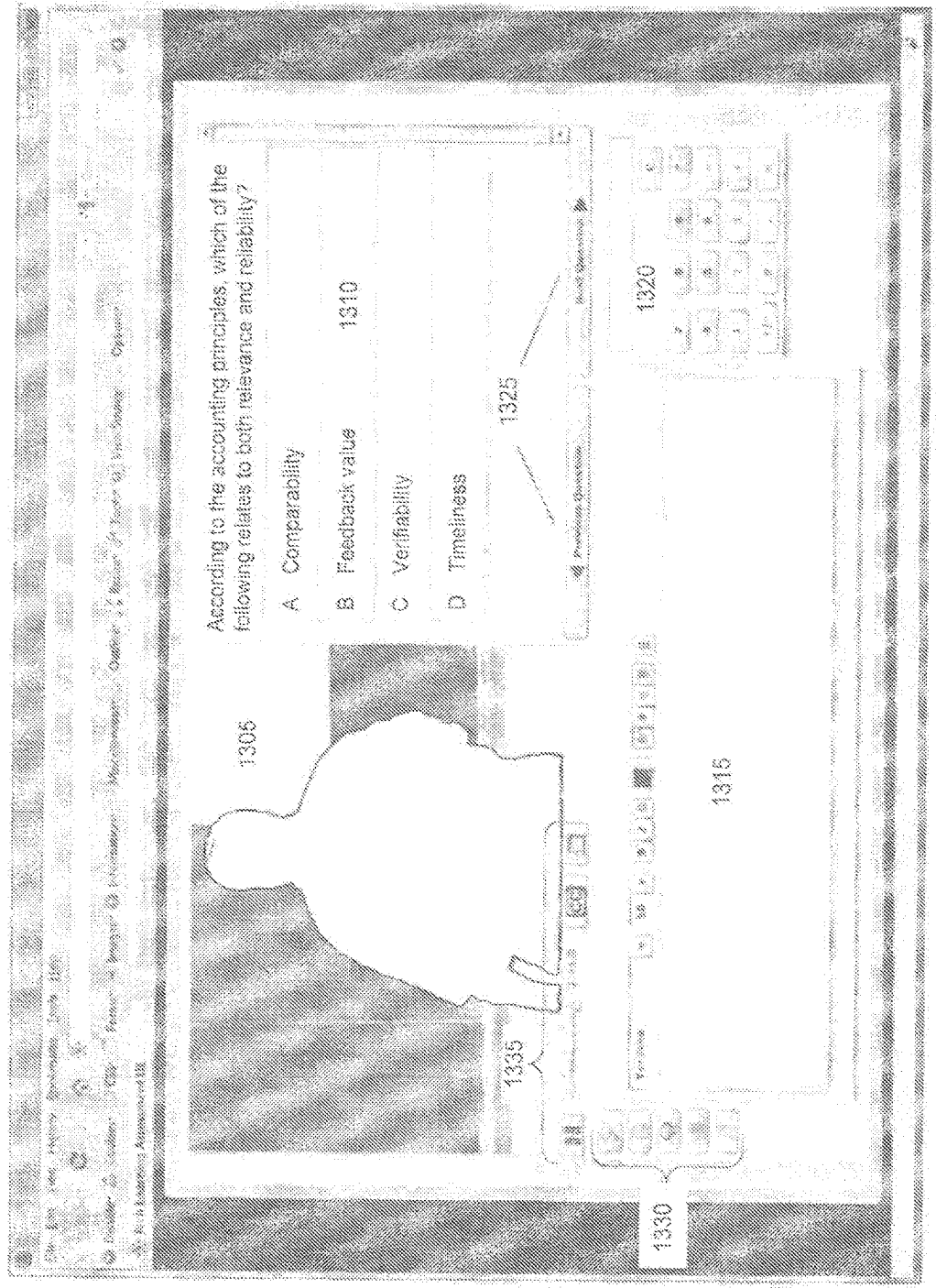

FIG. 13 illustrates a screen shot, according to non-tack runtime mode embodiment. The assets shown at the specific time in the displayed information presentation are: 1305 a video file, 1315 a document editing widget, 1310 an assessment widget, and 1320 a calculator widget. 1325 illustrates a next and previous button which can enable a user to navigate forward and backward through an information presentation, such as, but not limited to, enabling a user to jump forward and backward to previous and next points in time in an information presentation when upcoming and prior assessment questions are displayed. 1330 illustrates a selection of options which can allow the user access to various means of configuring the information presentation. Those illustrated include buttons for showing and hiding various assets and widgets, including the shown document editing and calculator widgets and the not-visible chat and discussion widgets. 1335 shows various other options for controlling or configuring the information presentation, including: a play/pause button for playing and pausing the information presentation, a time indicator for indicating the time in the information presentation, a closed captions button for showing/hiding closed captions which can accompany the information presentation, and a full screen button which can allow the information presentation to be viewed in full screen.

Figure 14:
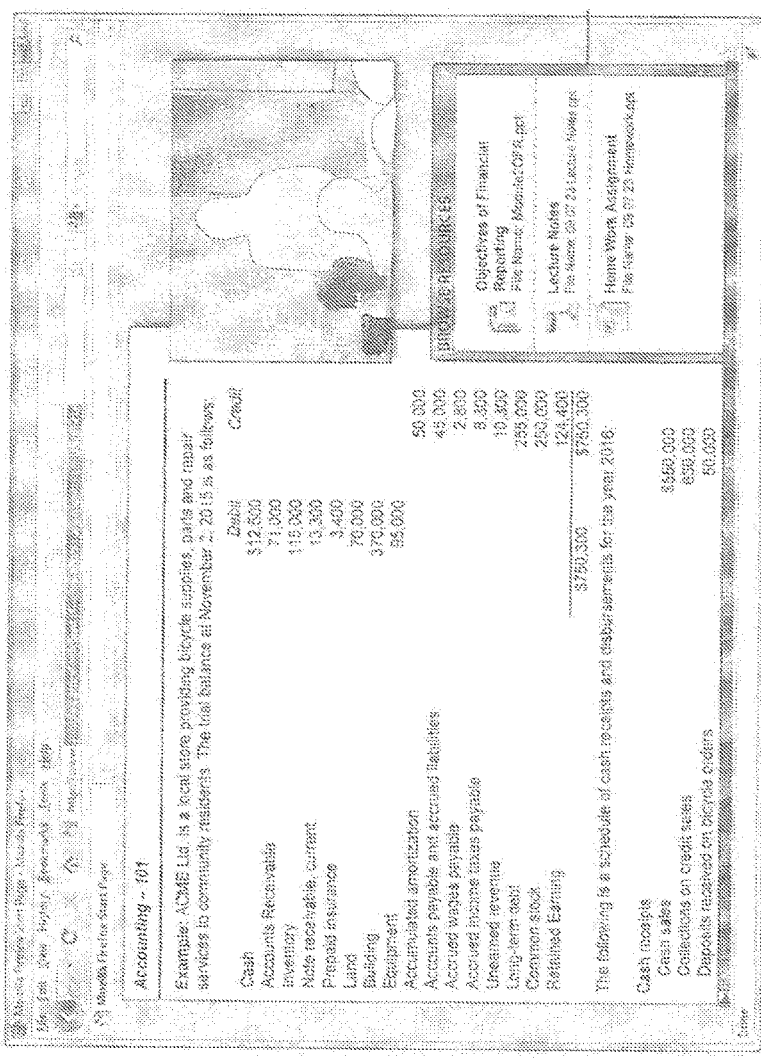

FIG. 14 is a screen shot illustrating a single track runtime mode embodiment. This screen shot shows a selection of assets that can be synchronized and/or viewed together within an information presentation. The assets are: a video file, a document viewing widget, and an asset browser widget. The video of the professor is synchronized with the display of pages in the displayed document, as well as with the display and actuation of other assets and widgets over time in the information presentation. In addition, the user can access other assets if needed, using the asset browser widget.

Multi-Track Embodiment

Figure 20:
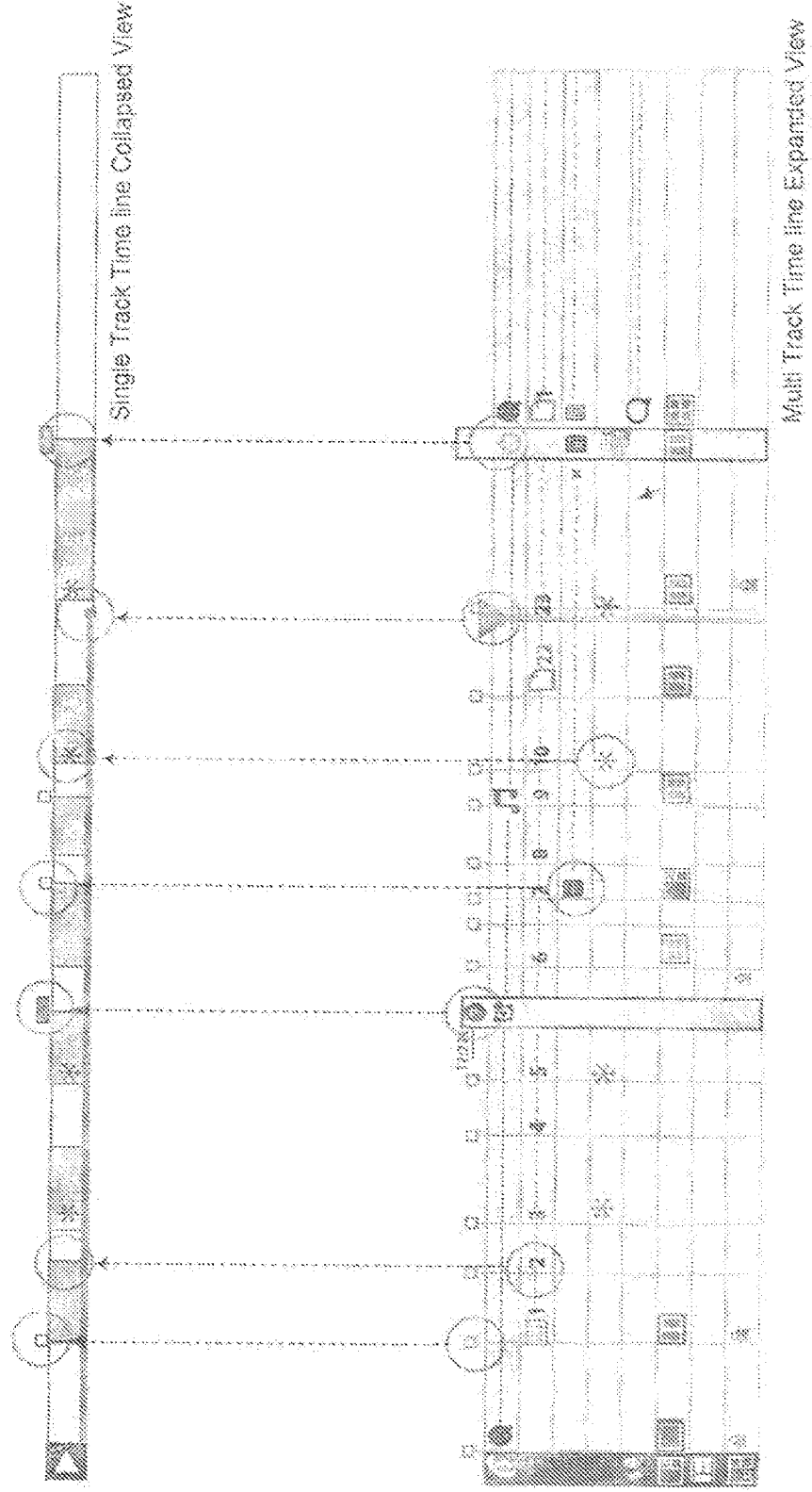

FIGS. 19-34 illustrate features of a multi-track embodiment. FIG. 19 illustrates an icon legend. FIG. 20 compares the single track embodiment with the multi-track embodiment, showing that both embodiments similarly represents the same set of one or more states of the information presentation and/or the changes of the state of the information presentation over time. The first timeline illustrates a single track timeline collapsed view, which shows different states of a presentation on a single track timeline. The second timeline illustrates a multi-track timeline, where different states of an information presentation are shown on a timeline that has details related to several tracks. In both embodiments, an editor user can easily define how information should be presented. It should be noted that, while the information described below is with respect to an editor user creating an information presentation, those of ordinary skill in the art will recognize that a user can also use system 100 to view/playback the information presentation. In addition, it should be noted that, in one embodiment, the system 100 can be used exclusively to define or play back/interact with the information presentation. While in other embodiments, the system 100 can be used to do both.

Figure 21:
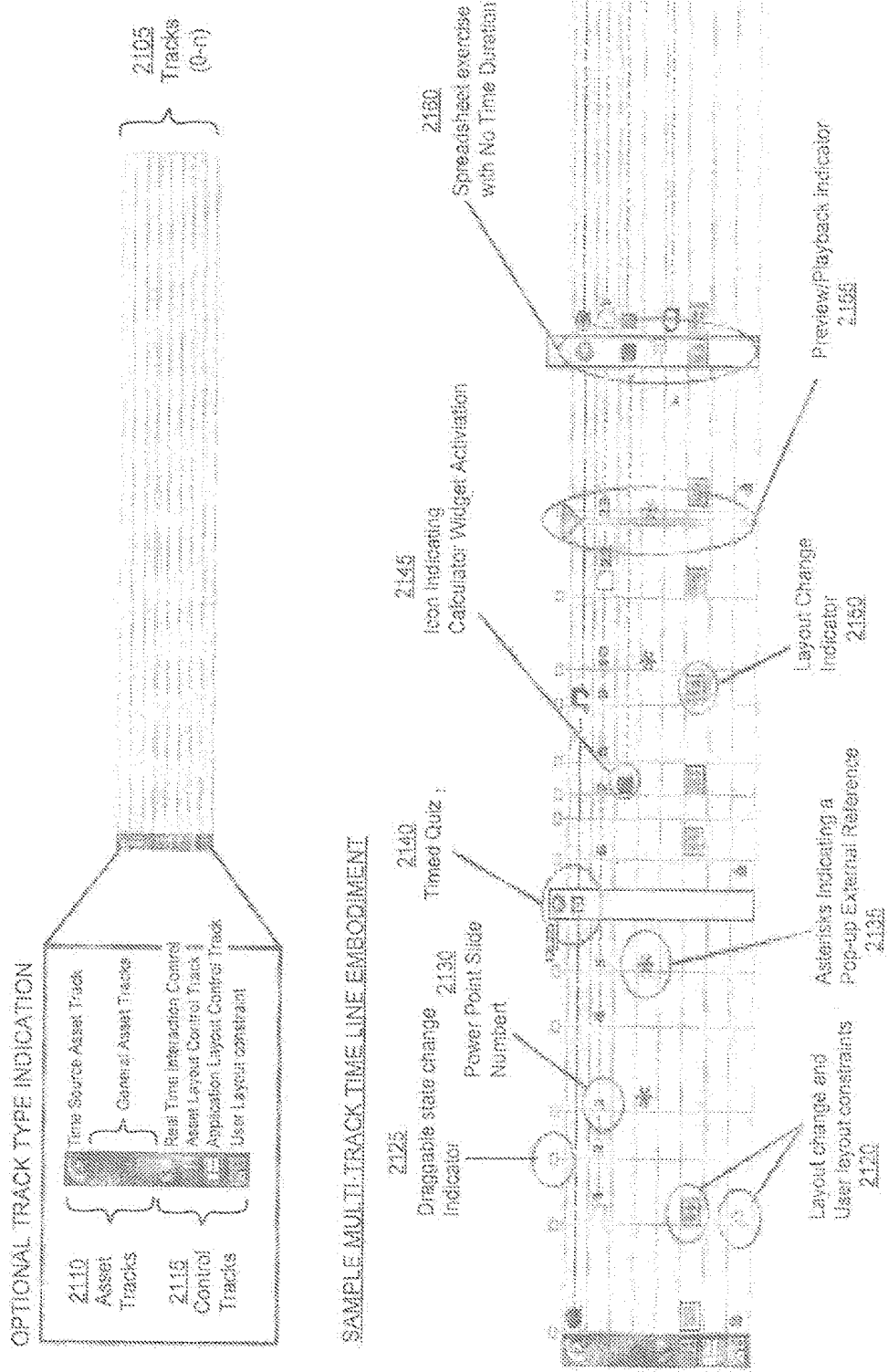

FIG. 21 illustrates the multi-track timeline area approach in detail, according to one embodiment. FIG. 21 shows a timeline and timeline area with multiple tracks 2105. The tracks can comprise asset tracks 2110 or control tracks 2115. Other tracks are also possible. For example, referring to the legend in FIG. 19, in 2120 of FIG. 21, when in editor mode, the user can interact with the asset layout control track and possible subsequent additional user interface prompts and interactions to define a state change to occur to the information presentation at a given point in time, in particular, defining a particular layout pertaining to assets to be executed at said point in time. In the same way of interacting and defining a change of state of the information presentation, however through an interaction with the user layout constraint control track, the editor user can set/change the constraints or capabilities of the user to modify the layout of the assets in any way, whereby the user layout constraint can display a lock or various other graphical indicators to represent the particular state of the information presentation in regards to the constraints set to the layout at said point in time. For example, in 2120, a particular layout for a given point in time can be defined and displayed on the asset layout control track and a particular set of layout constraints for a particular point in time can be defined and displayed on the user layout constraint track. The layout icon on the asset layout control track can illustrate the layout at the given point in time and the lock icon can illustrate constraints on the user's ability to control the layout at said point in time. In 2125, a state change indicator pin can indicate that there is a change in state for a given point in time in the information presentation and can be "draggable" or movable by the user using an input device to collectively adjust the time for all state changes for that given point in time of the information presentation. In 2130, a change in state of the information presentation, for example the slide number to be displayed of the slide show presentation asset within the information presentation can be indicated. In 2135, an asterisk indicates that a pop-up external reference (e.g., wiki widget, glossary widget) will be activated and displayed. In 2140 an assessment asset can be activated and displayed. The amount of time that has a solid dark box around it can indicate the time for the assessment to be completed. In 2145 a calculator widget can be activated and displayed, 2150 illustrates a layout change indicator, 2155 illustrates a preview/playback indicator, which can represent the current time while the information presentation is being played back in order to be previewed by the editor user. In 2160, an activity within the information presentation can be activated using the activity widget. In this example, the activity that is activated uses a spreadsheet widget and calculator widget. The green circle with white infinity symbol can indicate that there is no time minimum or limit for this activity.

Figure 22:
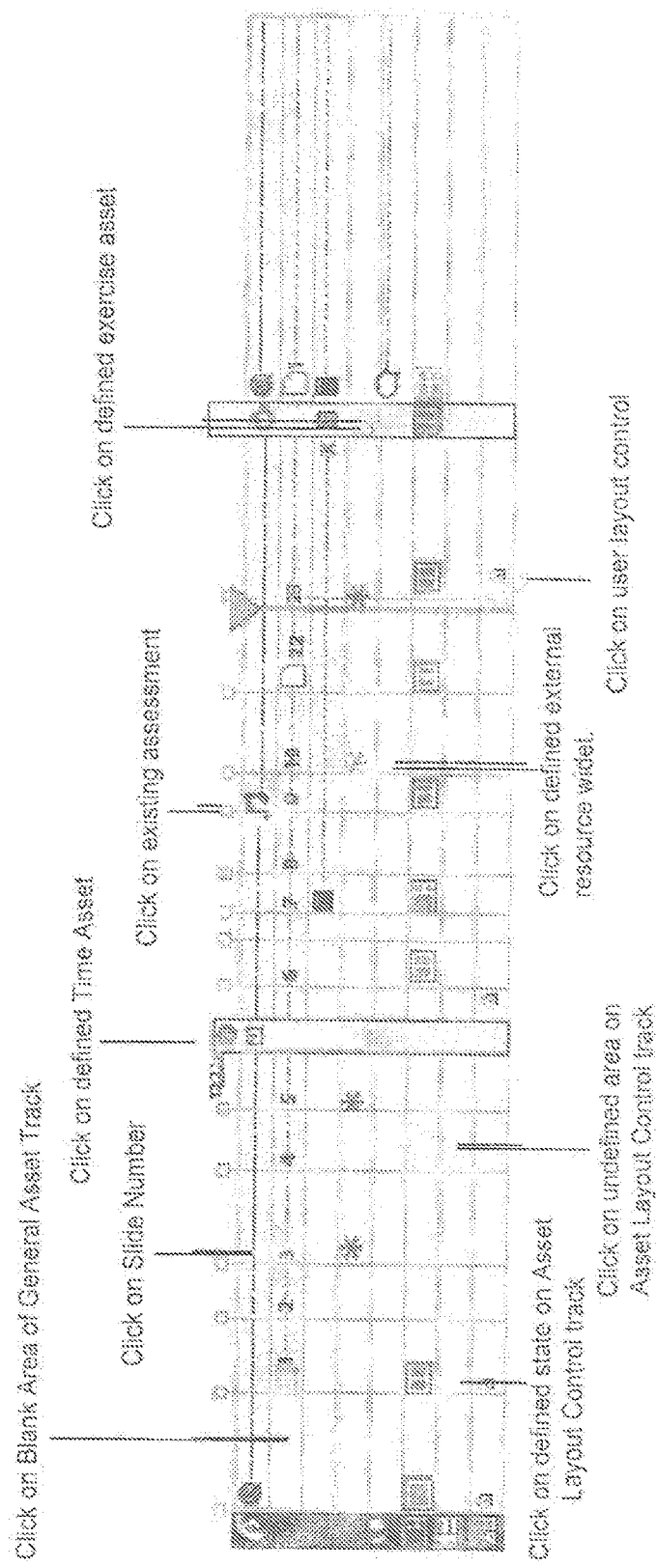
Figure 33:
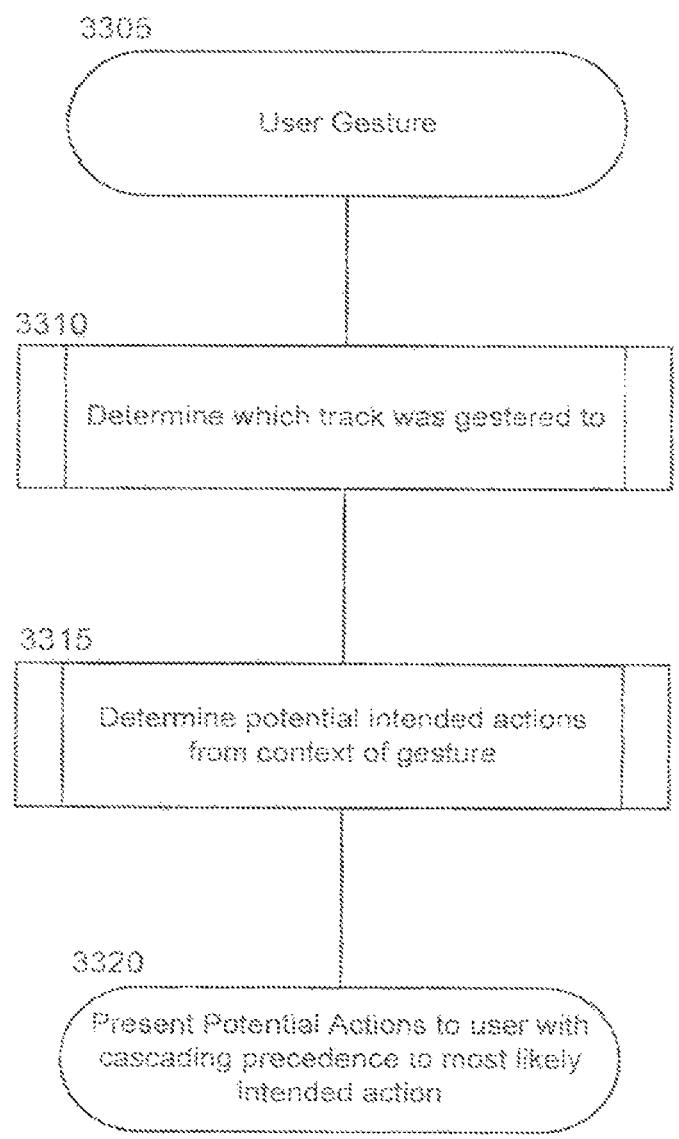

FIG. 22 illustrates a number of interactions that a user can make with a multi-track timeline embodiment and how the context of a user interaction can be used by the system 100. For example, the user input analyzer and router module 240 can be used to implement the contextual and predictive user interface capabilities of the system and within the user interface. This can attempt to predict an editor's desires based on where the user clicks. Clicks on different parts of the timeline area, anywhere on the stage, or anywhere on the user interface, and related to any point in time in the information presentation can trigger different results, offering users a different set of options each time. Effectively, the system and application can attempt to anticipate an editor's actions and desires based on the context of their click (e.g., using pop-ups with choices for actions as described in more detail below). FIG. 22 and FIG. 33 illustrate how the contextual and predictive user interface capabilities of the system might be implemented wherein the application is configured such that user interactions with the timeline area trigger such capabilities. It is important to note that such capabilities can also be implemented by and triggered with user interactions with the stage, or anywhere on the user interface, and related to any point in time in the information presentation.

FIG. 33 illustrates a method by which the user input analyzer and router module 240 can implement the contextual and predictive user interface capabilities, according to one embodiment. In FIG. 33, in 3305, a user gestures (e.g., interacts, clicks, etc) on the timeline area. In 3310, user input analyzer and router module 240 determines which asset or track was closest to or received the gesture. For example, referring to the multi-track map on FIG. 22, the user input analyzer and router module 240 can determine which of the following assets or tracks were closest to or received the gesture: the time source asset track, a general asset track, a real time interaction control track, an asset layout control track, the application layout control track, the user layout constraint track, and any assets that are present on any of the tracks. In 3315, the potential intended actions can be determined based on the context of the gesture, where the context of the gesture used in determining the potential actions includes which asset or track was determined to be gestured to as well as the state of any of the various assets or tracks or information presentation at any given point in time. In 3320, potential actions can be presented to the user (e.g., in a pop-up screen or box) with the most likely intended action displayed first.

Figure 34:
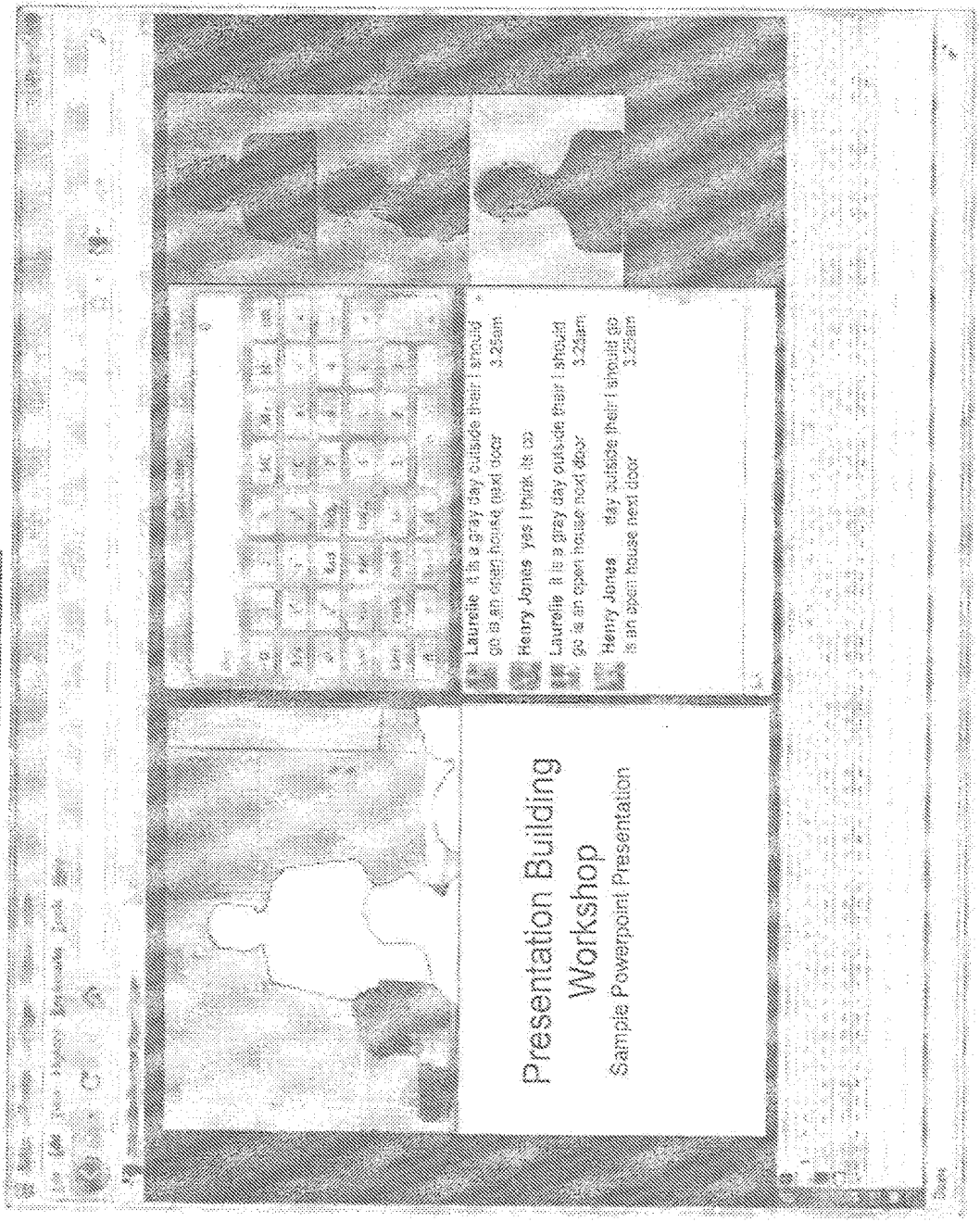

FIG. 34 illustrates a multi-track embodiment. In this illustration, a video document asset, a slide show asset, an audio/video chat widget (with 3 users displayed), a calculator widget, and a text chat widget are displayed on the stage as defined in the information presentation. In addition the multi-track timeline is displayed and can allow for interaction and/or defining of the state of the information presentation over time. In this illustration, each asset is defined to be displayed and used for the entire duration of the information presentation, as illustrated on the timeline and the various tracks. From top to bottom, tracks 1-4 are general asset tracks and display: 1) the video asset; 2) the slide show asset, displaying slide #1 for the duration of the presentation; 3) the calculator widget; and 4) the text chat widget. In this embodiment, the audio/video chat widget is displayed on the real-time interaction control track.

Example Embodiments

FIGS. 23-32 illustrate various embodiments of the system 100. FIGS. 23-26 illustrate an information presentation as played back by a user using a runtime mode embodiment (referred to below as a player), as well as the same information presentation as defined by an editor, according to one embodiment. In these figures, both the information presentation and timeline area shown to the user, as well as the corresponding editor user set-up and timeline area are shown, illustrated together. In FIG. 23, a timeline indicating the detailed structure and changes of state over time of an information presentation is illustrated. In 1, the information presentation can start with a video asset presented in single asset layout mode, with the user being locked to this layout mode only; not able to change the layout in any way, and potentially, as defined by the editor, not able to add or remove other assets to the information presentation. In 2, when the time controller module determines that the elapsed time has been reached, it will execute the defined state changes, which are signified symbolically and graphically in the timeline area user interface, wherein the state changes are: 1) the addition of a new asset, in particular a slide show asset 2) the displayed slide show slide from the slide show asset being slide number 1, and 3) a change in layout of the information presentation, specifically a two asset layout mode where the slide show and video are now displayed together, side by side. FIG. 23, 3-4, and FIGS. 24-27 correspond and operate within the system accordingly.

In FIG. 23, in 3, the timeline area and/or track display a number "2" signifying the displayed slide show asset slide from the slide show asset being changed to slide number 2. (Note that since there is no state change indicted on the timeline, no layout state change occurs at this point in time.) In 4, the asterisk on the timeline can indicate the activation and display of an external resource widget (e.g., external web page, external web page link) where additional information may be found.

In FIG. 24, a timeline indicating a part of an information presentation is indicated. In 1, a player can reach the time in an information presentation whereby a state change(s) is to occur, wherein the state change(s) to occur is for the assessment widget to be activated. Once the player (i.e., creation/playback application) reaches the applicable point in time, the video asset can be paused, and the assessment can be activated for the user to complete. This assessment can be timed, as represented by the clock icon. In 2, once the assessment is finished, the information presentation can continue. In 3, the player and information presentation reaches another set of state changes within the information presentation: a calculator widget is added to the stage, the stage switches from a two asset layout to a three asset layout, and, as signified by the unlock icon in the user layout constraint control track, the state of the information presentation and application is now such that a user can change the layout of the assets without constraint.

In FIG. 25 a timeline indicating another part of an information presentation is indicated. In 1, an audio asset can be triggered to play (and in this example to replace the video that was previously playing). Because the audio asset does not require a visual, the information presentation can switch from a three asset layout to a two asset layout, as indicated on the asset layout control track. In 2, another state change indicator can indicate another change in the information presentation. In this example, the player approaches another state change (visually represented by a pin), and the slide show can switch to a document. The layout can remain a two asset layout. The number "22" can indicate that page 22 should be the part of the document presented.

Figure 26:
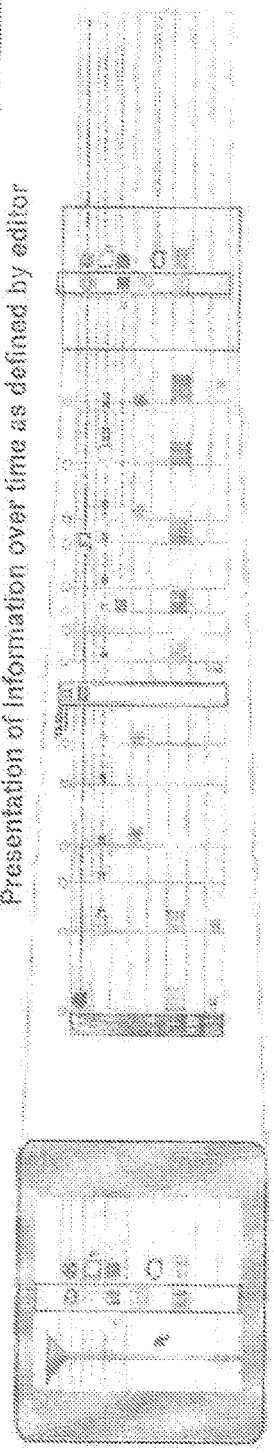

In FIG. 26, a timeline indicating another part of an information presentation is indicated. In 1, a player can reach a set of state changes that represent a non-timed interactive exercise (indicated by the infinity sign on the timeline) that uses a spreadsheet widget and a calculator widget. As defined by the editor user, the information presentation changes state to display a spreadsheet widget and a calculator widget on the screen and in a two asset layout. In 2, once the user is finished with the activity and prompts to continue, the information presentation continues, with the creation/playback application 120 immediately executing a set of state changes. In this instance, the state changes are such that the spreadsheet widget is removed from the stage and a four asset layout is applied, containing the calculator widget, a video asset, a document viewer widget, and a chat widget.

Figure 27:
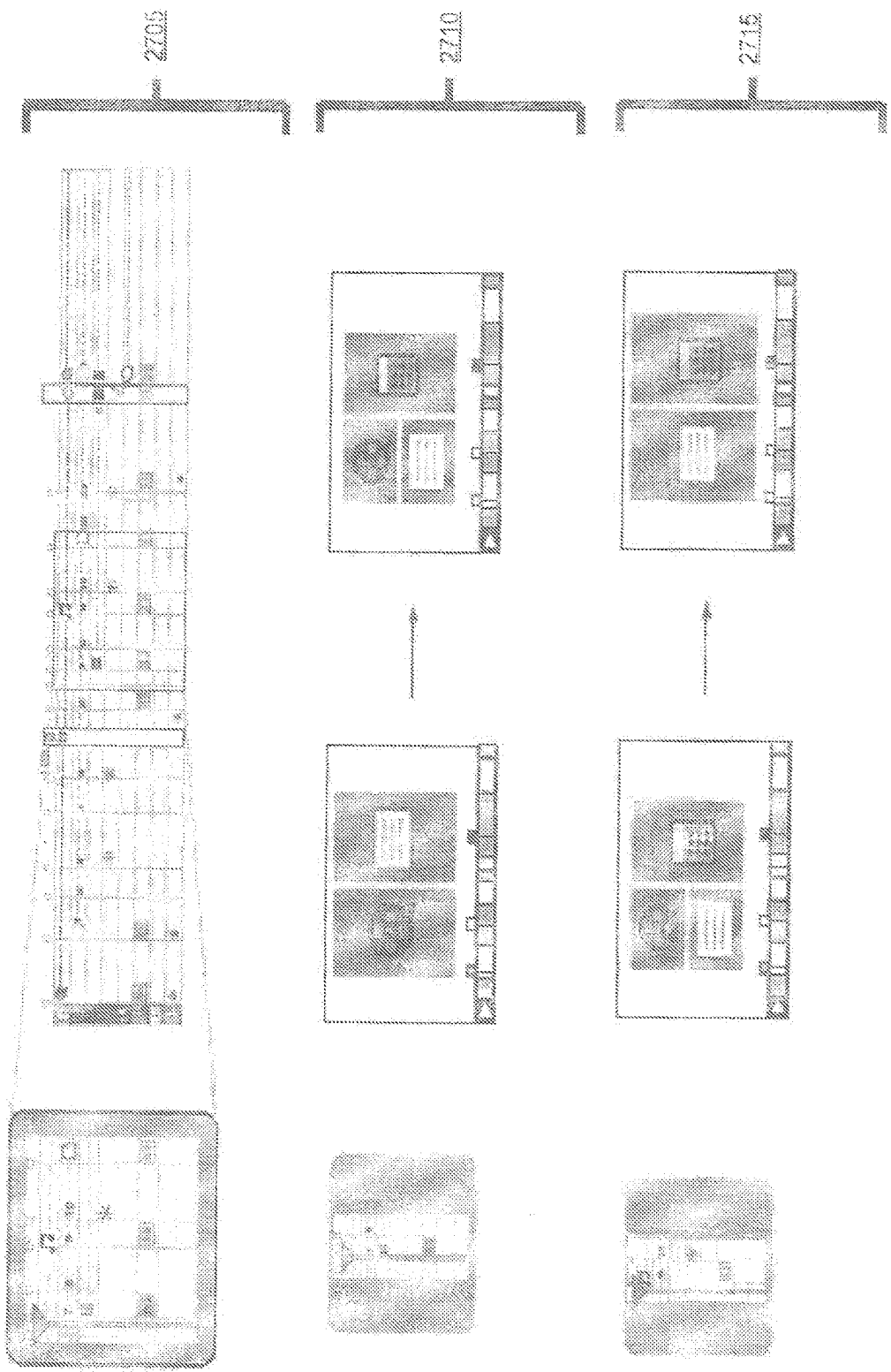

FIGS. 27-28 illustrate automatic and manual modes according to several embodiments. FIG. 27 illustrates an information presentation as defined by an editor user in a multi-track embodiment in editor mode as played back by a user in a runtime mode embodiment in automatic mode. 2705, illustrates the state of the information presentation as defined by an editor user. In 2710, the editor user has defined the state of the information presentation at a given point in time to be such that a calculator widget, a video asset and a slide show editing/viewing widget are to be displayed in a three asset layout. When the given point in time is reached within the information presentation, if in automatic mode, said state changes are executed, leaving the information presentation in a state as exactly defined by the editor user for that point in time. In 2715, the editor's configuration dictates that the layout automatically reconfigures the information presentation from a three asset layout to a two asset layout, displaying the calculator widget and the slide show editing/viewing widget, with an audio asset also playing.

FIG. 28 illustrates an information presentation as defined by an editor user in a multi-track embodiment in editor mode as played back by a user in a runtime mode embodiment in manual mode. As shown and described in 2805, an editor user can define constraints related to a user's ability to modify the information presentation during playback. The constraints can be related to modifications such as, but not limited to: adding or removing assets, resizing assets, positioning or moving assets, modifying assets, or interacting with assets, or any combination thereof. For example, a lock icon can indicate that certain things cannot be changed. As per allowed or disallowed by the constraints, a user can perform/invoke such modifications to the information presentation and can cause the creation playback application 120 to be changed from automatic mode to manual mode. In 2810, the editor user has defined the state of the information presentation at a given point in time to be such that a calculator widget, a video asset and a slide show editing/viewing widget are displayed in a three asset layout. In this example, the player is in automatic mode and reaches such point in time and executes such changes as defined by the editor. The user then decides that he/she does not need the calculator and can therefore remove the calculator widget, which results in the restoration to the two asset layout. The removal of a widget can be done by having a user highlight an icon representing the asset, and then pressing delete. In 2815, it is shown how some state changes are not executed because the user is in manual mode. Those of ordinary skill in the art will see that other methods are also possible for deleting an asset.

The user can also select whatever layout the user prefers using a variety of means. By means of a user modifying the information presentation during playback, such as selecting/configuring/changing the layout or adding/removing assets from the screen, or inviting other users to collaborate in collaborate mode, the creation/playback application 120 can change from playing the information presentation in its predefined format (e.g., automatic play mode) into manual play mode, wherein the creation/playback application in manual play mode can no longer implement some or all the predefined information presentation's state changes, such as the display/activation of assets and layout changes. The user can immediately switch back to automatic mode with a single user gesture, such as clicking on a button. In the example, after the user removes the calculator widget, the creation/playback application 120 is now in manual mode. As the system in run-time mode continues to play the information presentation, and the time and time line of the information presentation reaches the respective point in time, the state of the information presentation as per defined by the editor user during the use of the system in editor mode is such that the information presentation uses a three asset layout, displaying the video widget, the slide show editing/viewing widget with loaded slide presentation on slide number 9, and the calculator widget. However, some or all of these state changes, may not be executed, as a result of the various constraints that may have been implemented as part of the information presentation, and because the creation/playback application 120 is in manual mode. The state change where an audio asset is played is executed, while the video asset (which video has ended) remains on the screen in the layout defined by the user. In addition, the user can continue to modify the information presentation as described above. For example, an asset can be added by having the user click on an icon representing the asset browser, and then drag and drop different assets to a certain part of the screen. Those of ordinary skill in the art will see that other methods are also possible for adding an asset.

Figure 29B:
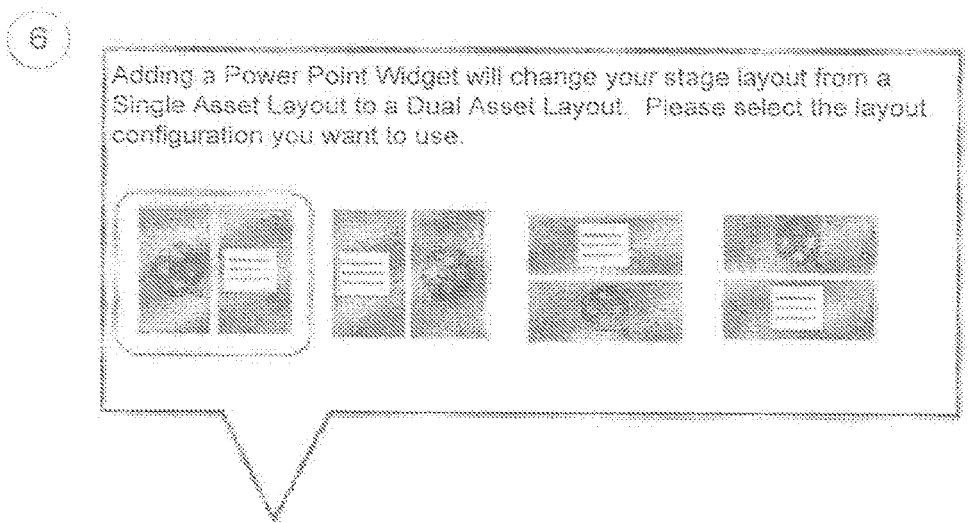
Figure 31A:
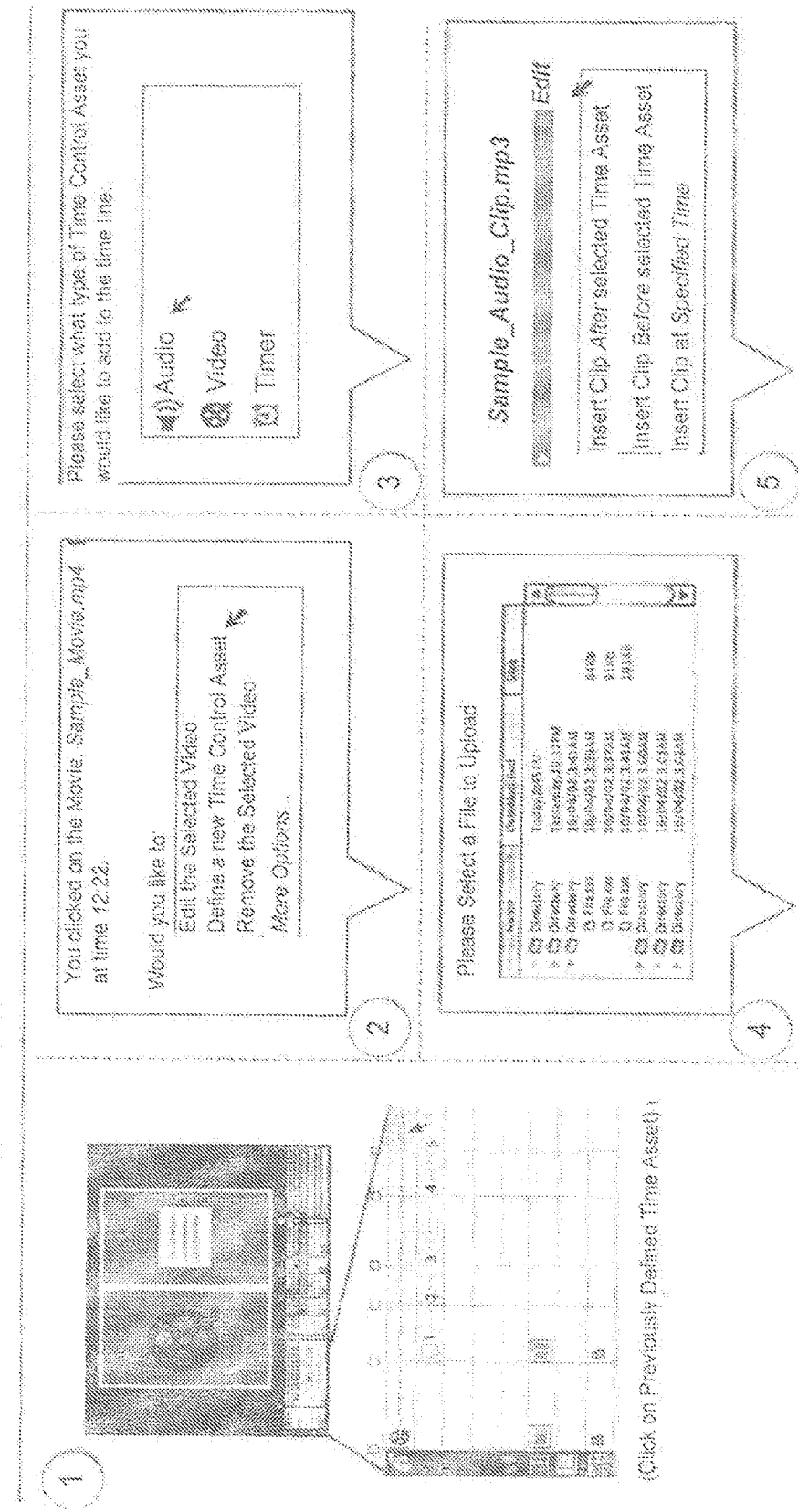

FIGS. 29A-31 illustrate blank timeline click, defined time asset click and slide number gesture and scenarios, as can be implemented by the user input analyzer and router module 240, providing contextual and predictive user interface capabilities, according to various multi-track embodiments. These figures illustrate a small subset of the various embodiments the user interface module 235 can utilize to present predictive and contextual user interaction capabilities. In FIGS. 29A and 29B, a sequence using a wizard or dialogue box approach can be utilized, according to one embodiment. In 1, a single asset layout with a video on the timeline can be shown. The editor can click on a blank area of the timeline, such as a blank area on a general widget track. In 2, pop-up menus can present the editor user with a list of options. These options can be dynamic and ranked by what an editor's highest probable desire is, based on where the editor clicked on the timeline. In 2, the editor user can add a new asset at the specified time, wherein the time is also determined based on where the editor user clicked. In 3, based on the editor's previous selection of adding a new asset, a new options menu can be presented asking the user to select what type of asset he would like to add to the timeline and track. In this example a slide document asset can be added. The editor can then be sent down a unique path of menus based on the type of asset he selected to add. For example, in 4, the editor user can next choose a slide document to upload. In 5, the editor user is asked which slide he would like displayed at the given or determined point in time. A particular slide can be selected. In 6, because this is a newly added asset, a notification is shown that this addition will change the layout. A default layout can be automatically selected, and the editor user can be given the option to choose an alternative layout.

In a manner similar to FIGS. 29A and 29B, FIGS. 30A and 30B illustrate a slide number click in a multi-track embodiment. In 1, an editor can click on an existing slide number. In 2, the editor's slide selection can be displayed, along with summary information, a list of possible actions, etc. In this example, a new slide is being inserted. In 3, a list of available slides can be displayed. Optionally, the editor may load slides from a new file. In 4, the editor can drop a new slide onto the timeline, represented by a pin with a slide number in it. In 5, the new stage layout can be shown. (Note that in this example there was no stage change as the new slide was inserted on an existing slide track.)

In a manner similar to FIGS. 29A and 29B, FIGS. 31A and 31B illustrate a defined time asset click in a multi-track embodiment. In 1, a two asset layout is displayed. An editor can click on the track/video asset at time 12:22. In 2, a context aware pop-up menu can be displayed with a list of options. In 3, based on the user's previous selection, a popup presenting the user a list of types of time control/defined time assets can be presented. In 4, based on what type of asset a user selects to add, various files can be shown for selecting or uploading. In this example, an 'Audio Asset' has been selected. In 5, an audio recording/playback widget can be loaded into another subsequent popup menu, allowing the editor to preview the audio file/asset. In 6, the editor can be notified that there will be a change in the layout because the audio file has nothing to display. In 7, the user has completed the addition of the asset (i.e., audio file) and the change in layout is shown within the application and system.

Figure 32:
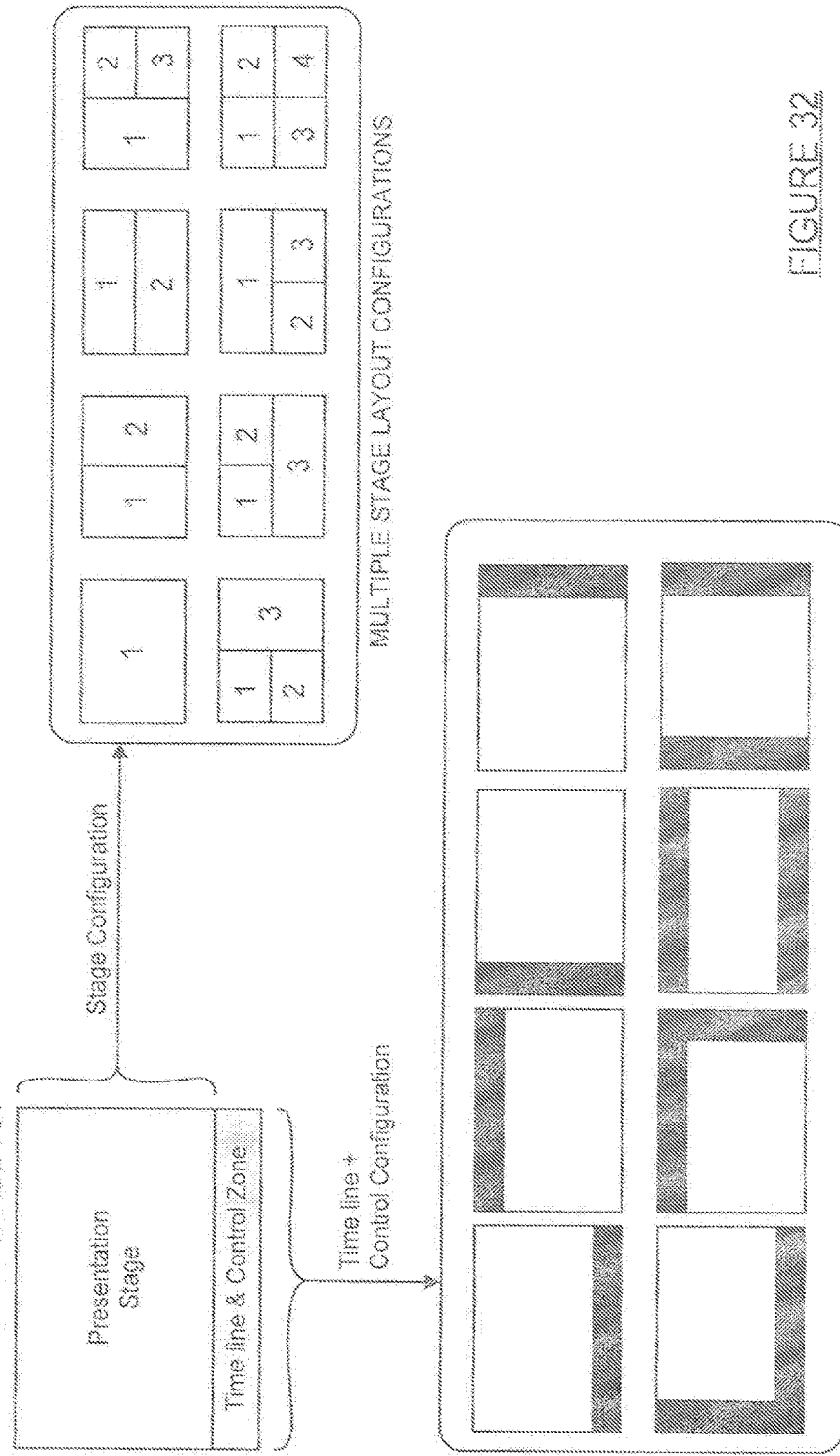

FIG. 32 illustrates various information presentation layouts, according to several embodiments. FIG. 32 also illustrates various timeline and control configurations.

FIGS. 35-36, 39 and 41-47 depict several embodiments of the system 100 according to various usage scenarios within the context of the one or more information presentations.

Figure 35:
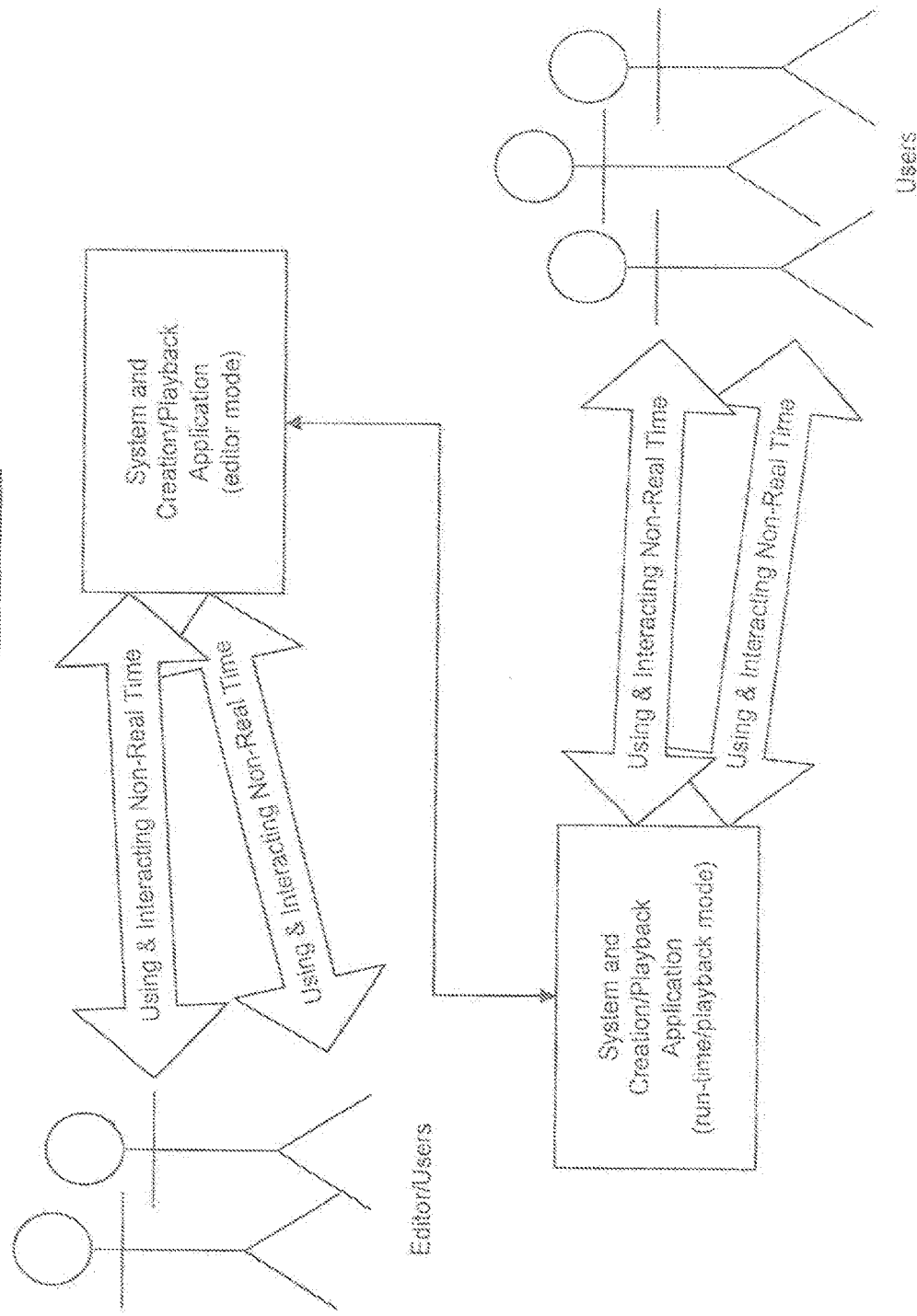

FIG. 35 illustrates editor users interacting with the information presentation (e.g., defining/controlling the information presentation), and users interacting with each other in both real-time and non real-time.

Figure 36:
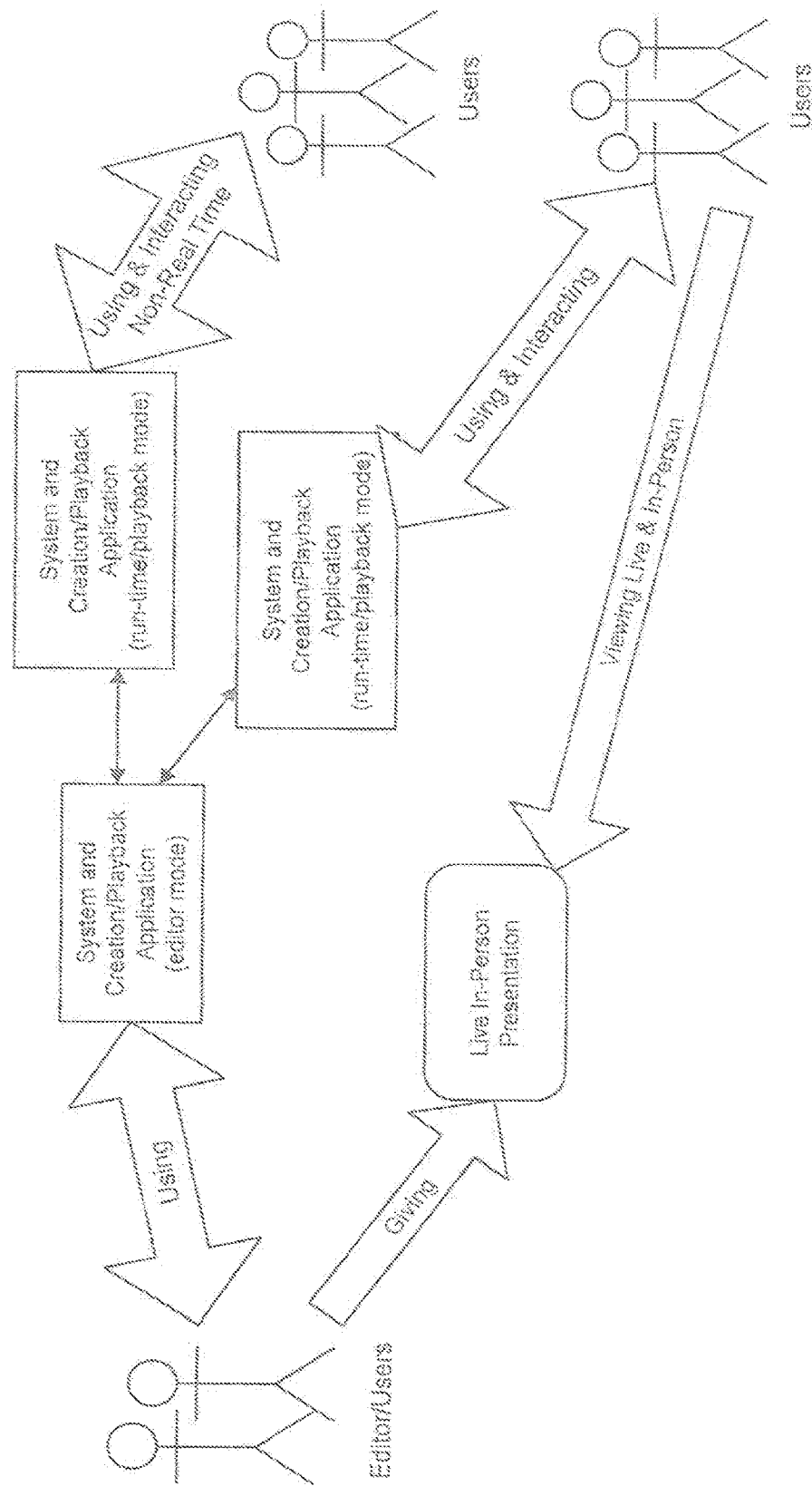

FIG. 36 illustrates editor users interacting with the information presentation (e.g., defining/controlling the information presentation), and users interacting with each other in both real-time and non real-time, whereby the system 100 is in use in a live setting. In this illustration, the editor user can give an in-person presentation to a live audience. In place of, or in conjunction with control or presentation instruments (e.g., including, but not limited to: a computer, laptop, mobile device, tablet computer, television, video/teleconferencing system, interactive whiteboard, or other classroom or presentation device and/or tool; or any combination thereof) a presenter can use real-time, in a live setting, an editor mode embodiment of the creation/playback application 120 to present and control an information presentation using assets with and for a live (i.e., in person) audience, as well as with and for other users who are viewing and interacting with the information presentation remotely using the system. For example, the editor user could use an embodiment of the creation/playback application 120 in editor mode either in place of, or to control, or in conjunction with a traditional instrument, such as a computer using presentation software and presentation slides (e.g., PowerPoint, Apple KeyNote, etc.) or document software (e.g., Microsoft Office, Microsoft Word. Adobe Acrobat, etc.), wherein the software/slides/documents are traditionally used by being projected in a large format for the in-person live audience to see. The use of the creation/playback application 120 in conjunction with such traditional instruments could be implemented using several components of the creation/playback application 120, as well as by using special software plug-ins or hardware devices connected or integrated with such instruments. In addition, the editor user can set the editor mode embodiment into the record made and record his/her real-time editing and defining of the information presentation, to be: (1) immediately available to be replayed as a predefined, on-demand information presentation; or (2) further edited, then replayed as a predefined, on-demand information presentation; or any combination thereof. It should be noted that, in FIG. 36, both in-person live audience users as well as remote users can be using an embodiment of the creation/playback application 120.

Figure 41A:
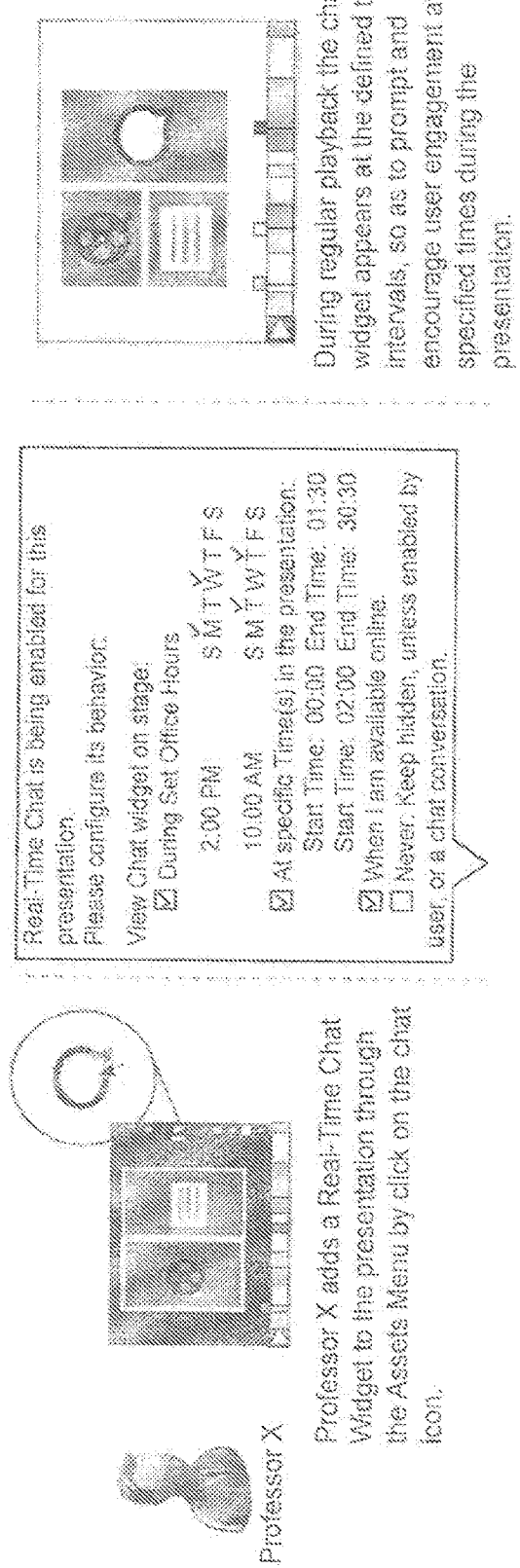

FIGS. 41A and 41B illustrate multiple usage scenarios of the creation/playback application 120, specifically where there is a predefined information presentation and configuration of real-time widgets, according to one embodiment. In this case, the editor user wants users of the information presentation to be notified when he is online and available for interaction and collaboration with users. In addition, the editor user wants to encourage interaction between the users. The editor user can implement and configure the use of both a real-time chat widget and a real-time audio/video chat widget so as to be available to collaborate with the users using such widgets.

For example, in Scenario 1, a user Hiroko can view Professor X's predefined information presentation of a slide show in 1. In 2, Hiroko can view Professor X's predefined information presentation of a slide show and video. In 3, although Professor X is not online, Hiroko can activate the chat widget and video-chat widget and collaborate and interact with other available friends and information presentation viewers in real-time. When Hiroko modifies/edits the run-time information presentation and adds the chat widget, the information presentation mode can change to manual mode.

In Scenario 2 of FIG. 41B, in 1, John, like Hiroko, can view Professor X's predefined presentation of a slide show. In 1(b), Professor X can come online. This can cause the predefined layout to be interrupted to expose the chat widget. In 2 and 3, even though the chat widget is appearing, because it was pre-configured to be able to appear, the information presentation is still in automatic play mode.

In Scenario 3 of FIG. 41B, in 1, Julie, like Hiroko and John, is a user viewing Professor X's predefined presentation. In 1(b), during Julie's viewing session, Professor X's office hours occur. This can interrupt the predefined layout to expose the chat widget. In 2 and 3, a slide show and video appear along with the chat widget. Because the chat widget was pre-configured to be able to appear, the information presentation is still in automatic mode.

FIG. 42A-42C illustrate a usage scenario of the creation/playback application 120, specifically where there is a predefined information presentation in run-time mode with real-time widgets and real-time collaboration, according to one embodiment. In 1, a user Julie is watching a predefined information presentation and using the document editing widget to create/edit notes as she views the information presentation. In 2, Julie then activates the user list widget to identify other users who are available so that Julie can discuss and/or collaborate with on a topic she is confused about. In 3, Julie sees that she has some "friends" available and online, as well as other users viewing the information presentation that is available. Julie pauses the information presentation and activates the chat widget to seek out help from someone. Julie had the information presentation in automatic mode, but by activating the chat widget and thereby adding it to the screen, the information presentation is taken out of automatic play mode and put into manual play mode. In 4, the chat widget is automatically laid out on the stage. Using the chat widget, Julie can ask her friends, classmates and other users for some clarification about the topics. In 5, Julie engages one of the available users. John (who is a friend and classmate), in real-time, first over chat using the chat widget. Julie asks John to view and collaborate within the information presentation, and though he could do so from his mobile phone, John asks Julie to wait until he can access the information presentation from his laptop computer. In 6, Julie activates collaboration mode so that John can be engaged within the system. In 7, when John arrives home, he opens up his e-mail and clicks on the link Julie sent him using the system 100. He logs into the system and is taken to the information presentation. John's information presentation and application instantly becomes synced with Julie's information presentation as they start the collaborate mode session. The system can automatically activate the audio/video chat widget instead of the text chat widget. All collaborators in the information presentation can have their own cursor and can together at the same time view every other collaborator's cursor, as well as each being independently able to control the information presentation and see every single interaction or modification a user makes to the information presentation. Julie then shows John the information presentation segment that she has trouble with and discusses it via audio and video chat with John. In 8, Julie is still having difficulty understanding what John is explaining, so John decides to share his notes with Julie. John then takes control of the mouse and activates a second document editing widget and then loads his notes into the widget. In 9, a warning is displayed notifying John that he is about to share his notes. John acknowledges that he wishes to continue and selects that he would like to enable collaborative editing. In 10, the information presentation and stage automatically reconfigure to show both John and Julie's notes on the screen, while relegating their video chats to the edge of the screen.

Figure 43B:
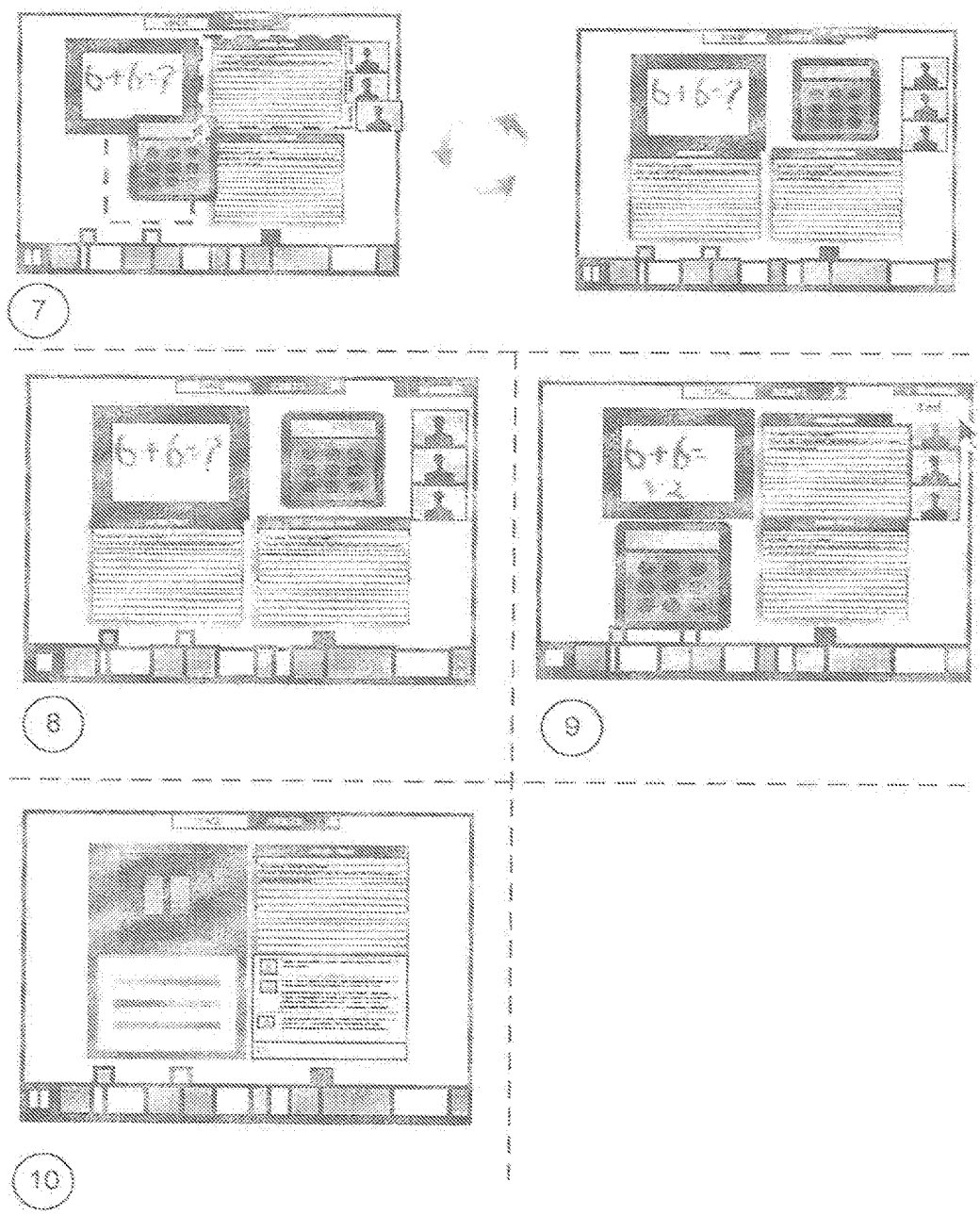

FIGS. 43A and 43B illustrate another usage scenario of the creation/playback application 120, where there is also a predefined information presentation in run-time mode with real-time widgets and real-time collaboration, according to one embodiment. FIGS. 43A and 43B illustrate how Julie and John can engage in real-time use of the system with Professor X. Within the collaboration mode session, the three users make use of various real-time widgets and collaborative features, including the calculator widget, the whiteboard widget, the document editing widget, synced views of the information presentation, and the ability to view every other participant's cursor.

FIG. 44 illustrates another usage scenario of the creation/playback application 120, where there is an editor user in a live setting in record mode, according to one embodiment. The editor user can be in front of a live audience and can interact with various other users of the information presentation, including live and real-time users, non-real-time users, and on-demand users. Scene 1 depicts a presenter delivering a live presentation in New York at 12:00 PM. As the presenter delivers the in-person presentation, he uses editor mode to edit/define the information presentation "on the fly" (e.g., changing the state of the information presentation, such as adding/removing assets and changing layout, etc.) throughout the duration of the information presentation. Additionally, the system is set into a record mode and records the state changes and their times as the information presentation is being edited/defined and delivered in real time.

Scenes 2 and 3 take place in London where it is 5:00 PM. Using the creation/playback application 120 in run-lime mode, users are able to witness and interact with the information presentation and with other available users, including the editor user, in real-time, using such capabilities as the chat widget, video chat, etc. In Scene 2, the user is viewing the information presentation in automatic mode. In Scene 2, the presenter has specified a 3 asset layout that includes a live video feed, a slide show presentation, and a calculator widget. In Scene 3, however, the user has opted to run the live information presentation in manual mode, configuring his workspace (as allowed by the editor user) to his liking. The user in Scene 3 has opted to listen to the audio stream of the live information presentation, while viewing the slides, and activating the chat widget to converse with other users.

Scenes 4 and 5 take place in Tokyo, Japan. Since it is 1:00 AM in Japan at the time of the live information presentation, users will opt not to not see the information presentation until they wake up the next morning. In Scene 4, a user is viewing a published on-demand version of the information presentation at a later point in time (non-real time). The user can view it in automatic mode, seeing the information presentation exactly as the instructor intended/defined/recorded, or the user may (where permitted by the editor) modify the layout of the information presentation and view it in manual mode. In Scene 5, a user is viewing a non-real time version of the information presentation, but is chatting with the professor who delivered the presentation at a time in which both parties happen to be online.

FIGS. 45A and 45B illustrate another usage scenario of the creation/playback application 120, where there is also an editor user in a live setting in record mode, according to one embodiment. In Scenario 1, an editor user pre-configures and predefines some aspects of an information presentation. In 1, Professor X loads a number of slide show presentations he wishes to use during his live presentation into the system 100 using the creation/playback application 120. In 2, Professor X configures the information presentation so that users viewing it in automatic mode will view a video that will be taken of him. The information presentation will show the slide show presentation on the left and the video on the right. In 3, Professor X decides to allow users the ability to chat during the information presentation, so using the creation/playback application 120, he configures the chat widget to run continuously and to be available for other users of the system 100 who are viewing the information presentation. Because he knows that some users may not see the information presentation until the next day, he wants the system to notify them whenever he is online, so they can follow up with him and ask questions directly, and uses the creation/playback application 120 to configure such behavior.

In Scenario 2, the editor user loads, then uses the predefined information presentation within the creation/playback application 120 in editor mode, in front of a live audience setting during a presentation. In addition, he can have set the creation playback application 120 into record submode. In 1, Professor X interrupts his information presentation using the creation playback application 120 and the predefined information presentation to show the audience how to calculate something. In 2, Professor X activates the calculator widget and begins showing the audience how to calculate the answer to a problem. He asks the audience to try to calculate it themselves and discuss their results. In 3, once complete, Professor X decides to take questions from students and other users of the system 100 viewing the information presentation and activates the chat widget that is available and running in the background to be displayed for both live audience members and all other users of the system 100 viewing the information presentation.

In Scenario 3, a user accesses the system and the information presentation from a remote location, in real-time as it is being defined and delivered by the editor user. This user uses the system in automatic mode, such that the information presentation is played back exactly as it is being defined by the editor user. Thus, in 1, John is in London and watches Professor X's information presentation live in real time. He sees a video of Professor X on the right and the slides on the left. In 2, since John is viewing the information presentation in automatic mode, when Professor X activates the calculator widget. John's screen automatically reorients itself to display the calculator widget. In 3, once Professor X activates the chat widget. John's screen reorients itself to display the chat widget so that he can have discussions with users.

In Scenario 4, another user also accesses the system and the information presentation from a remote location, in real-time as it is being define and delivered by the editor user. However, this user opts to inactivate and hide some of the widgets that the presenter/editor user is displaying, thereby putting the application into manual mode. If a state change was to be activated but cannot due to the inactivation of some of the widgets, the user is notified of the specific state change that was to be implemented, but was not implemented due to being in manual mode, through a notification indicator popping up on the screen. In this scenario, the editor user added a calculator widget to display within the information presentation, and the user was notified of this state change via a pop-up window. Thus, in 1, Julie, like John views the information presentation from a remote location in real time. She finds the video footage too distracting and so opts to only see the slides by closing the video widget. In 2, because Julie is not in manual mode, when Professor X adds a calculator to the screen, she only receives a popup notification indicating that a state change has occurred. If she desires, she can click on the pop-up to see the predefined stage as it appears in automatic mode. In 3, when Professor X activates the chat widget, Julie remembers a question. She clicks to activate the chat widget and joins the discussion Professor X has started.

In Scenario 5, the user watches the information presentation, initially in automatic mode, as it was recorded/defined by the editor user hours earlier. The user then changes and customizes the layout, thereby changing to manual mode, and then uses the real time interactive text chat widget. Thus, in 1, Hiroko is in Tokyo during the class, so she views the information presentation in non-real-time the next day. In 2, the screen can be configured to Hiroko's liking. For example, when Professor X activated the calculator widget. Hiroko can choose to close the video widget. In 3, because Professor X activated the chat widget and enabled it to run continuously, Hiroko can chat with other present viewers of the information presentation or other users of the system. Moreover, because Professor X decided to make himself "known" when he logs on, Hiroko can ask him questions in real-time.

Figure 39A:
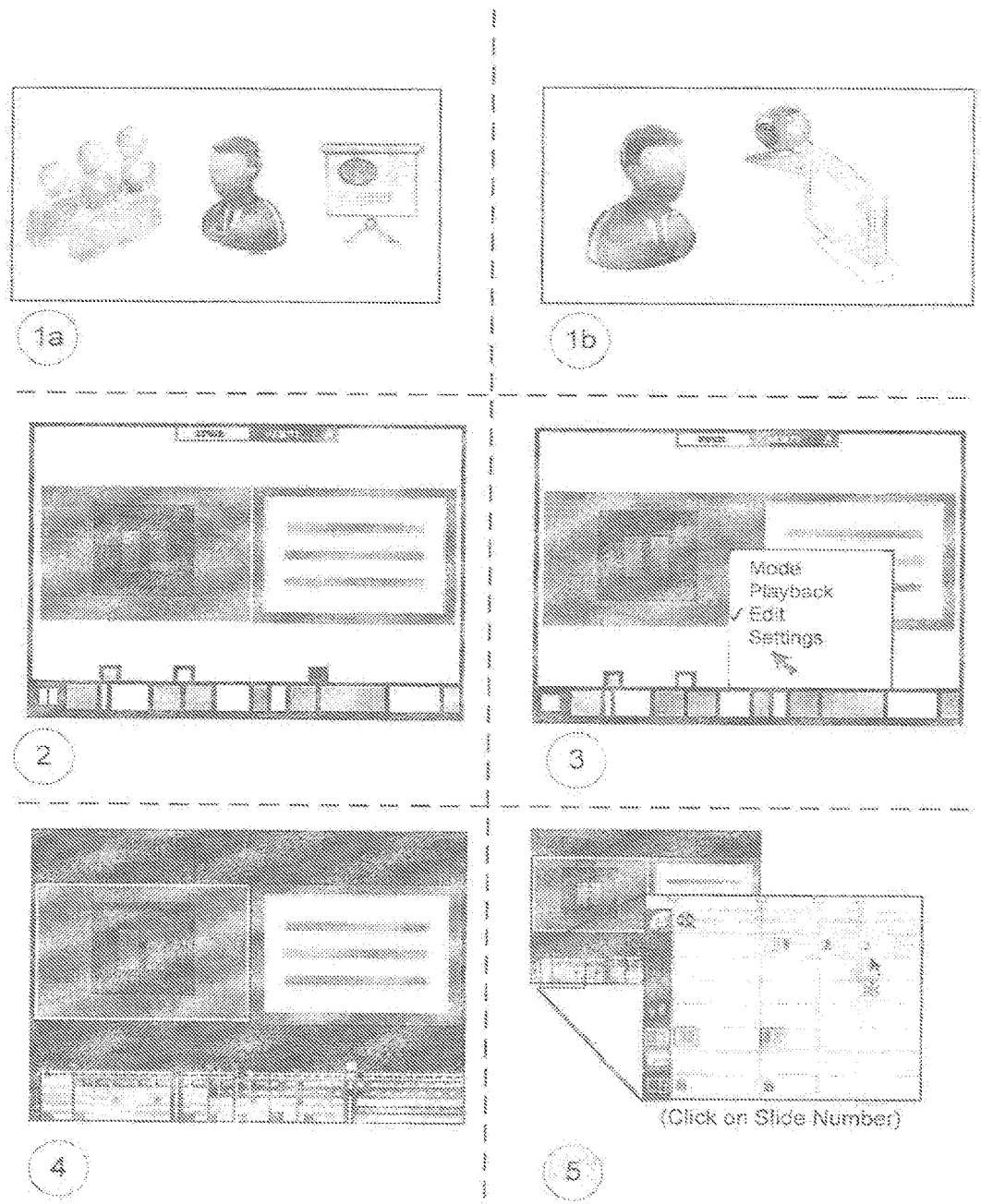

FIGS. 39A and 39B illustrate another usage scenario of the creation/playback application 120, where an existing information presentation's data can be edited, according to several embodiments. As indicated in 1, an information presentation could have been delivered using an editor mode embodiment in record mode one of two ways. In 1a, the editor user (e.g., a Professor) could have used the application and delivered an information presentation both in front of a live audience and to other users of the system comprising an online audience in real-time. In 1b, the editor user could have delivered an information presentation to only other users of the system that comprise an online audience, similar to a "live webinar" or web conference. In 2, the editor user loads an information presentation, then previews the information presentation, locates an area he wants to change, so he pauses the information presentation. In 3, the editor user switches from runtime/playback mode to edit mode by right-clicking on the time line and selecting edit. In 4, a multi track time line appears on the screen and the user is in edit mode. In 5, the editor user clicks on the relevant slide display indicator on the multiple track time line and uses the user interface to switch it out with an updated version of the slide. In 6, the editor user replaces a portion of the video that was already in place in the information presentation with an audio file. This can be done by clicking on the time line asset video at the specified time, uploading his new audio file, and locking the stage into a single asset view so viewers only hear his voice and see the newly defined slide. In 7, once the editor user is finished making edits, he can publish the information presentation for on demand viewing. In 8, the information presentation can be put on the setting "publish to server for viewing"). In 9, once the editor user publishes the information presentation to the server for viewing and configures the permission settings, the information presentation is ready to be viewed online.

Figure 46A:
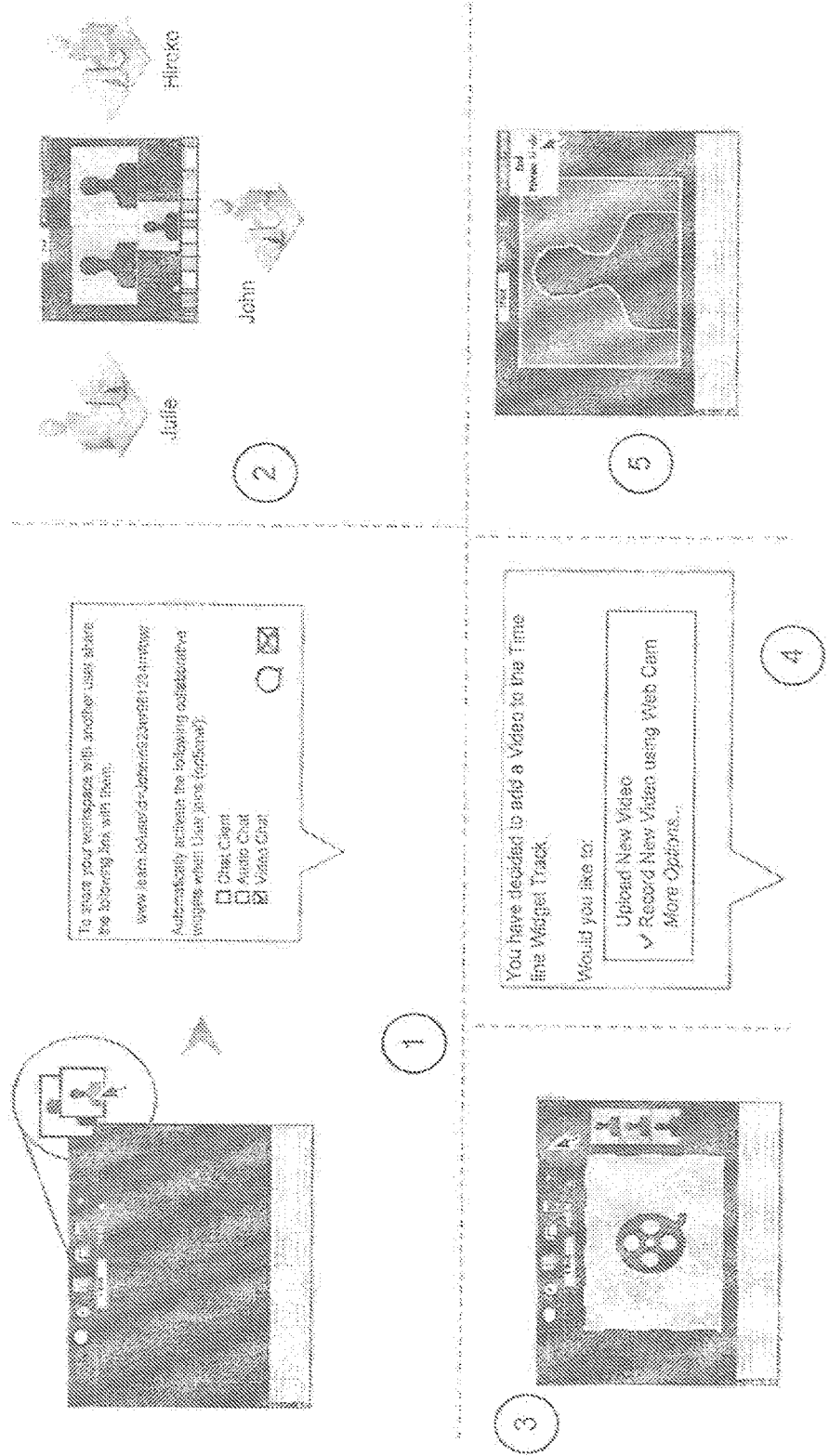

FIGS. 46A-47 illustrate another usage scenario of the creation/playback application 120, where collaborative creation and editing of an information takes place, according to one embodiment. In 1, John, Julie and Hiroko have an assignment to build an information presentation as a team. Using the system and the creation/playback application, John creates a new information presentation. John then invites Hiroko and Julie to the workspace so they can work together. In 2, once all three members are in the workspace, they begin collaborating via video chat on how they want the information presentation to go. They decide to start with a video introduction by Julie. In 3, Julie opens her tools menu and drags the video widget on the screen. In 4, a pop-up menu of options appears on Julie's screen and Julio chooses to record a new video segment with her web cam. In 5, because Julie is recording a web cam video in a multi-user environment, she switches her environment to private mode, which allows her to isolate herself from other state changes that users are doing, so she can focus on the task at hand. In private mode, she will receive small/subtle notifications of ongoing changes in the information presentation in the corner of the screen, so she has a log of events that are occurring and can receive feedback from her teammates. In 6, all three users can see Julie deliver the web cam introduction, as she is recording. While Julie is delivering the presentation, Hiroko becomes inspired to create the accompanying slides for Julie's introduction and adds the editing widget to the stage by clicking on a blank track. In 7, the slide show editing widget appears on the stage next to the video segment that Julie is currently recording. John is able to see Julie recording her presentation and Hiroko building/editing the accompanying slide show using the slide show editing widget simultaneously, in real-time. In 8, when Julie and Hiroko are finished, John takes charge and begins working on the timing of the slide transitions, while Julie and Hiroko provide verbal guidance.

Continuing on in FIG. 47, in 9, after John is finished syncing Hiroko's slides to Julie's presentation, they collaboratively review the presentation and decide what additional tools, like the calculator widget, to add to the information presentation. In 10, as Hiroko and John are doing this, Julie feels that it might be a good idea to start taking notes on potential questions they might want to ask viewers through the presentation. She activates her note pad (not her workspace like she did previously) in private mode so as not to disturb John's and Hiroko's work, and begins taking notes. In 11, once John, Hiroko, and Julie have finished configuring the widgets on the stage. Julie shares her note pad with the team, showing them all the questions she has jotted down. They collaboratively edit the questions on Julie's note pad. Once finished, Julie emails a copy to everyone, so they have their own copy of the content. In 12, once they have finished building the information presentation, they preview the information presentation in its entirety in automatic mode. In 13, now that they have reviewed the information presentation and are satisfied with it, John configures the settings for the information presentation before publishing it to the web. In 14, the information presentation settings are shown.

FIGS. 34 and 49-67 are screen shots illustrating various single track and multi-track embodiments of the creation/playback application 120, and various information presentations and assets. With respect to these figures, and other examples screens illustrated throughout this disclosure, those of ordinary skill in the art will understand that all of these examples screens can be sequenced together in different ways to create and playback many different types of activities using the activities widget.

Figure 49:
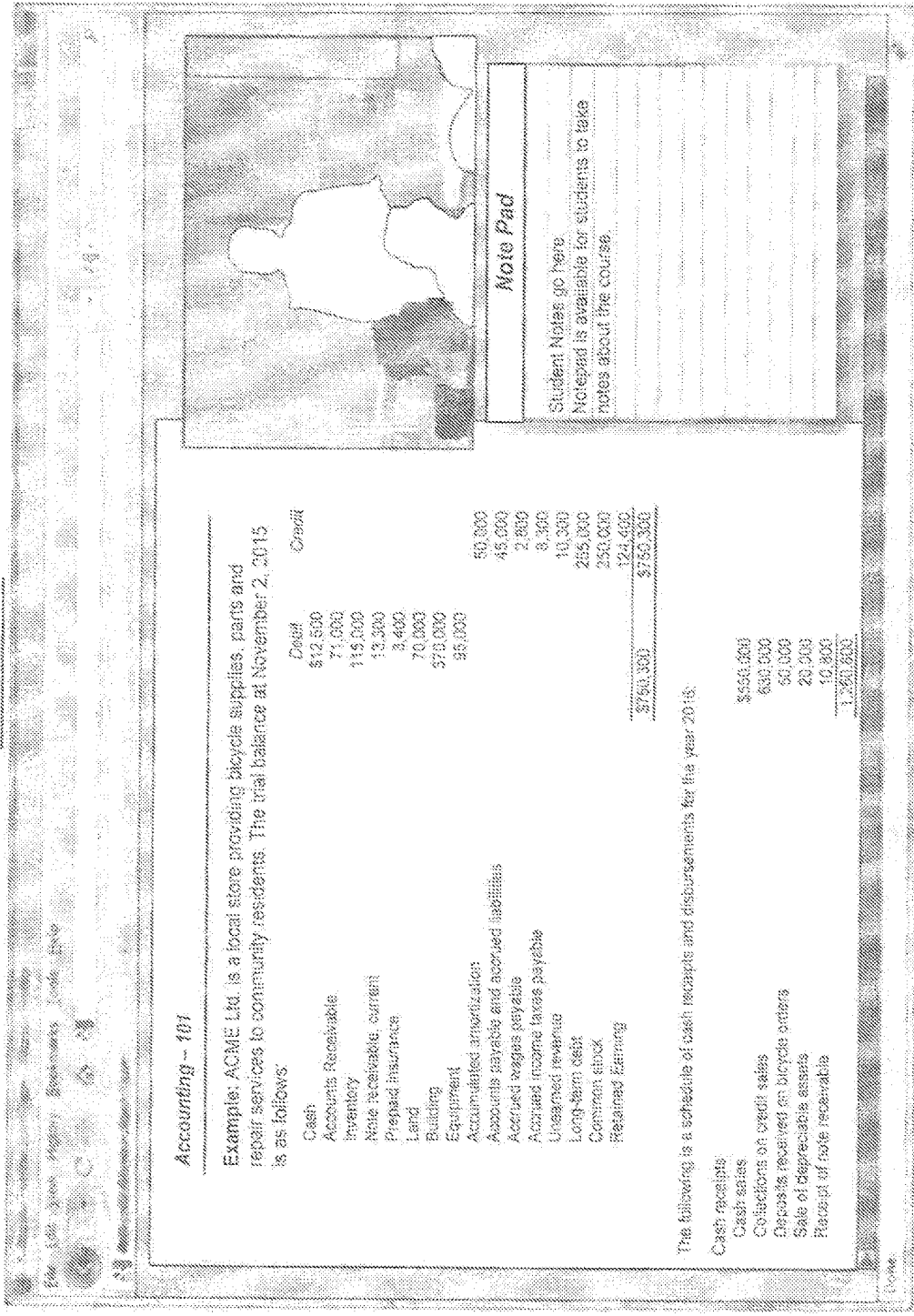

FIG. 49 illustrates a single track embodiment with a document viewer widget displaying a document, a video asset and a document editing widget displayed.

FIG. 50 illustrates a single track embodiment with a video asset, a slide show editing/viewing widget displaying a slide document, an asset browser widget and a chat widget (labeled class discussion) displayed.

FIG. 51 illustrates a single track embodiment with an assessment widget displaying a quiz modally within the information presentation and the creation/playback application.

Figure 52:
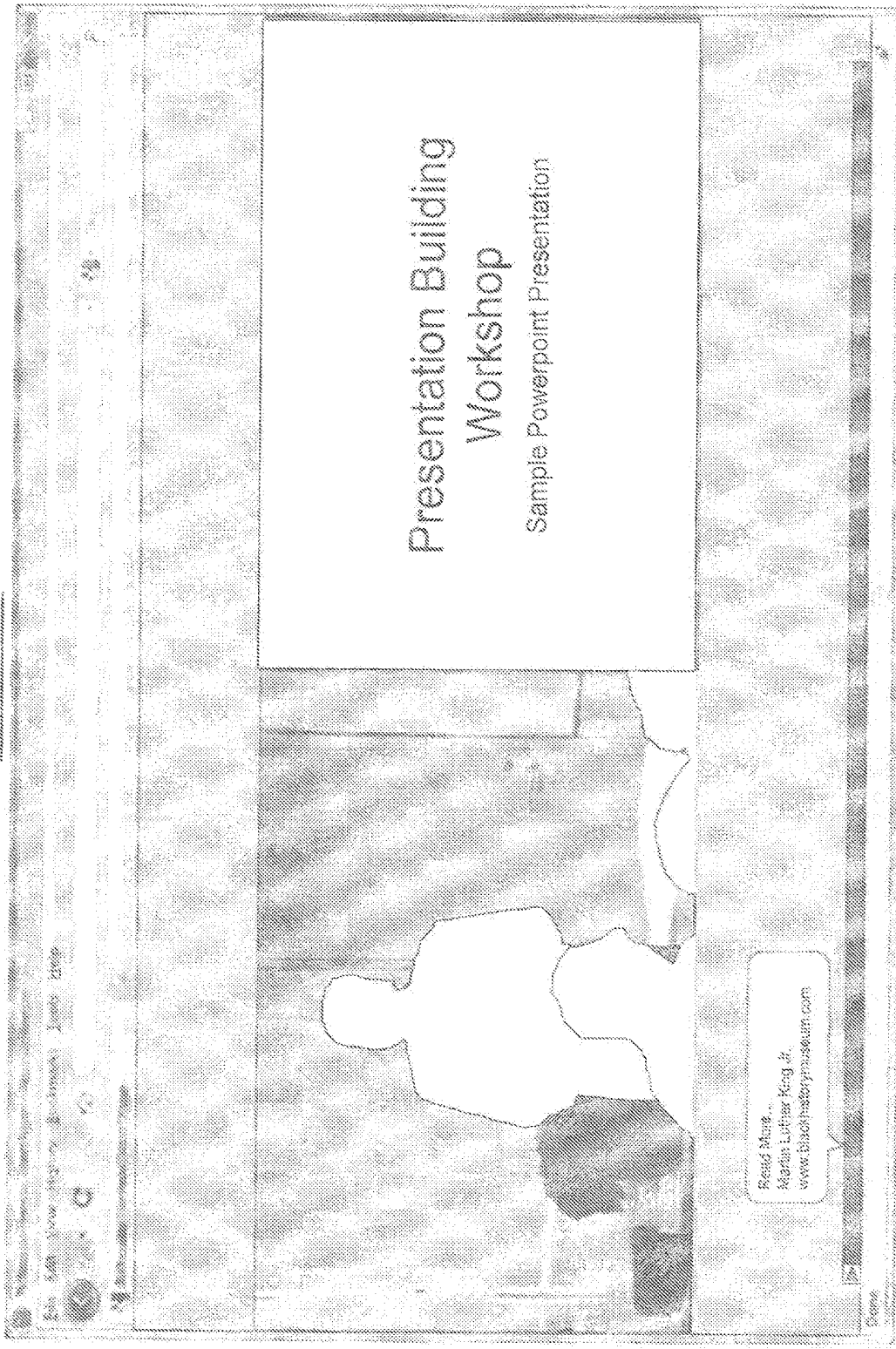

FIG. 52 illustrates a single track embodiment with a video asset, a slide show editing/viewing widget displaying a slide document, and a bookmark widget displayed.

Figure 53:
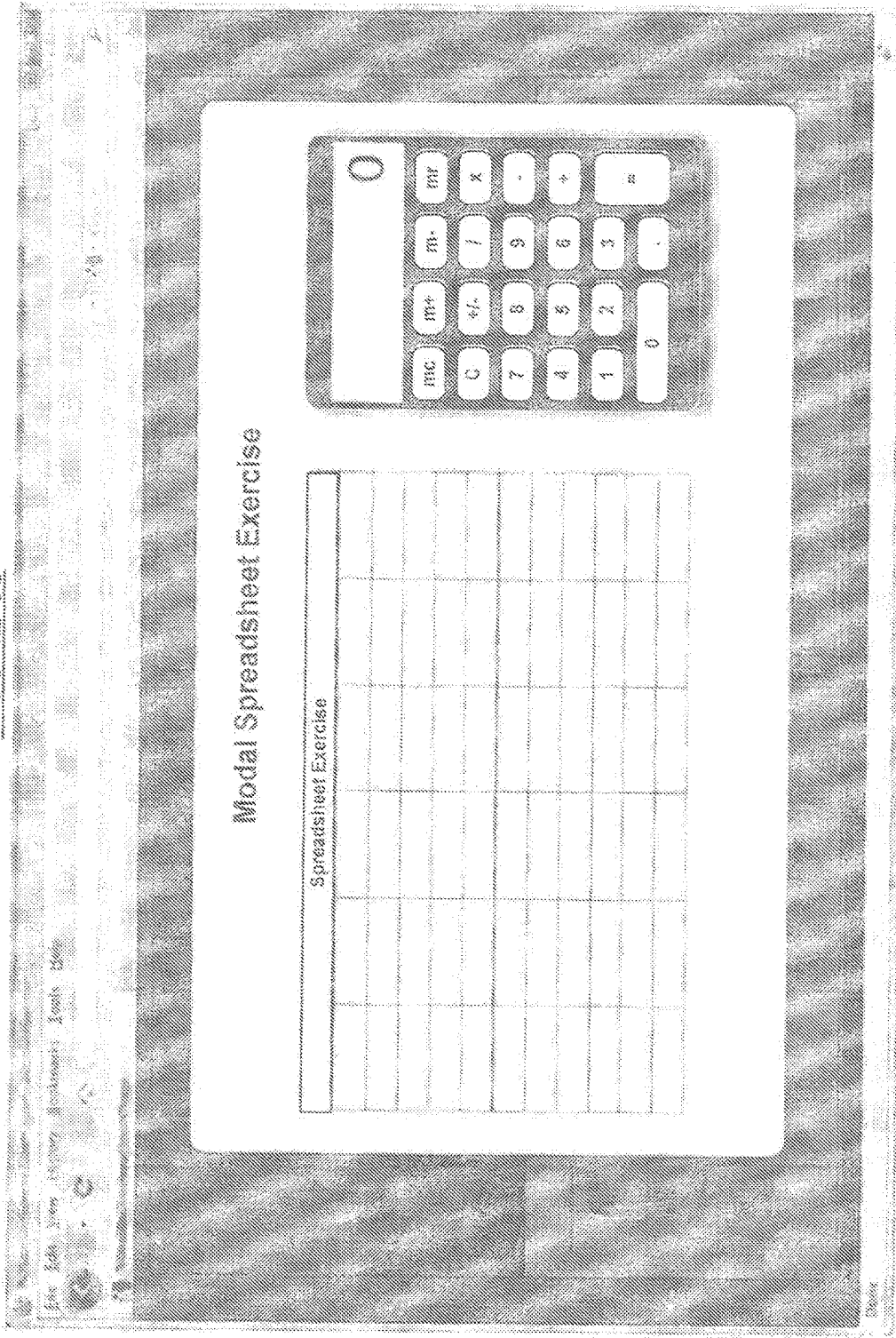

FIG. 53 illustrates a single track embodiment with a spreadsheet widget and a calculator widget displayed modally within and using an activity widget within the information presentation in the creation/playback application.

Figure 54:
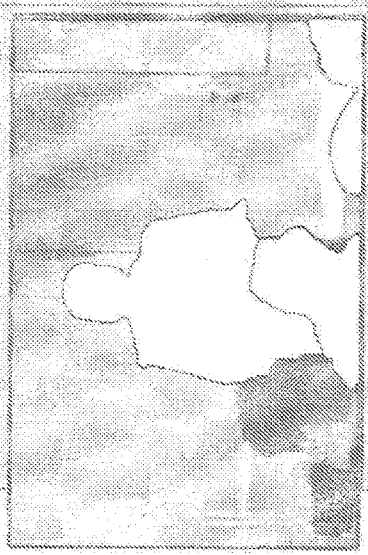

FIG. 54 illustrates a single track embodiment displaying: a document viewer widget displaying a document, a video asset, and a spreadsheet widget.

Figure 55:
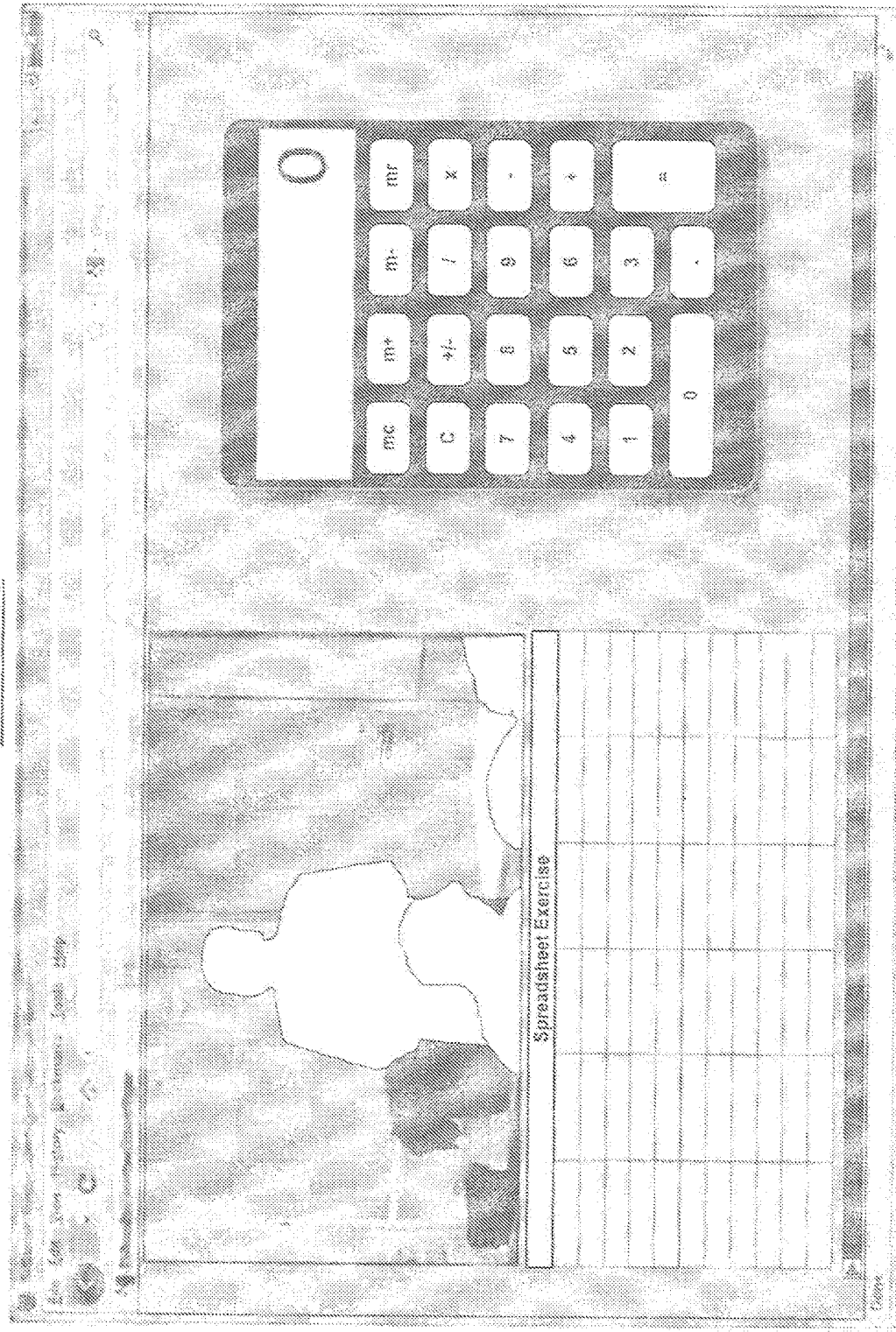

FIG. 55 illustrates a single track embodiment displaying: a video asset, a spreadsheet widget, and a calculator widget.

Figure 56:
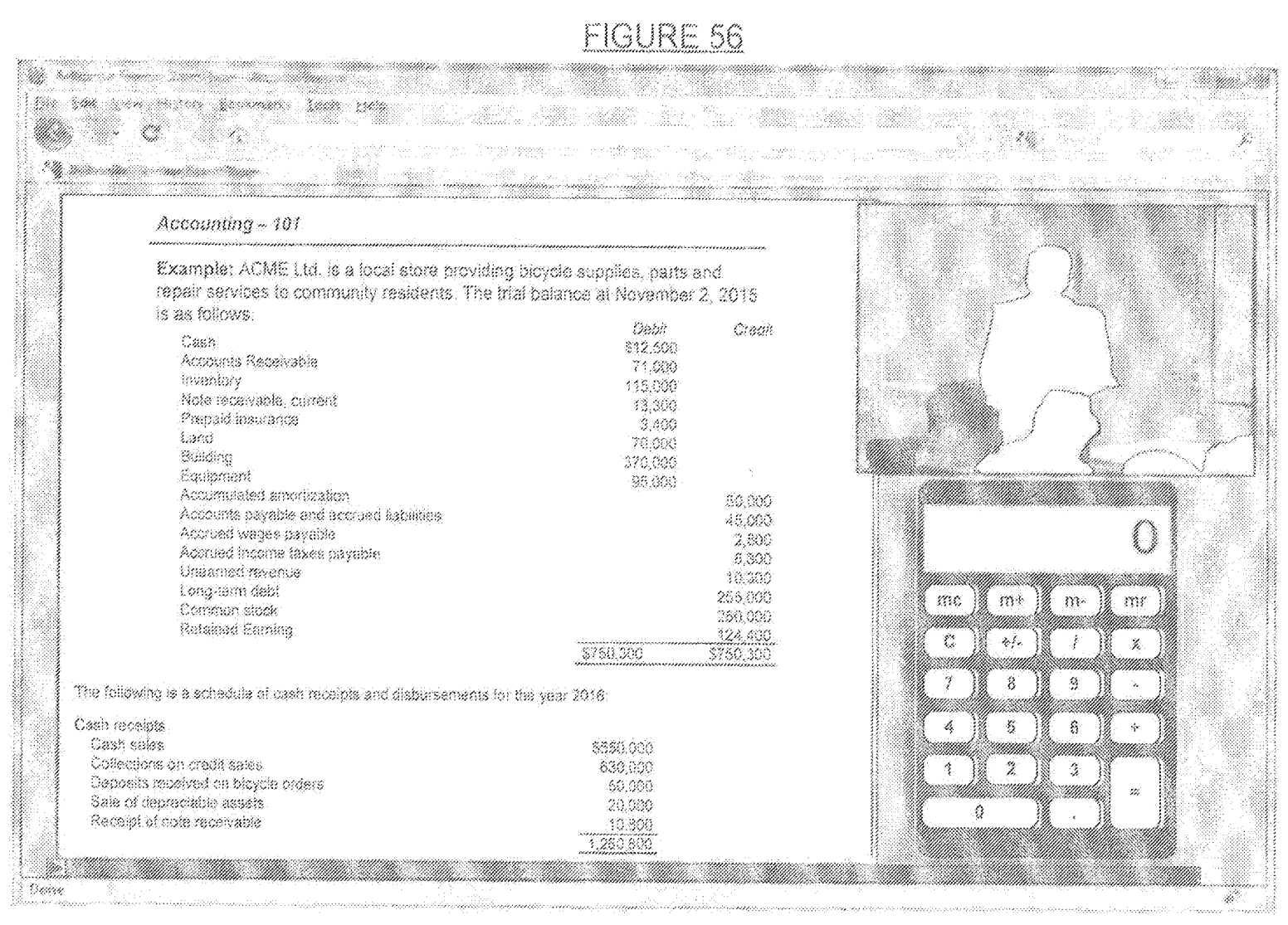

FIG. 56 illustrates a single track embodiment displaying: a document viewer widget displaying a document, a video asset, and a calculator widget.

Figure 57:
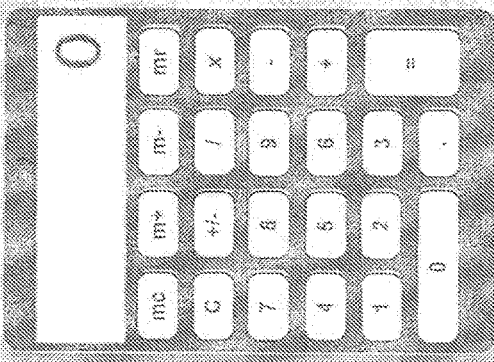

FIG. 57 illustrates a single track embodiment displaying: a document viewer widget displaying a document, and a calculator widget.

Figure 58:
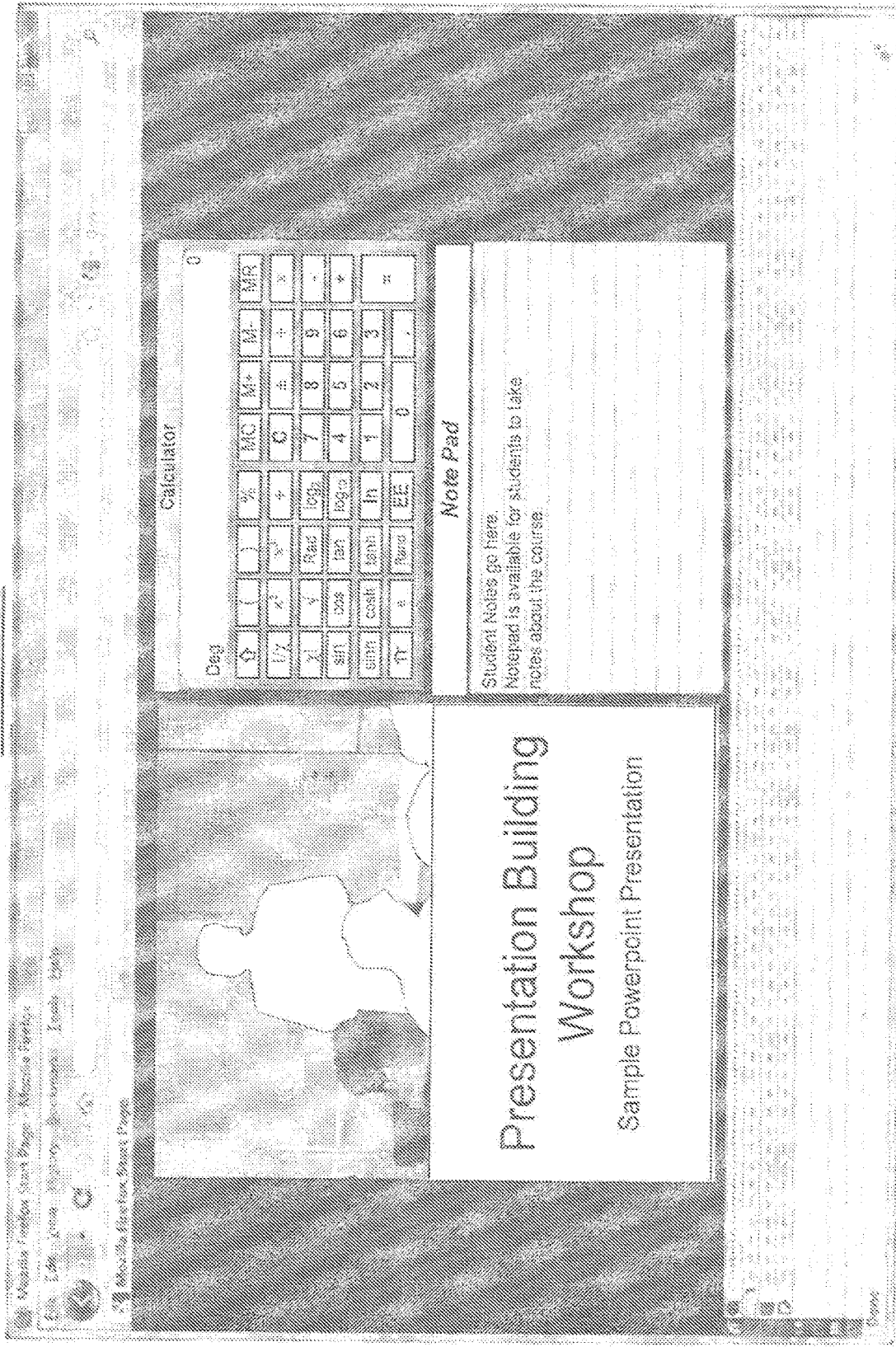

FIG. 58 illustrates a multi-track embodiment displaying: a video asset, a slide show editing/viewing widget, a calculator widget, and a document editing widget.

Figure 59:
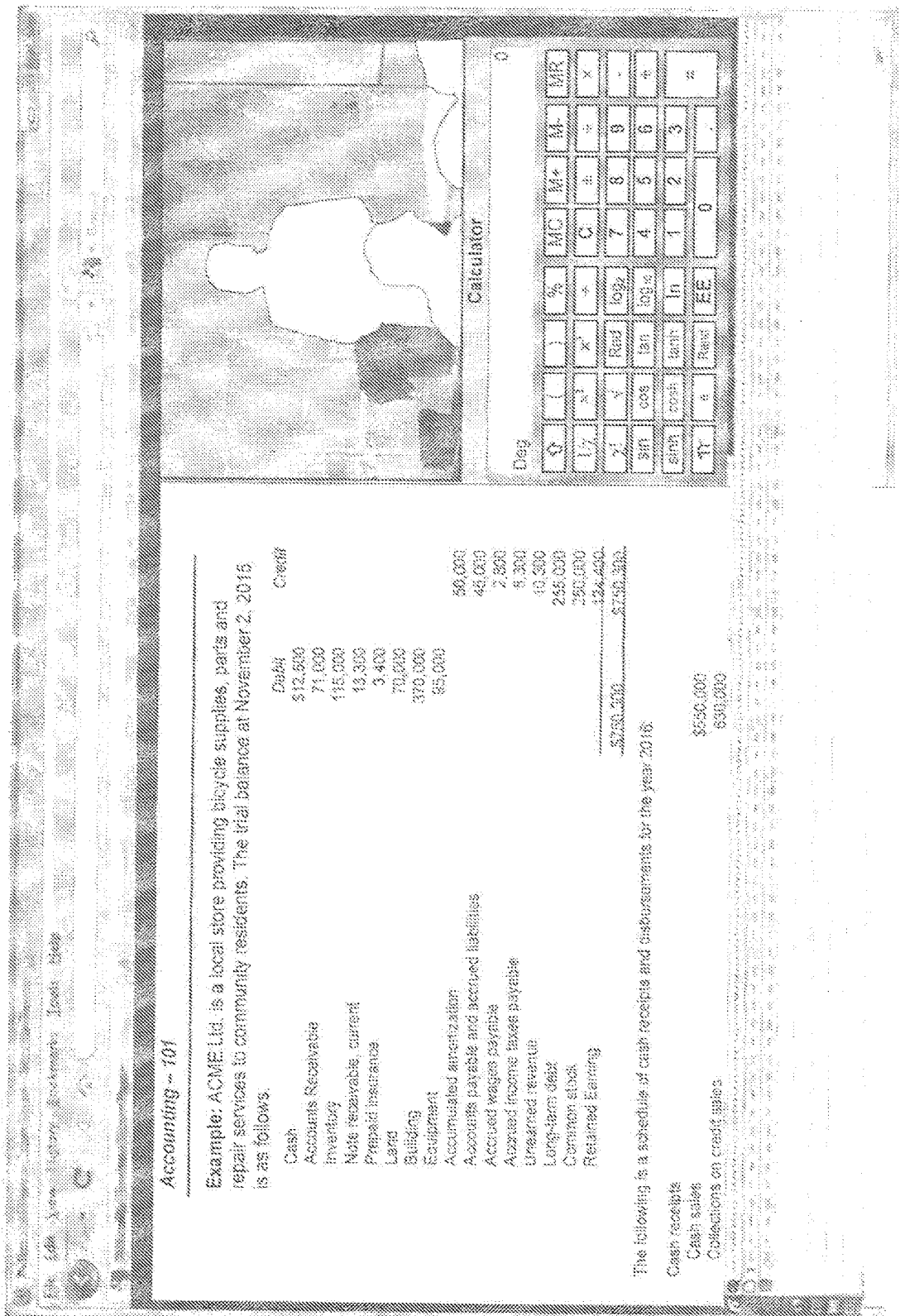

FIG. 59 illustrates a multi-track embodiment displaying: a video asset, a document viewer widget displaying a document, and a calculator widget.

Figure 60:
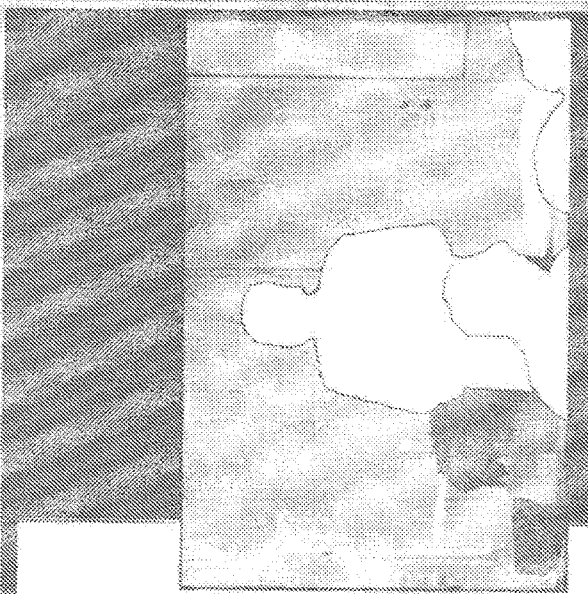

FIG. 60 illustrates a multi-track embodiment with a video asset and document viewer widget displayed.

Figure 61:
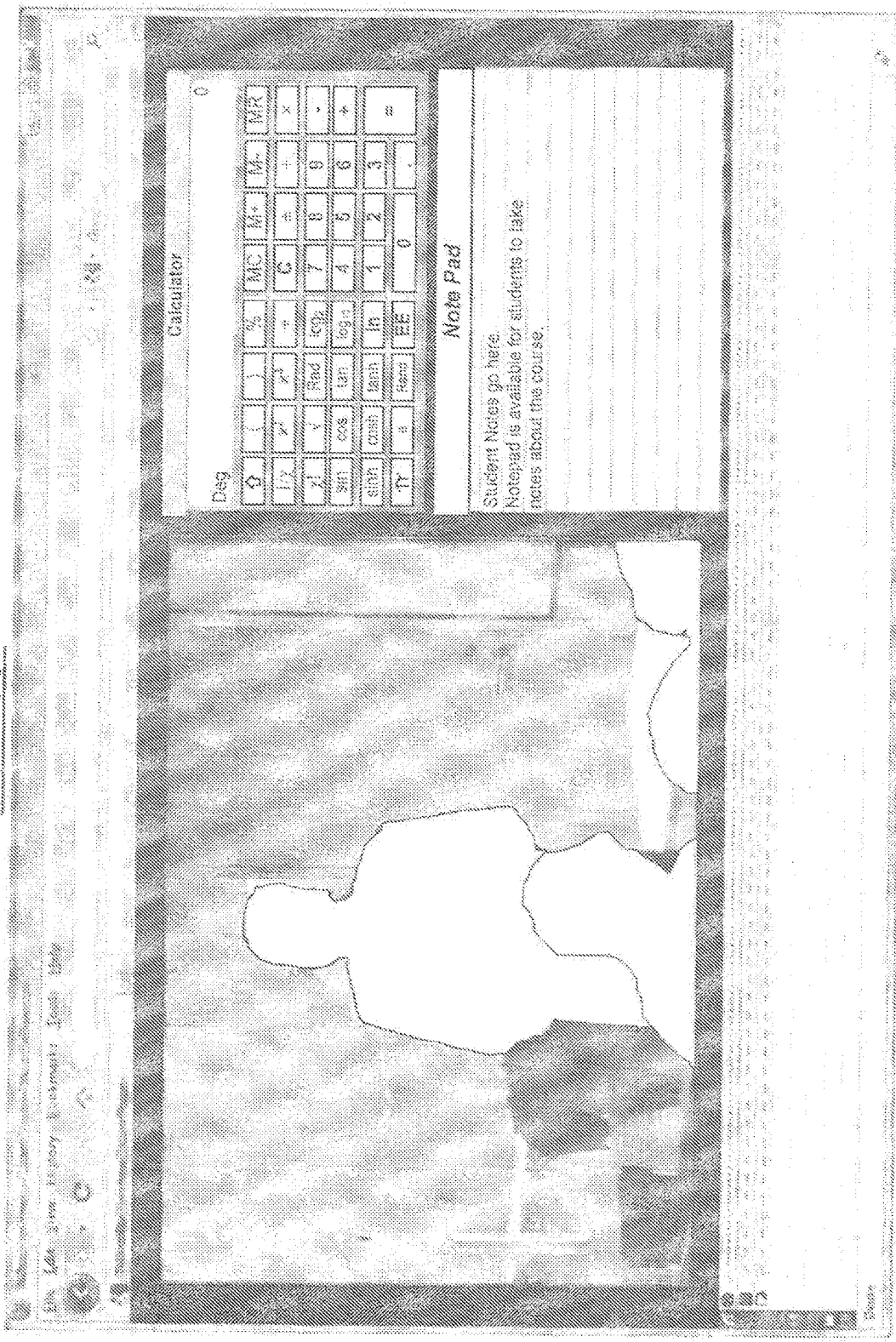

FIG. 61 illustrates a multi-track embodiment with a video asset, a calculator widget and a document editing widget displayed.

Figure 62:
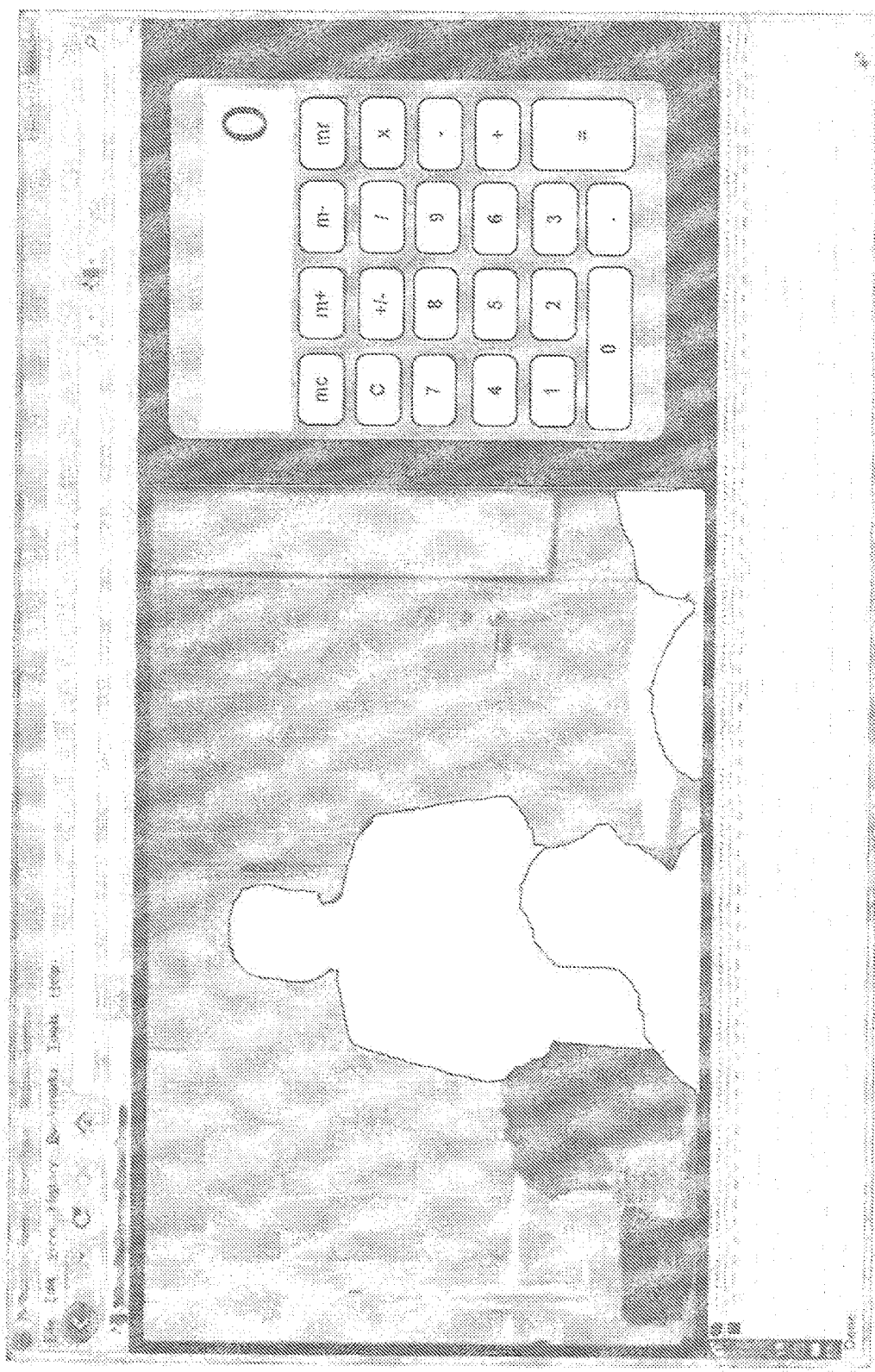

FIG. 62 illustrates a multi-track embodiment with a video asset and a calculator widget displayed.

Figure 63:
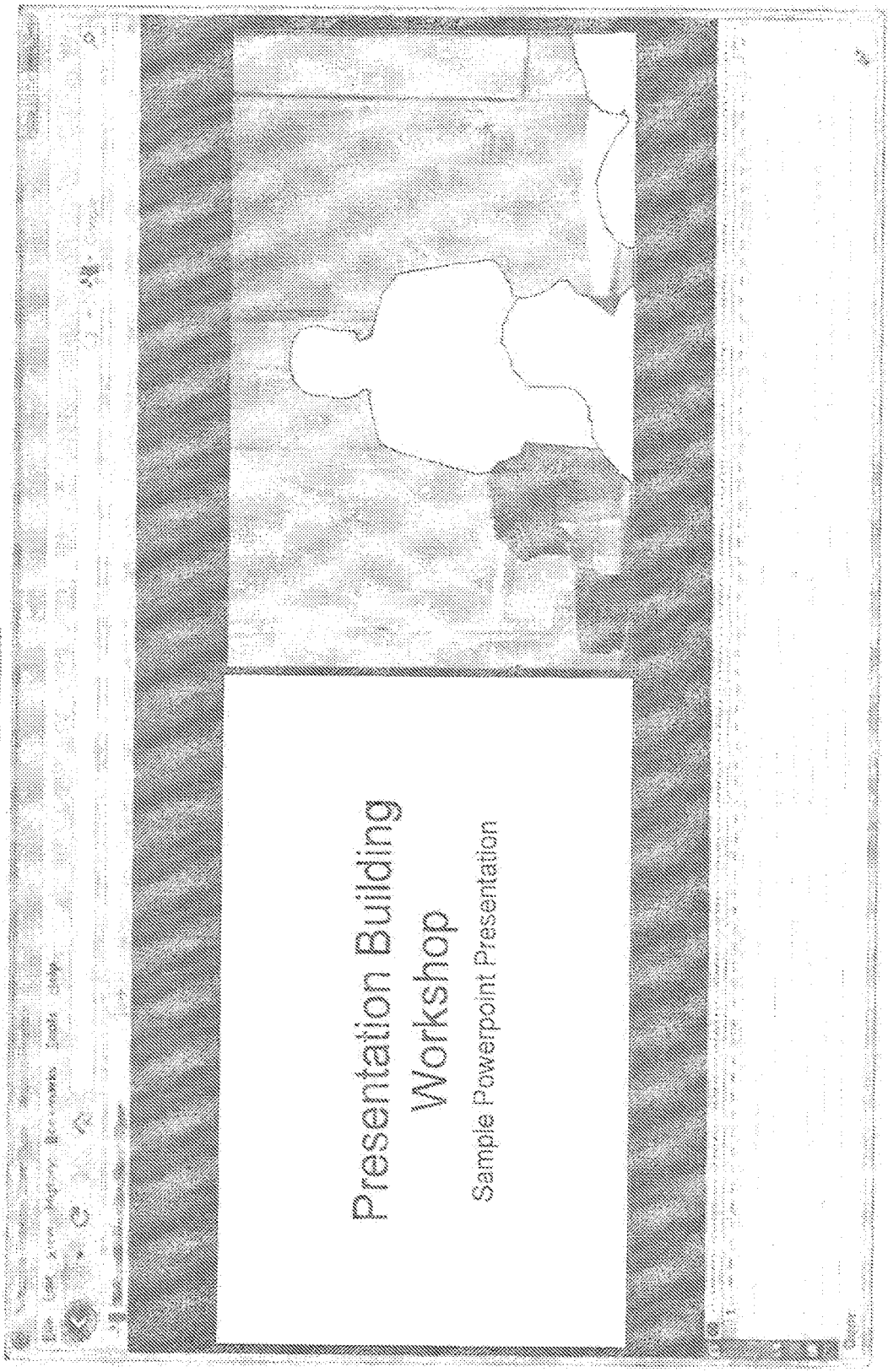

FIG. 63 illustrates a multi-track embodiment displaying: a video asset, and a slide show editing/viewing widget displaying a slide document displayed.

Figure 64:
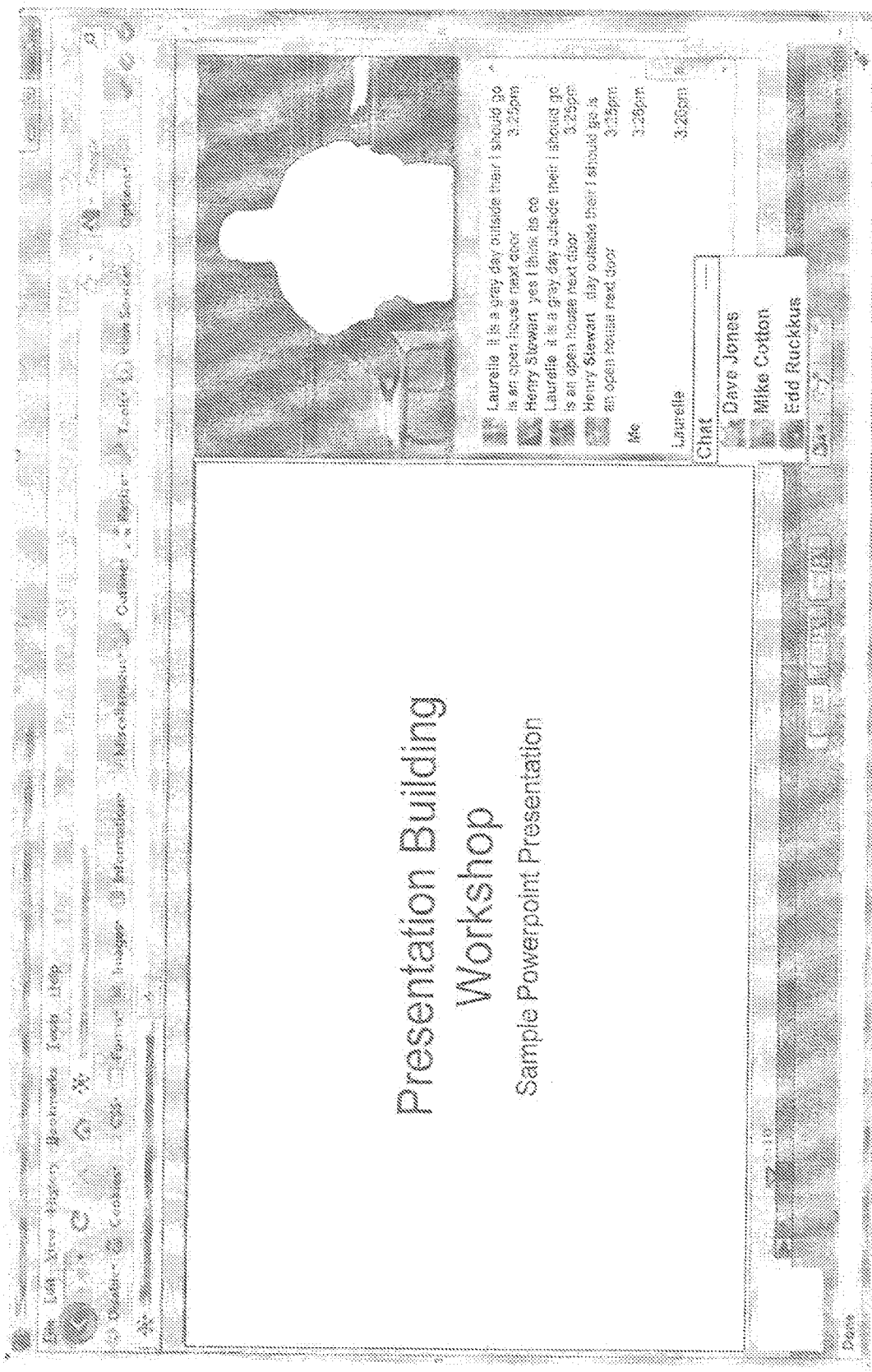

FIG. 64 illustrates a single-track embodiment displaying: a video asset, a slide show editing/viewing widget displaying a slide document, a chat widget, and a user list widget displayed as a popup (labeled "Chat").

Figure 65:
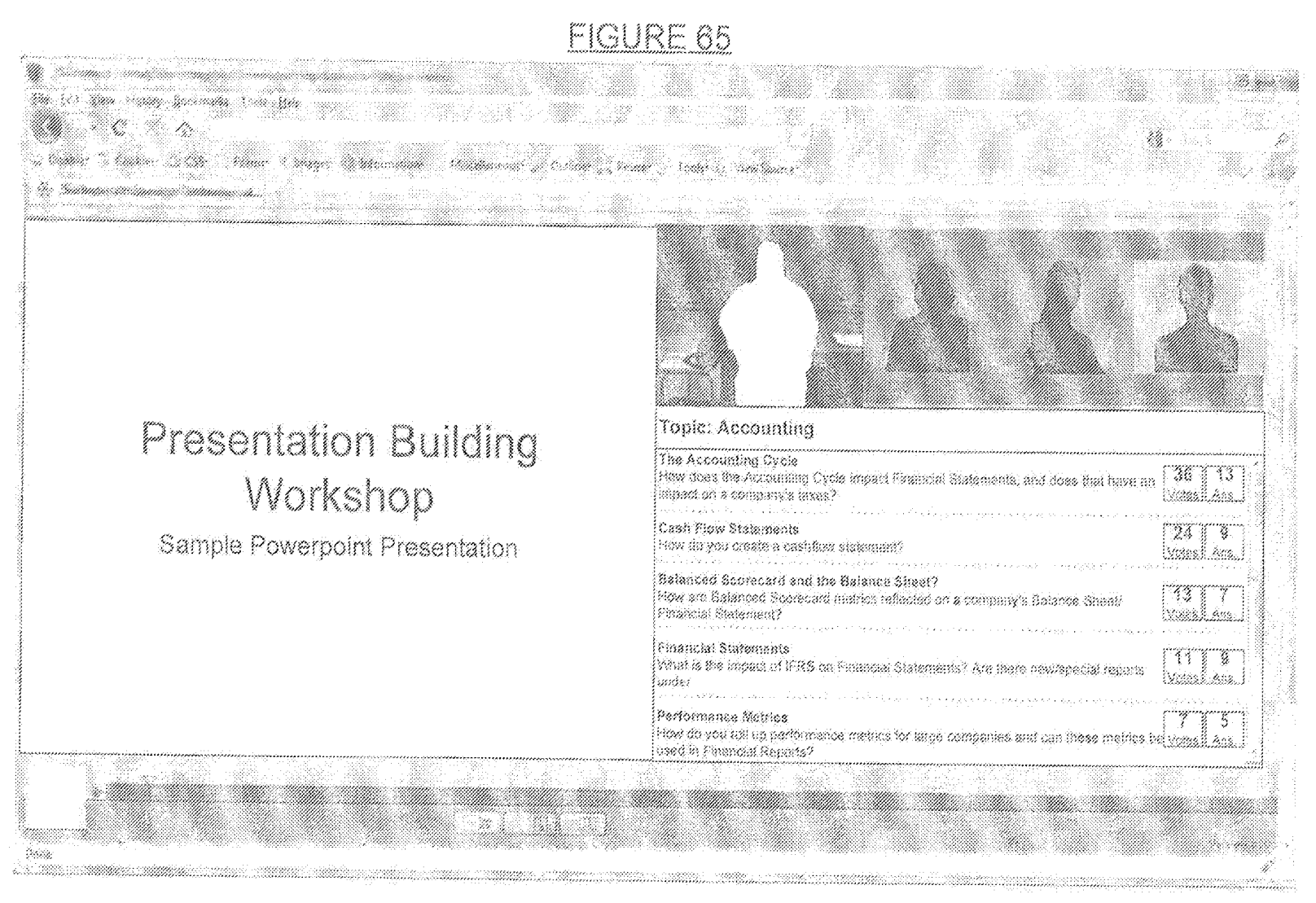

FIG. 65 illustrates a single-track embodiment displaying: a video asset, a slide show editing/viewing widget displaying a slide document, a video chat widget (with three users shown), and a discussion widget (labeled "Topic: Accounting").

Figure 66:
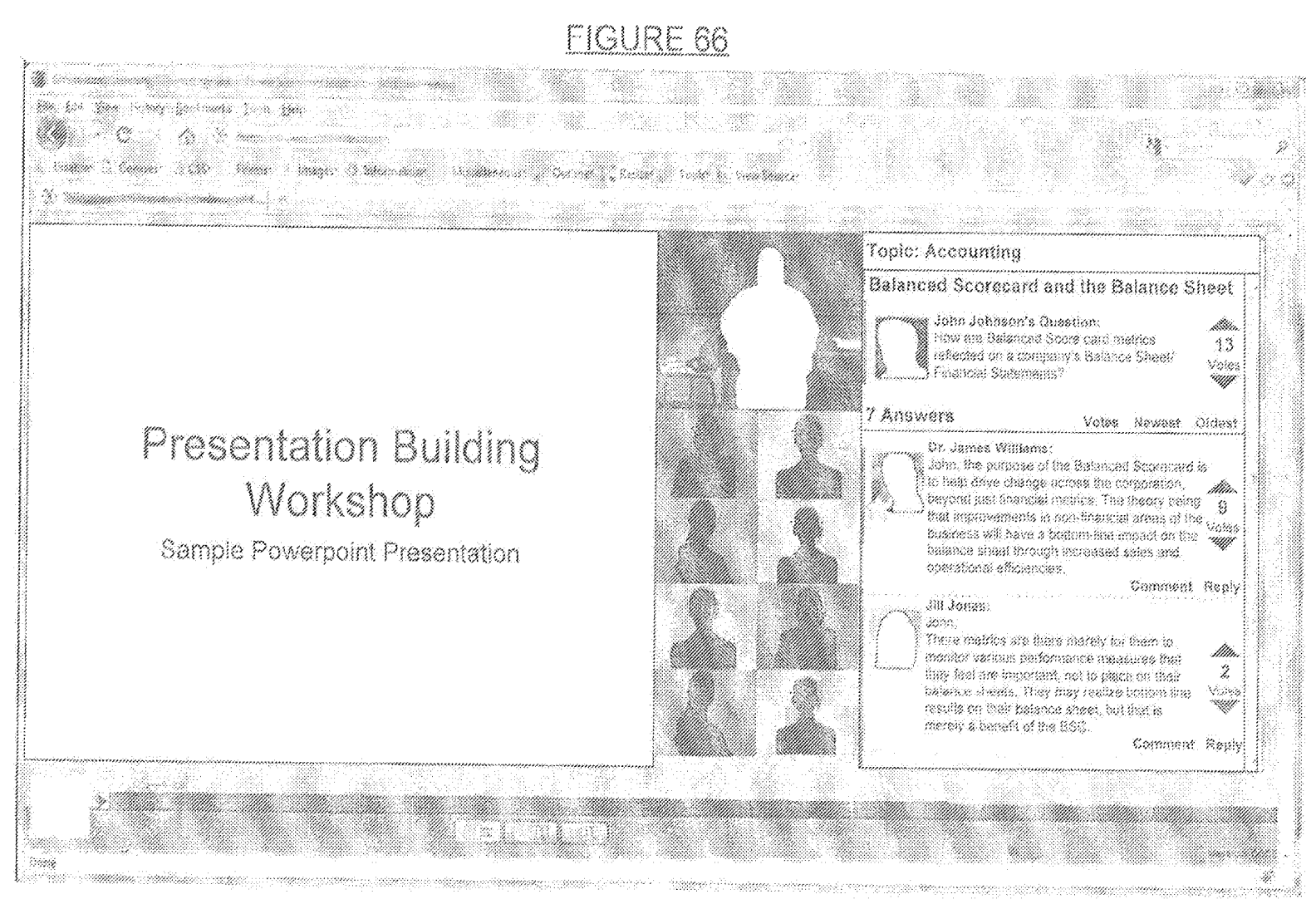

FIG. 66 illustrates a single-track embodiment displaying: a video asset, a slide show editing/viewing widget displaying a slide document, a video chat widget (with 8 users shown), and a discussion widget (labeled "Topic: Accounting").

Figure 67:
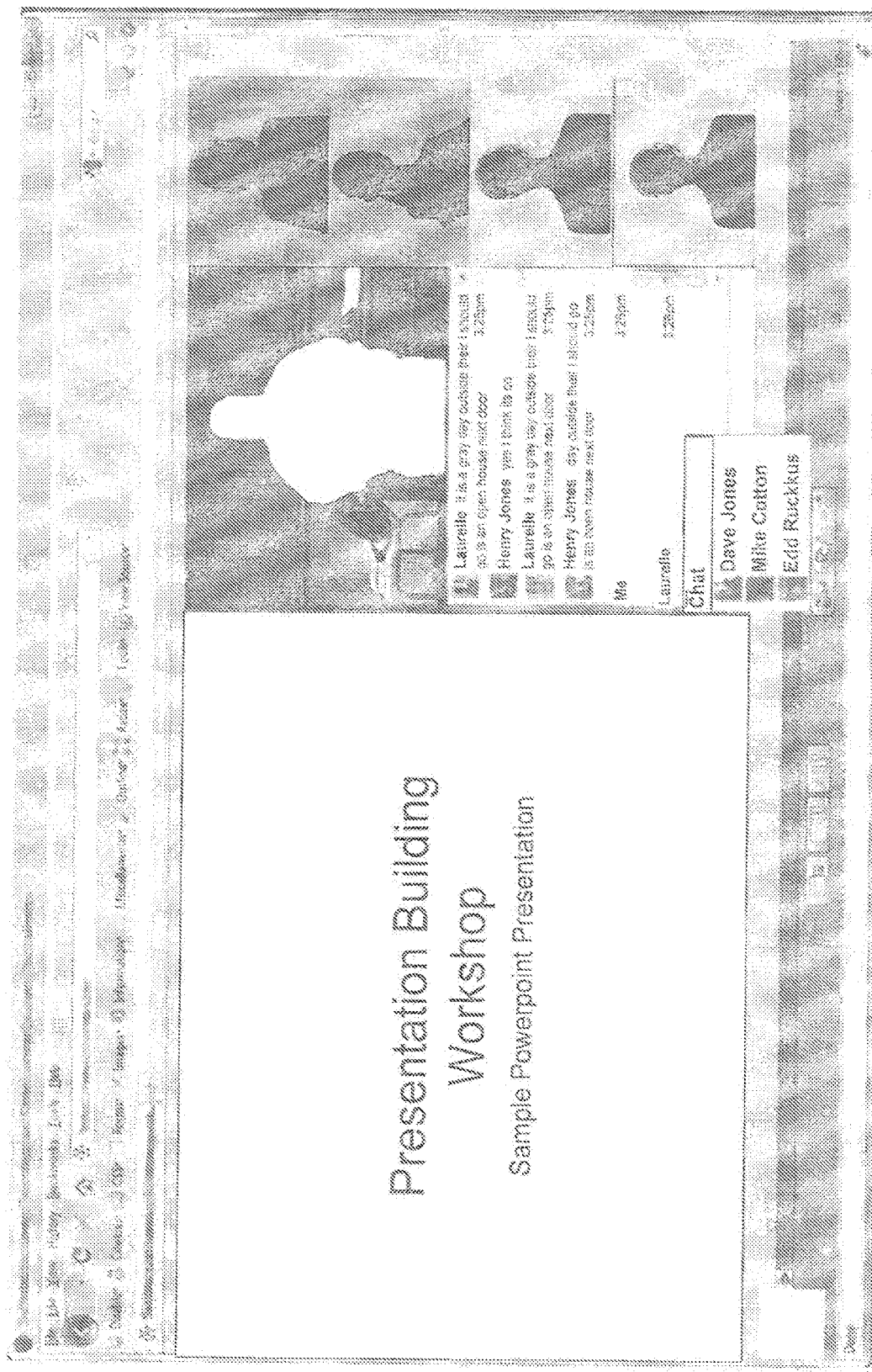

FIG. 67 illustrates a single-track embodiment displaying: a video asset, a slide show editing/viewing widget displaying a slide document, a video chat widget (with four users shown), a text chat widget, and a user list widget displayed as a popup (labeled "Chat").

FIGS. 68-74 are screen shots illustrating various single track and multi-track embodiments of the creation/playback application 120. FIGS. 68-74 illustrate single-track embodiments, and sequentially together demonstrate several capabilities of the system and creation/playback application, including the use of the discussion board widget in implementing an "assignment".

Figure 68:
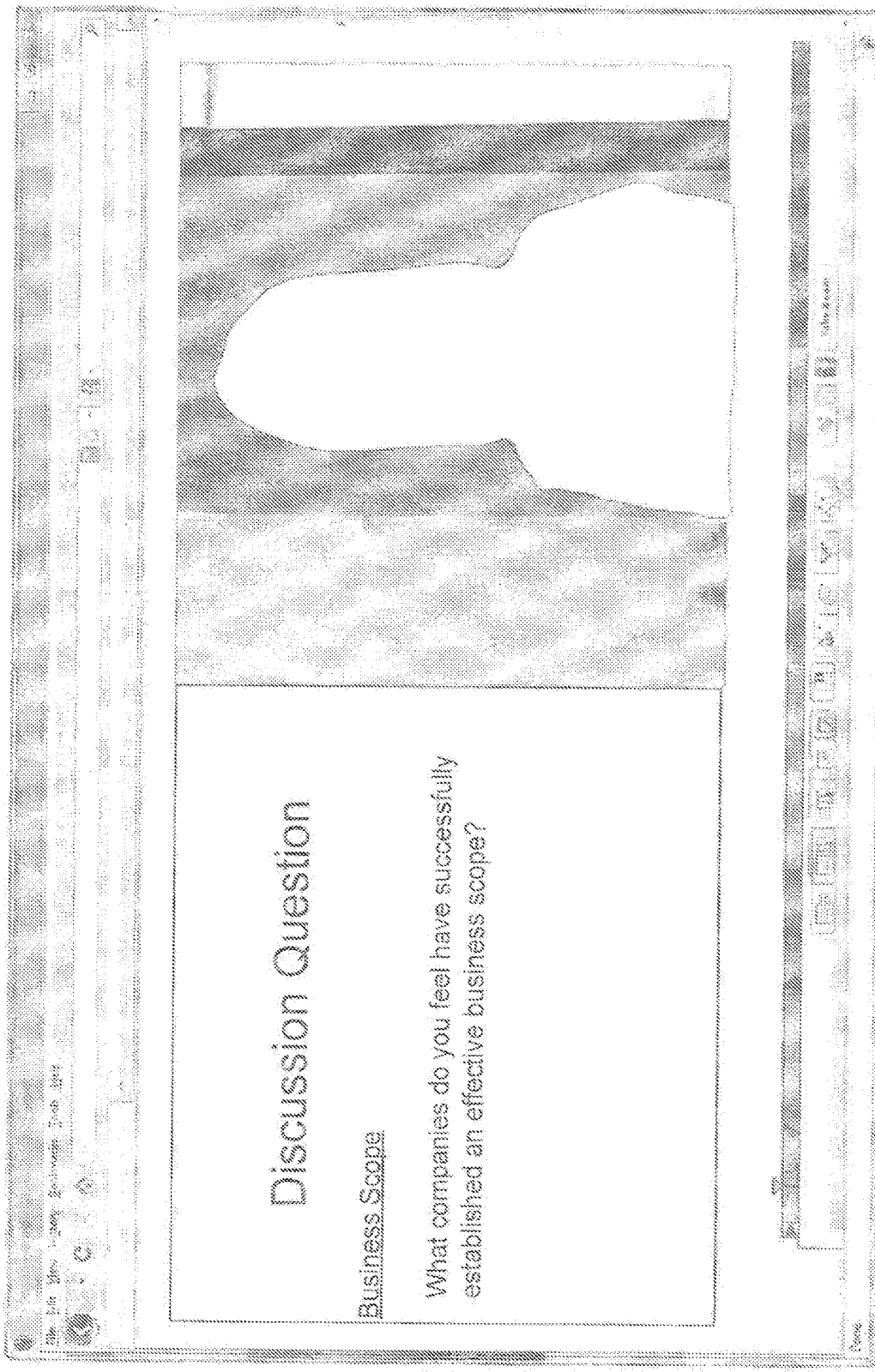

FIG. 68 displays: a video asset, and a slide show editing/viewing widget displaying a slide document.

Figure 69:
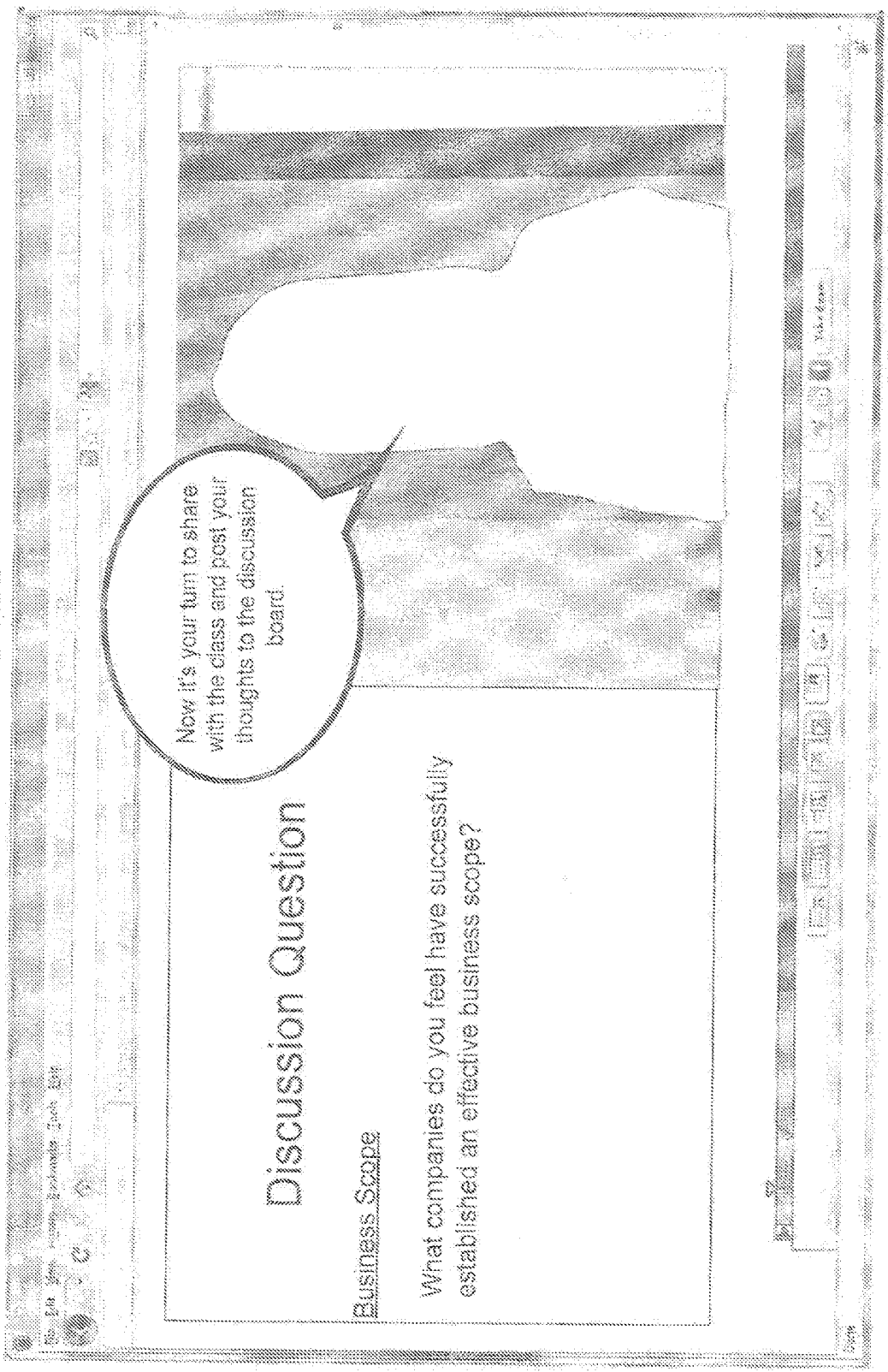

FIG. 69 illustrates a speaker/presenter within the video asset instructing users orally as to an upcoming activity which the user will have to participate in. The video asset illustrated could be a live and real-time video stream asset, or a prerecorded video asset.

Figure 70:
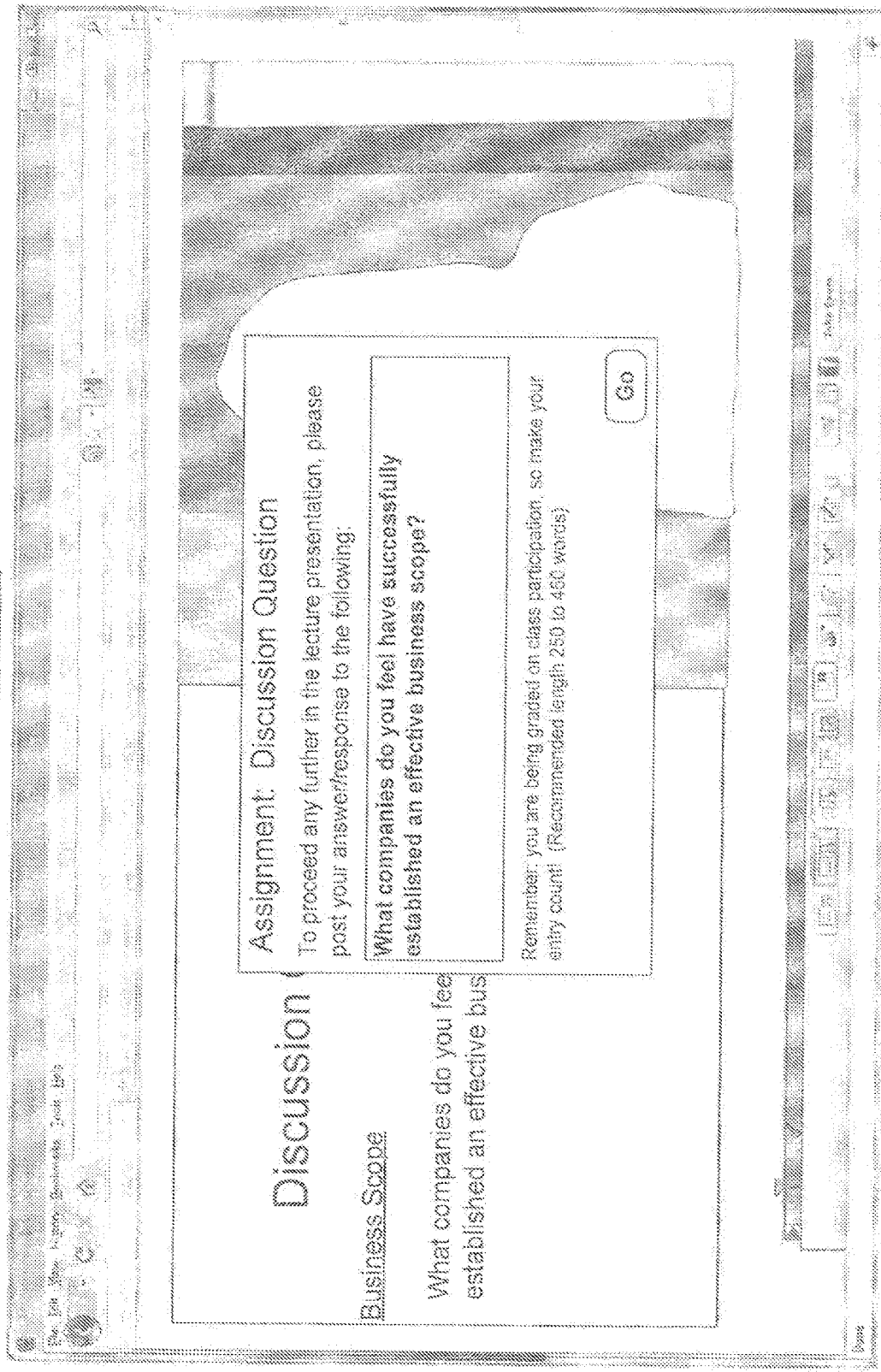

FIG. 70 illustrates a modal dialog box introducing the activity to users of the system, as well as providing instructions regarding the activity to users of the system. In FIG. 70, the user is able to click on the green "Go" button which results in the creation/playback application changing to the state depicted in FIG. 71, which continues the sequence. Alternatively, an editor user using the system to deliver the information presentation in a live in real-time, may be controlling the state of the presentation such that such editor user controls the advancing of the creation/playback application for all users to the state depicted in FIG. 71.

Figure 71:
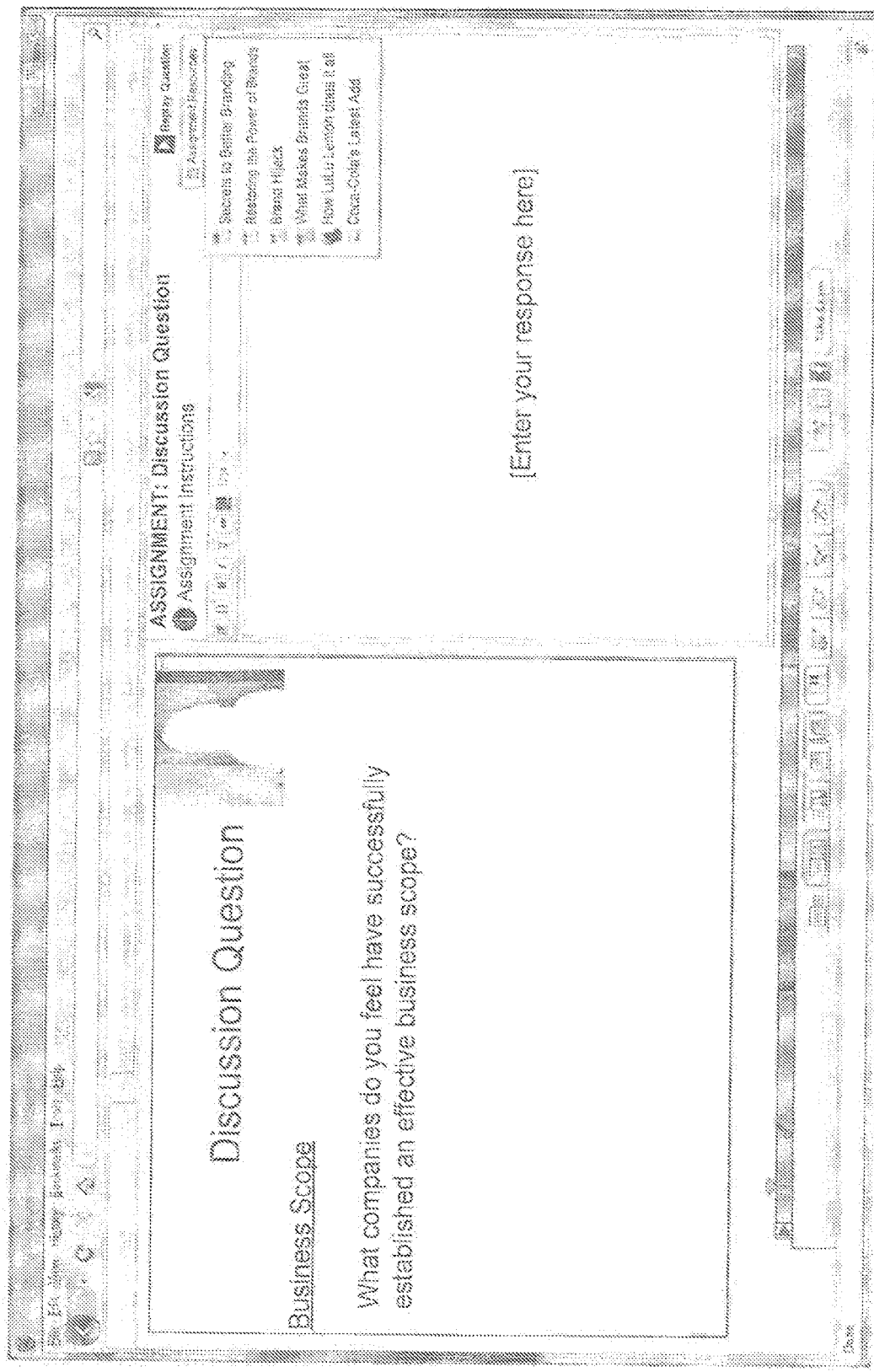

FIG. 71 illustrates a rich text entry component (which may be a document editing widget) for users to enter responses to be posted to a discussion board widget. In addition. FIG. 71 illustrates an asset browser widget, which is depicted as a pop-up list of files, appearing in response to a user's clicking on the button depicted (labeled "Assignment Resources"). The user may enter their response into/ using the rich text entry component. The system may receive and save such response to the associated discussion board widget, such discussion board widget being depicted in FIG. 72.

Figure 72:
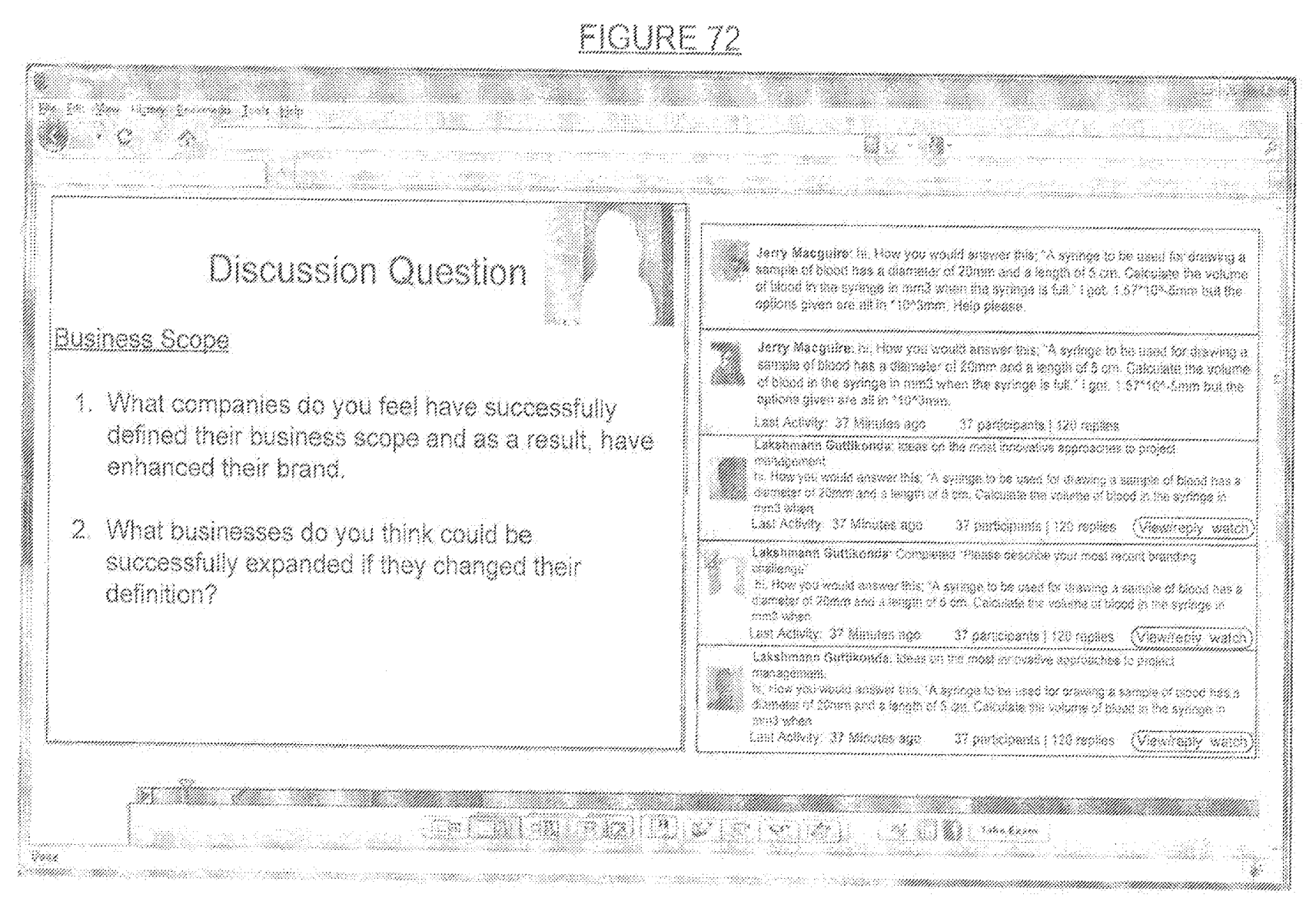

The discussion board widget depicted in FIG. 72 shows many different discussions, each of which may be submissions from users using the rich text entry method described and depicted in FIG. 71.

Figure 73:
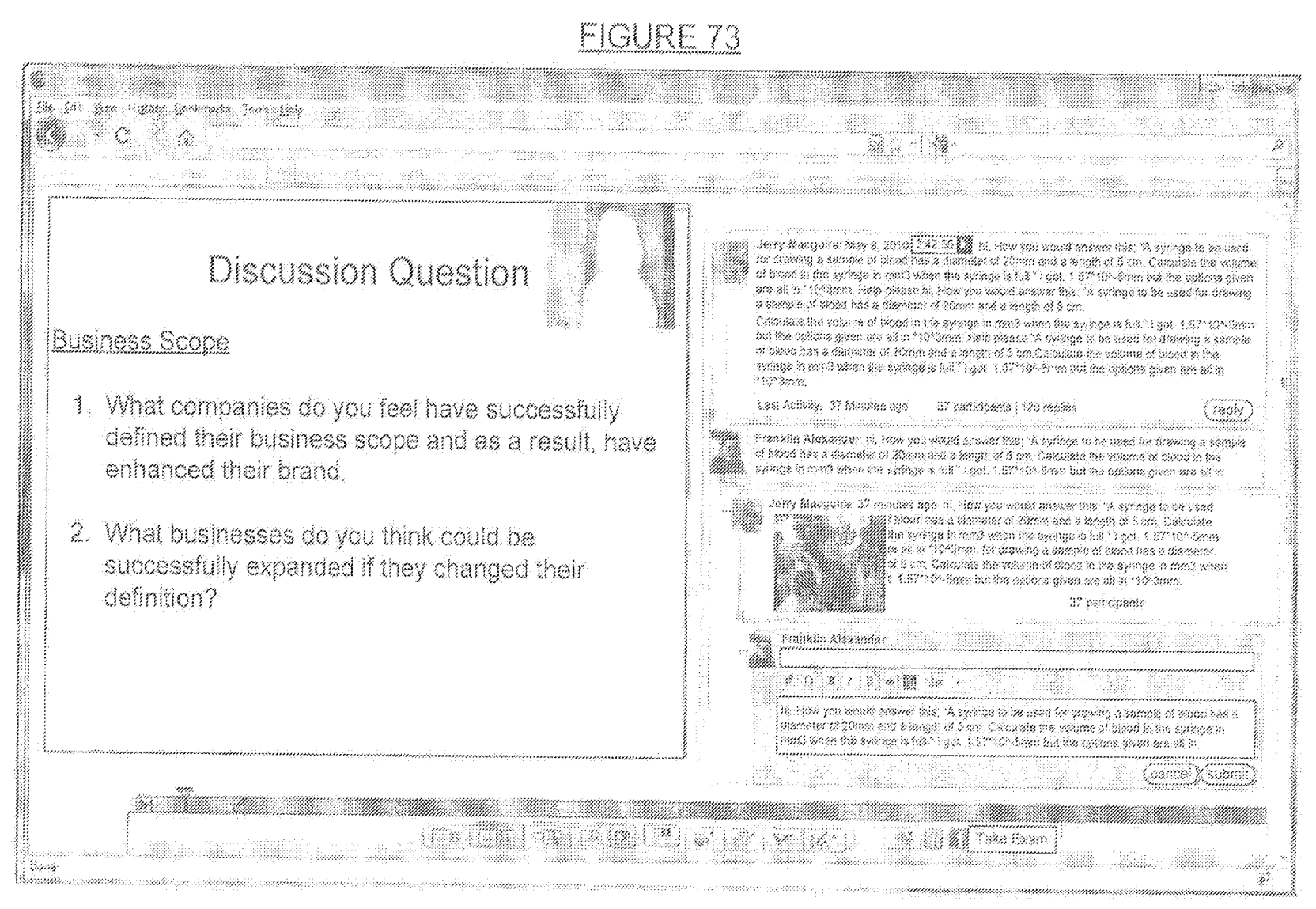

FIG. 73 continues the sequence, depicting what any user of the system might see upon selecting to view a discussion from the list depicted in FIG. 72.

FIG. 73 depicts a threaded format discussion within the discussion widget.

Figure 74:
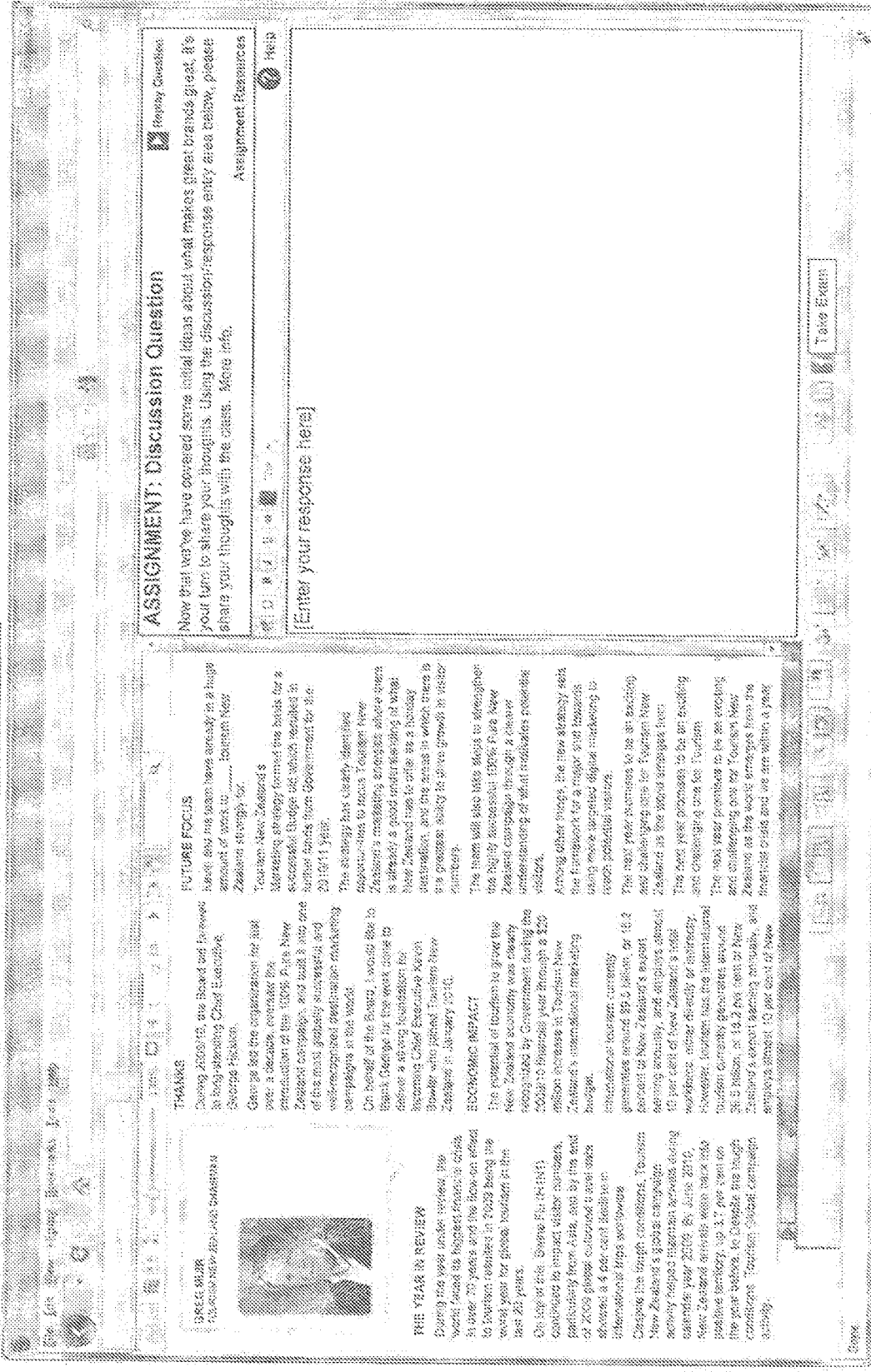

FIG. 74 illustrates: a single-track embodiment with a document viewing widget editing/viewing widget displaying a slide document, a video chat widget (with 3 users shown), and a discussion widget (labeled "Topic: Accounting").

FIGS. 75A-75E together further illustrate many capabilities of the system 100 and creation/playback application 120. Specifically, these figures illustrate the creation of a predefined information presentation using a multi-track editor mode embodiment. It is important to note that the same sequence of events described with respect to FIGS. 75A and 75B, as well as with respect to all other scenarios described in this disclosure could be used in scenarios with live viewers/users/participants and with or without the multi-track display being used.

For example, referring to FIGS. 75A-75E, in 1, Professor X may be creating a predefined information presentation using an editor mode embodiment using his desktop computer, tablet PC, mobile/smart phone, or other computing/contoller device, or any combination thereof. In 2, the creation playback application opens in editor mode with the multi-track timeline visible. Professor X sets the initial state of the presentation to use a video recording/playback widget and a document viewing/editing widget. In 3, Professor X activates record mode. The user interface presents various options based on the context of the user interaction and configuration of the information presentation at the given point in time. In 4, Professor X clicks "Start Recording" and proceeds to record himself giving a presentation. At this point, Professor X is recording himself on video and audio and proceeds through the first few pages of the document. In 5, a short way into his presentation, Professor X decides he'd like to better explain a concept and will engage a few other assets and widgets to do so. First, using the asset browser widget, Professor X locates a relevant diagram. It is important to note that Professor X could have also chosen to create and display a new diagram. Referring to FIG. 75B, in 6, a detailed view of the multi-track timeline, demonstrating how during the recording of an information presentation, all changes of state of any sort to the assets, widgets or information presentation may be recorded, as well as displayed visually on the multi track timeline.

In 7, the user interface presents Professor X with various options for adding the diagram to the stage and information presentation using a diagram viewing editing/widget, including automatic layout options where the application automatically detects the best layout option. The application can also automatically add the diagram asset or widget to the stage without prompting the user, Professor X. In 8, Professor X activates the drawing widget. In 9, using various keyboard shortcuts, and/or on screen prompts, etc., Professor X is able draw on/within and/or interact with both individual widgets or assets, as well as the stage as a whole. For example. Professor X makes some modifications to the diagram in real time, the state changes for which are being recorded. Likewise, Professor X can draw shapes overlaying and overlapping the various assets on the stage. It should be noted that 9 is only one example of the combining of widget capabilities together with other widgets, in this case the drawing suite widget being used and combined with the diagram viewing/editing widget, as well as the document editing widget. In addition, 9 is also one example of the ability to put assets on top of other assets, in this case, the drawing suite widget being used to draw over top of the entire stage within the creation/playback application 120.

Referring to FIG. 75C, in 10, Professor X decides he'd like to have some supplementary information in the presentation, but leave the existing widgets and layout intact. To do this, Professor X can use the layers widget, to create a new layer on the stage.

In 11A, after creating the new layer, Professor X adds a new slide show editing/viewing widget to the layer on the stage. Professor X edits the slide show, adding some text in bullet point form, then adds a calculator to the screen and performs an example calculation, all of which may still be recorded.

In 11B, Professor X then changes back to the first layer to continue with the main portion of the presentation.

Referring to FIG. 75D, in 12, Professor X is done presenting the materials and stops the recording process (e.g., by clicking a stop button). All of the changes of state of the information presentation have been recorded and persisted by the system and creation playback application.

In 13, all of the changes of state of the information presentation that have been recorded are rendered and represented visually on the multi-track timeline. Professor X would now like to make some additions and changes to the information presentation. Specifically, Professor X would like to make some areas of the diagram he used into links to: 1) one or more points in time in the information presentation; 2) other assets/widgets; 3) other states of other assets/widgets; 4) other layers in the layers widget; 5) other information presentations; or 6) any other URI or URL; or any combination thereof. Any of these options can be displayed within the linked from/original information presentation or outside of the information presentation. Those of ordinary skill in the art will see that there are other link types that may be created and applied to objects in the system.

Referring back to 13 on FIG. 75D. Professor X may drag the timeline indicator/playhead across the timeline in order to quickly find the point in the presentation.

In 14, after locating the point in the information presentation where the diagram was added. Professor X now begins interacting with the diagram viewing/editing widget and the application in order to create the links he would like.

In 15, it is demonstrated how, in this embodiment, by selecting and right clicking on an object (e.g., shape, image, text, etc.), Professor X can access the linking widget. In this example, Professor X is making the large blue arrow in the diagram link to another point in the information presentation, such that when a user clicks the arrow, the playhead will jump to another point in time in the presentation and the presentation will play from that point in time. The user interface in this embodiment allows a user to enter a time in hours, minutes, and seconds format, or to use the timeline and playhead to select the point in time (i.e., by clicking and dragging the playhead to the desired location/time in the information presentation to link to).

Referring to FIG. 75E, in 16, Professor X continues to link several other objects within the diagram, using all of the different linking types. The creation of each link type works similarly to that described in 15, wherein after right-clicking, then selecting a link type, the user/editor (i.e., Professor X) is presented with special dialog boxes for creating that link type. In the example in 16, Professor X is linking an object to another asset or widget. The menu presented allows him to select an asset as well as some options for how the asset is displayed (e.g., add asset to stage, display asset modally). Those of ordinary skill in the art will see that there are many other configuration options available for all of the link types.

In 17, Professor X finishes creating the presentation and uses the save capability of the system 100 and creation/playback application to save the presentation.

Figure 76B:
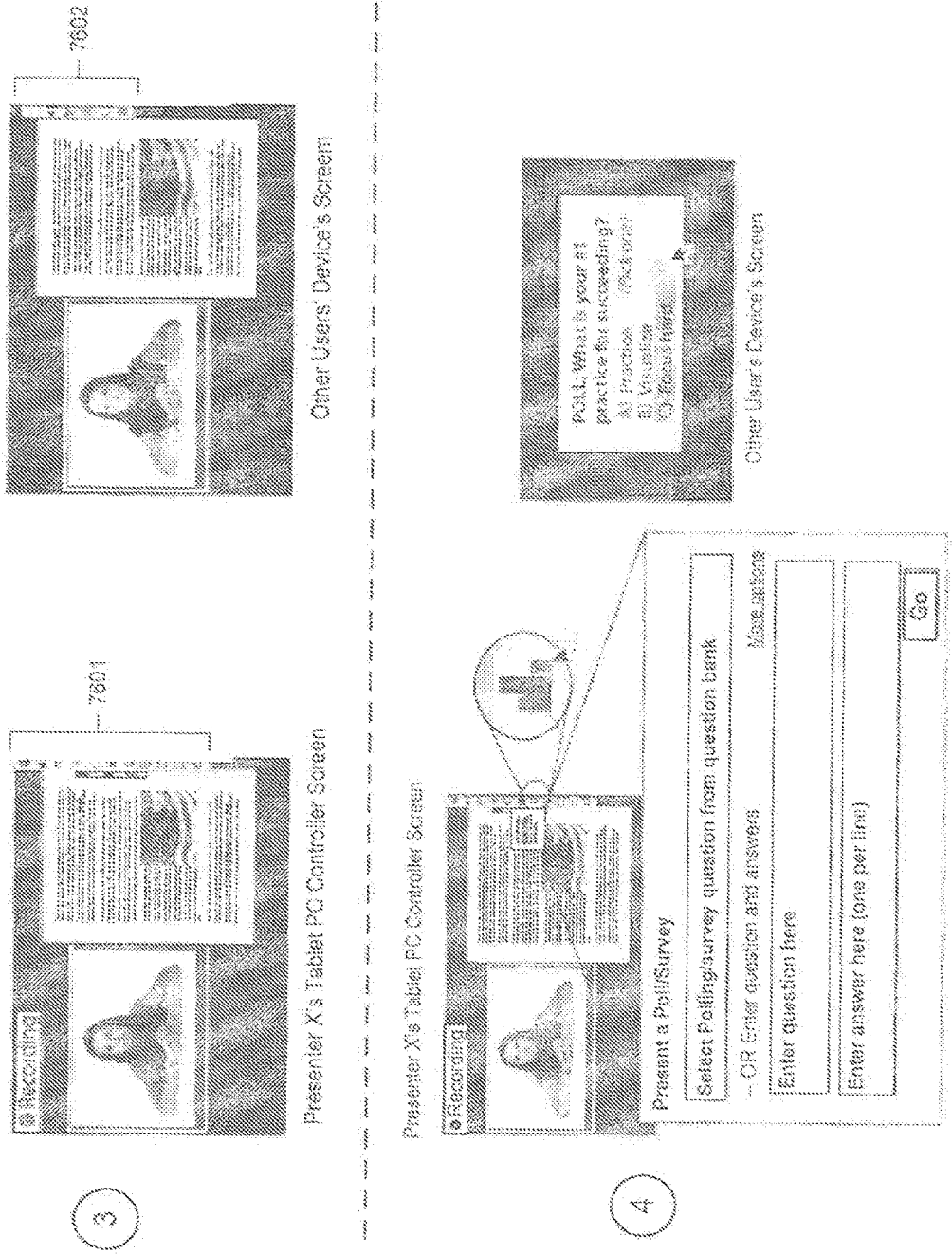

FIGS. 76A-76D together illustrate many capabilities of the system 100 and creation/playback application 120. Specifically, these figures illustrate the creation of a live delivery (and recording) of an information presentation using an editor mode embodiment. Referring to FIG. 76A, in 1 illustrates an editor user (Presenter X) in front of a live, in-person audience. Presenter X is using an editor mode embodiment of the system 100 and creation/playback application 120 which is integrated with and connected to a number of control or presentation instruments, specifically, for example: a tablet PC, multiple video cameras and/or a video/teleconferencing system, a touchscreen PC or device, interactive/touchscreen whiteboard, document camera(s) or other specialized cameras (e.g., surgical cameras), other audio/video or data signal producing devices, and a projector. An audience is watching and participating (i.e., users) using the system 100 and creation/playback application 120 and various runtime and editor mode embodiments. The audience is comprised of both live, in-person users, and remote users, all of which are able to view and participate using embodiments on desktop PCs, tablet PCs, mobile/smart phones, and other computing and control devices.

In 2, Presenter X is preparing to give a live presentation to both a live and remote audience. He will also be recording the presentation for later editing or playback. Before or during the presentation, Presenter X can configure the application in many ways. Examples of such ways include, but are not limited to: what he will see while presenting, what his main control device will be, what other users will see, how other presenters may interact by default, what the constraints are on a user's ability to change the stage and activate other widgets and assets, and what other connected devices and systems to integrate with.

Referring to FIG. 76B, in 3, Professor X begins his presentation using video and a document loaded into a document viewing/editing widget. Presenter X's Tablet PC controller screen running an editor mode embodiment is depicted showing a full set of controls 7601 available for controlling/editing the information presentations display and changes of state. Other users' device's screens are depicted running either editor mode or runtime mode embodiments, and will show a limited set of controls 7602 for controlling/editing the information presentation, based on the constraints being set and managed by Presenter X and/or other presenters, using various embodiments of the system and application.

In 4, Professor X next chooses to display one or more poll questions to the users and audience, using the polling widget. In this embodiment he is able to select a poll/survey question from a bank of existing questions or he can create a new question. Additionally, a depiction of what a user my see on their embodiment is included, wherein such user's embodiment is displaying a poll response window (part of the polling widget). As with all embodiments, users can be either in the live audience or the remote audience, and can be using a desktop PC, a mobile/smartphone, a tablet PC, a television, or any other computing or audio/visual device.

Referring to FIG. 76C, in 5, Professor X monitors the poll's results. When he is satisfied that all or enough users have submitted their responses, he can close the poll and choose whether or not to display the results to the users.

In 6, Presenter X decides to do a hands-on demonstration for the users using the document camera. Presenter X uses the integrations widget to switch the video feed to the connected document camera. Presenter X clicks/selects the tools icon to access the integrations widget and is presented with a menu of relevant options based on the state of the information presentation and other context. Presenter X is able to select various routing options for this document camera video, including adding a new video to the stage. In this scenario he chooses to route the document camera to the screen in place of the current video on the stage.

Referring to FIG. 76D, in 7, an example is depicted or what may be displayed in a user's embodiment after Presenter X activates the document camera as described above. What is shown is the video on the stage of Presenter X doing a pen and paper based activity. It is important to note that any type of camera or specialized camera (e.g., surgical camera, etc) may be used.

In 8, after Presenter X completes the hands on demonstrations using the document camera, he decides he will do a demonstration using screen sharing, such that he may display his computer/tablet/device desktop and its running applications. Using his chosen device. Presenter X selects to activate the screen sharing widget, and opts to use full screen sharing over the whole stage, rather than replacing a particular widget that may be currently visible to the users on the stage of the creation/playback application 120.

In 9, an example is depicted of what users, as well as Presenter X, may see while Presenter X is using the screen sharing widget. Presenter X sees a full set of controls 7601 over his desktop (which he can also hide). Users will see limited set of controls based on constraints, and are able to see Presenter X's desktop.

Figure 77:
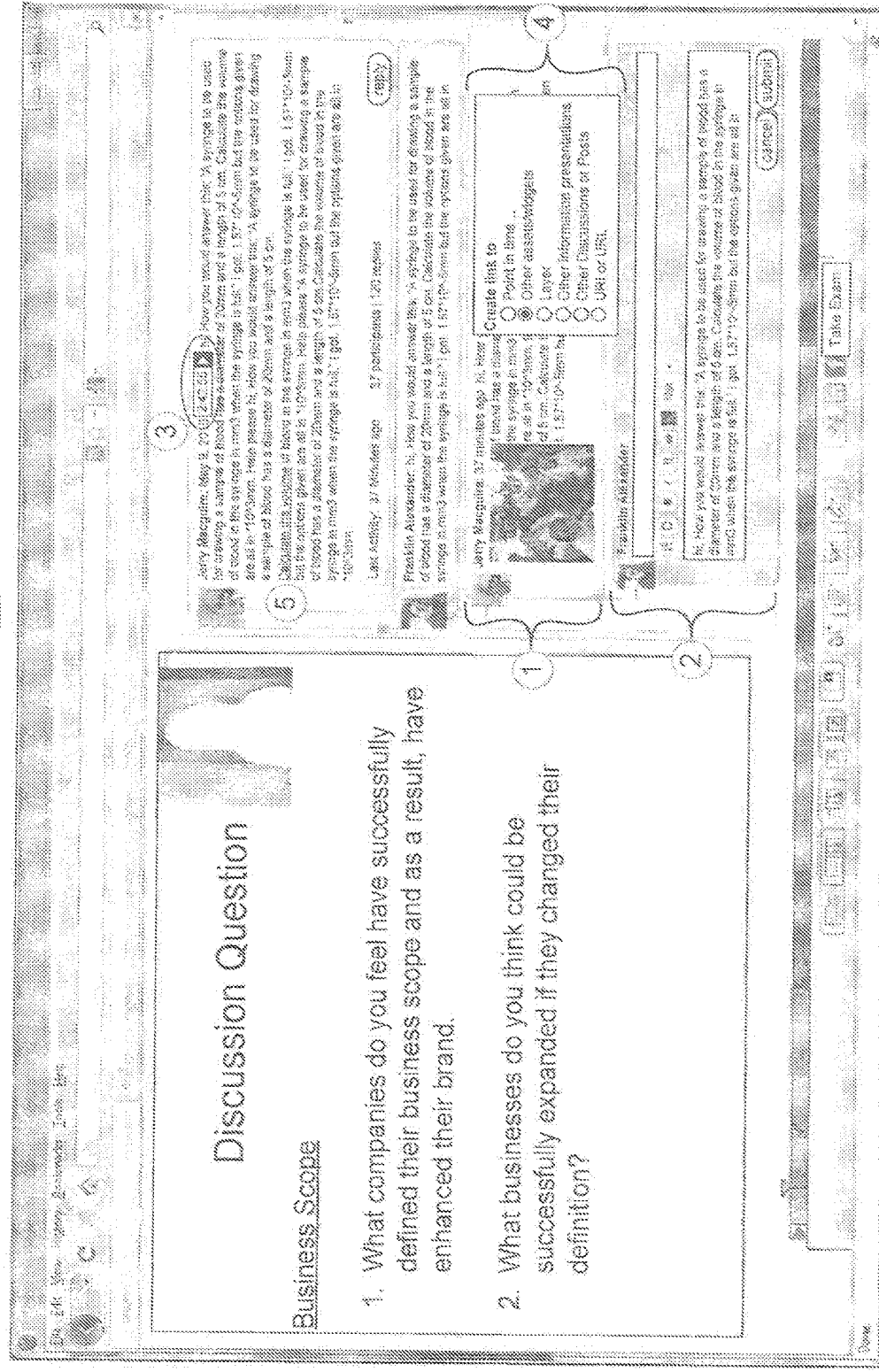

FIG. 77 illustrates a single track embodiment of the creation playback application 120 and various capabilities of the system in regard to discussion boards. In this illustration, a discussion widget is displayed on the right with a slide show viewing/editing widget on the left. In 1, a discussion board post that is rich text and contains an image is displayed. In 2, a new discussion board post is created by the user. The document editing widget is visible and open within the discussion board, such that the user can create and submit a rich text discussion post/message, which will be saved to the discussion widget and system. In 3, it is shown how a discussion or post can be linked to a specific time in the video. In 3, the time in the video that this post/link is related/tied to is 2:42:55. Clicking on the play button next to the time (dark gray arrow) will play the information presentation starting from 2:42:55. In 4, the create link popup (part of the linking widget) is shown that a user can see if they attempt to create a link from any object or text in the discussion board widget or post. In 5 a completed post is shown with a link (bright blue) made using the linking widget.

It is important to note that the sequences of screenshots illustrated in this disclosure can represent: 1) an information presentation being delivered and controlled live and in real-time by an editor user and viewed live by one or more users; or 2) an information presentation which was predefined and is being played back by users at a later time; or 3) any combination thereof.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

In addition, it should be noted that the terms "a", "an", "the", "said", etc. in the specification, figures and claims signify "at least one", "the at least one", "said at least one", etc.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "stop for" be interpreted under 35 U.S.C. 112, paragraph 6. Claims that do not expressly include the phrase "means for" or "step for" are not to be interpreted less than 35 U.S.C. 112, paragraph 6.

The invention claimed is:

1. A computer-implemented method for interactive delivery, by a processor of a pre-stored electronic presentation of a predetermined duration, to user computers associated with a plurality of users, the user computers each including an information display, the user computers coupled to the processor by a computer network, the method comprising the steps of:
   receiving a playback request, at the processor, from a first user computer, to play the electronic presentation in an automatic mode at the information display of the first user computer;
   at a selected point in time during the predetermined duration of the playback of the electronic presentation:
      suspending the automatic mode;
      entering a manual mode in the playback of the electronic presentation;
   receiving a collaboration request while in the manual mode, at the processor, from the first user computer, to enter a collaboration mode with a second user computer, the second user computer displaying content other than information associated with the selected point in time of the playback of the electronic presentation and the collaboration mode comprising synchronously displaying information associated with the selected point in time of the playback of the electronic presentation as displayed on the information display of the first user computer on an information display of the second user computer; and
   in response to an end collaboration request, at the processor, from the first user computer to end the collaboration with the second user computer, terminating the collaboration mode, said terminating including terminating the synchronously displaying of the electronic presentation.

2. The computer-implemented method of claim 1, further comprising the steps of, in response to a request from the first user computer, at the processor, to revert to the automatic mode:
   terminating, by the processor, the manual mode; and
   resuming, by the processor, the play of the electronic presentation in the automatic mode at the selected point in time.

3. The computer-implemented method of claim 1, wherein:
   the collaboration mode further comprises the step of receiving, at the processor, an execution request from the first user computer to execute a function of a first interactive widget asset of a plurality of interactive widgets; and
   synchronously executing the function of the first interactive widget asset on the first user computer and the second user computer.

4. The computer-implemented method of claim 3, wherein the plurality of interactive widget assets comprise one or more of the widgets selected from the group consisting of:
   a text chat widget, an audio/video chat widget, a browser widget, a discussion widget, an audio/video editing widget, a document editing widget, a slide show editing/viewing widget, a diagram editing/viewing widget, a polling widget, a survey widget, an assessment widget, a spreadsheet widget, a user list widget, and a calculator widget.

5. The computer-implemented method of claim 4, wherein one or more of the interactive widget assets comprise at least one user-selectable property.

6. The computer-implemented method of claim 5, wherein the first interactive widget asset is the video chat widget comprising at least one user-selectable property including a record property, the record property configured to record an audio/video input of the first user.

7. The computer-implemented method of claim 3, further comprising the steps of:
   receiving, at the processor, a second widget selection command from the second user computer to select a second interactive widget asset of the plurality of interactive widget assets; and
   in response to receiving the second widget selection command, synchronously executing the function of the second interactive widget asset on the first user computer and the second user computer.

8. The computer-implemented method of claim 1, wherein the pre-stored electronic presentation is created and received from a presentation creation user computer.

9. The computer-implemented method of claim 8, wherein the presentation creation user computer is not the first user computer.

10. The computer-implemented method of claim 9, wherein the presentation creation user computer is not the second user computer.

11. The computer-implemented method of claim 1, wherein the method further comprises the steps of:
   while the first user computer and the second user computer are in the collaboration mode, receiving a second playback request from a third user computer at the processor, to play the electronic presentation in the automatic mode at approximately a beginning of the predetermined duration; and in response to receiving the second playback request, executing the playback of the electronic presentation on the third user computer at approximately the beginning of the predetermined duration.

12. A system for interactive delivery of a pre-stored electronic presentation of a predetermined duration, the system comprising:

an electronic database for storing the electronic presentation, wherein the electronic presentation is configured for display to user computers associated with a plurality of users; and a processor communicably coupled to the electronic database, wherein the processor is configured to:

receive the electronic presentation from a presentation creation user computer and store the electronic presentation in the electronic database;

receive a playback request from a first user computer, to play the electronic presentation in an automatic mode at an information display of the first user computer, wherein the first user computer is coupled to the processor by a computer network;

in response to receiving the playback request from the first user computer, retrieve the electronic presentation from the electronic database and play the electronic presentation in the automatic mode at the information display of the first user computer;

at a selected point in time during the predetermined duration of the playback of the electronic presentation:

suspend the automatic mode;

enter a manual mode in the playback of the electronic presentation; and execute a function of a first interactive widget asset; and receive a collaboration request while in the manual mode from the first user computer to enter a collaboration mode with a second user computer, the second user computer coupled to the processor by the computer network and displaying content other than information associated with the selected point in time of the playback of the electronic presentation, the collaboration mode comprising synchronous display of information associated with the point in time of the playback of the electronic presentation as displayed on the information display of the first user computer on an information display of the second user computer.

13. The system of claim 12, the processor further configured to:

in response to an end collaboration request from the first user computer to end the collaboration with the second user computer, terminate the collaboration mode, said terminating including terminating the synchronous display of the electronic presentation and terminating the function of the first interactive widget asset with respect to the second user computer; and in response to a request from the first user computer to revert to the automatic mode:

terminate the manual mode, said terminating of the manual mode including terminating the function of the first interactive widget asset with respect to the first user computer; and resume the play of the electronic presentation in the automatic mode at the selected point in time.

14. The system of claim 12, the processor further configured to:

receive an execution request from the second user computer to execute a function of a second interactive widget asset of a plurality of interactive widget assets; and in response to receiving the execution request from the second user computer, synchronously execute the function of the second interactive widget asset on each of the first and second user computers.

15. The system of claim 14, wherein the processor is further configured to:

receive a third widget selection command from the second user computer to select a third interactive widget asset of the plurality of interactive widget assets; and in response to receiving the third widget selection command, synchronously execute the function of the third interactive widget asset on the first user computer and the second user computer.

* * * * *